March 8, 1960 R. M. RINDER ET AL 2,927,732

ELECTRONIC COMPUTER

Filed Oct. 10, 1955 78 Sheets-Sheet 1

INVENTORS.
George B. Greene.
Charles M. Hill.
Robert M. Rinder.
Robert M. Walsh.
Eugene P. Hamilton.
Oliver J. Cotey.
William B. Bennett.

Robert W. Hampton

March 8, 1960 R. M. RINDER ET AL 2,927,732

ELECTRONIC COMPUTER

Filed Oct. 10, 1955 78 Sheets-Sheet 2

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732
ELECTRONIC COMPUTER
Filed Oct. 10, 1955 78 Sheets-Sheet 4

INVENTORS.
George B. Greene.
Charles M. Hill.
Robert M. Rinder.
Robert M. Walsh.
Eugene P. Hamilton.
Oliver J. Cotey.
William B. Bennett.

BY
Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 7

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 8

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.
BY
Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hauston

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 18

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 21

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 23

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 24

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 25

INVENTORS
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hughston

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton.

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 35

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 37

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 39

INVENTORS.
George B. Greene.
Charles M. Hill.
Robert M. Rinder.
Robert M. Walsh.
Eugene P. Hamilton.
Oliver J. Cotey.
William B. Bennett BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 44

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 45

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732
ELECTRONIC COMPUTER
Filed Oct. 10, 1955 78 Sheets-Sheet 46

INVENTORS
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 48

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 49

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 53

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 54

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 56

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 58

INVENTORS
George B. Greene.
Charles M. Hill.
Robert M. Rinder.
Robert M. Walsh.
Eugene P. Hamilton.
Oliver J. Cotey.
William B. Bennett.
BY Robert W. Hamilton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 60

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 65

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 66

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

March 8, 1960 R. M. RINDER ET AL 2,927,732

ELECTRONIC COMPUTER

Filed Oct. 10, 1955 78 Sheets-Sheet 67

INVENTORS.
George B. Greene.
Charles M. Hill.
Robert M. Rinder.
Robert M. Walsh.
Eugene P. Hamilton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 69

INVENTORS.
George B. Greene.
Charles M. Hill.
Robert M. Rinder.
Robert M. Walsh.
Eugene P. Hamiton.
Oliver J. Cotey.
William B. Bennett.

BY Robert W. Hampton

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732
ELECTRONIC COMPUTER
Filed Oct. 10, 1955 78 Sheets-Sheet 71

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton March 8, 1960 R. M. RINDER ET AL 2,927,732

ELECTRONIC COMPUTER

Filed Oct. 10, 1955 78 Sheets-Sheet 74

INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder
Robert M. Walsh.
Eugene P. Hamilton.
Oliver J. Cotey.
William B. Bennett.
BY Robert W. Hampton INVENTORS.
George B. Greene.
Charles M. Hill.
Robert M. Rinder.
Robert M. Walsh.
Eugene P. Hamilton.
Oliver J. Cotey.
William B. Bennett
BY Robert W. Hampton

United States Patent Office 2,927,732

Patented Mar. 8, 1960

2,927,732

ELECTRONIC COMPUTER

Robert M. Rinder and Robert M. Walsh, Berkeley, Eugene P. Hamilton, Richmond, Charles M. Hill and Oliver J. Cotey, Oakland, and George B. Greene, Berkeley, Calif., and William B. Bennett, Albuquerque, N. Mex., assignors to Marchant Research, Inc., a corporation of California Application October 10, 1955, Serial No. 539,337

9 Claims. (Cl. 235—157)

The present invention relates to computers, and more particularly concerns an electronic digital computer.

Large-scale digital computers that are known in the art process and store large quantities of data which can be represented in digital form. Such computers are bulky and expensive, they consume a large amount of electrical power, and they employ so many complements that they must be repaired often and are therefore frequently unavailable for operation. Smaller, less complex digital computers have been designed to overcome some of the above difficulties, but these are generally too slow in operation to be of comparable value in processing large quantities of data, and many of the smaller computers are disproportionately expensive and unreliable.

It is therefore a primary object of the present invention to provide a relatively small and simple electronic computer which is reliable and fast in operation.

Other objects of the invention are:

To provide such a computer, the internal operations of which are performed in the decimal system of notation.

To provide an improved circuit for generating timing pulses in a computer;

To provide an improved circuit for distributing timing pulses in a computer;

To provide an improved gated amplifier circuit for cooperation with a magnetic transducing head;

To provide an improved band selection circuit for a magnetic drum memory in a computer;

To provide an improved circuit for shaping writing pulses which are employed for driving a magnetic transducing head;

To provide an improved circuit for interpreting signals that are derived from a magnetic memory having values recorded therein in random order;

To interpret signals, representing randomly time-spaced value changes, by detecting the properties of each signal at a plurality of times during the signal, and relating the signal to an appropriate one of several predetermined time intervals in response to such detection;

To provide an improved circuit for adding values expressed in binary-coded decimal form;

To provide improved means for counting machine cycles during a computer operation for thereby controlling the continued progress of said operation;

To provide an improved circuit for selecting a computer operation;

To provide an improved circuit for locating addresses in a computer memory;

To provide an improved circuit for performing arithmetic operations in a computer;

To selectively compute in decimal or hexadecimal notation;

To provide an improved circuit for detecting coincidence between a predetermined sector value and its corresponding sector in a magnetic drum memory;

To provide an improved circuit for sequencing the operations of a computer;

To provide an improved circuit for automatically starting a second computer operation in response to the termination of a first computer operation;

To provide an improved circuit for distributing control voltages in a computer;

To provide an improved circuit for detecting an overflow or nonoverflow condition in a computer register, and for stopping or continuing the computer operation in response to said overflow or nonoverflow condition as required by the mathematical significance of such overflow or nonoverflow condition;

To provide an improved error-detection circuit in a computer;

In a stored program computer having means for automatically stopping computer operation in response to the occurrence of certain events, to provide improved means for recording a representation of the program step which was in progress when the computer is automatically stopped;

In a stored program computer having manually operable means for stopping the computer, to provide improved means for recording a representation of the program step which was in progress when the computer is manually stopped;

In a stored program computer having means for stopping computer operation, to provide improved means for re-initiating computer operation at a selected step in the program after said operation has been stopped;

To compare the values of selected digits in two multiple-digit numbers, and to perform respective control operations in response to different results of said comparison; and In a programmed computer adapted to perform any of a set of primary logical operations in conjunction with any of a set of secondary operations, and wherein successive steps of a program are performed under control of respective multiple-digit code values set up in the computer, to provide improved means for determining a primary operation under control of a first discrete part of a code value, and for determining a conjunctive secondary operation under control of a second discrete part of said last-named code value.

Other objects of the invention will appear from the following description, reference being made to the accompanying drawings, in which:

Fig. 6 is a block diagram employed to represent the cathode follower in Fig. 5;

Fig. 32 is a drawing layout illustrating the manner in which Figs. 33 and 34 are joined to show the entire block diagram of the first embodiment of the invention;

Figures 32, 33:
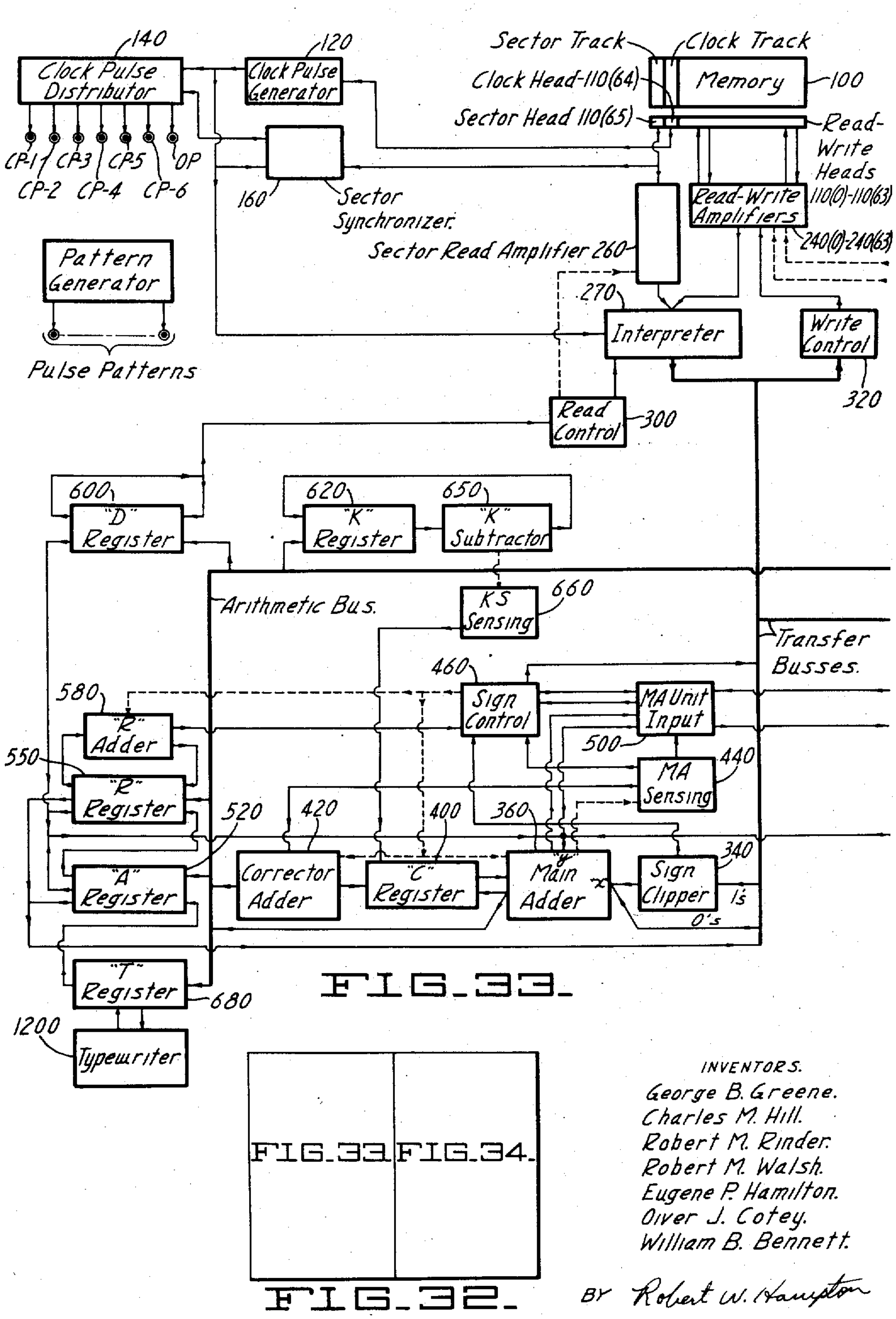
Figure 34:
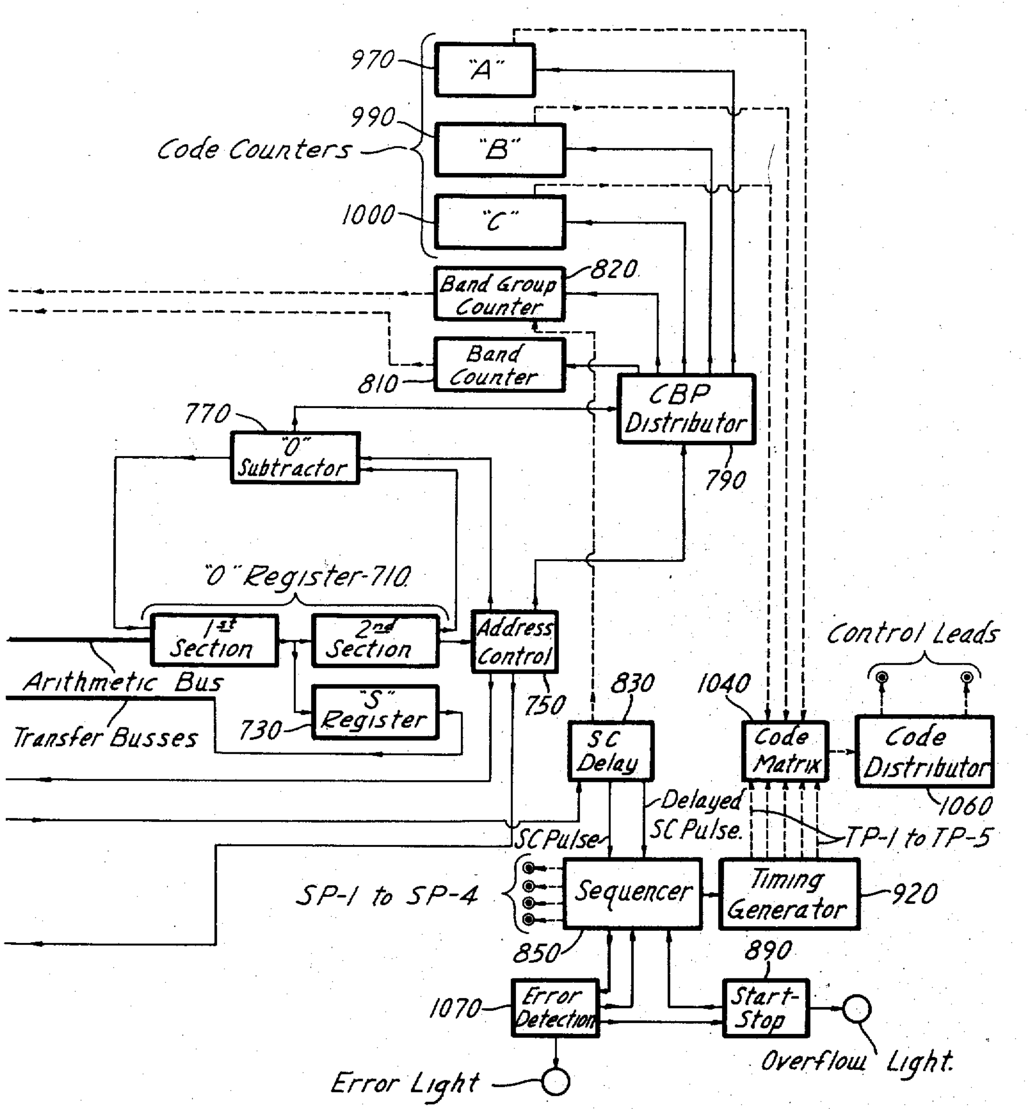
Figure 35:
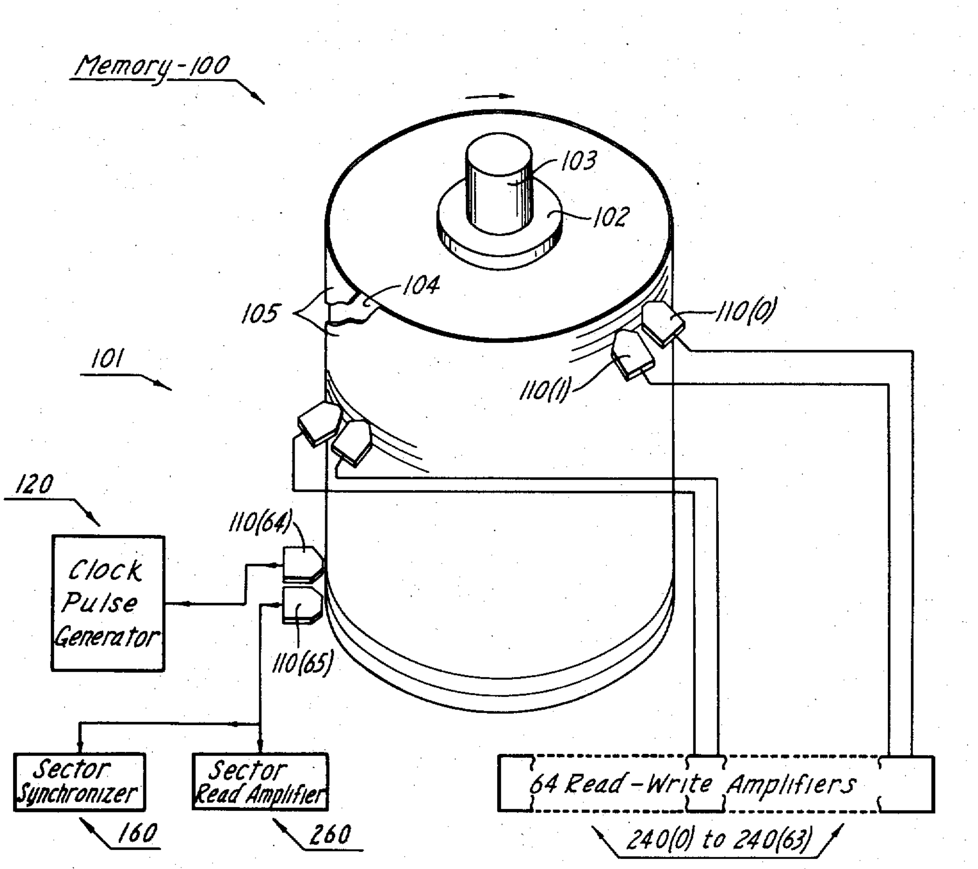
Figures 36, 37, 38:
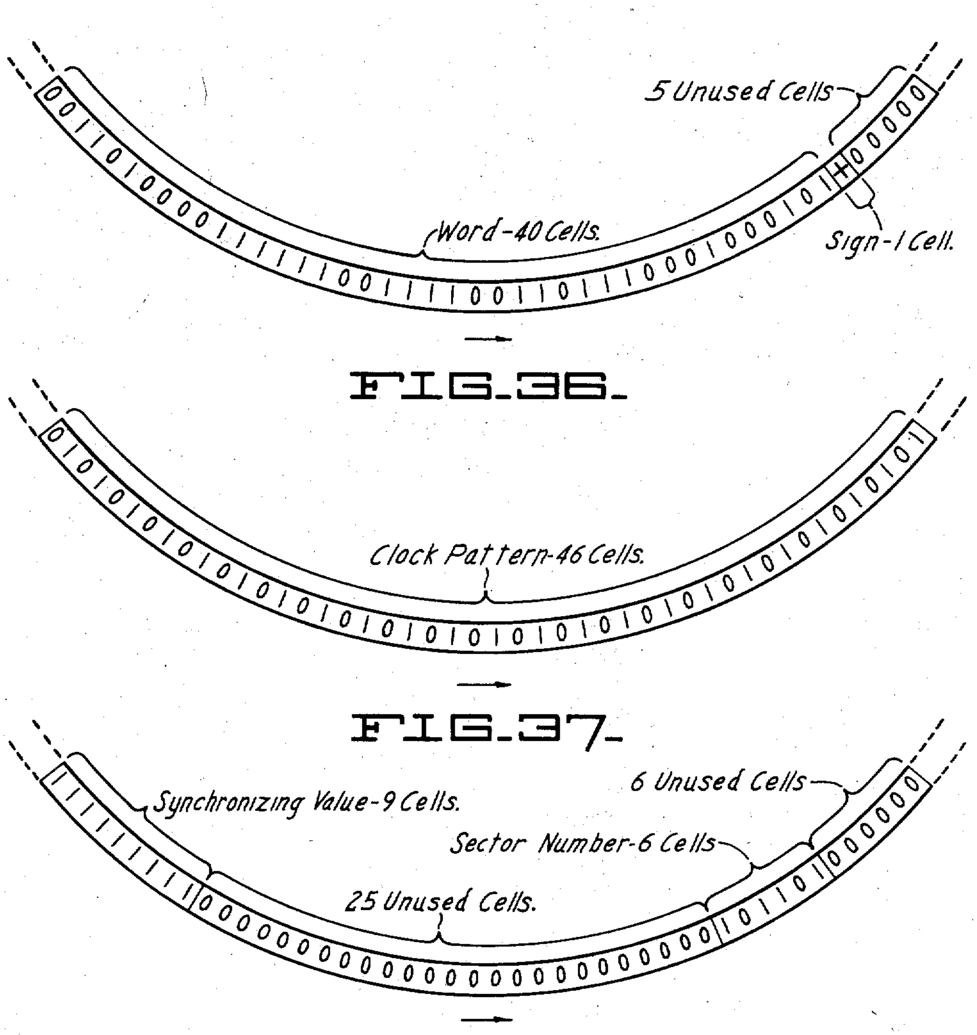
Figure 39:
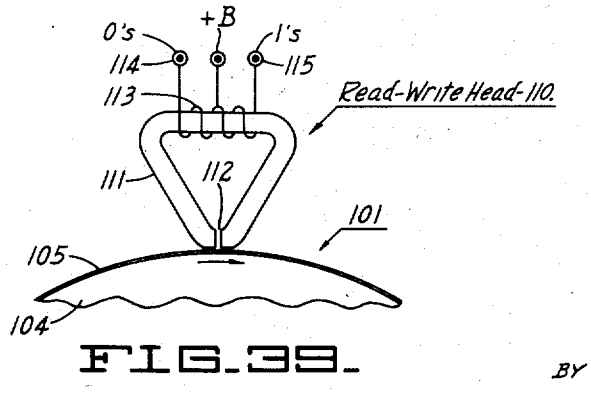
Figure 4A:
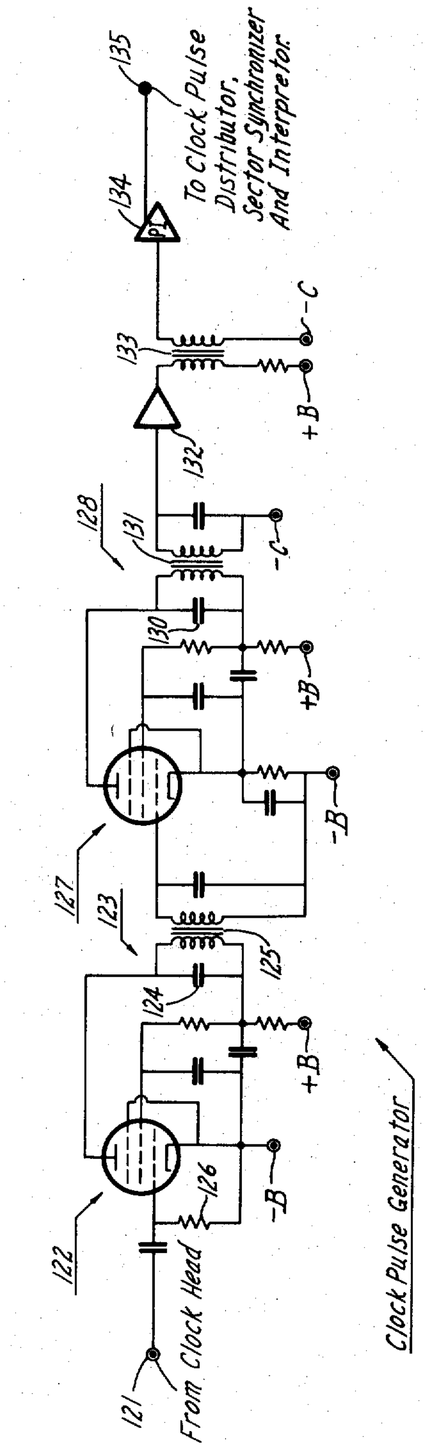
Figure 41:
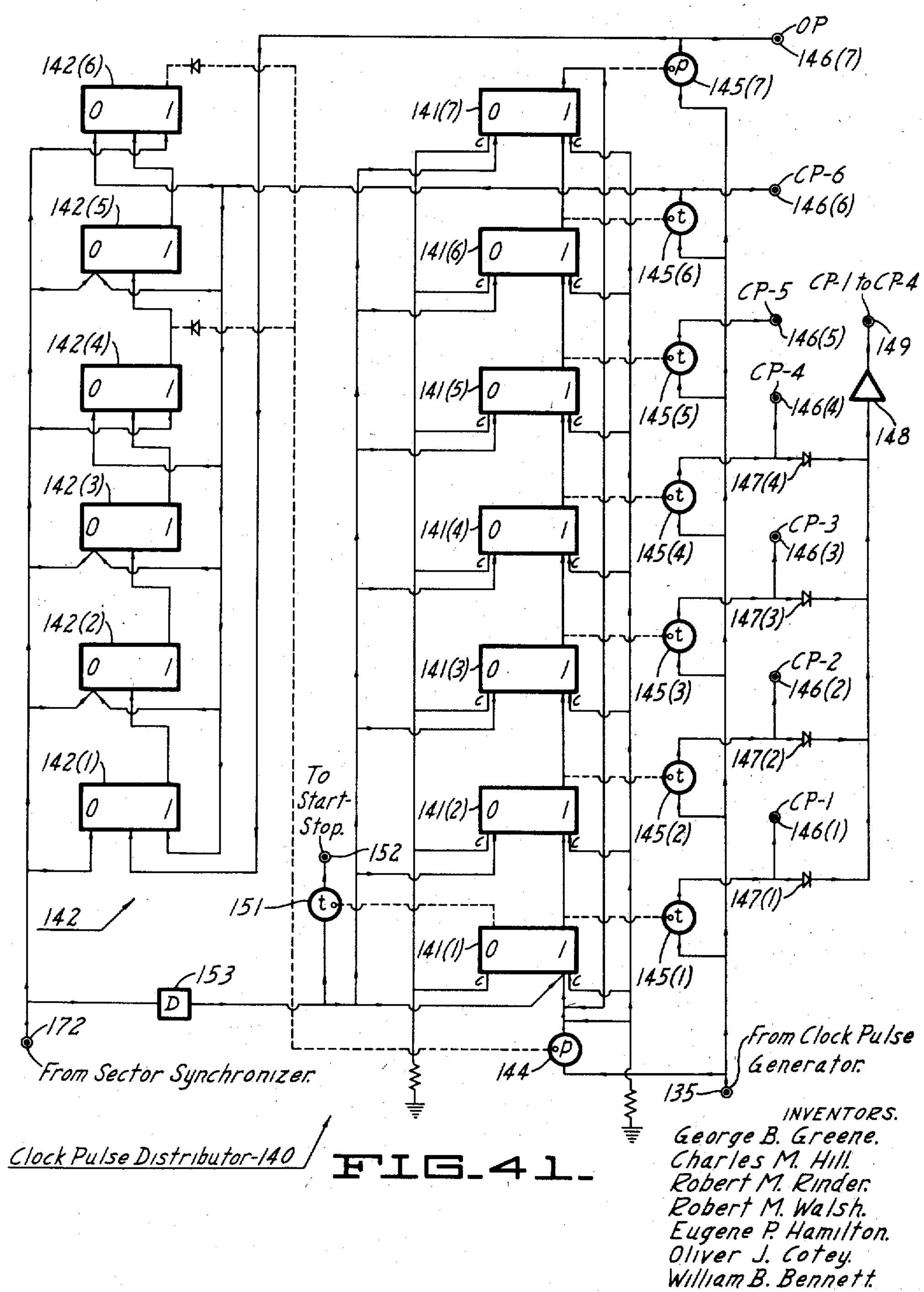
Figure 42:
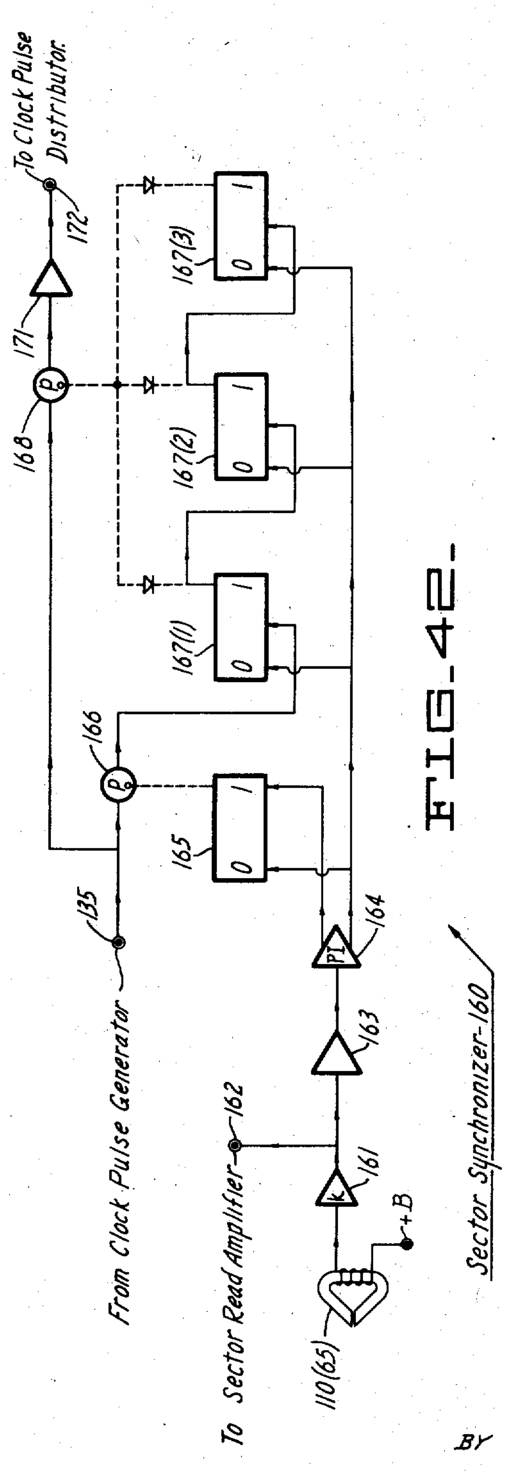
Figure 43:
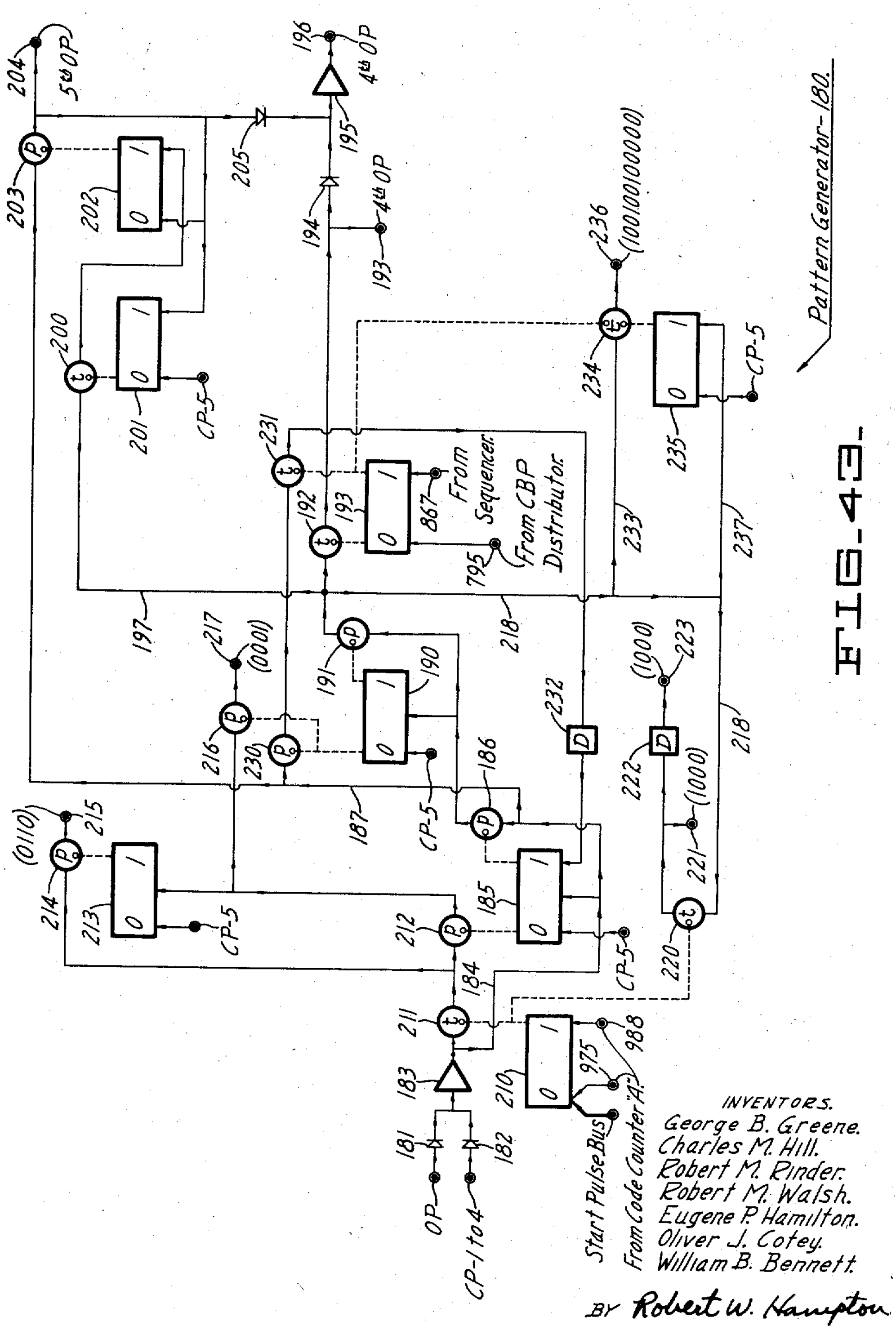
Figure 44:
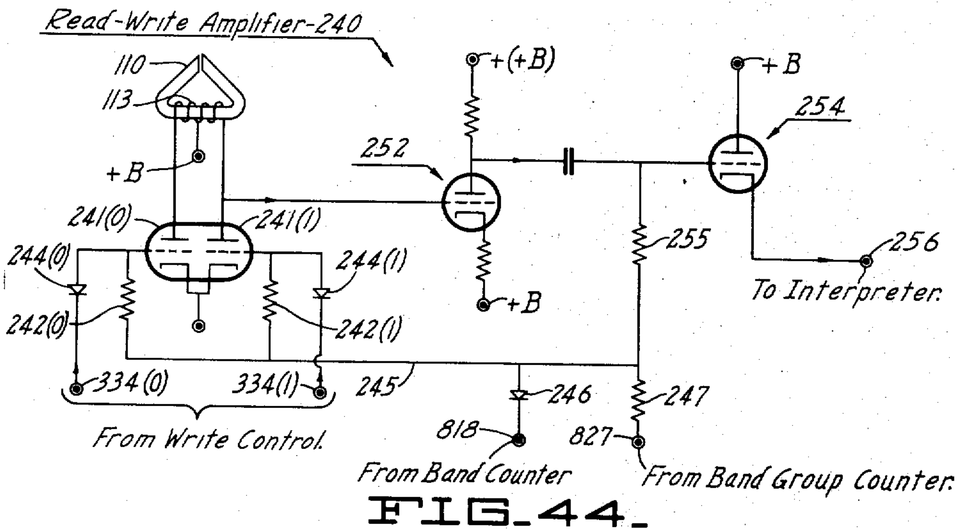
Figure 45:
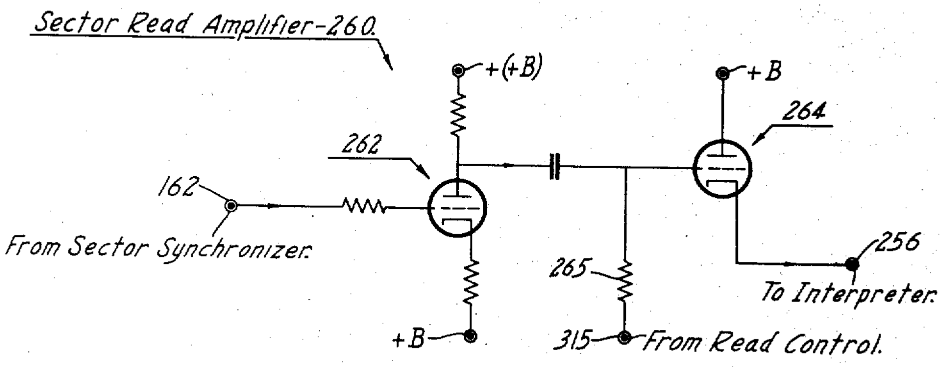
Figure 46:
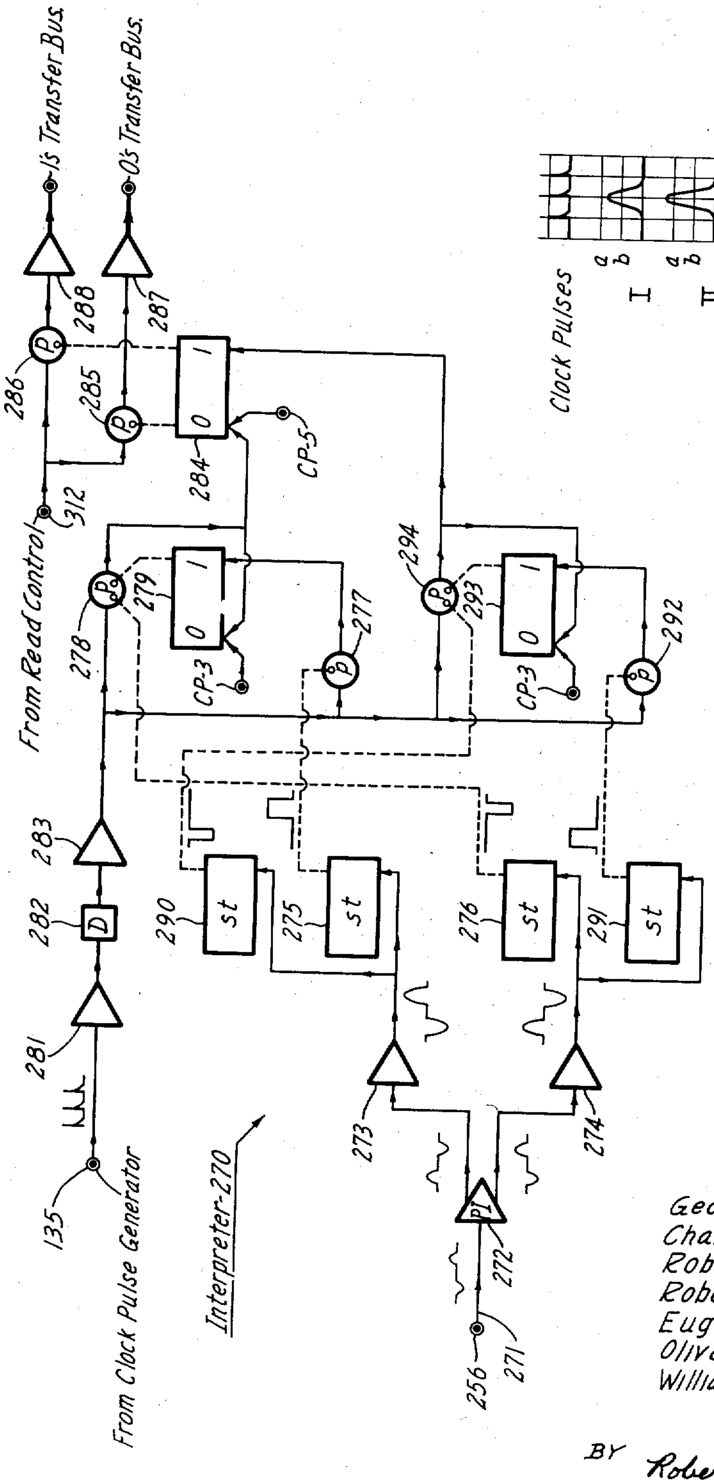
Figure 47:
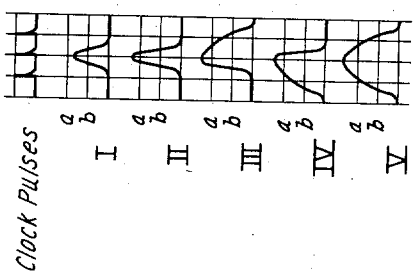
Figure 48:
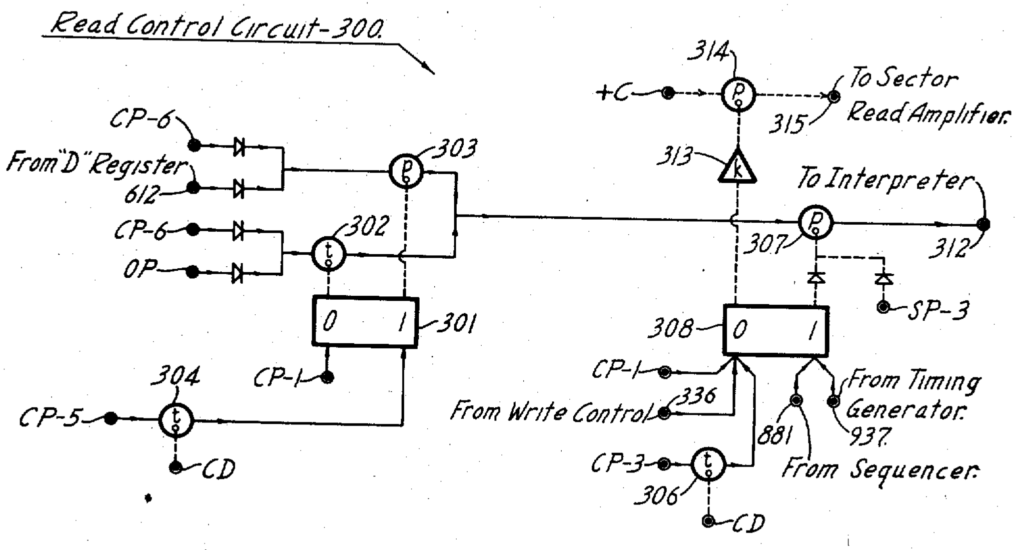
Figure 49:
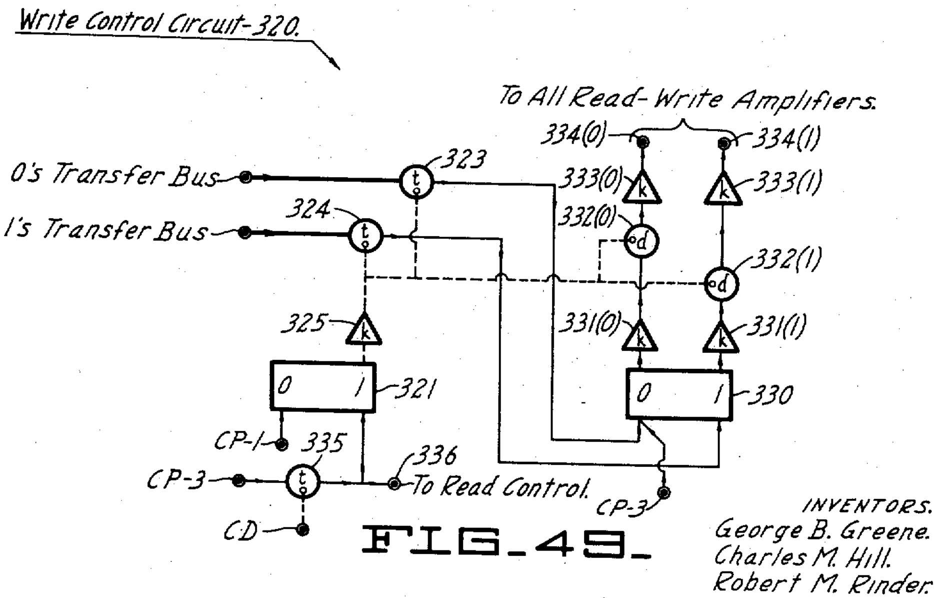
Figures 50, 54:
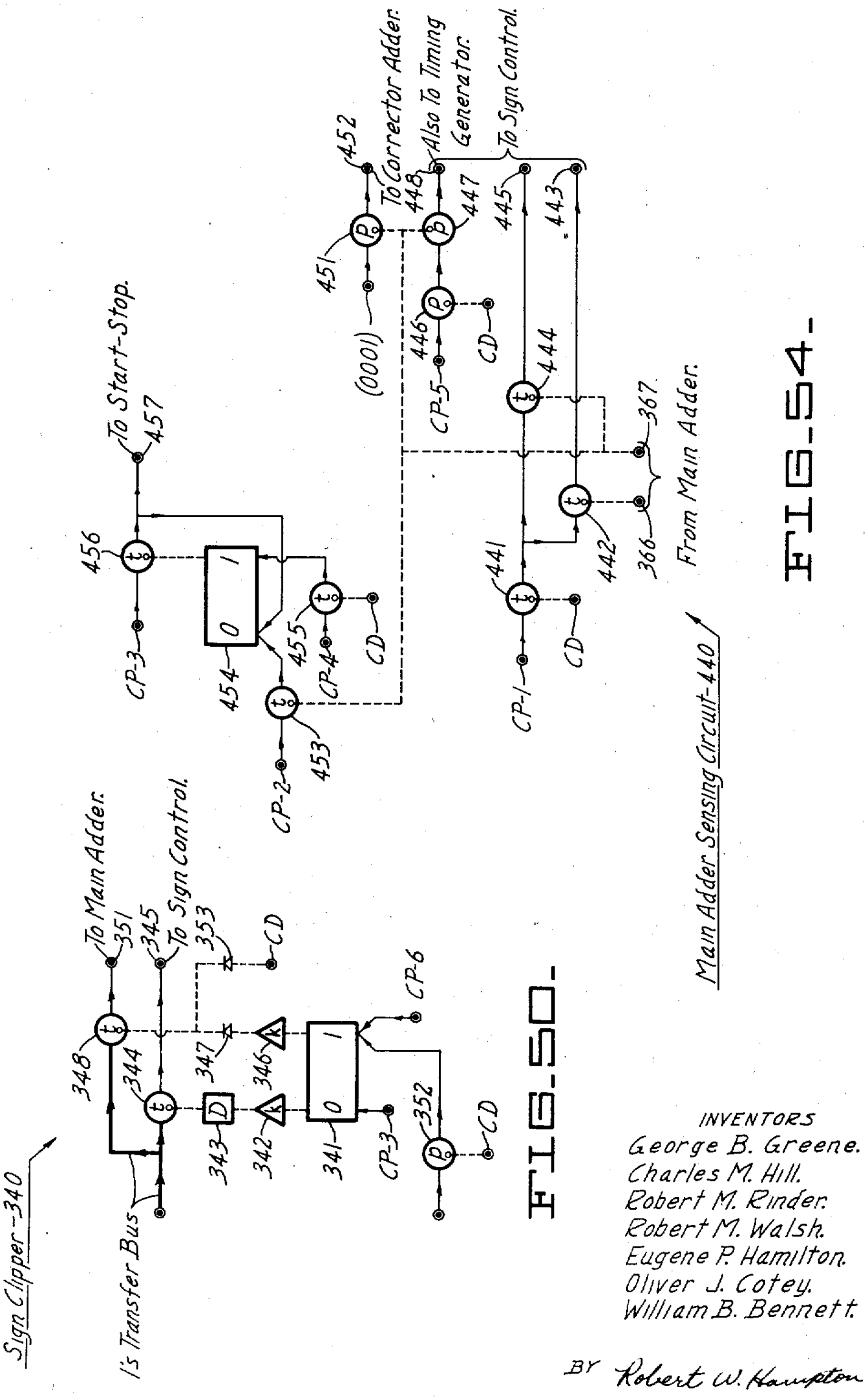
Figure 51:
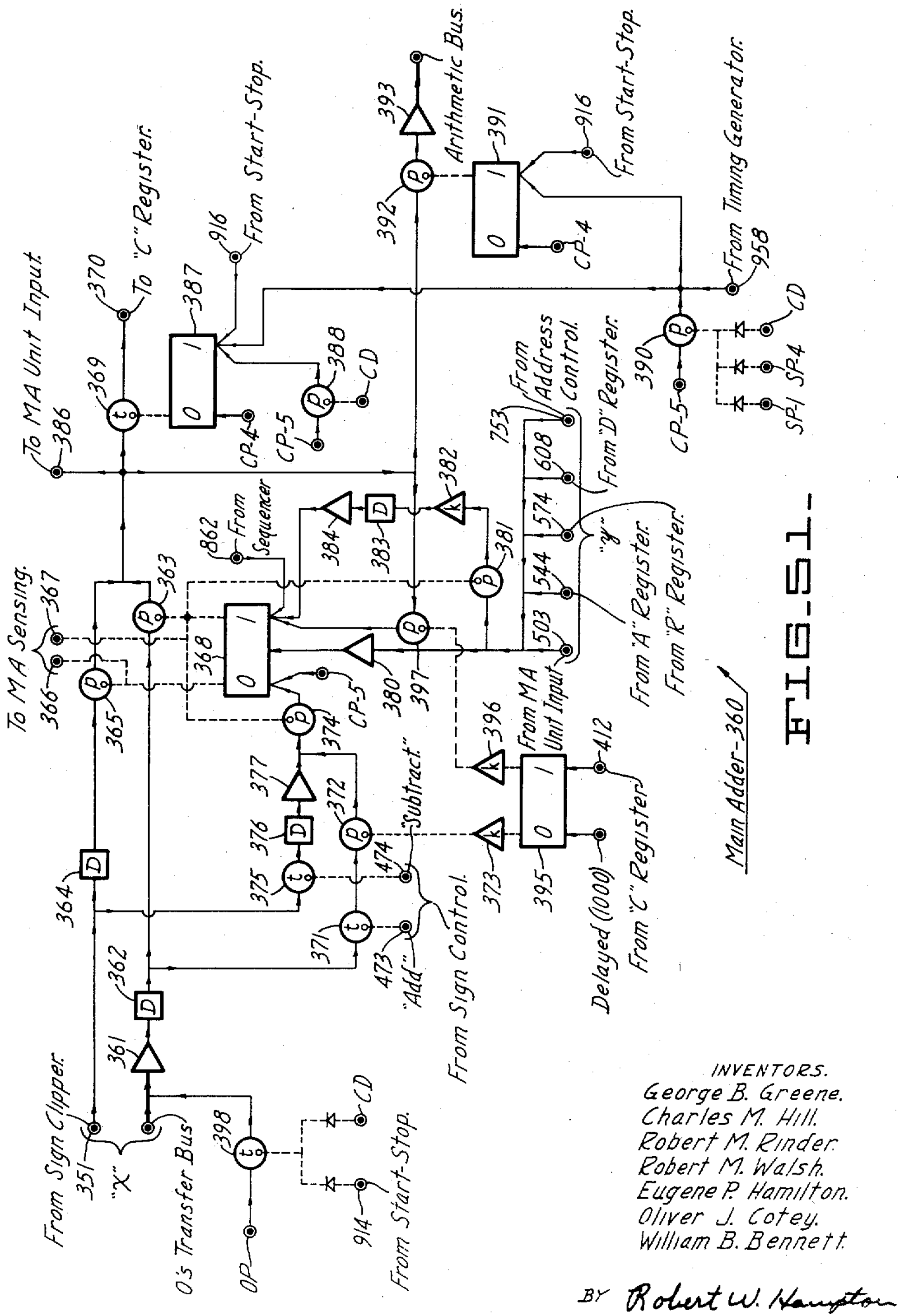
Figure 52:
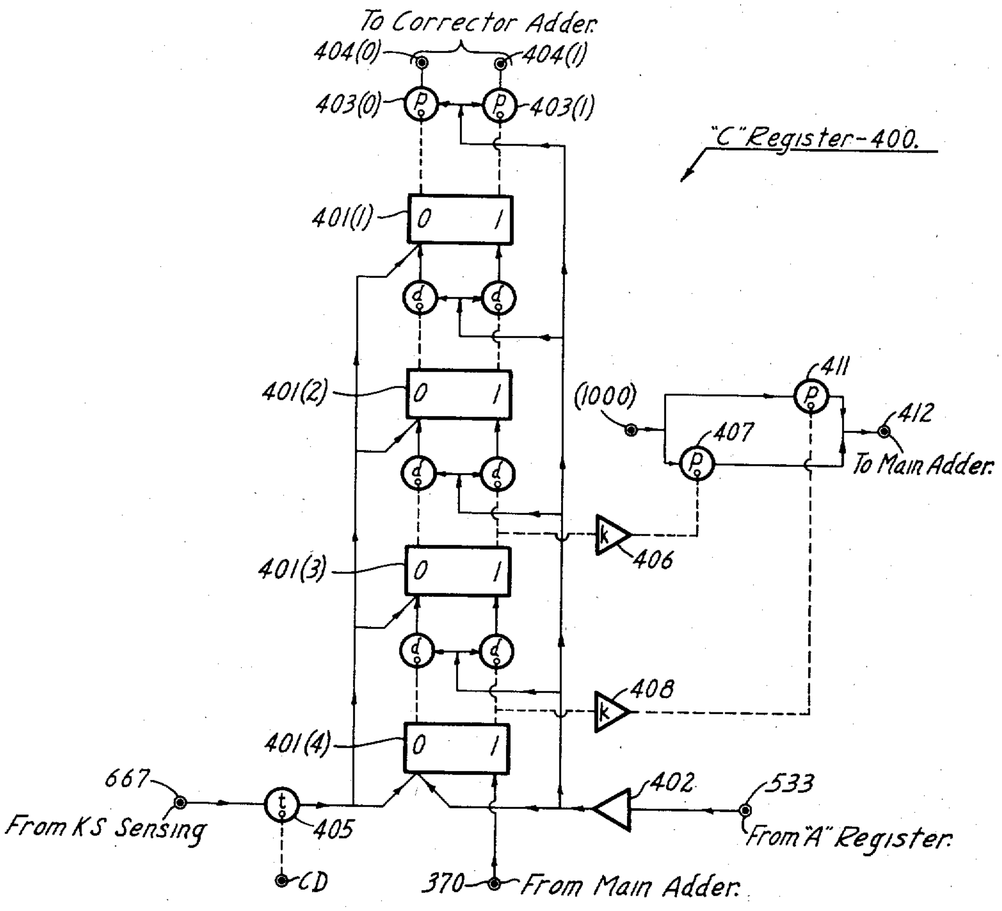
Figure 53:
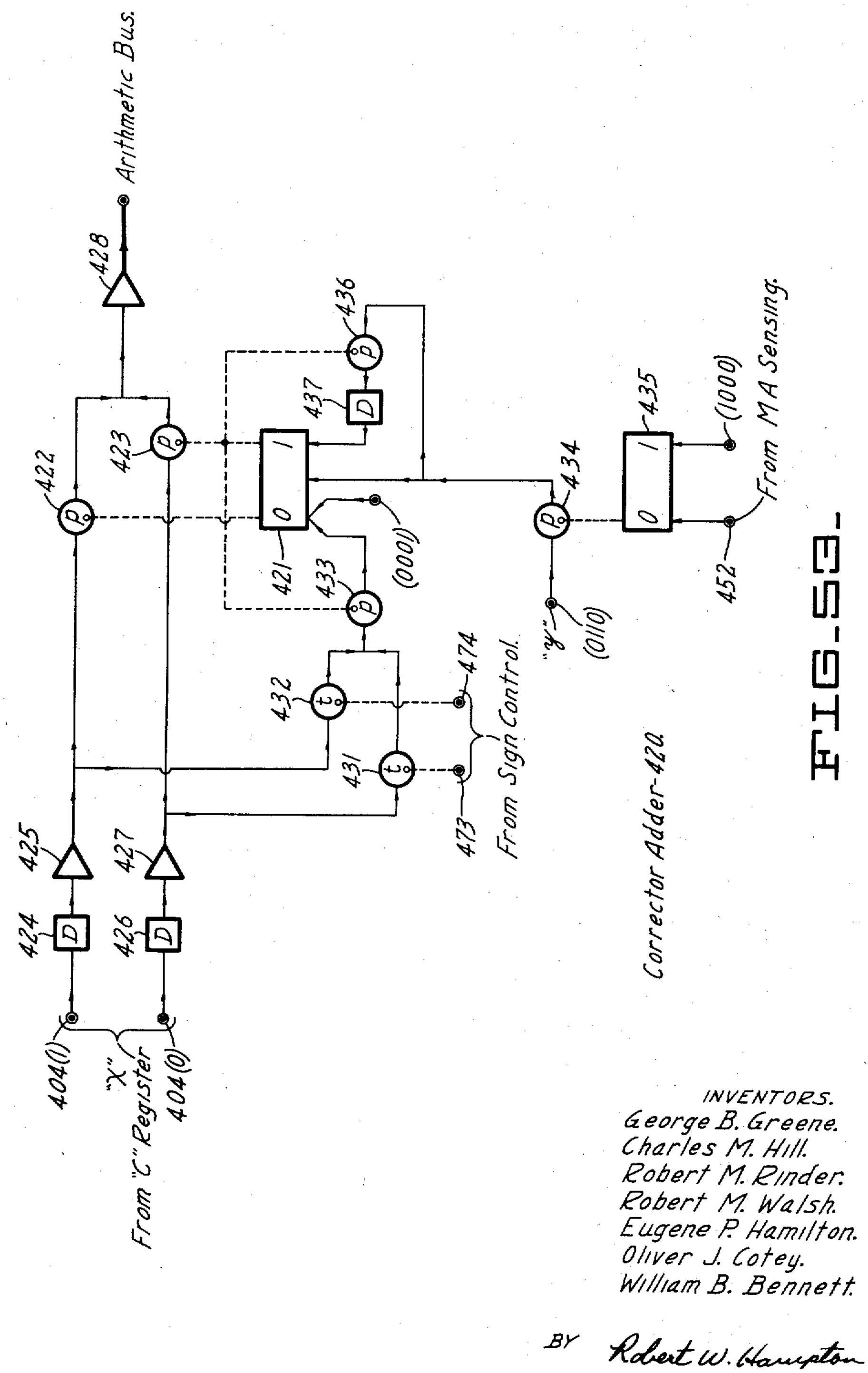
Figure 55:
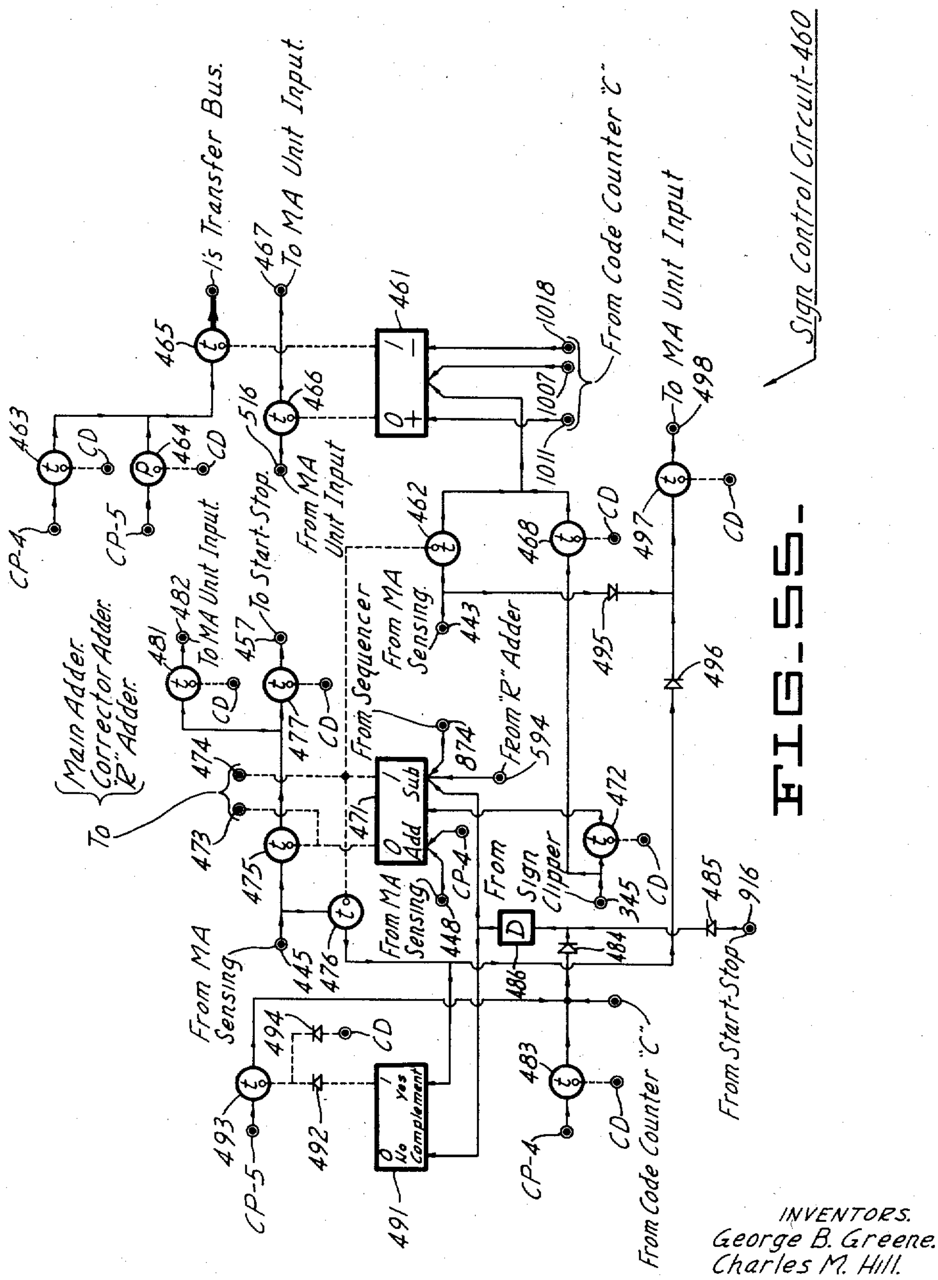
Figure 56:
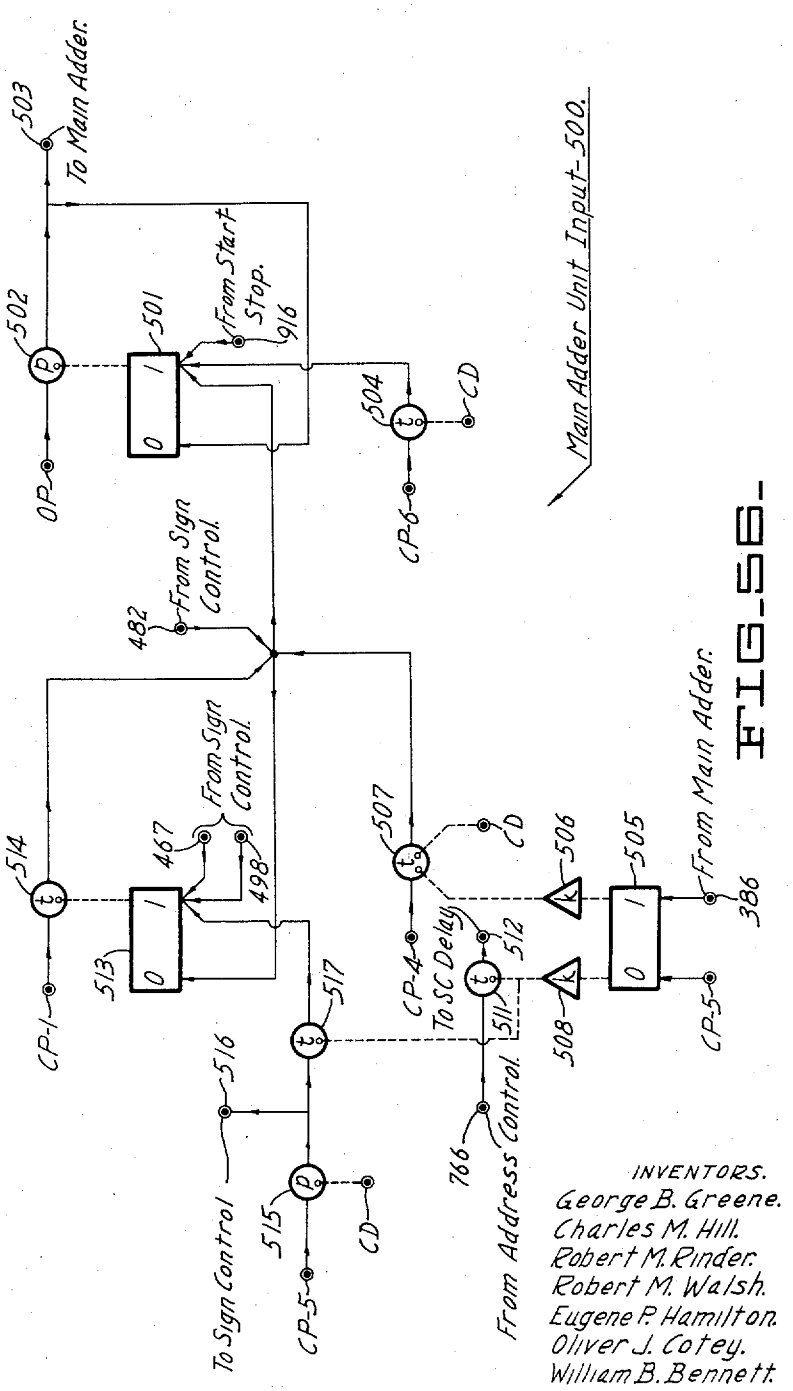
Figure 57:
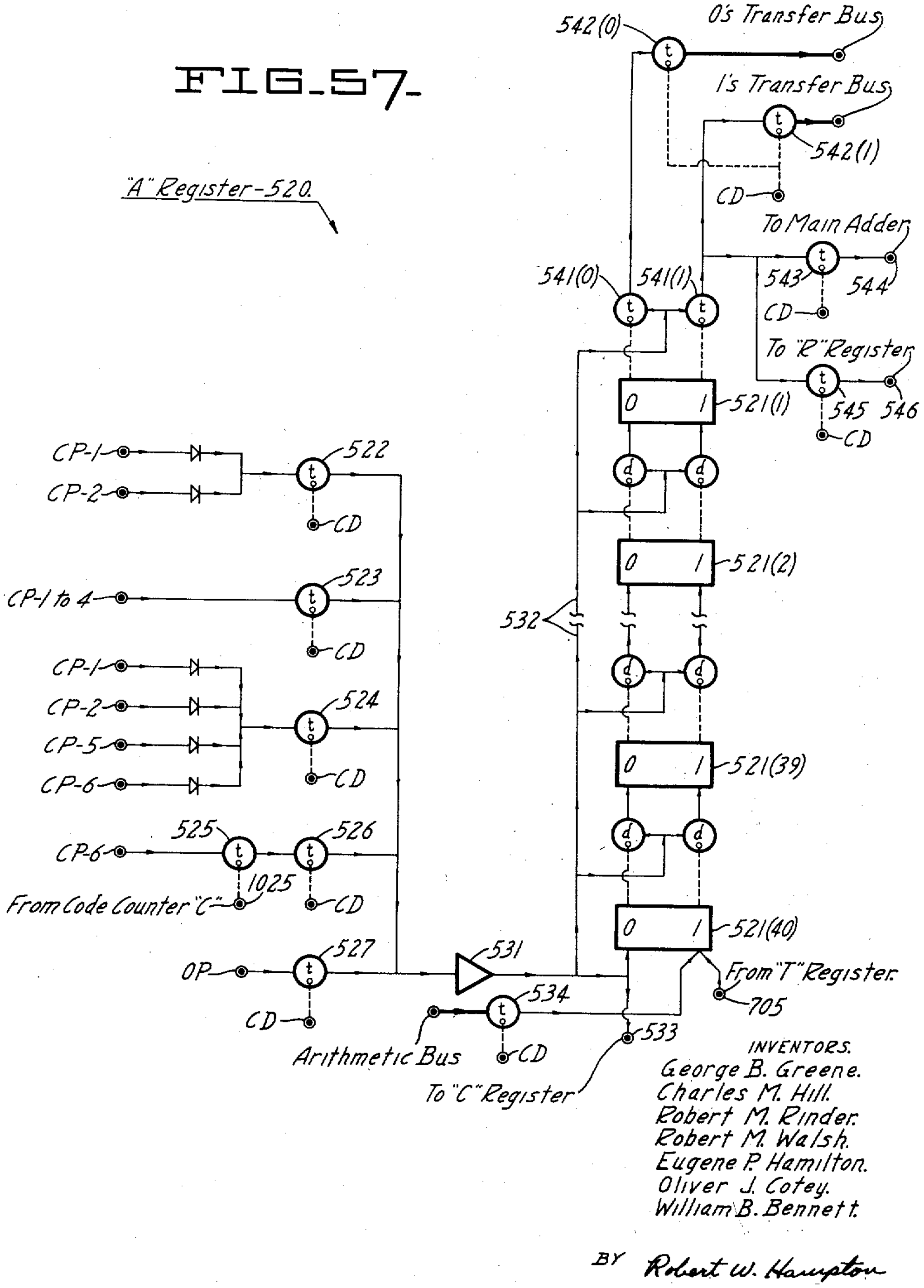
Figure 58:
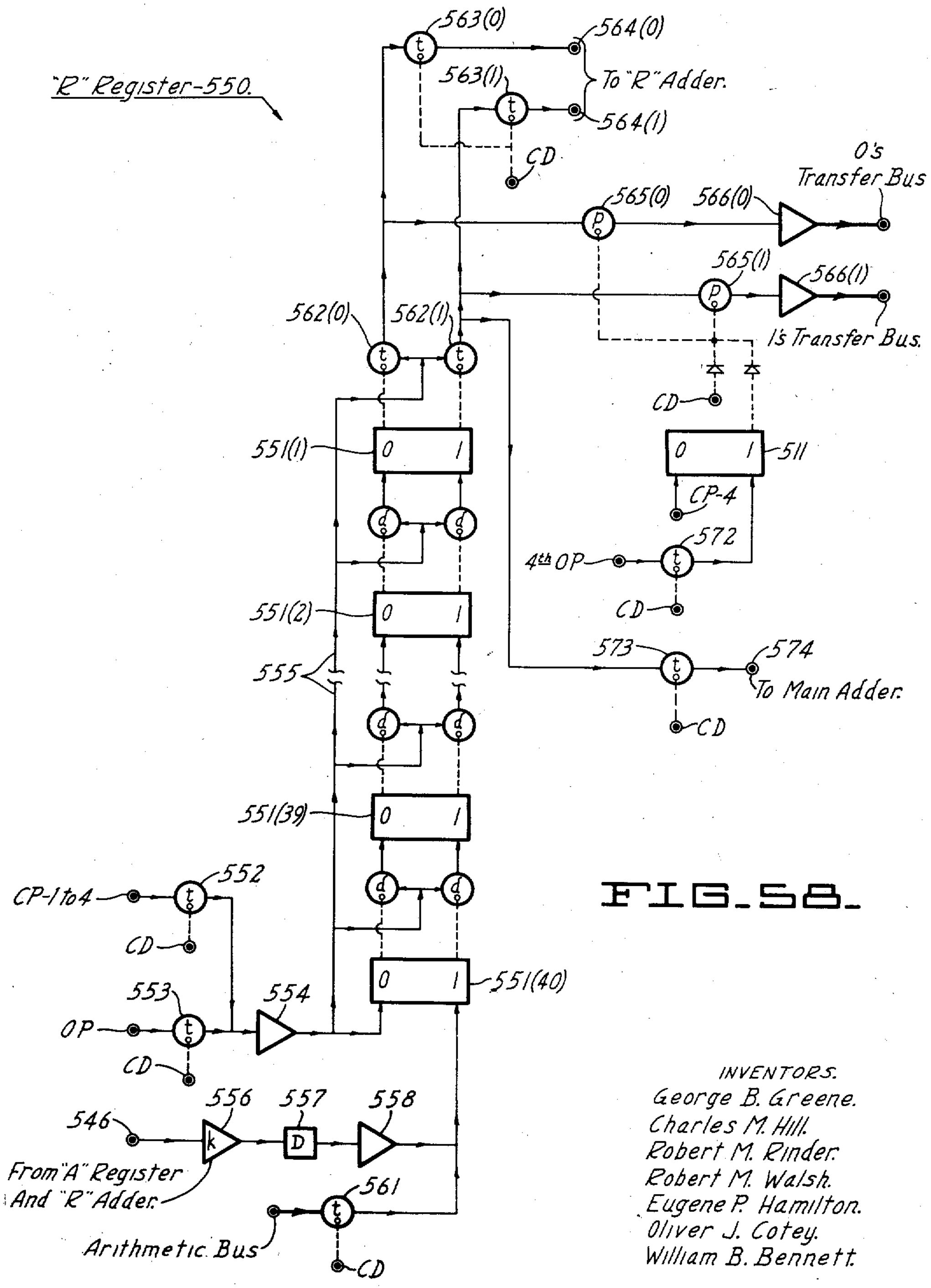
Figure 59:
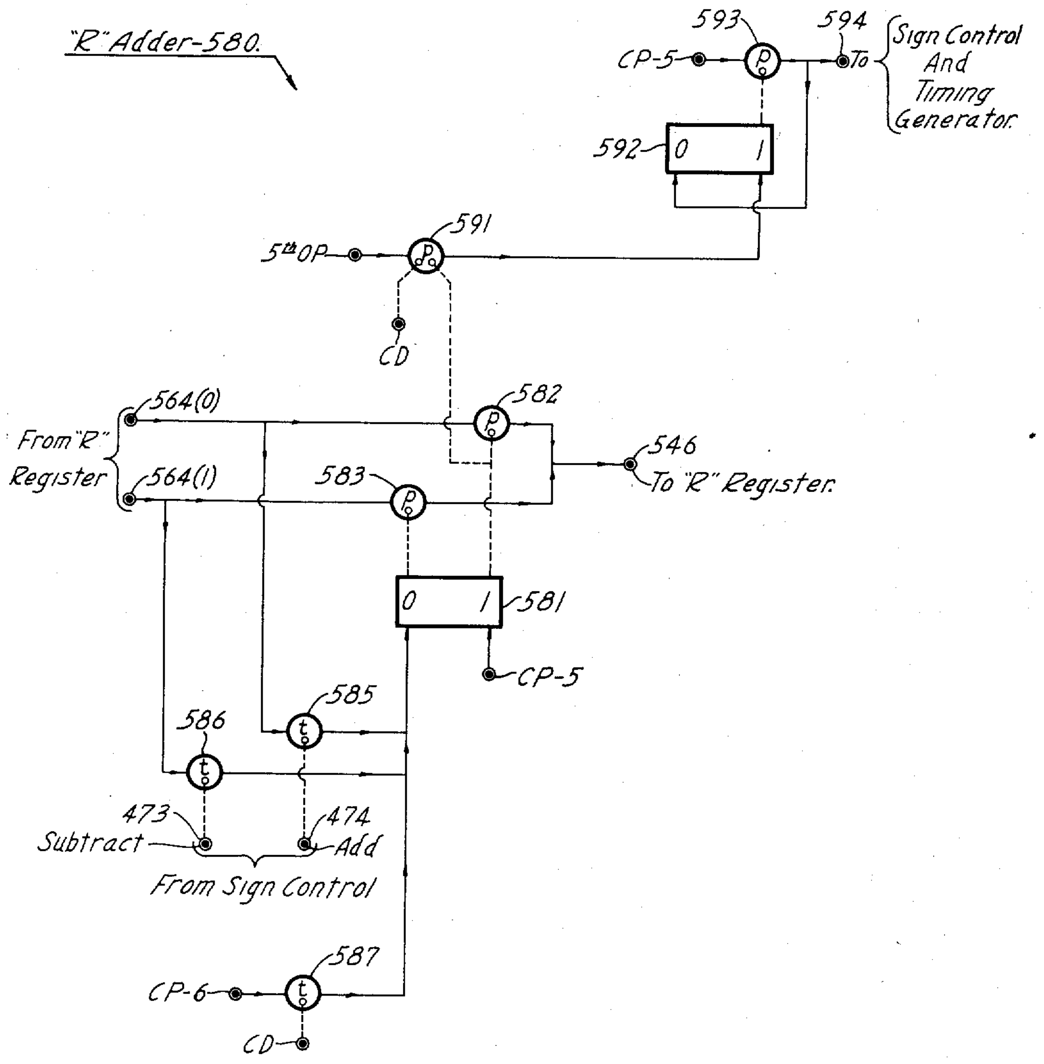
Figure 60:
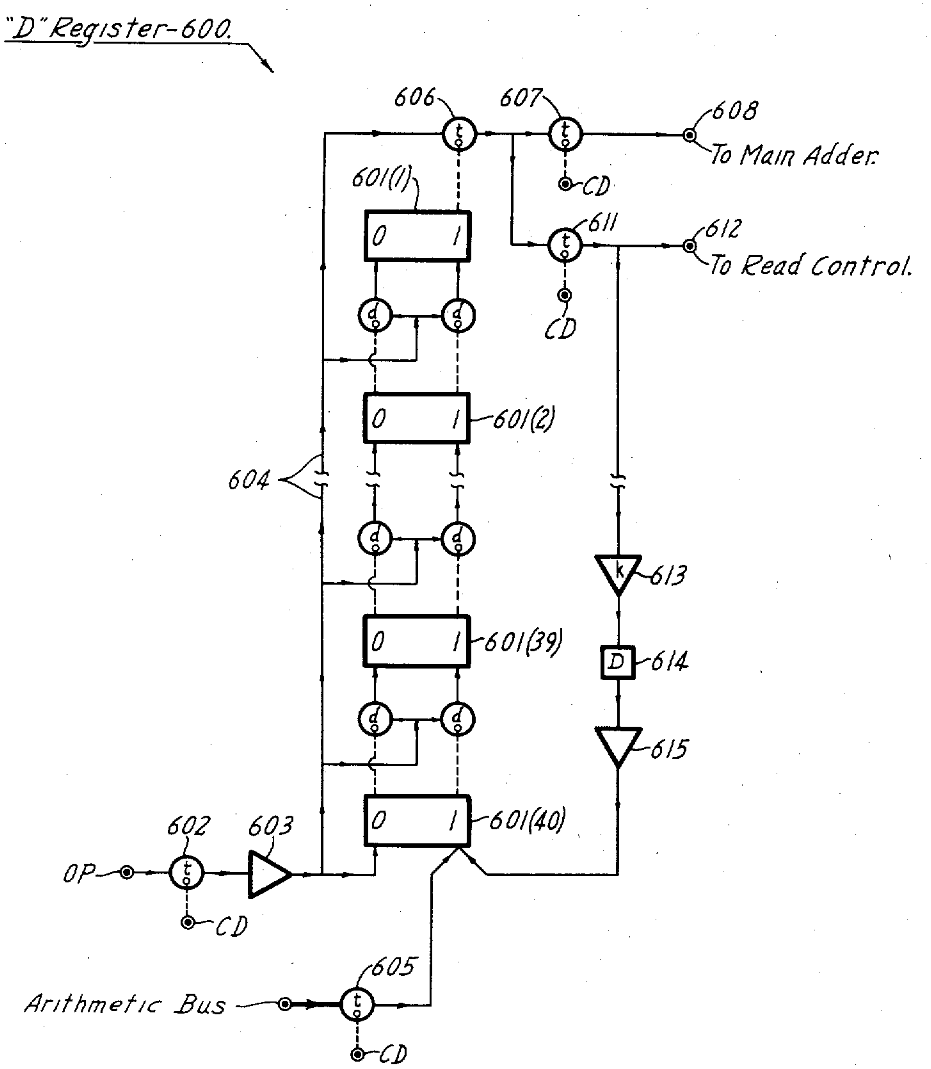
Figure 61:
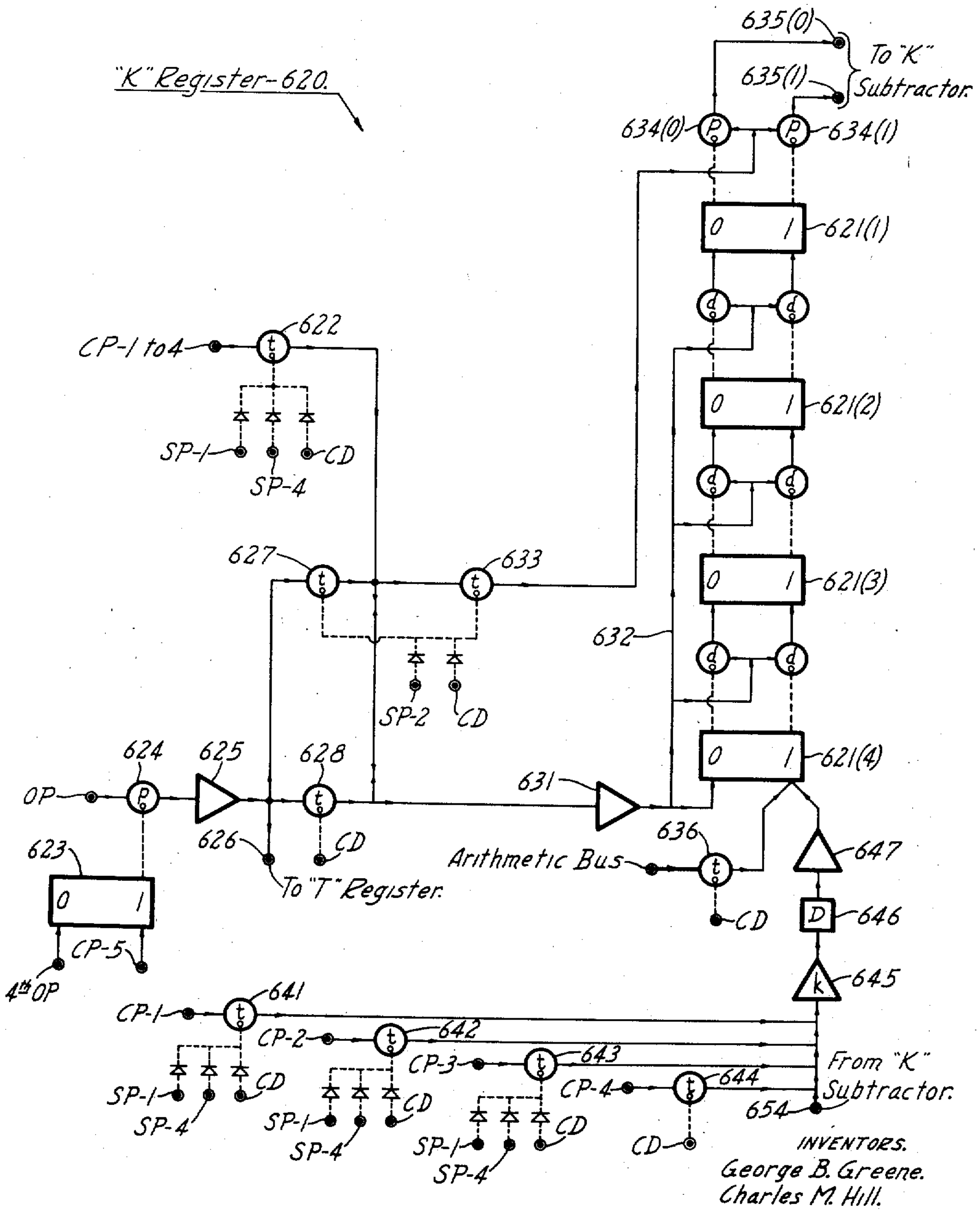
Figure 63:
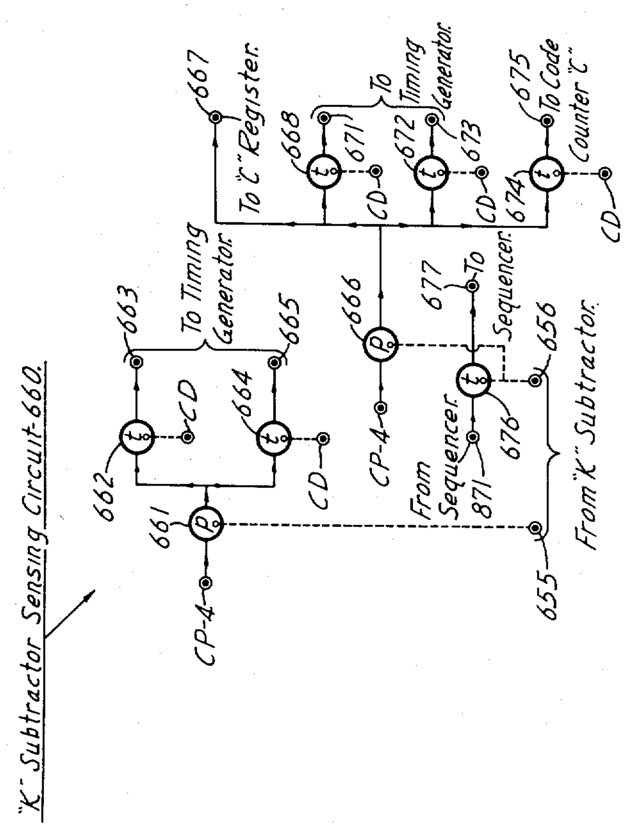
Figure 62:
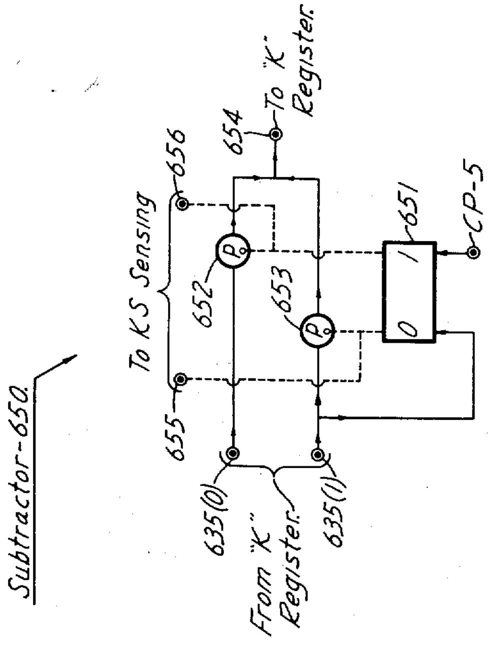
Figure 64:
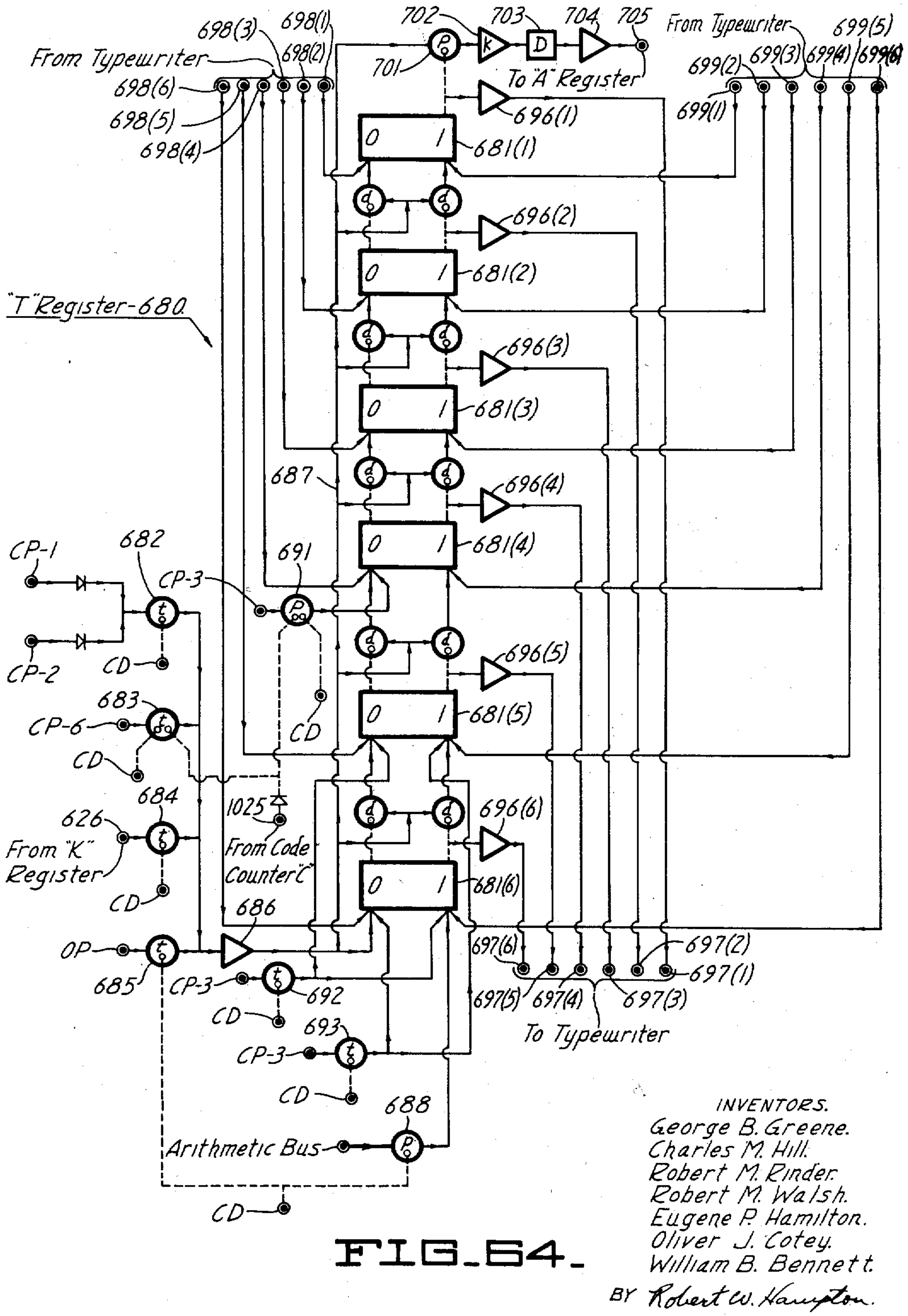
Figure 65:
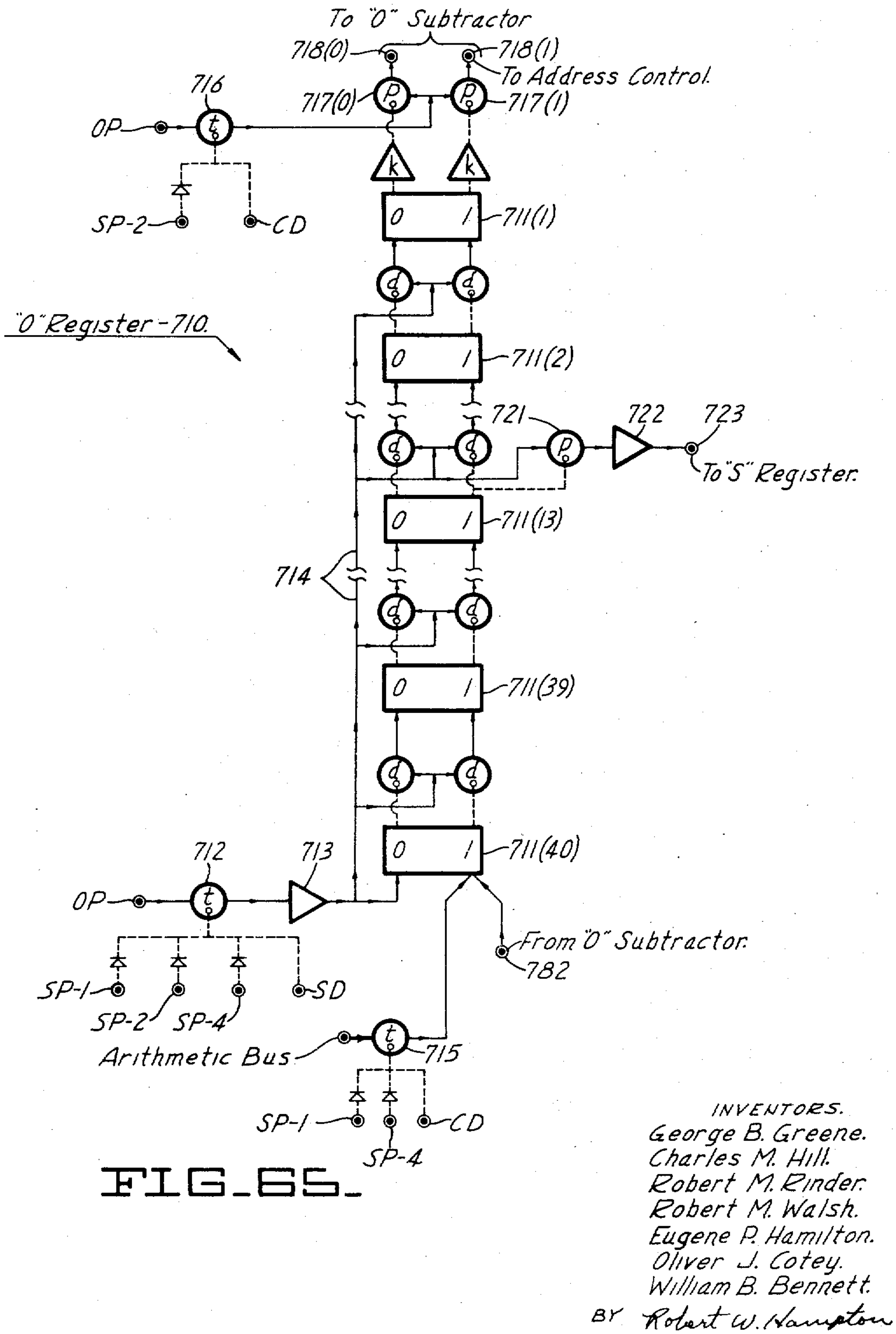
Figure 66:
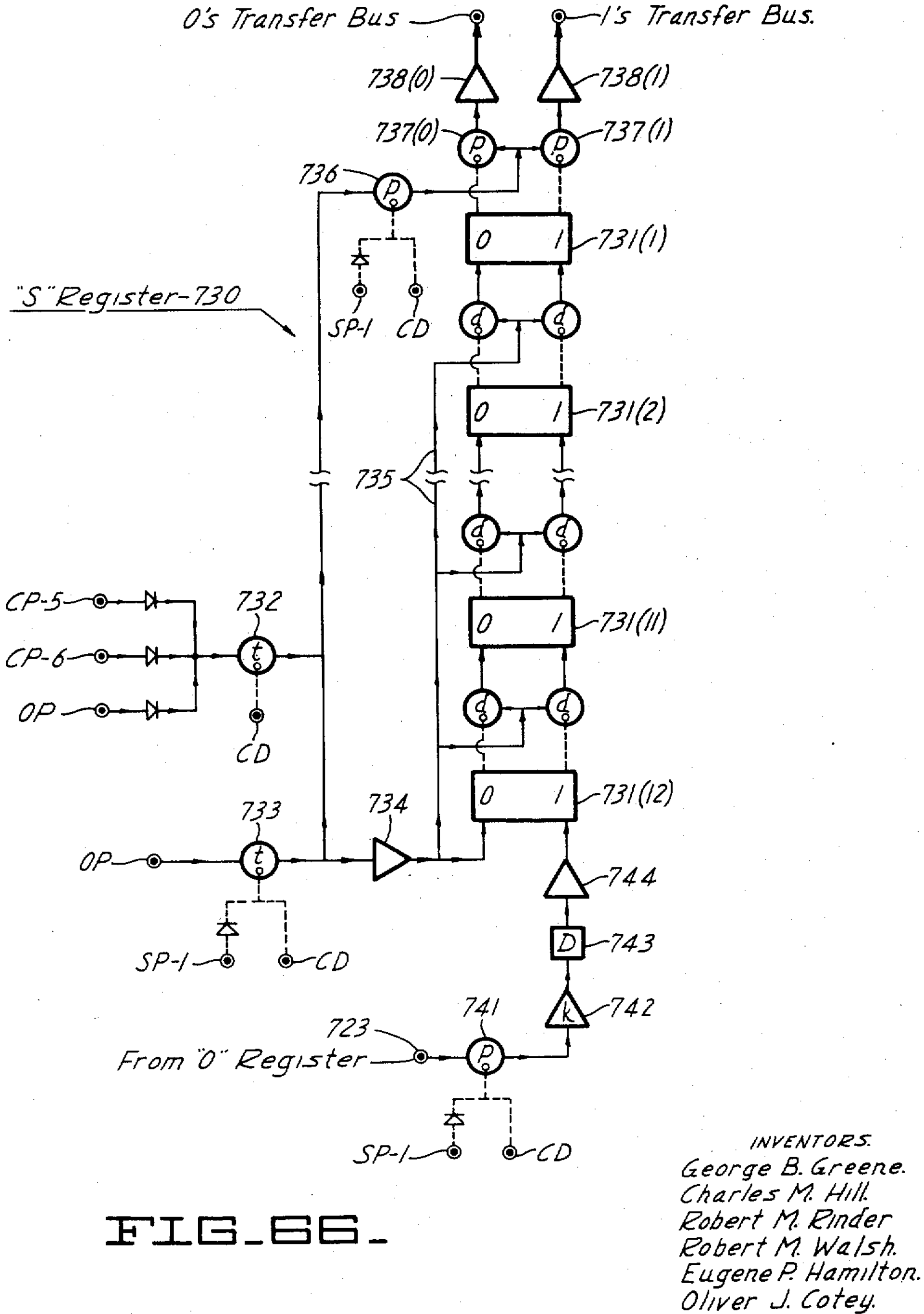
Figure 67:
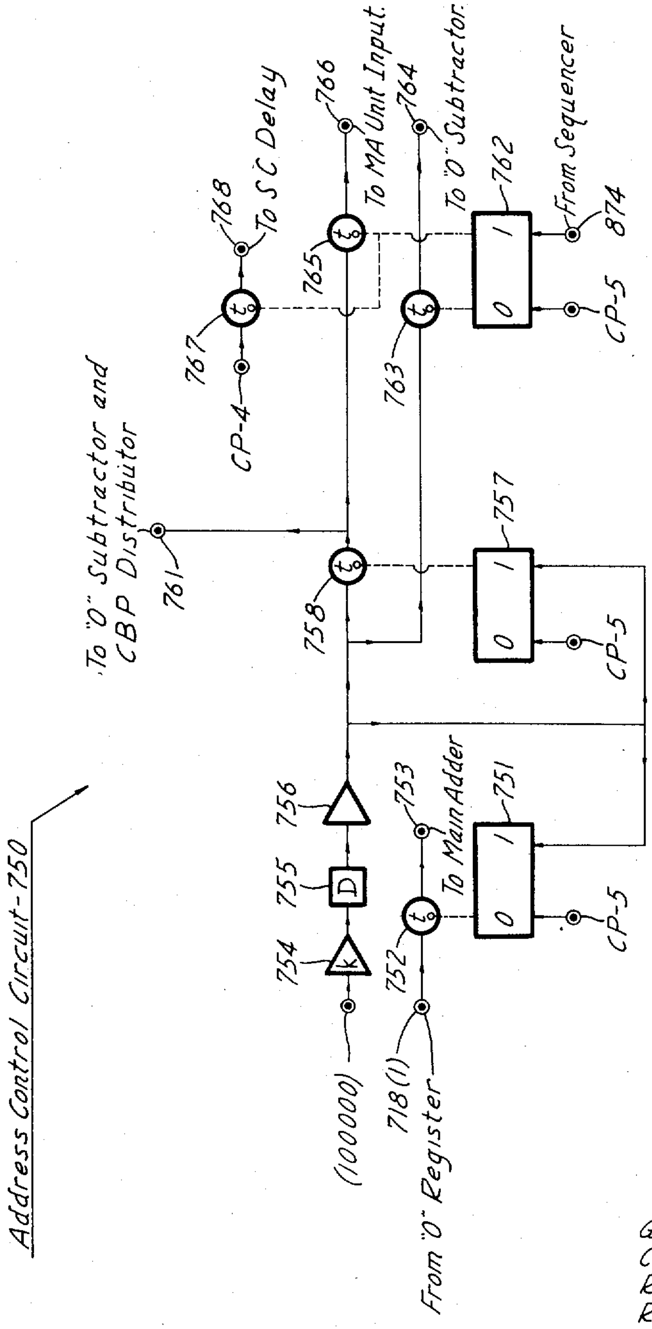
Figure 68:
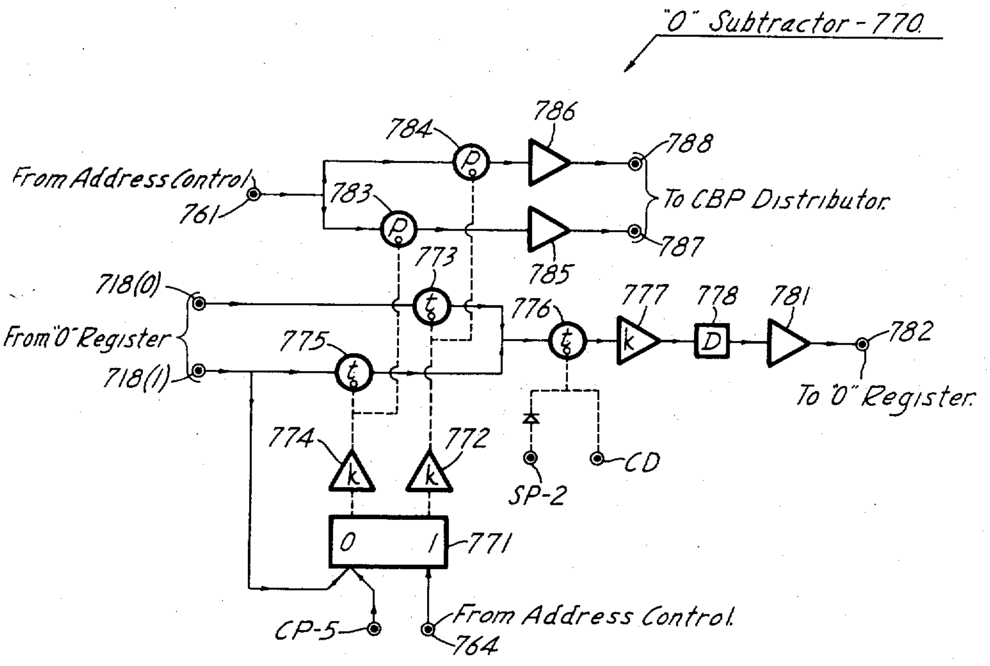
Figure 69:
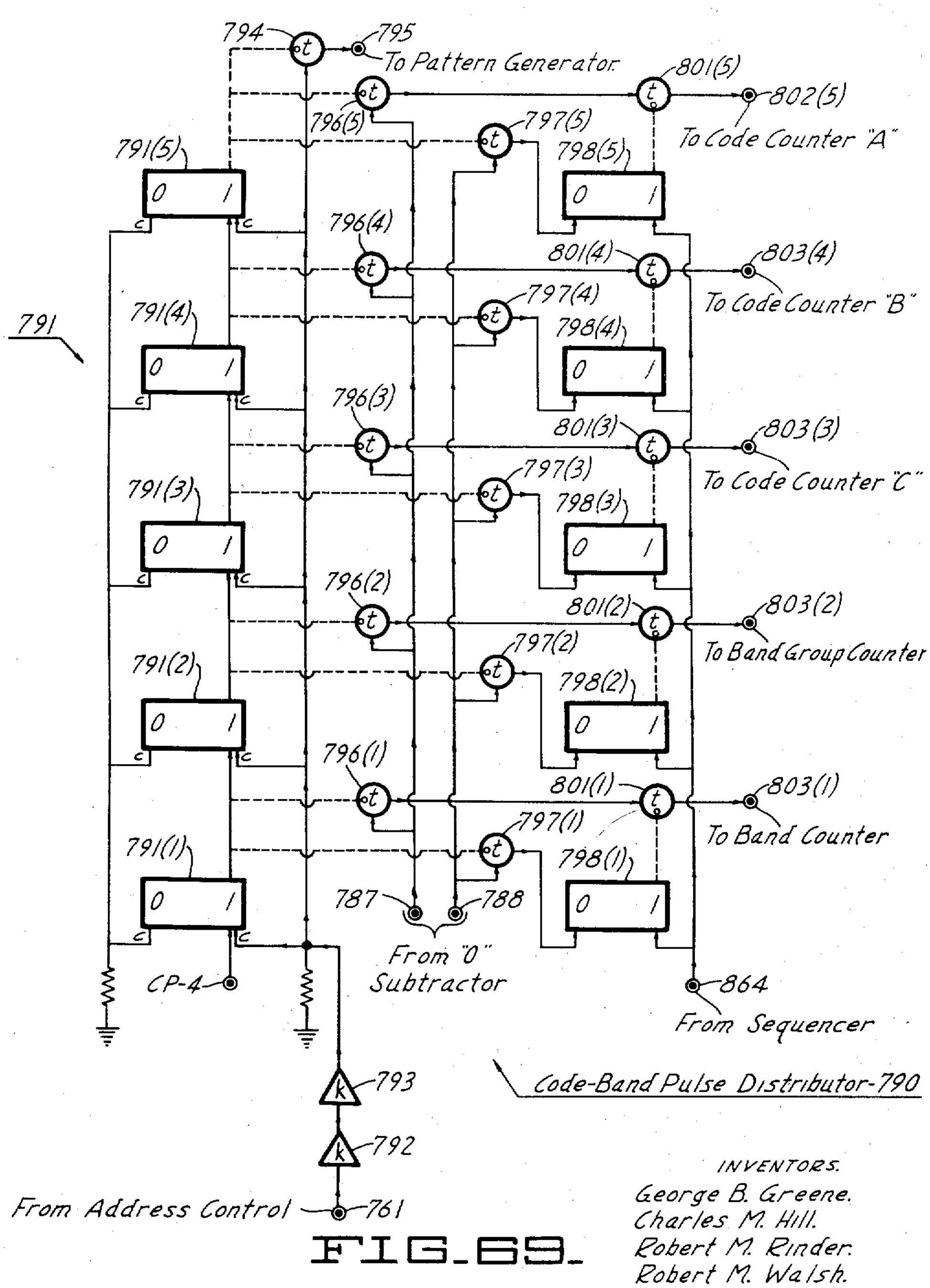
Figure 70:
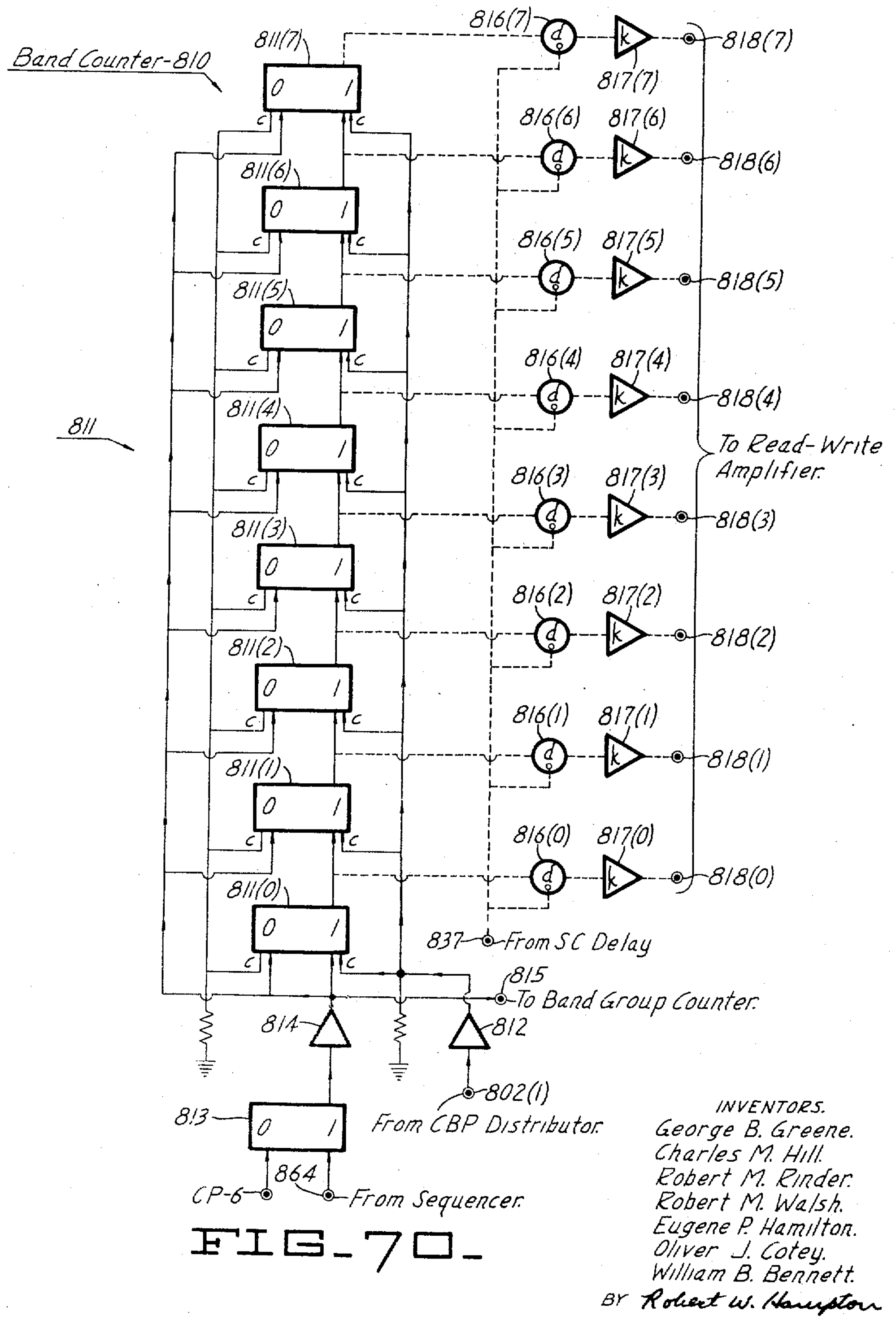
Figure 71:
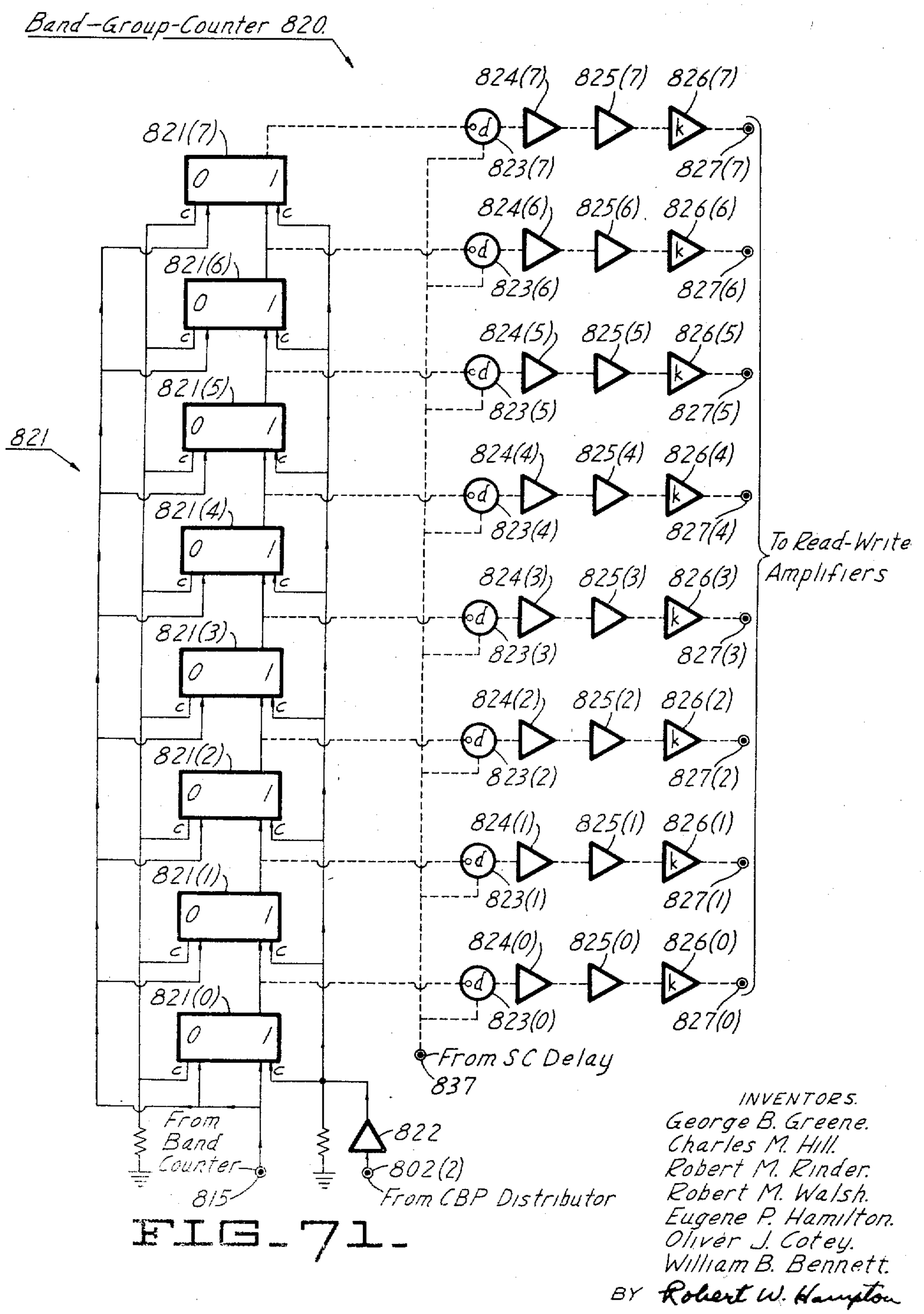
Figure 72:
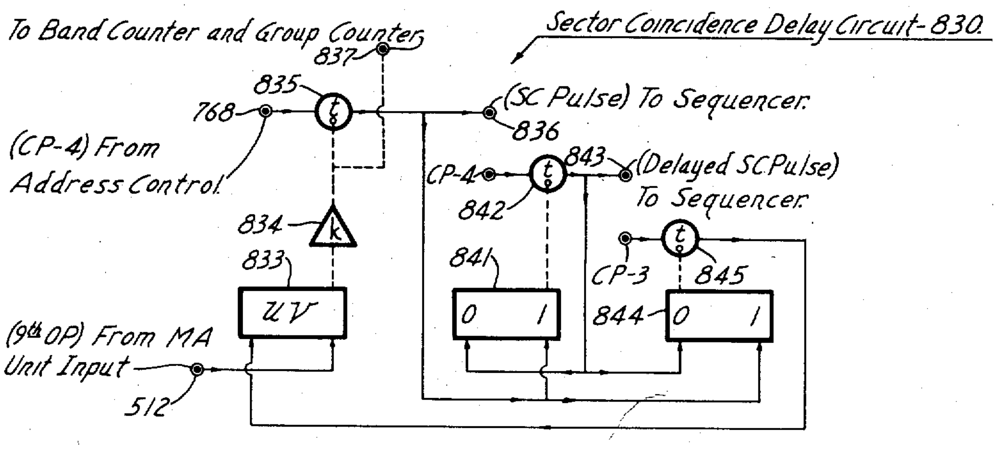
Figure 73:
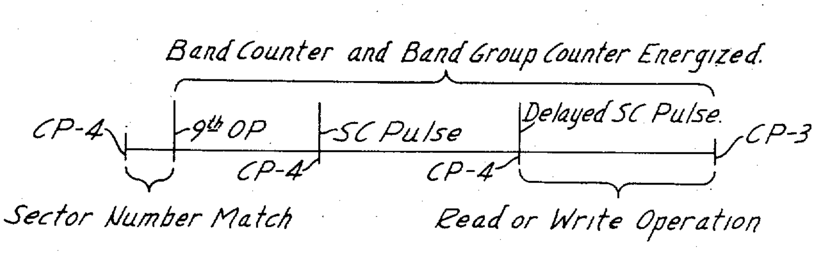
Figure 74:
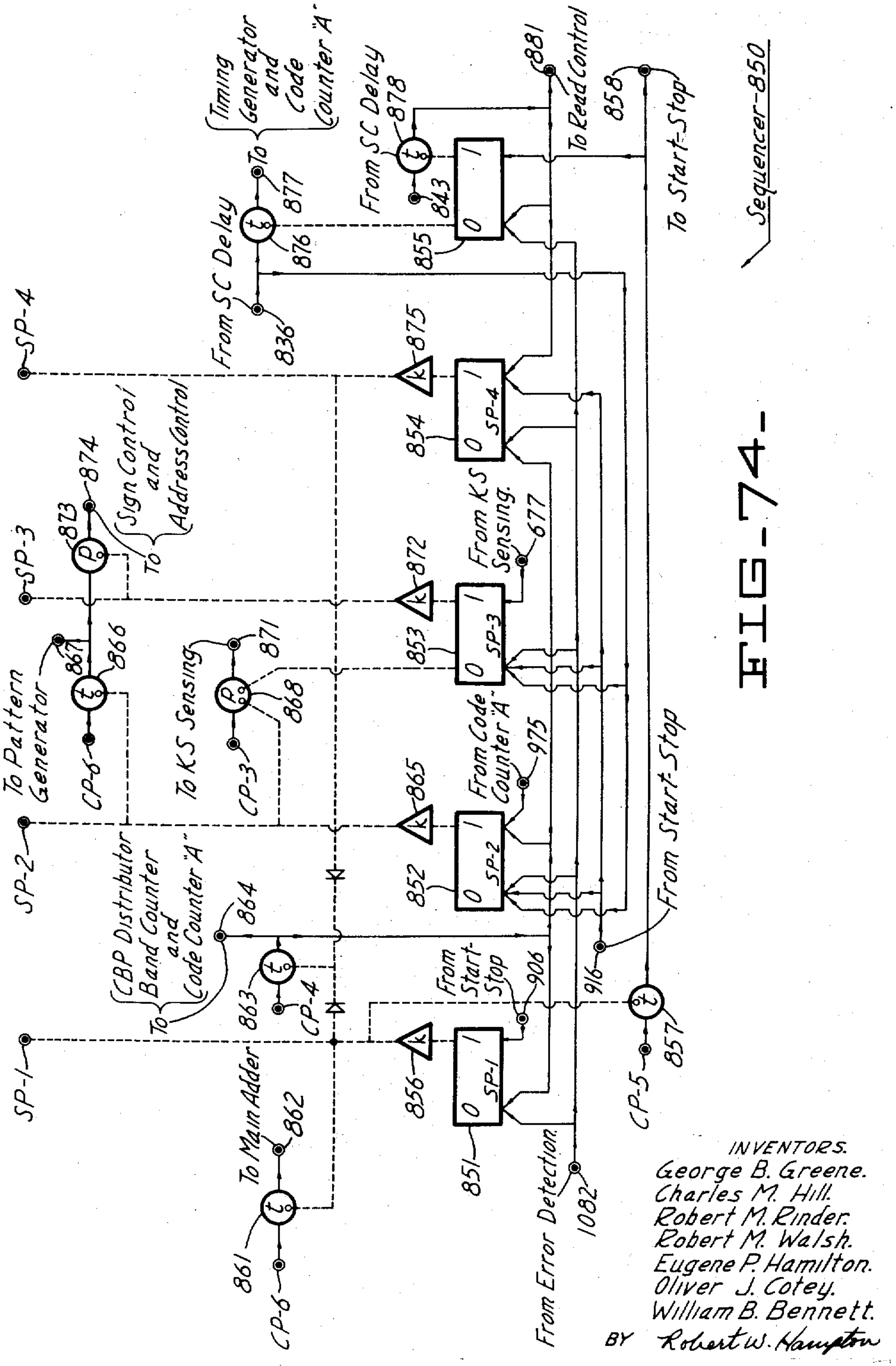
Figure 75:
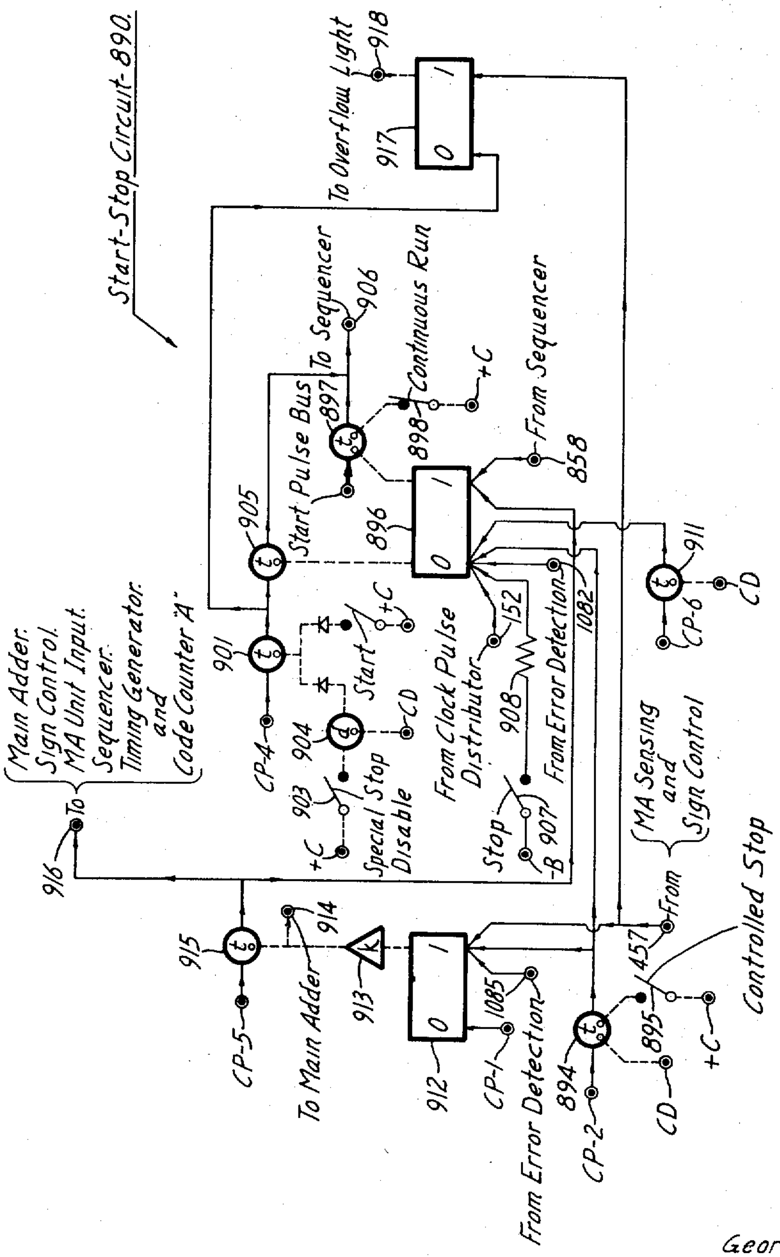
Figure 76:
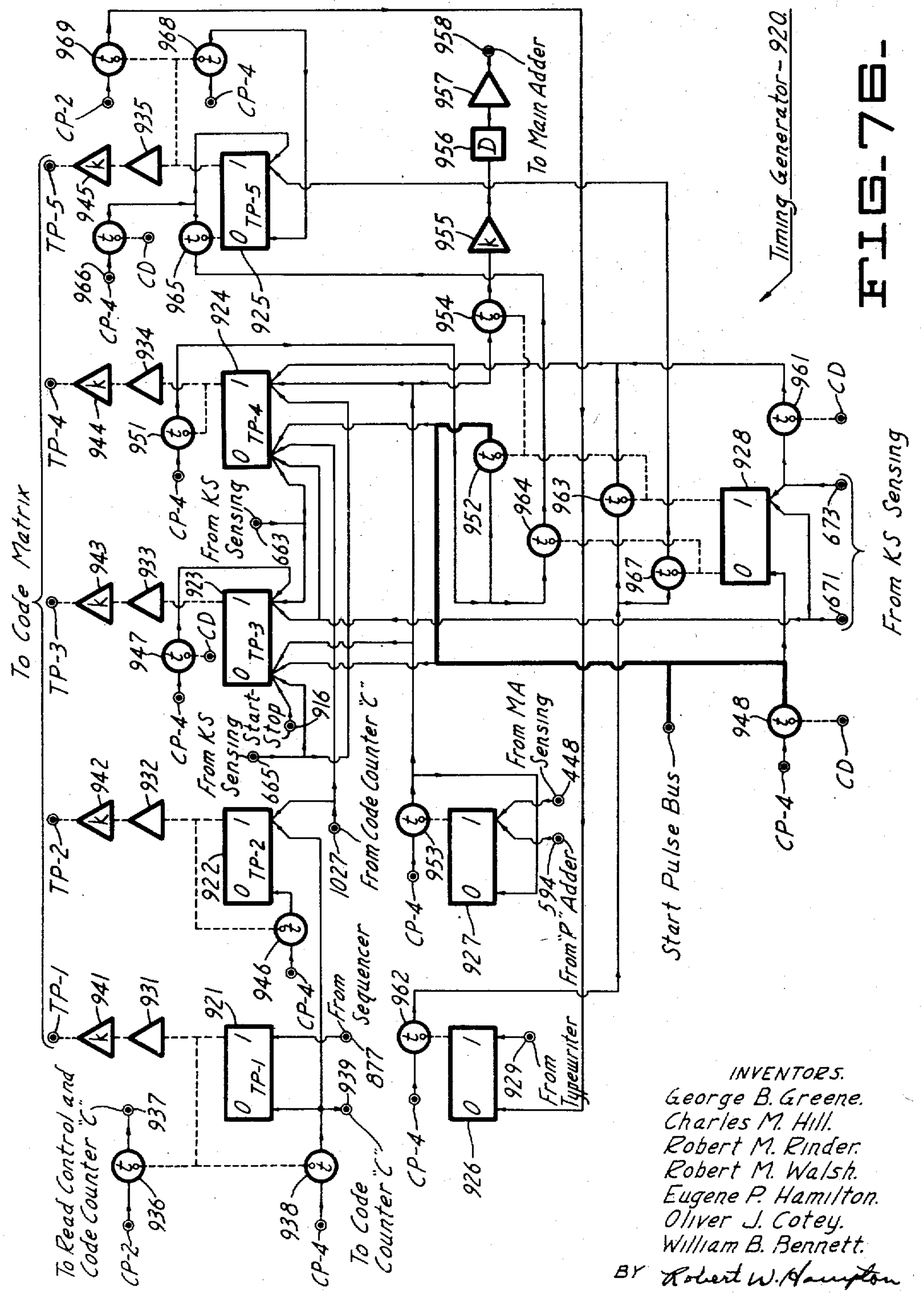
Figure 77:
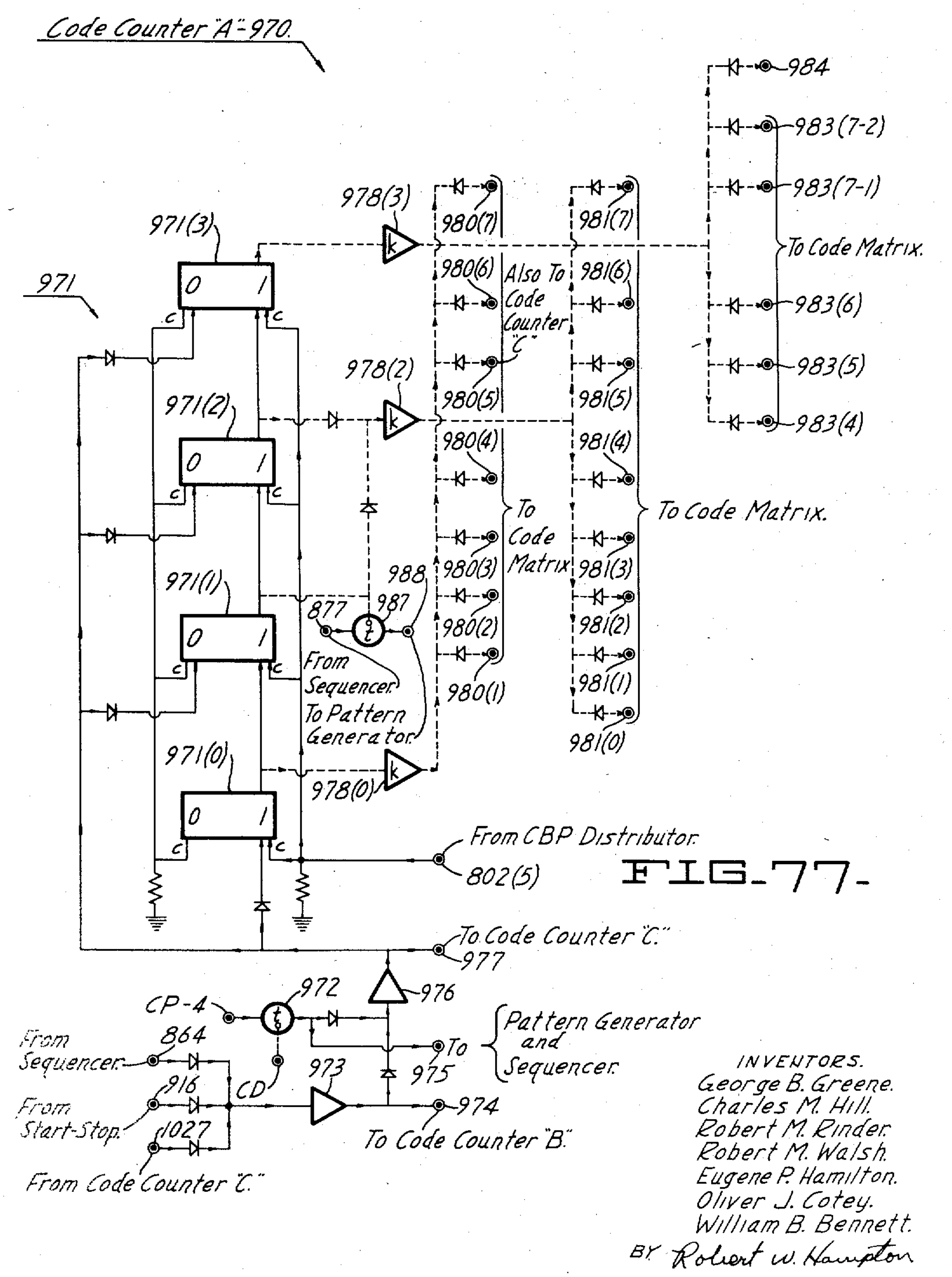
Figure 78:
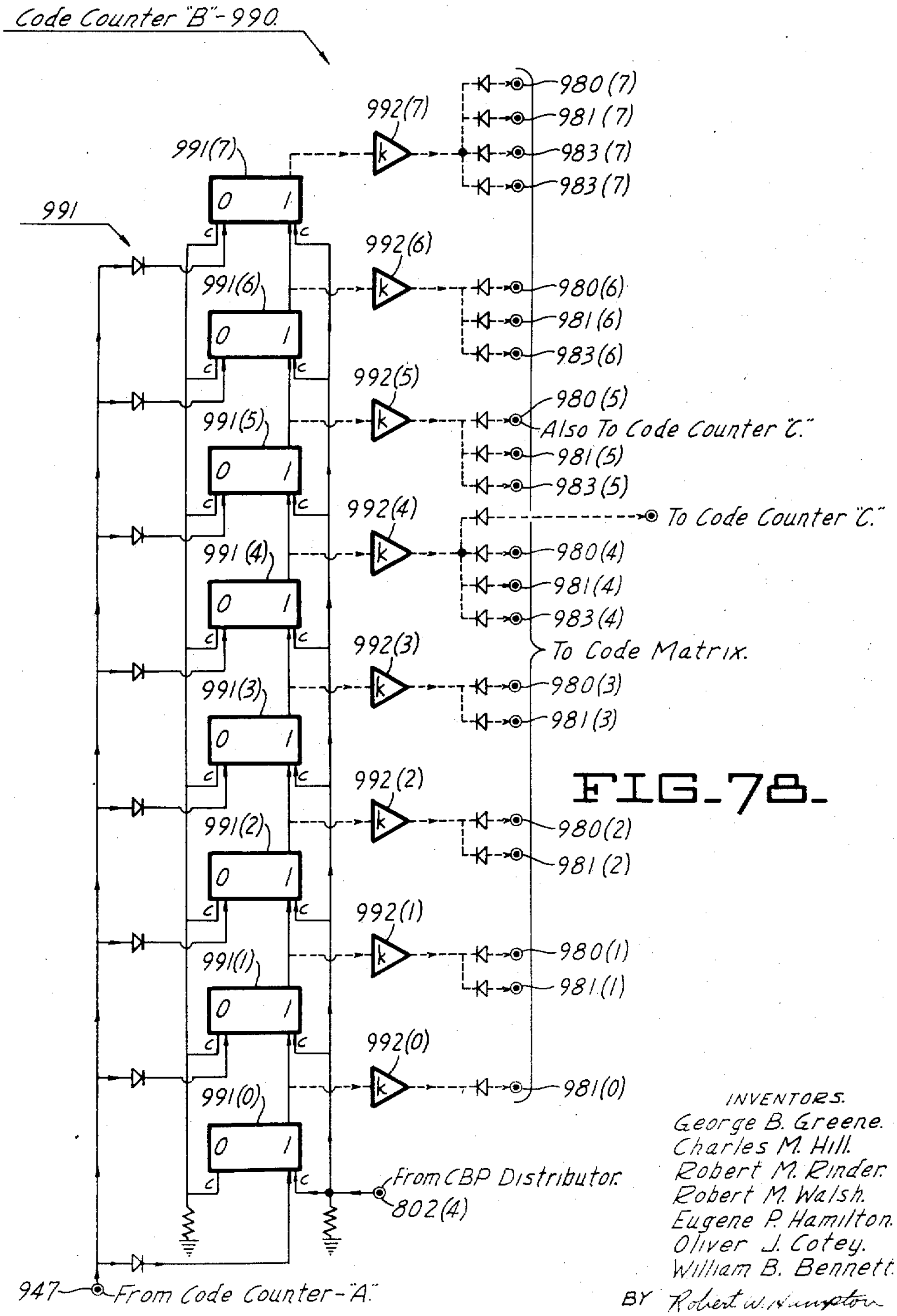
Figure 79:
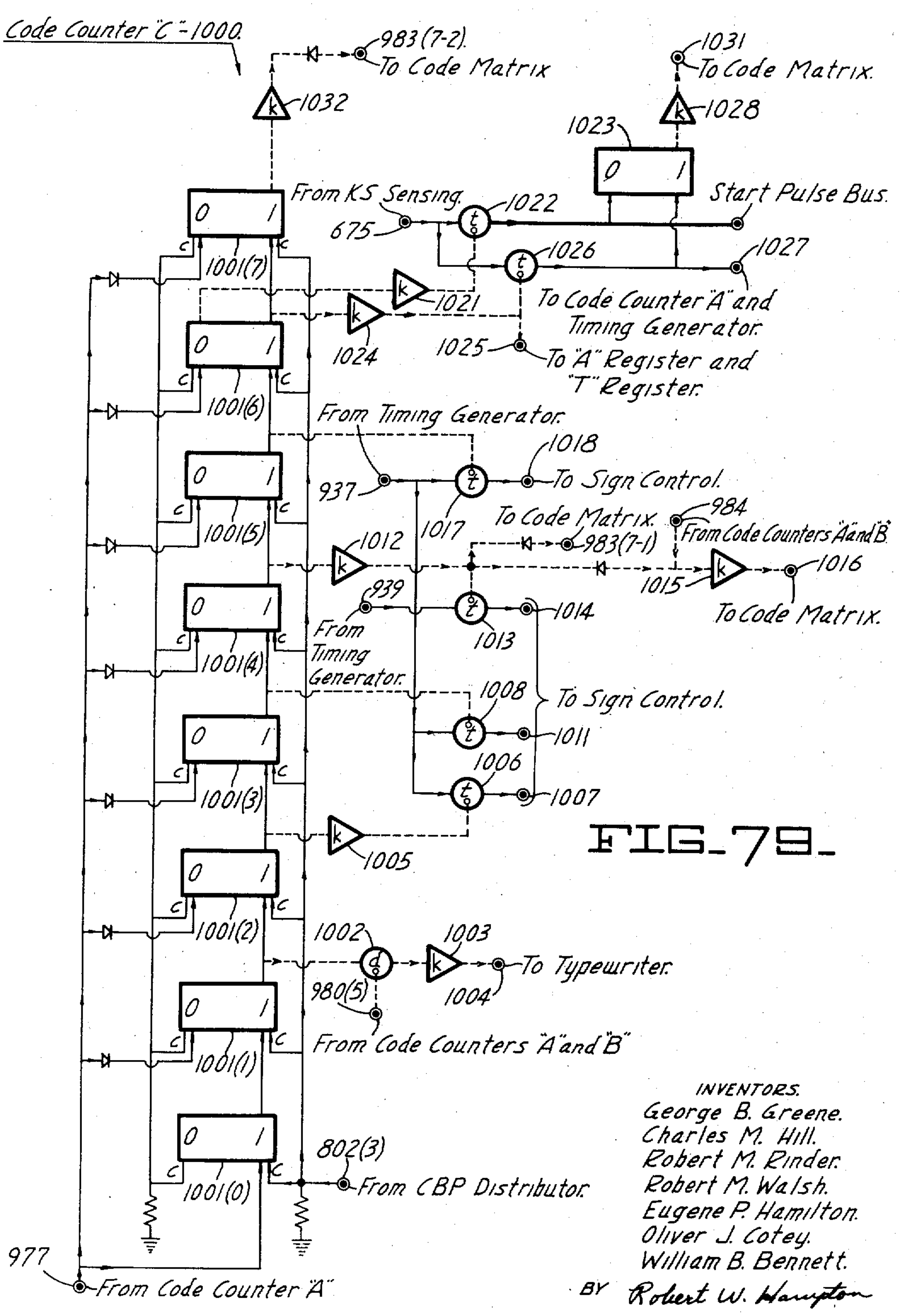
Figure 80:
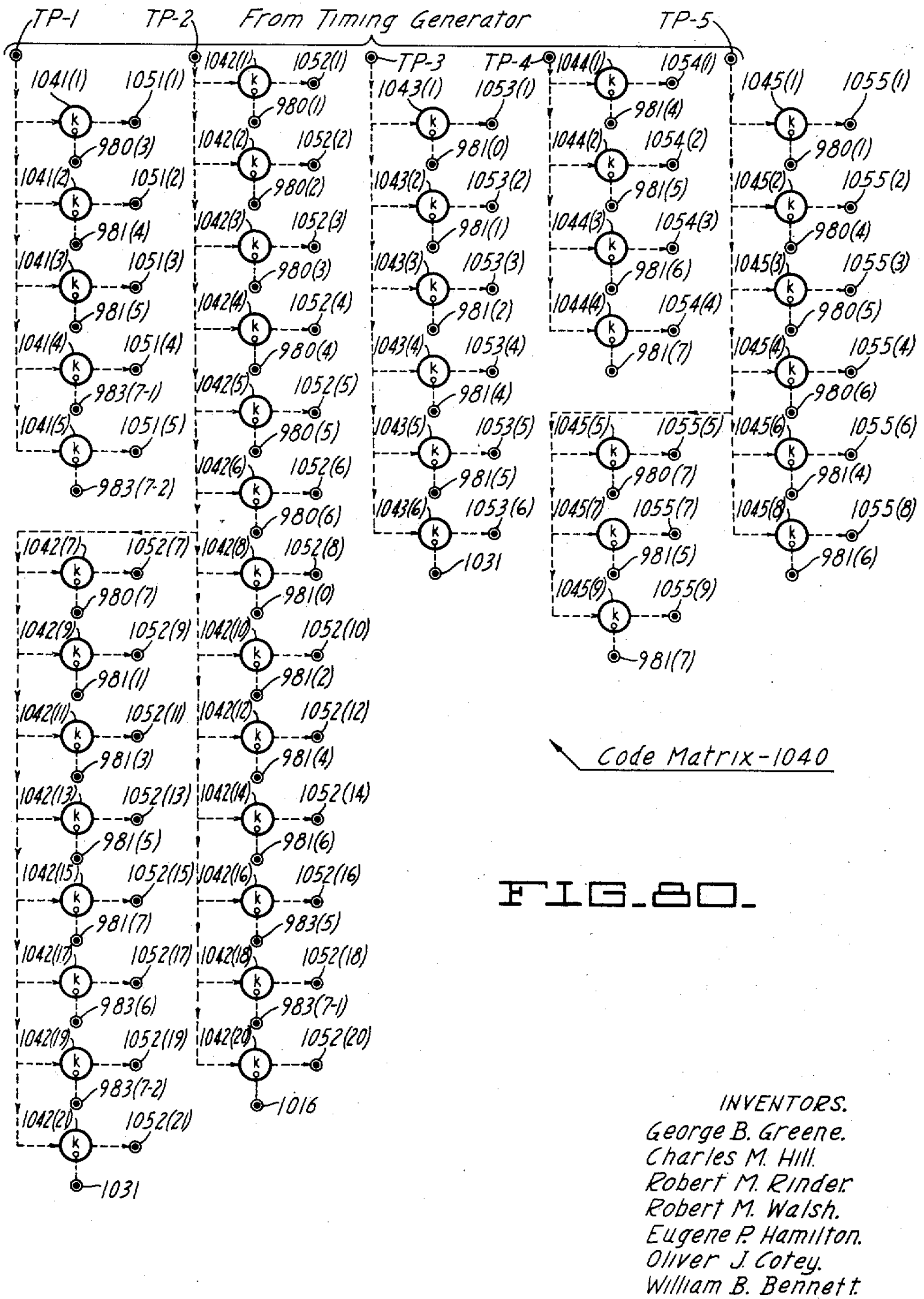
Figure 81:
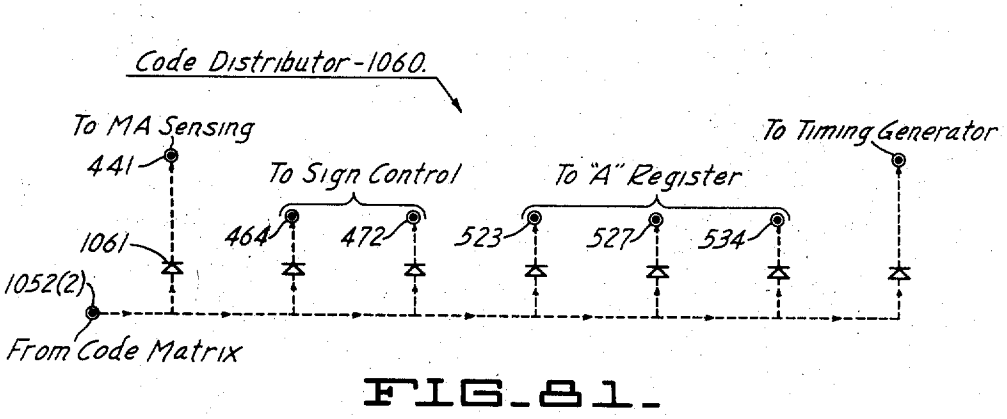
Figure 82:
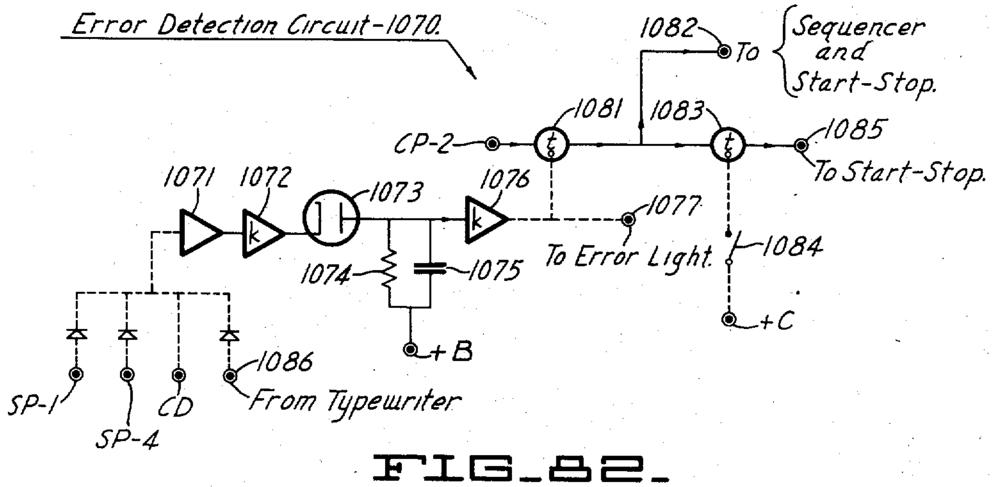
Figure 83:
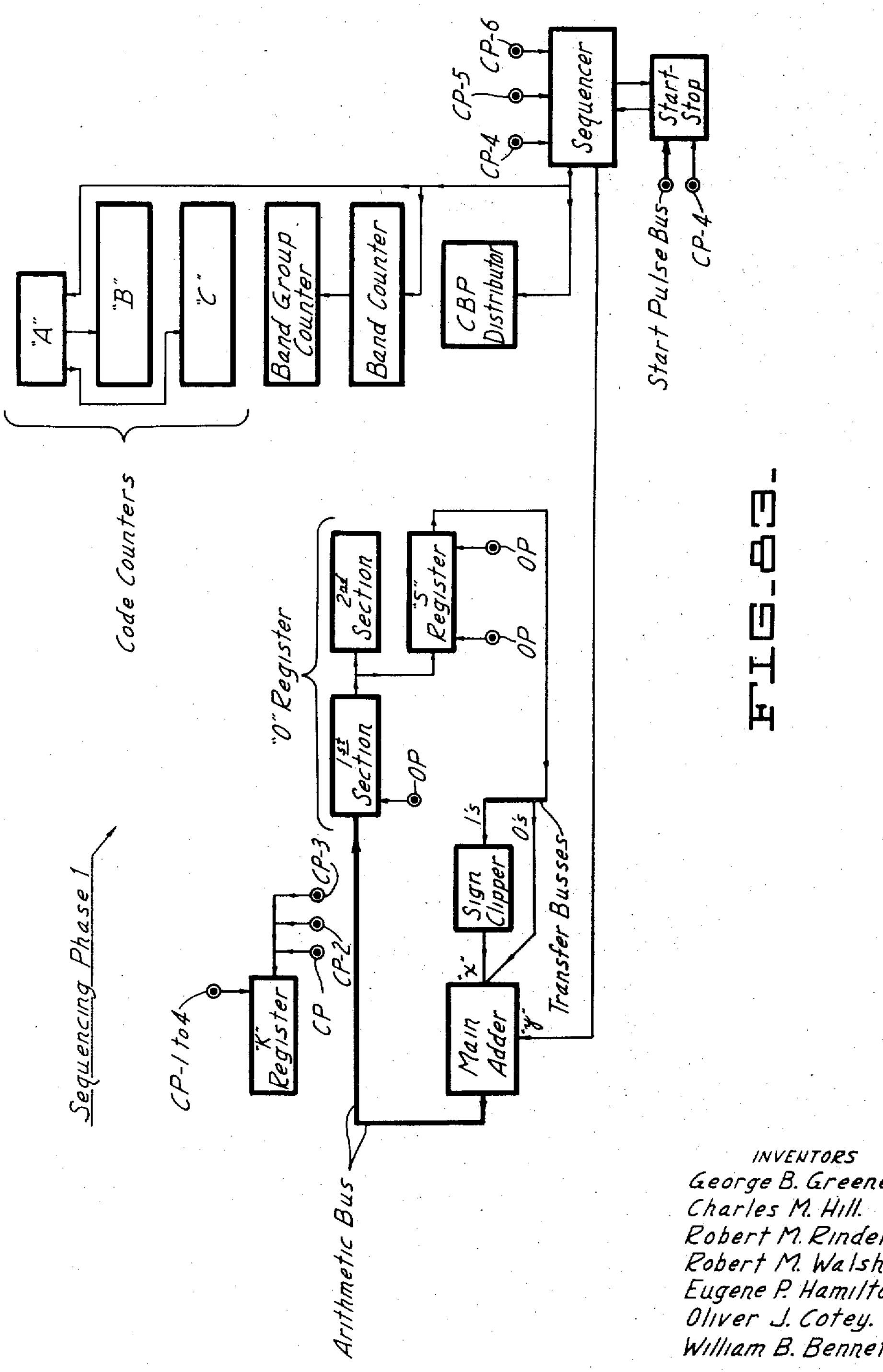
Figure 84:
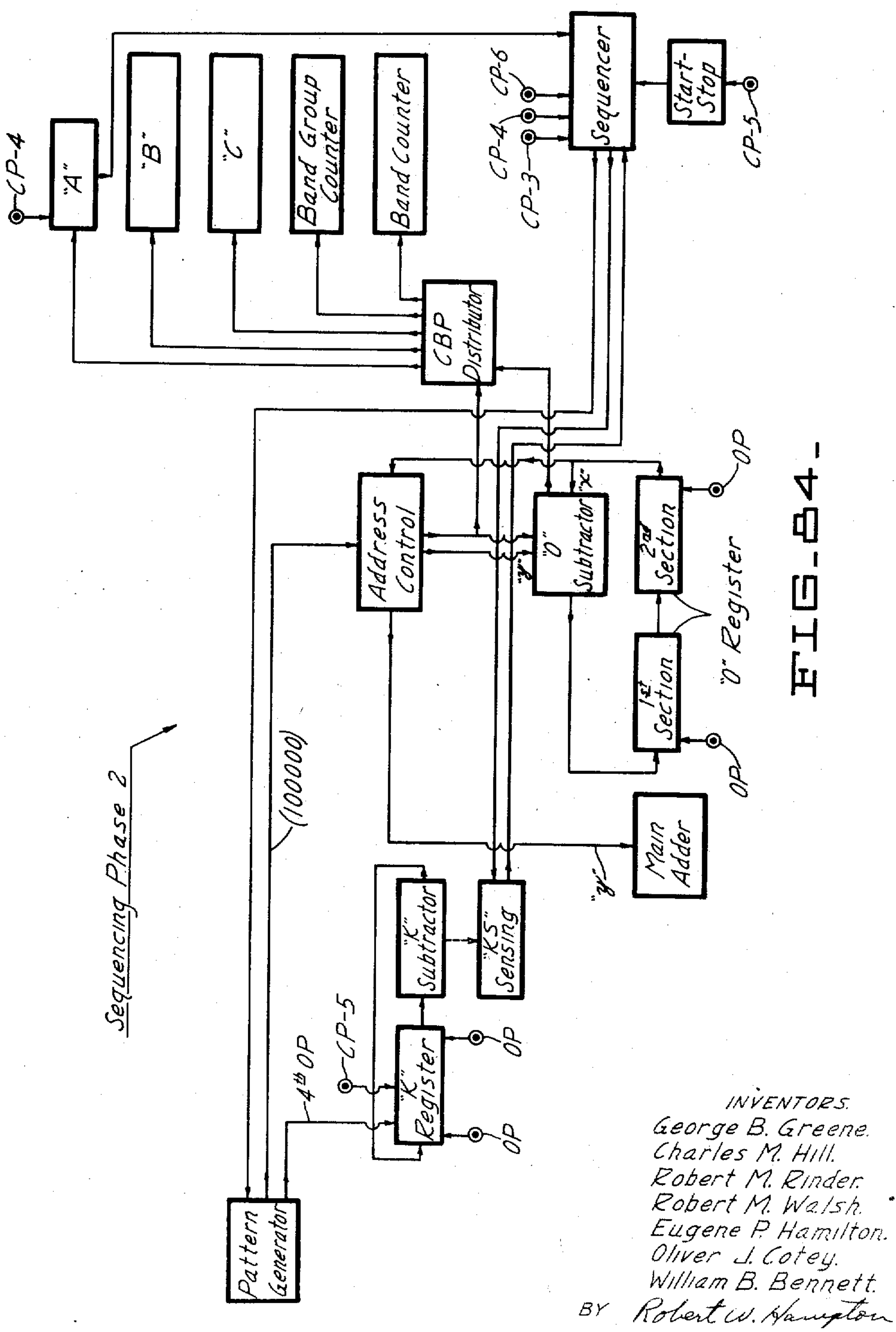
Figure 85:
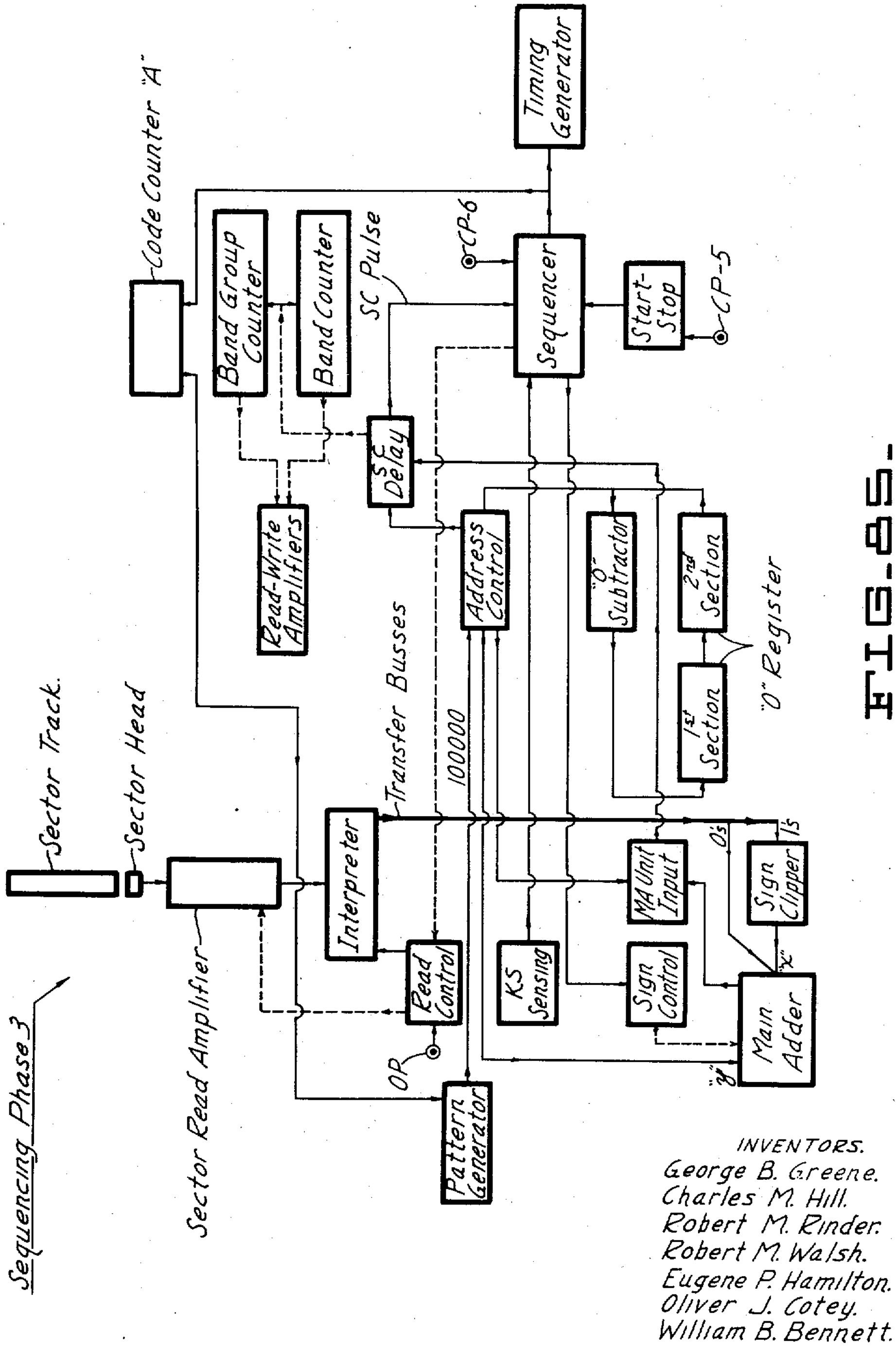
Figure 86:
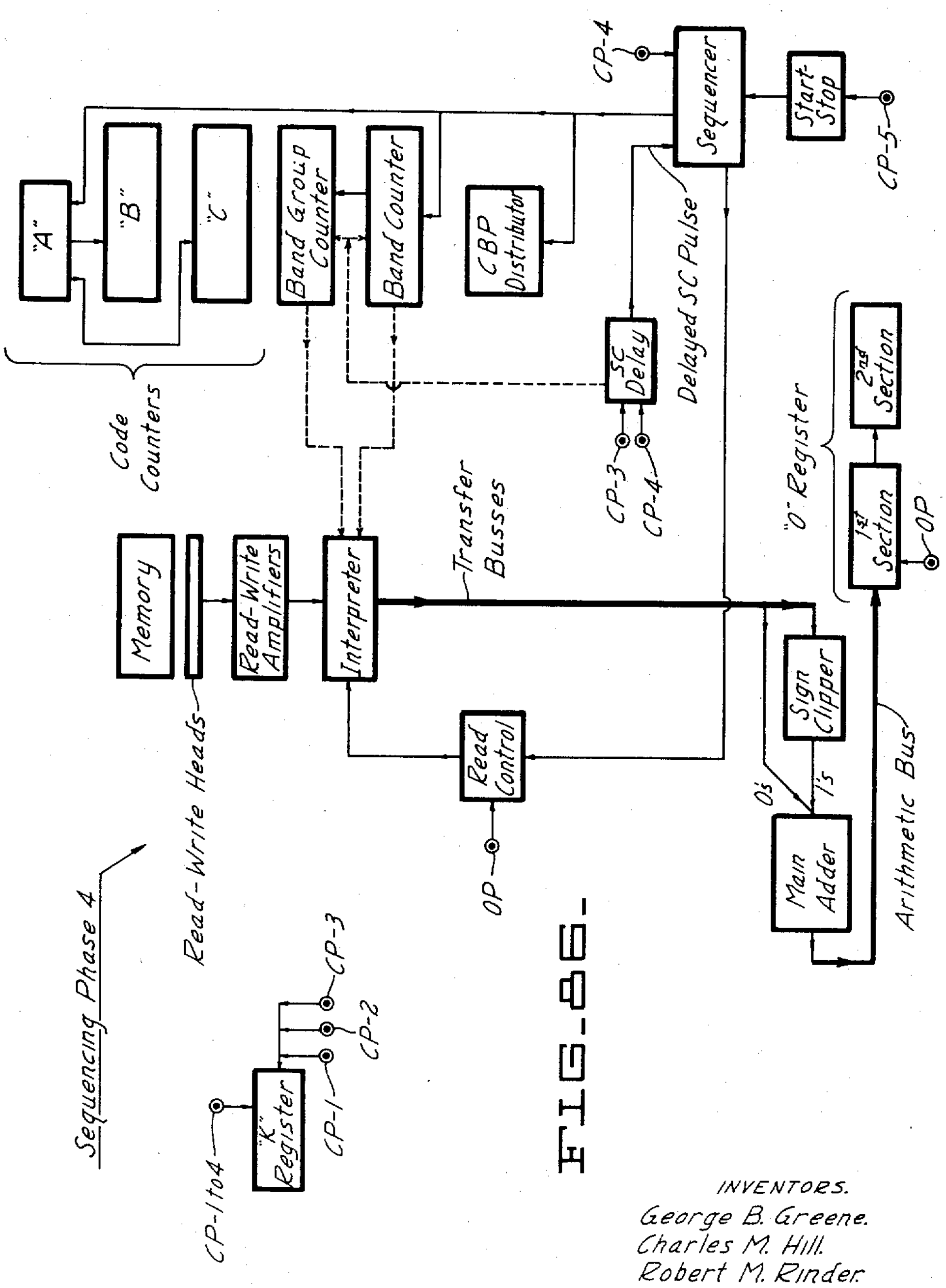
Figure 87:
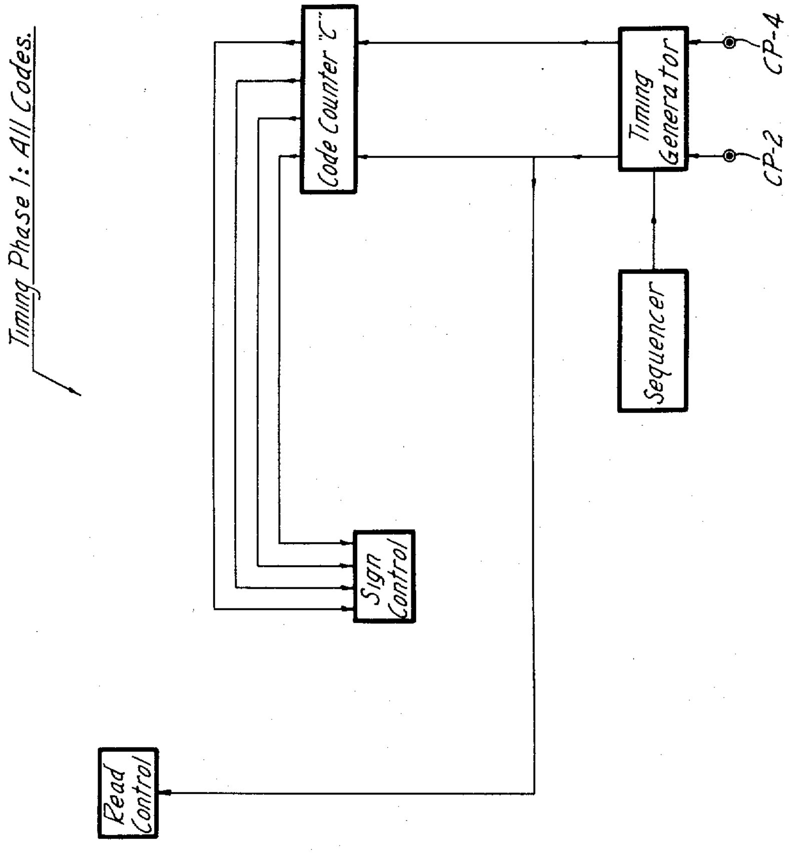
Figure 88:
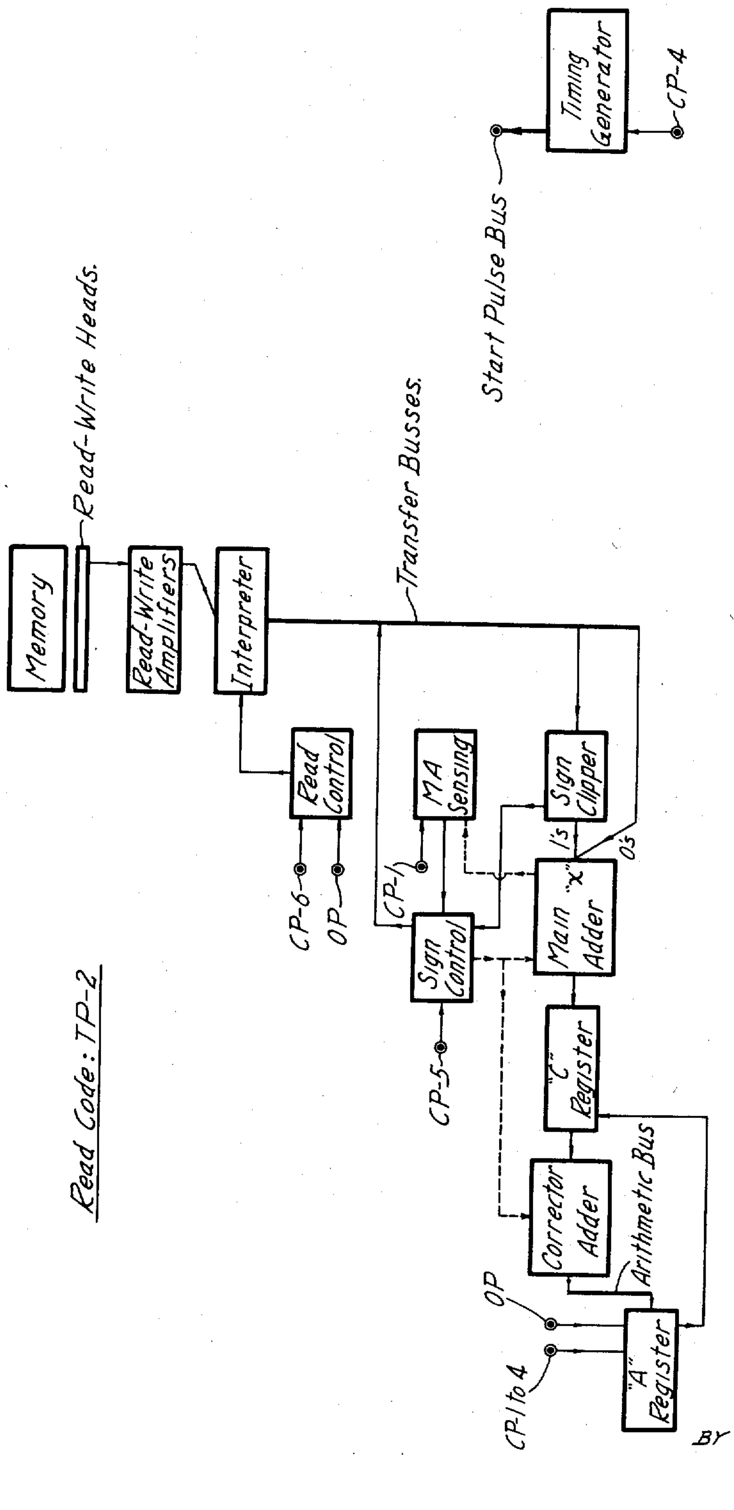
Figure 89:
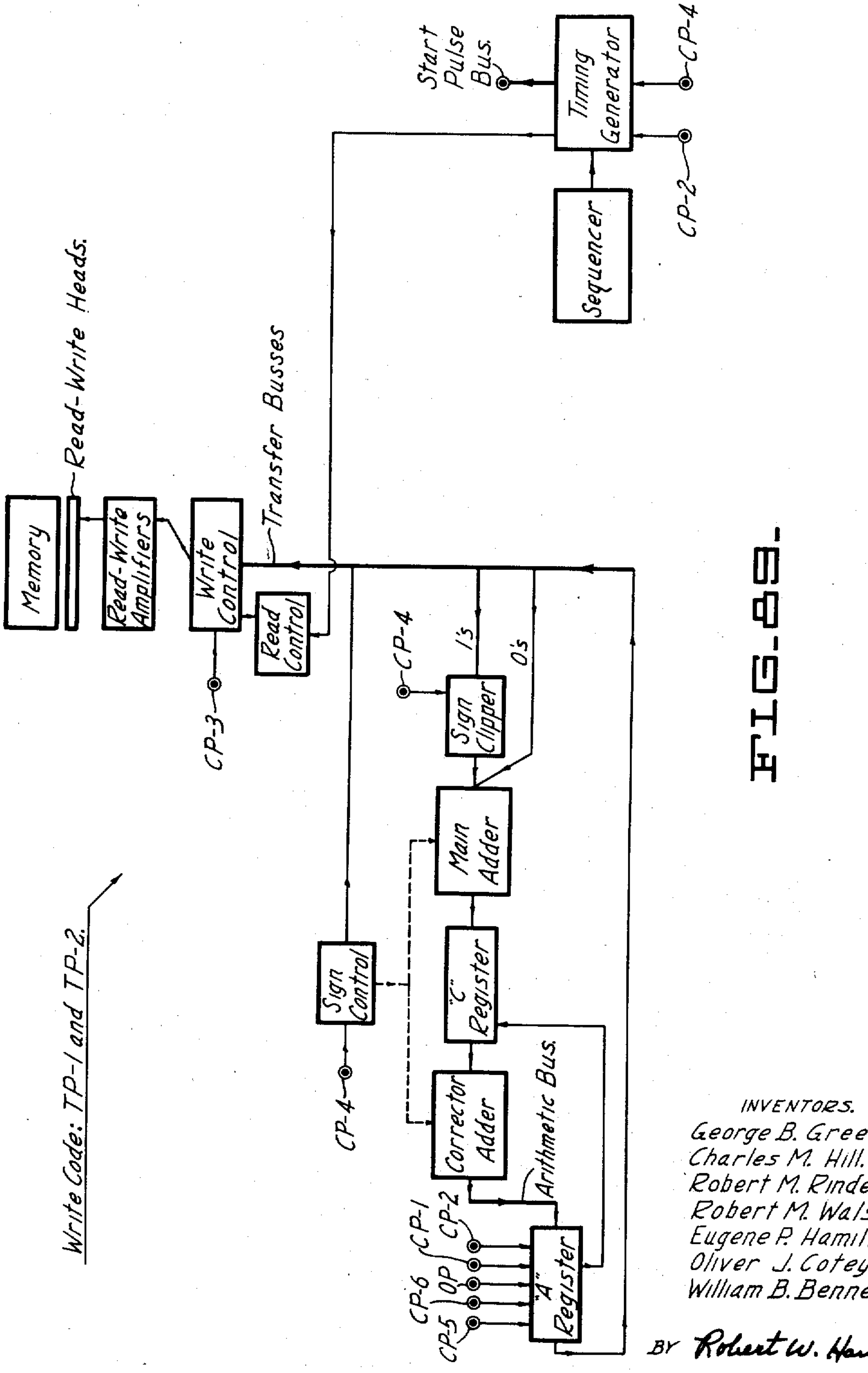
Figure 90:
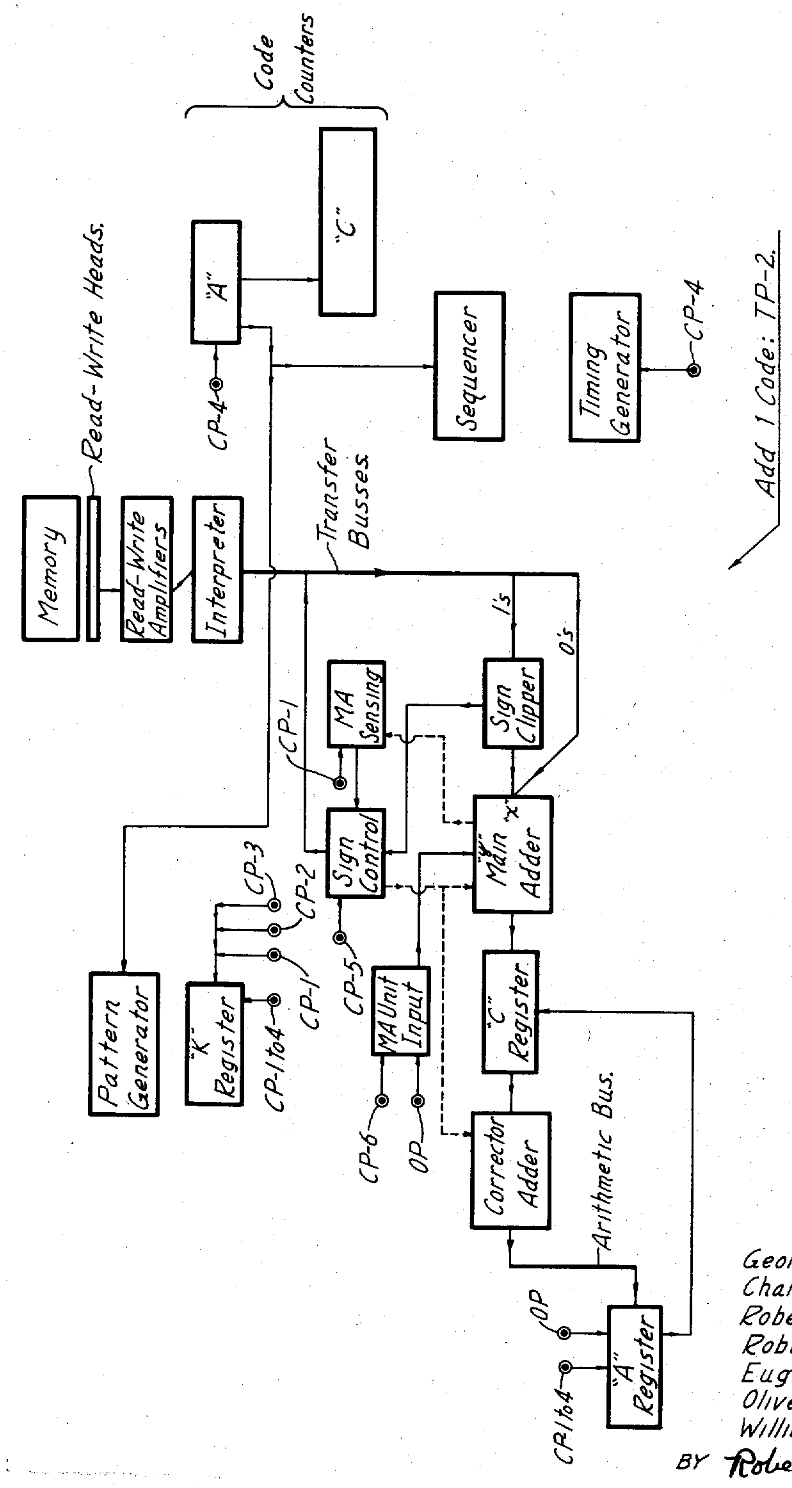
Figure 91:
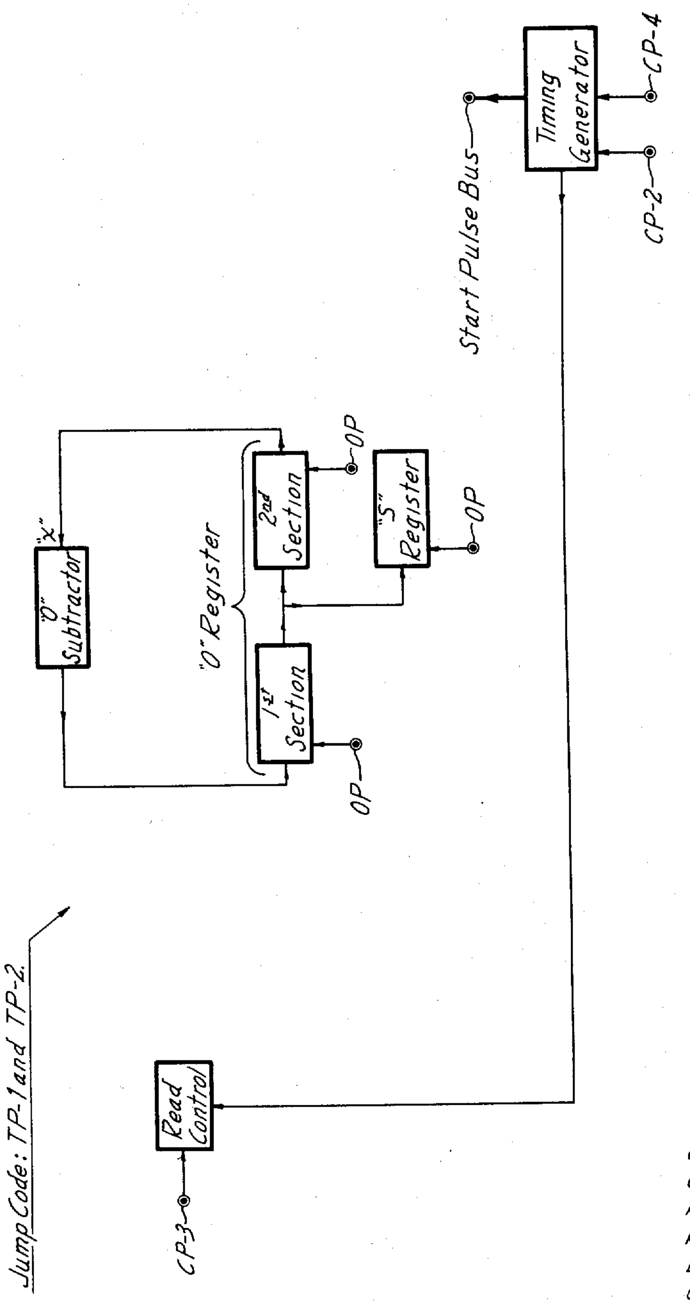
Figure 92:
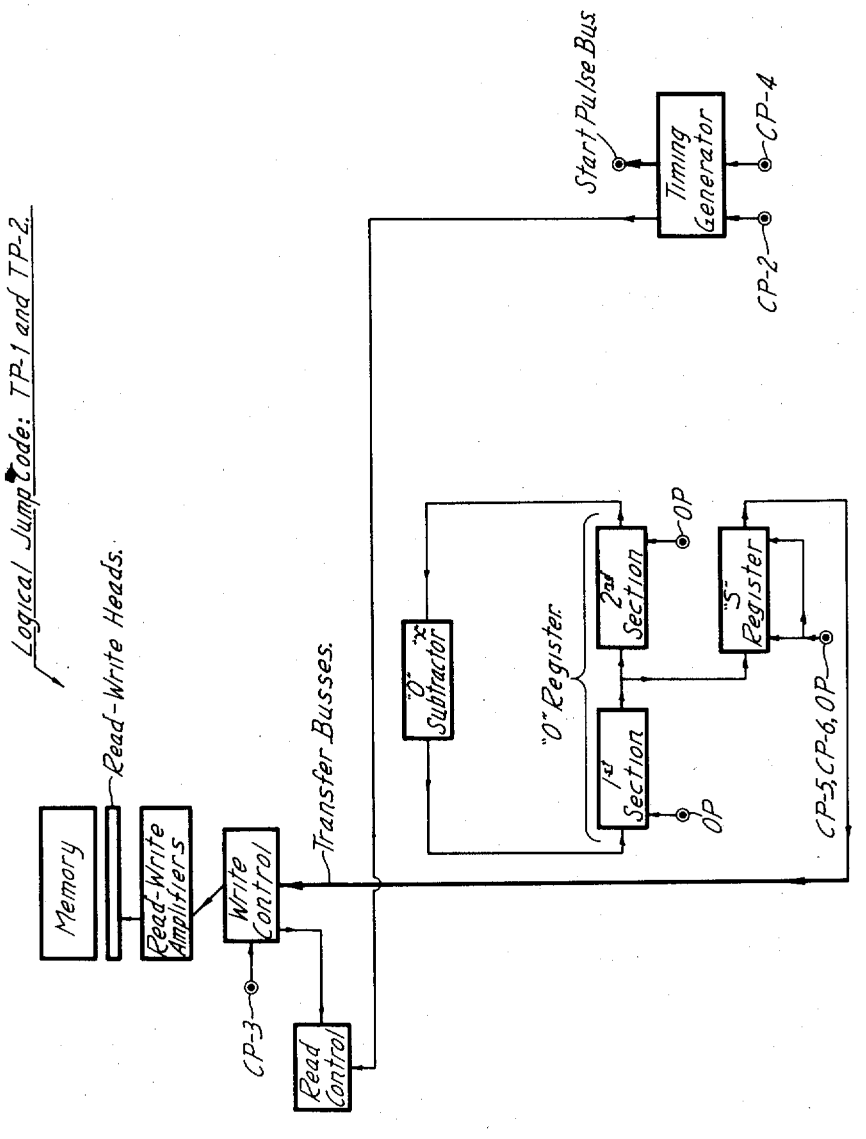
Figure 93:
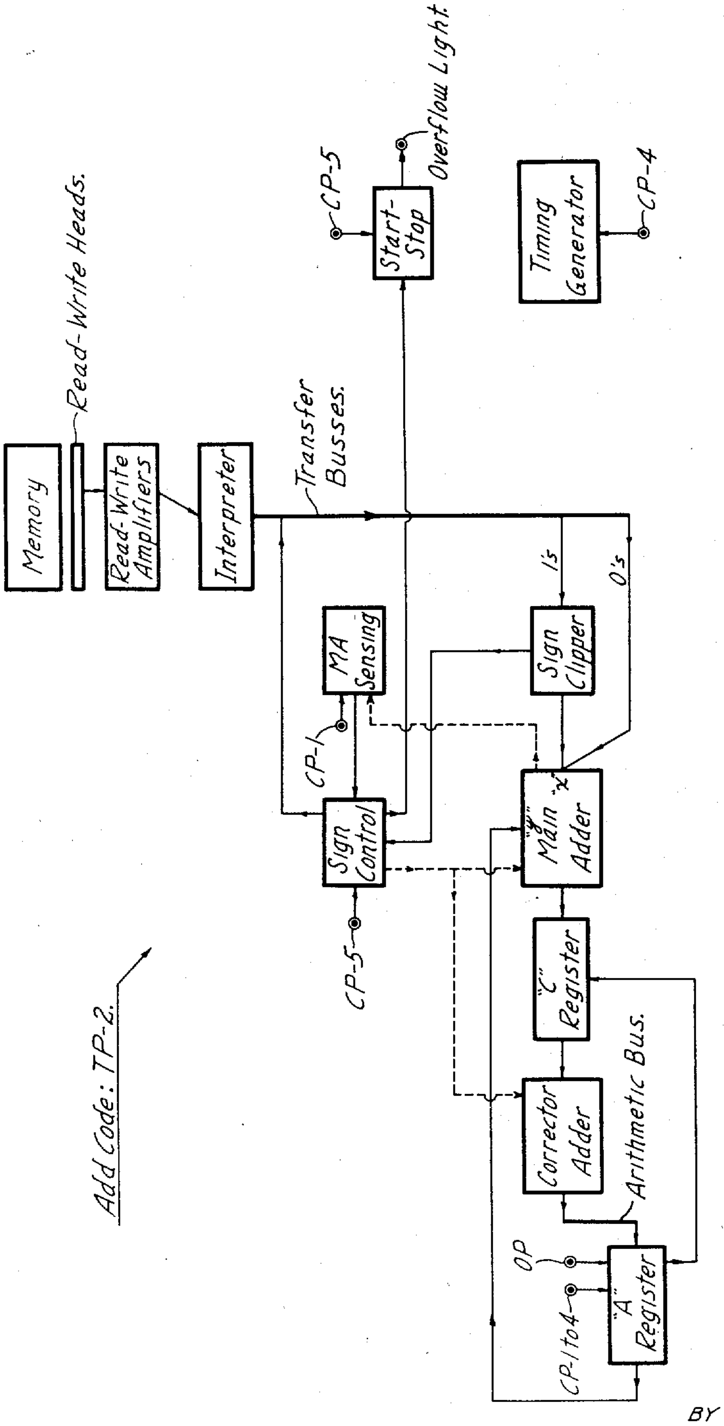
Figure 94:
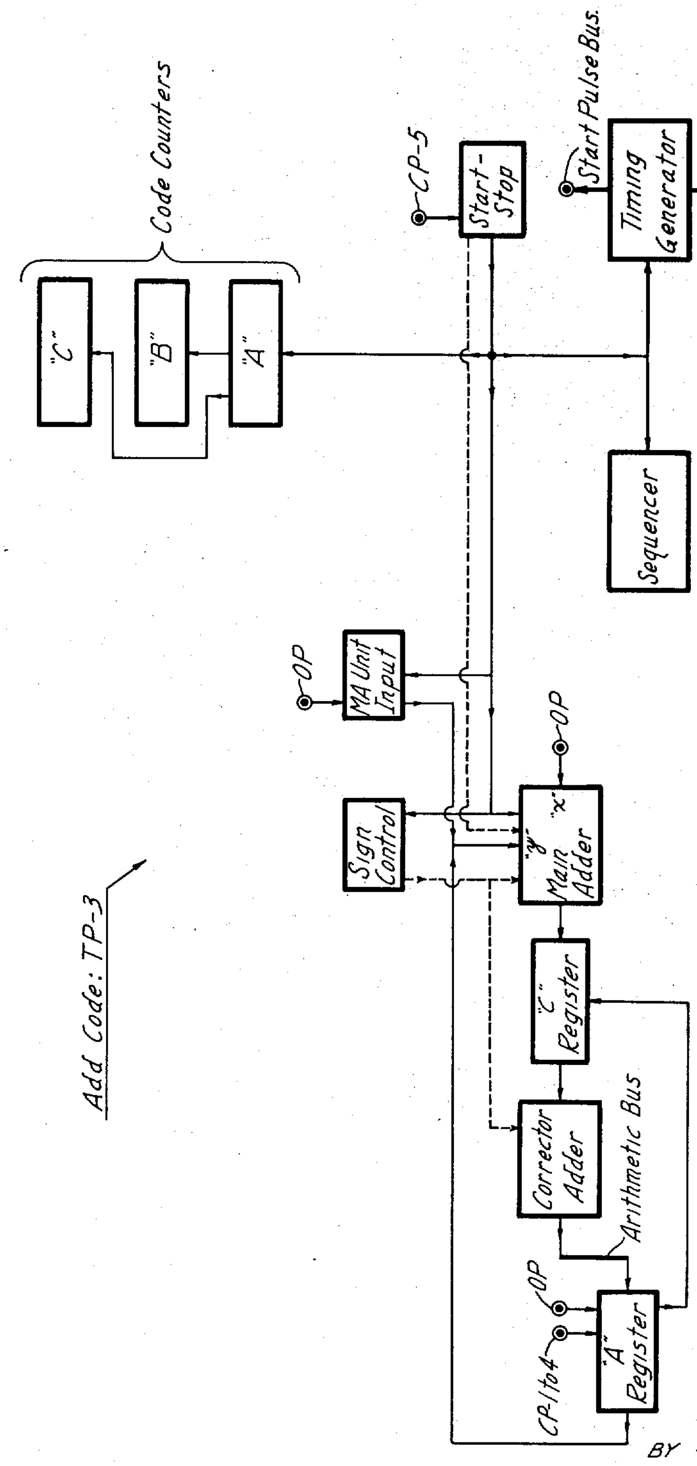
Figure 95:
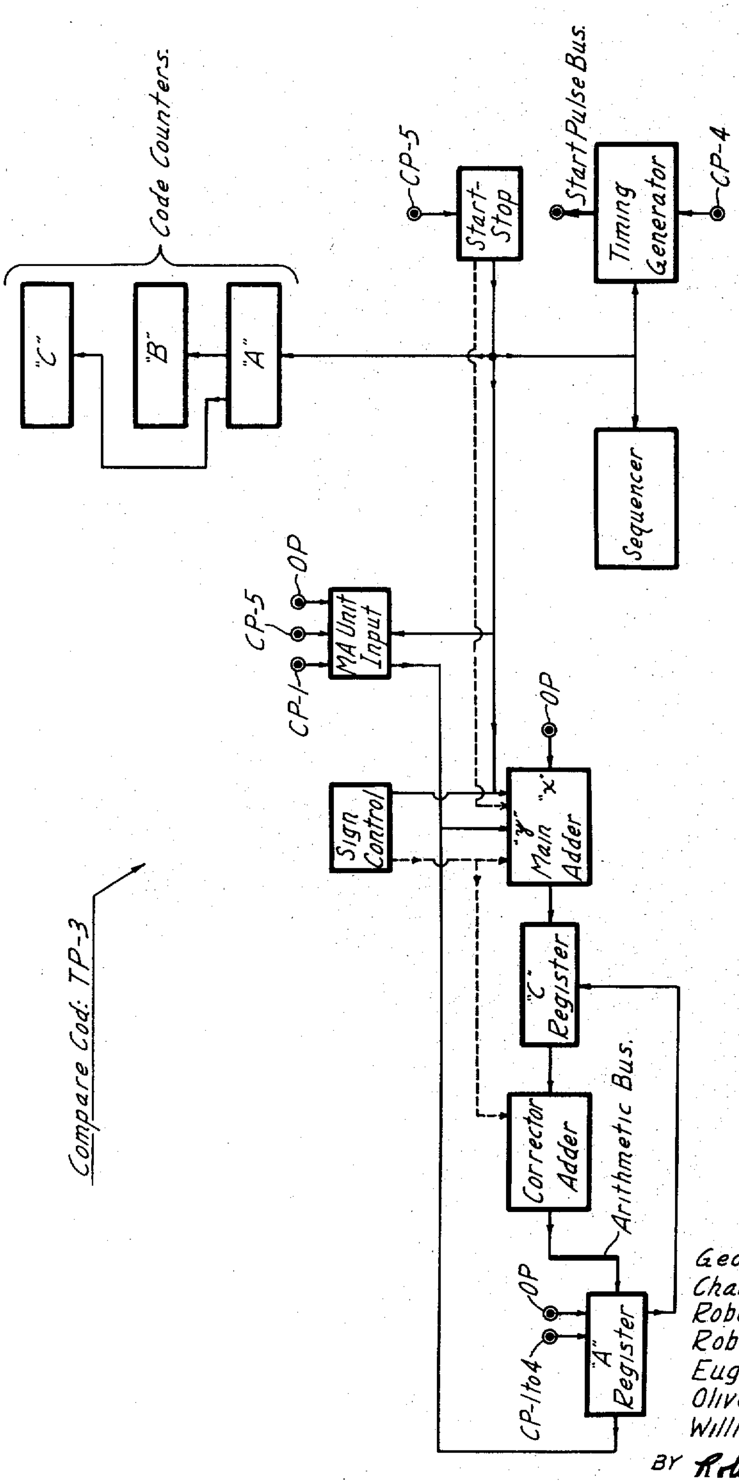
Figure 96:
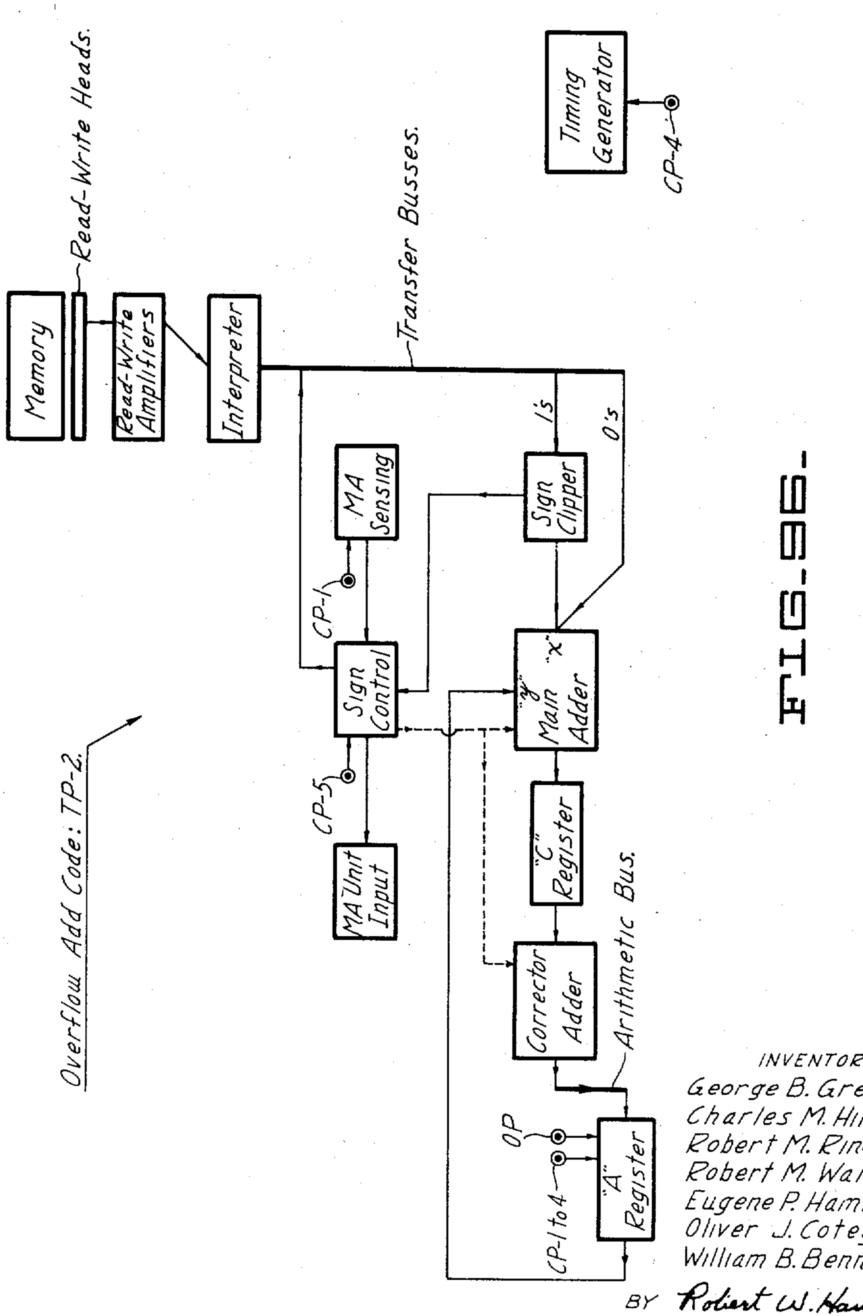
Figure 97:
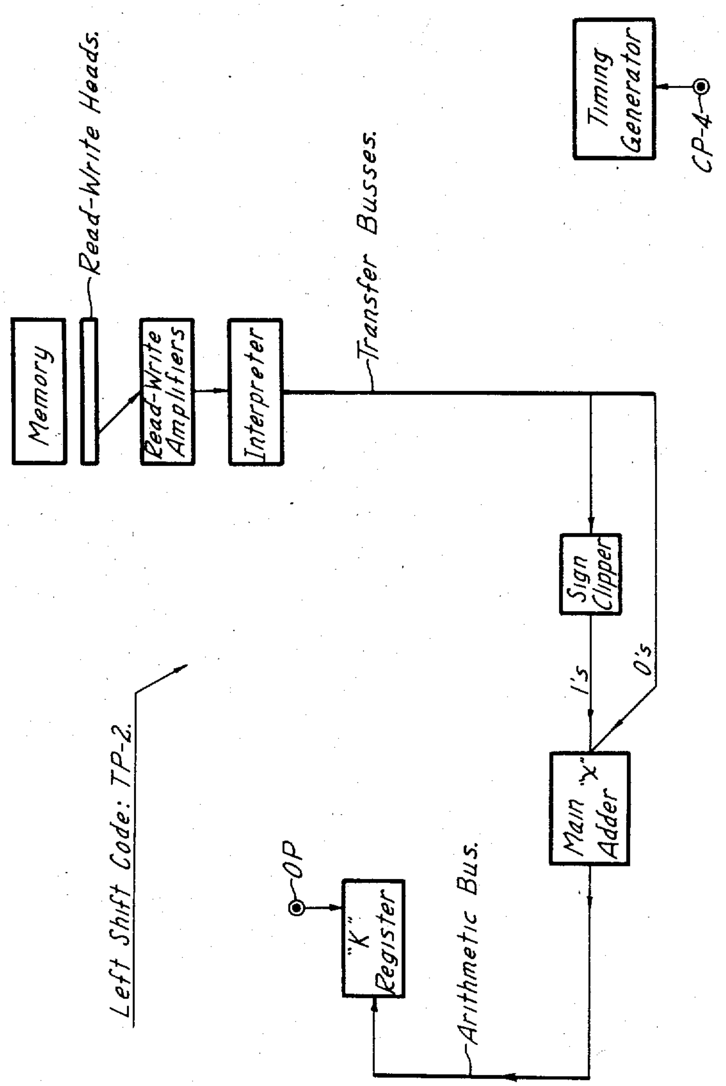
Figure 98:
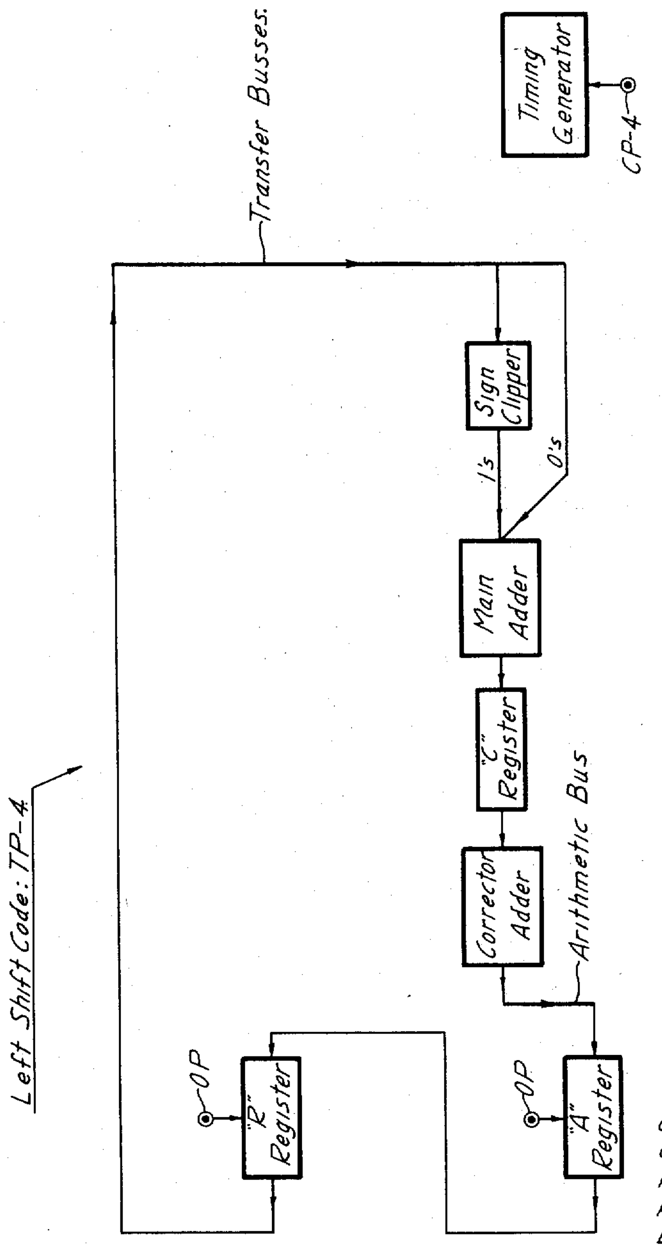
Figure 99:
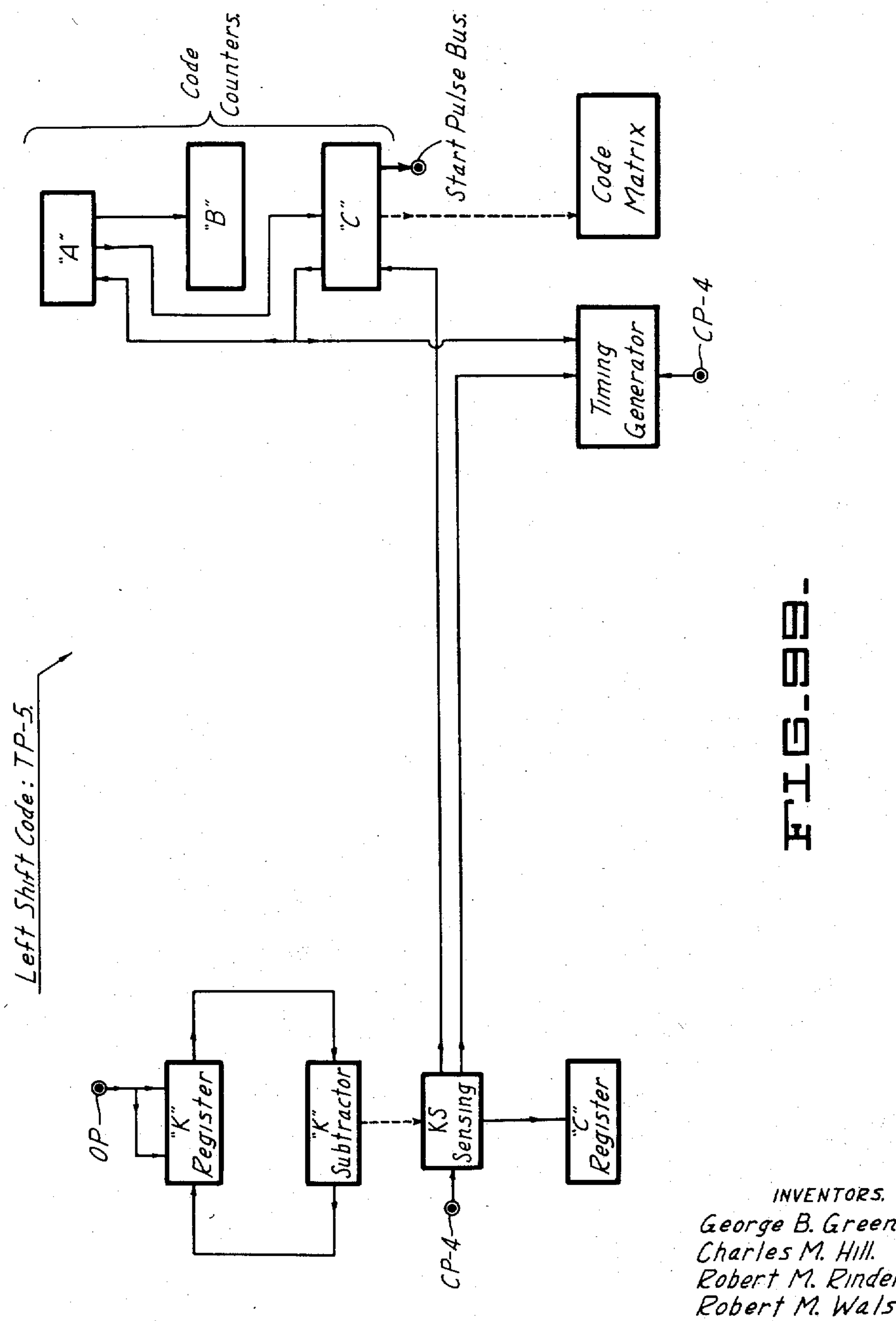
Figure 100:
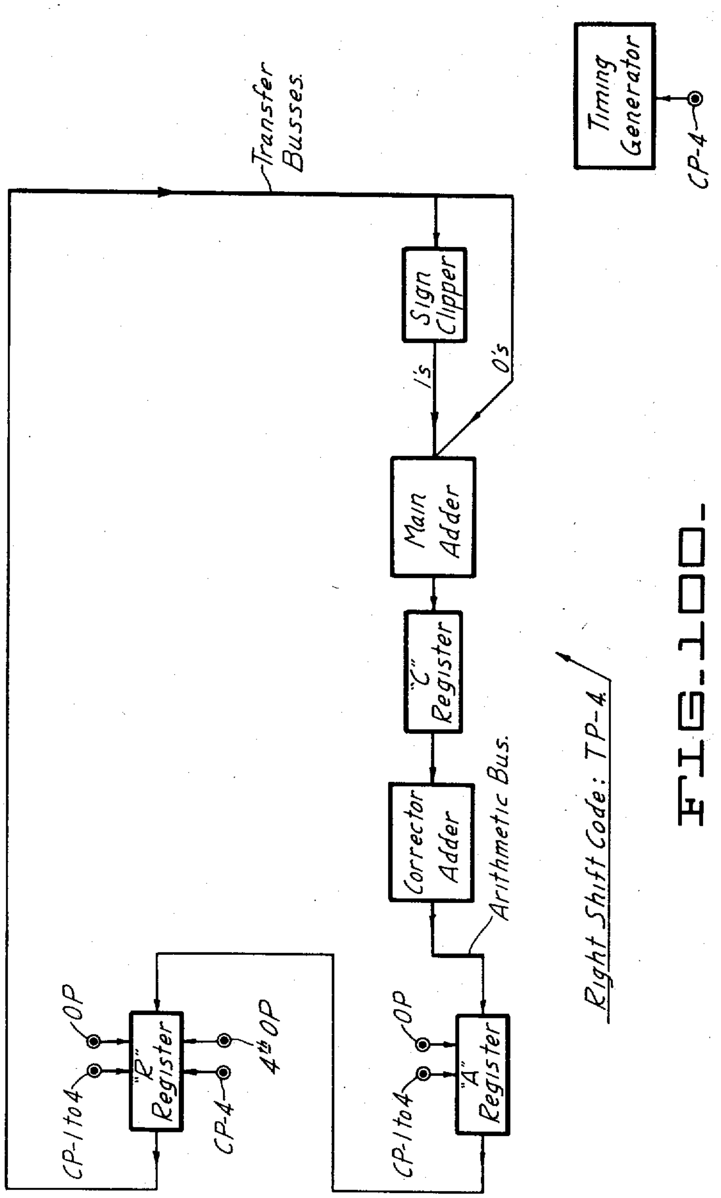
Figure 101:
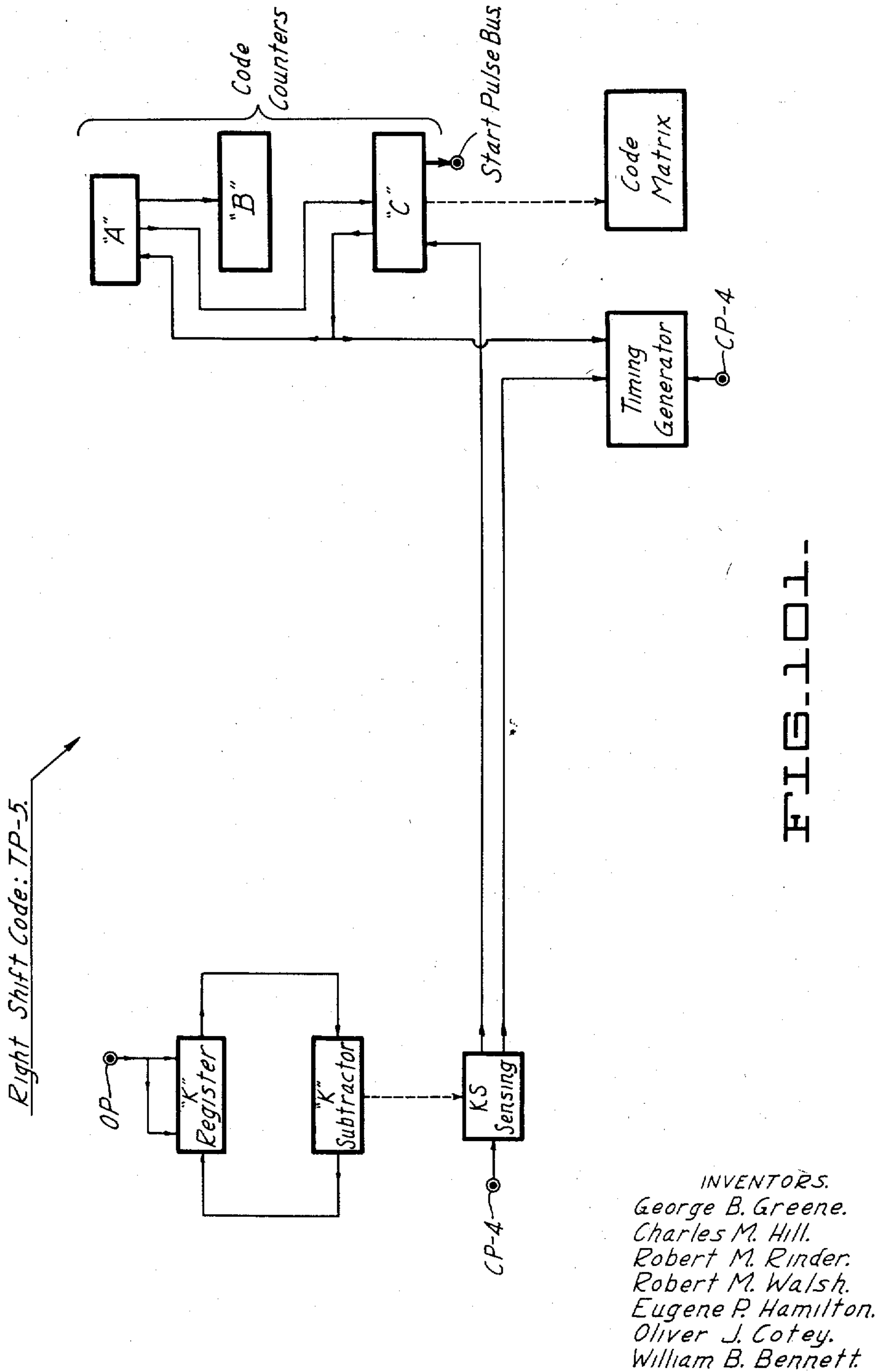
Figure 102:
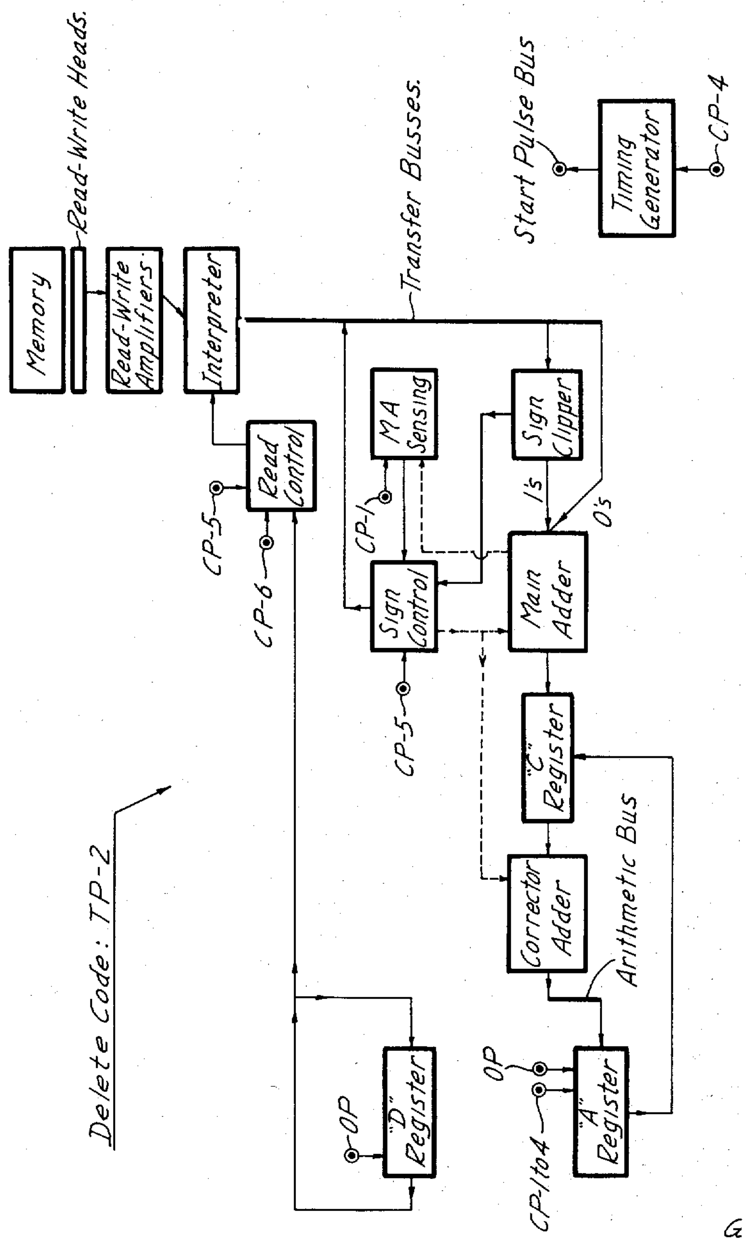
Figure 103:
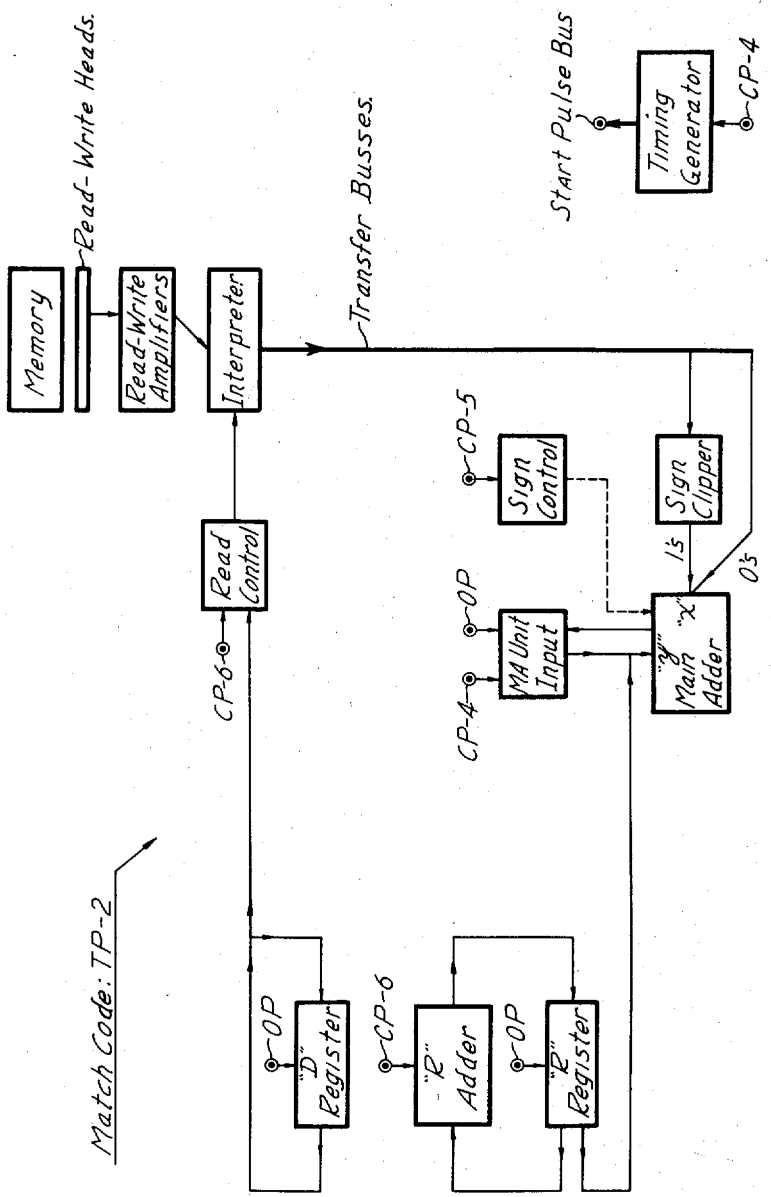
Figure 104:
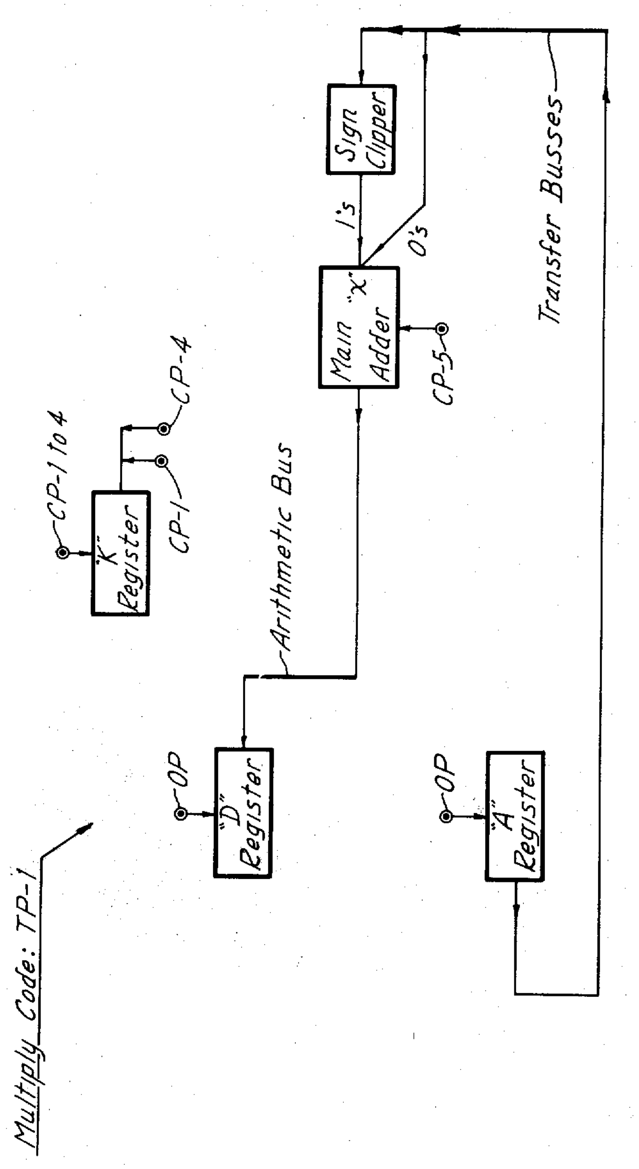
Figure 105:
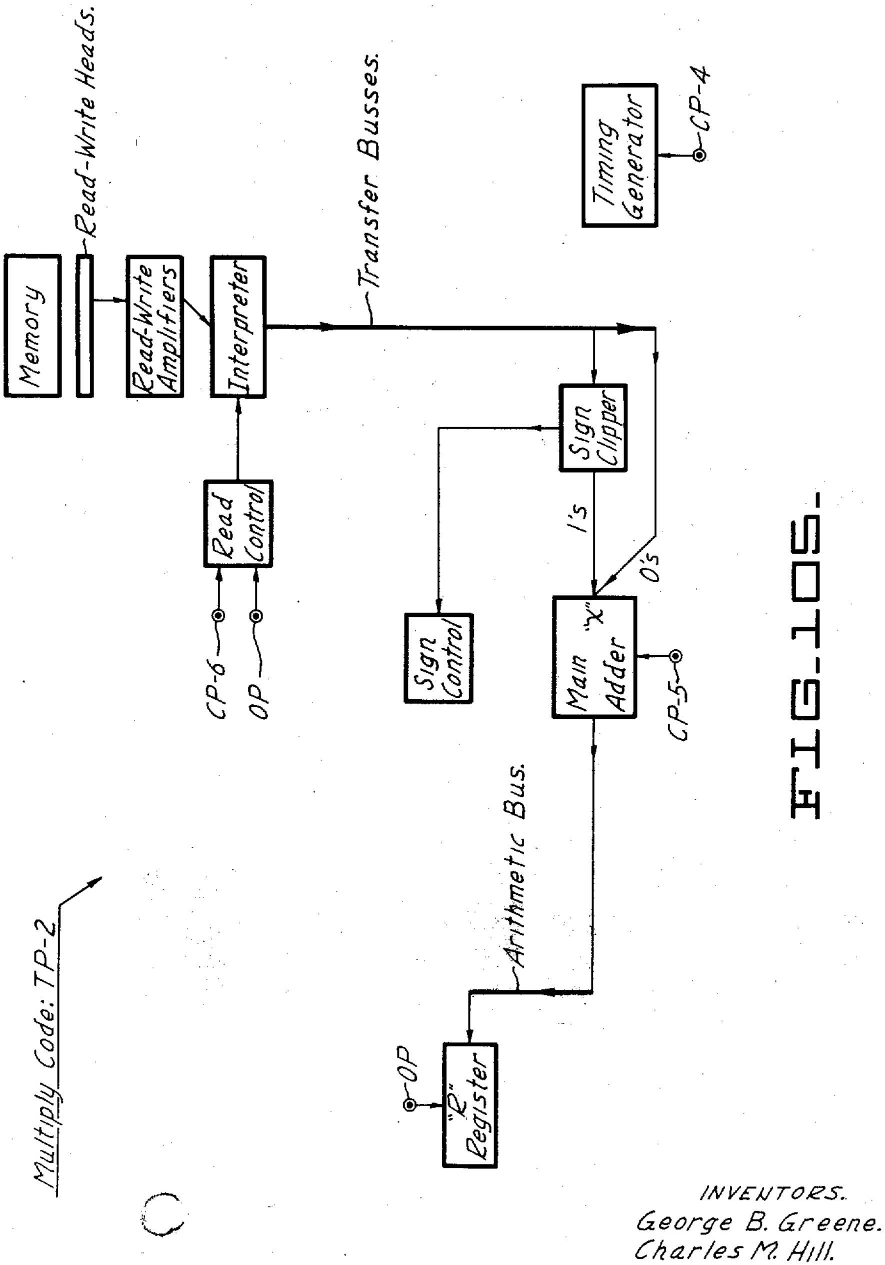
Figure 106:
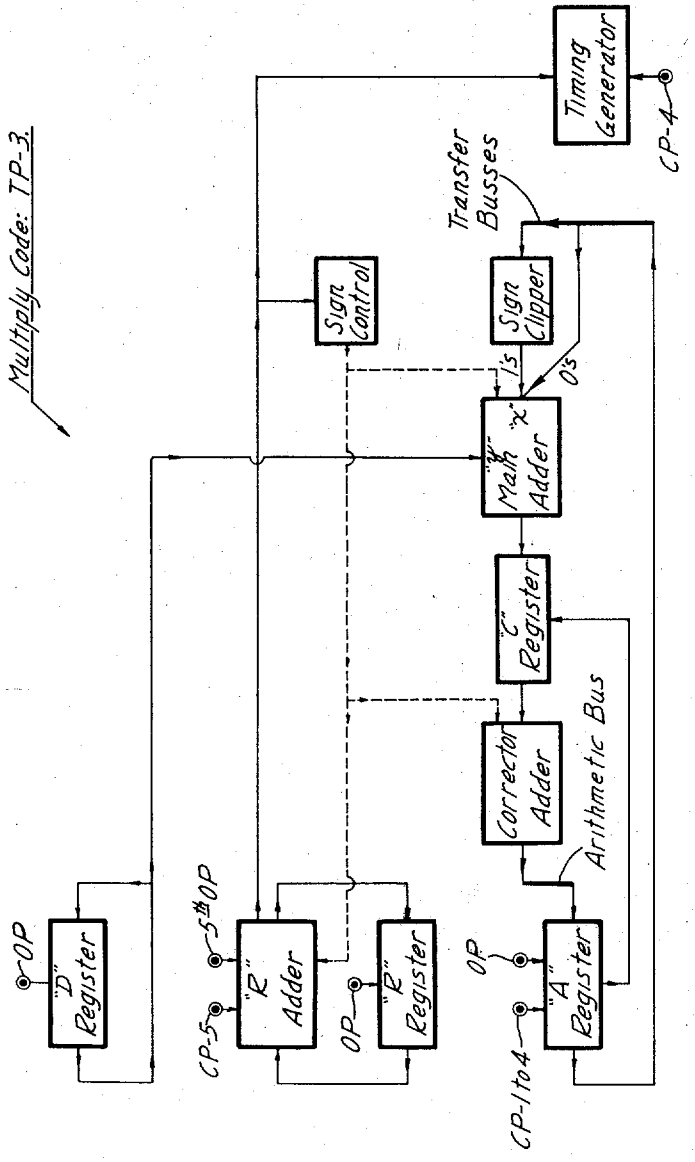
Figure 107:
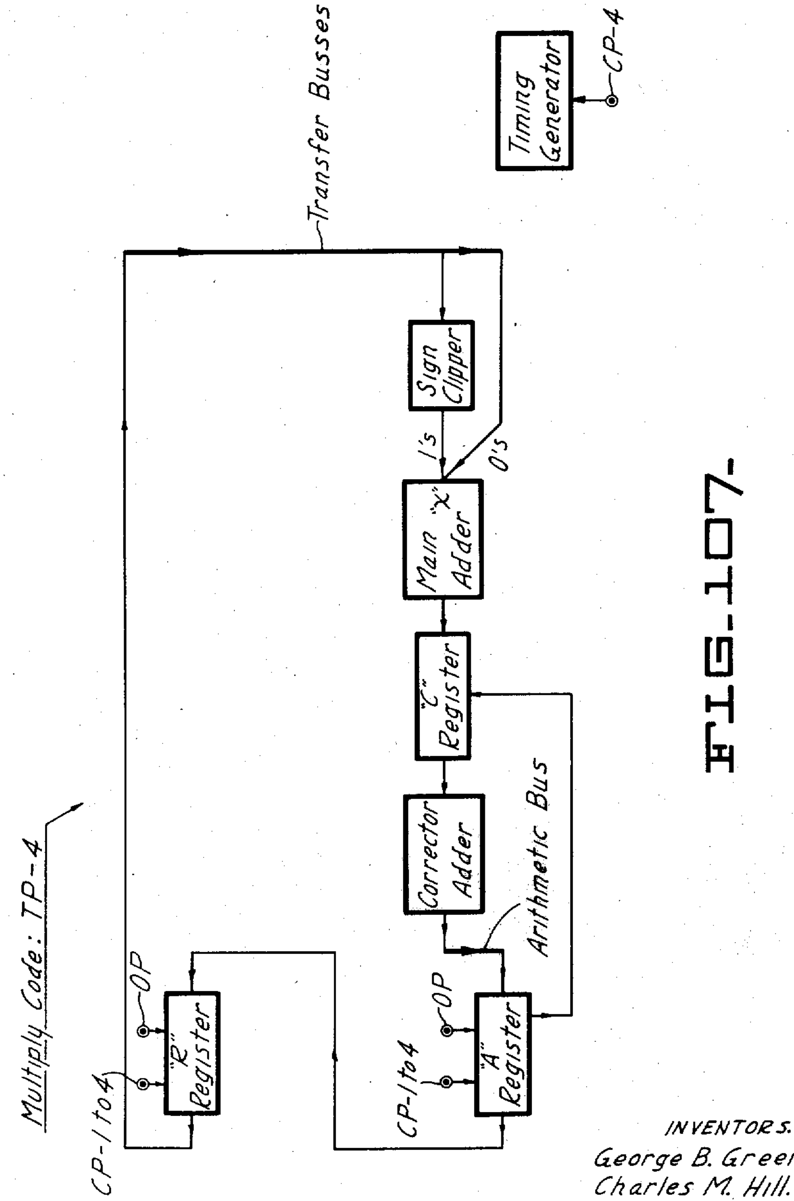
Figure 108:
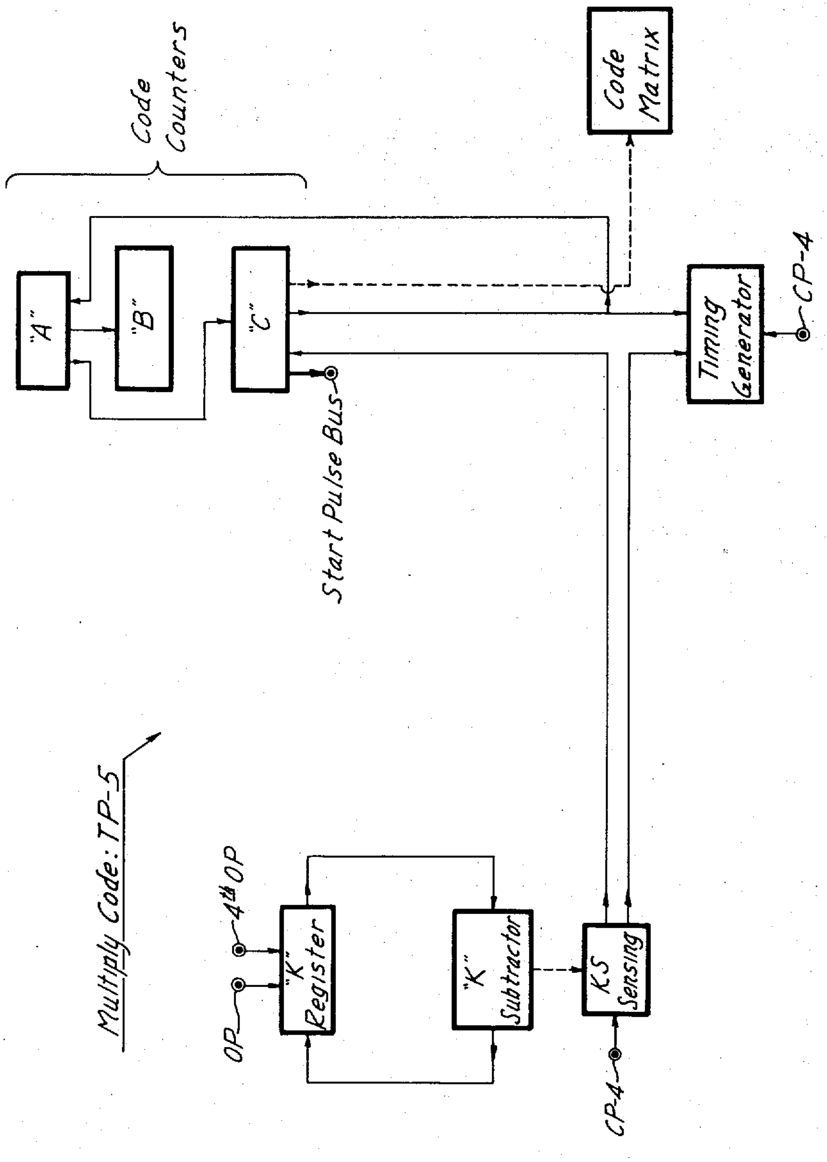
Figure 109:
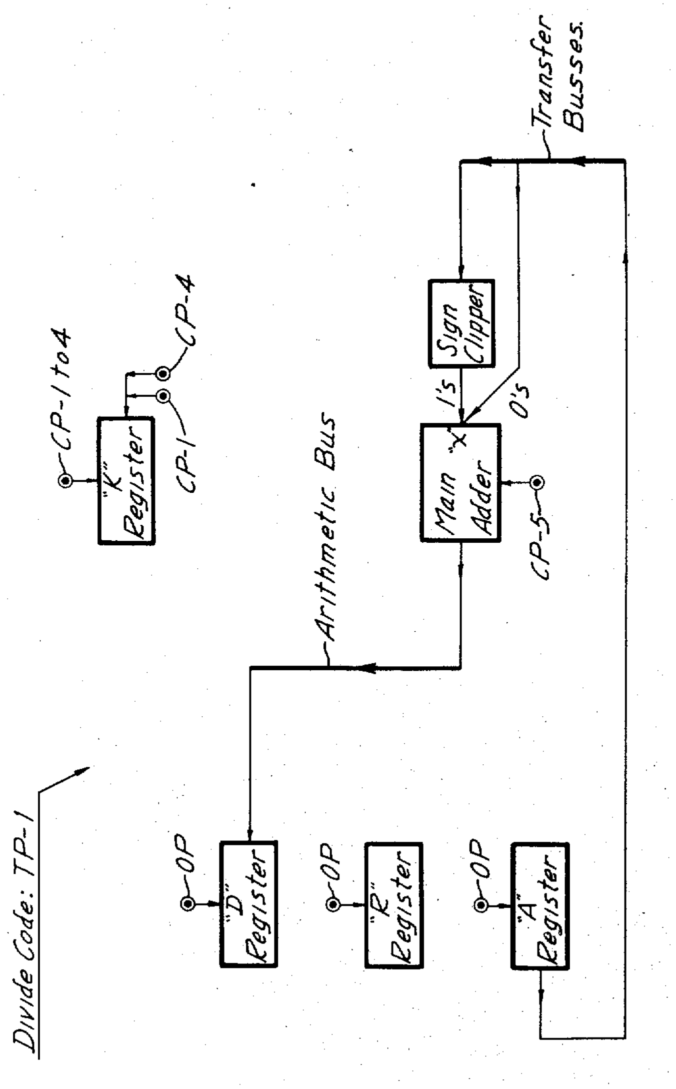
Figure 110:
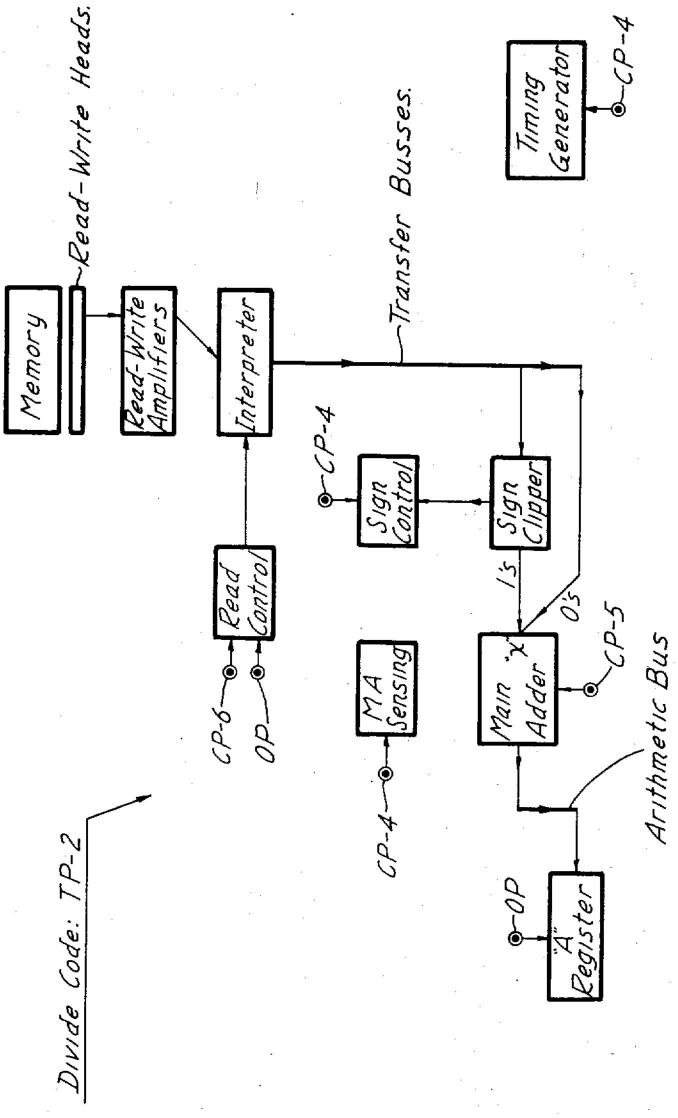
Figure 111:
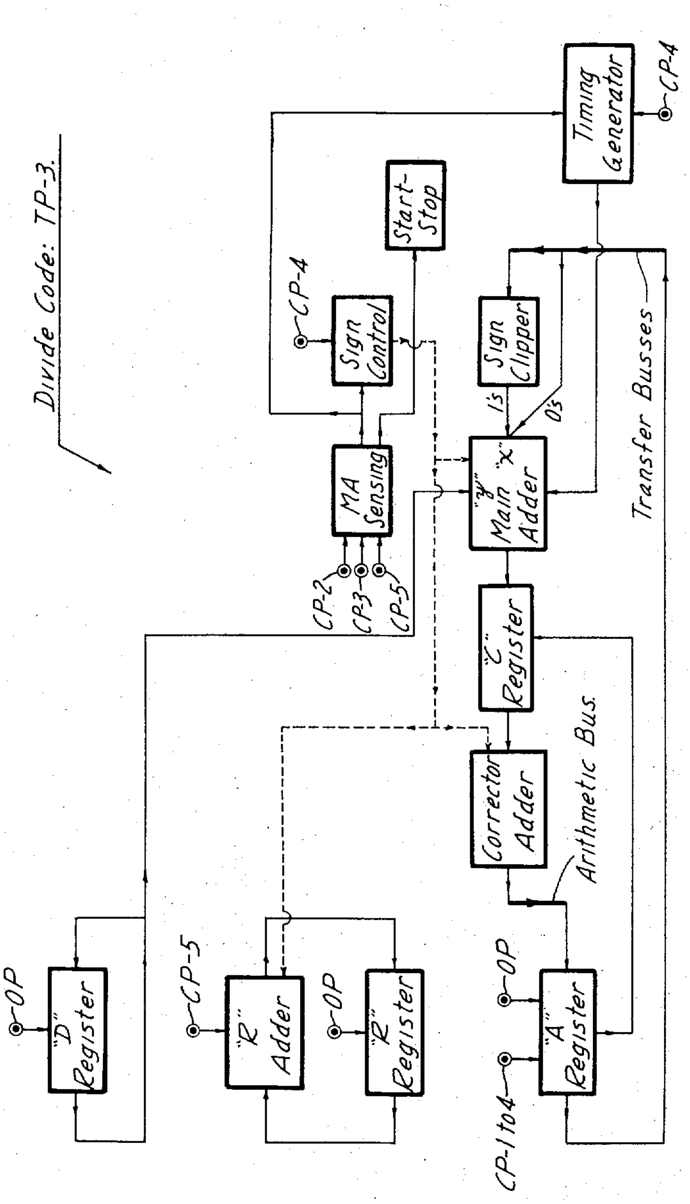
Figure 112:
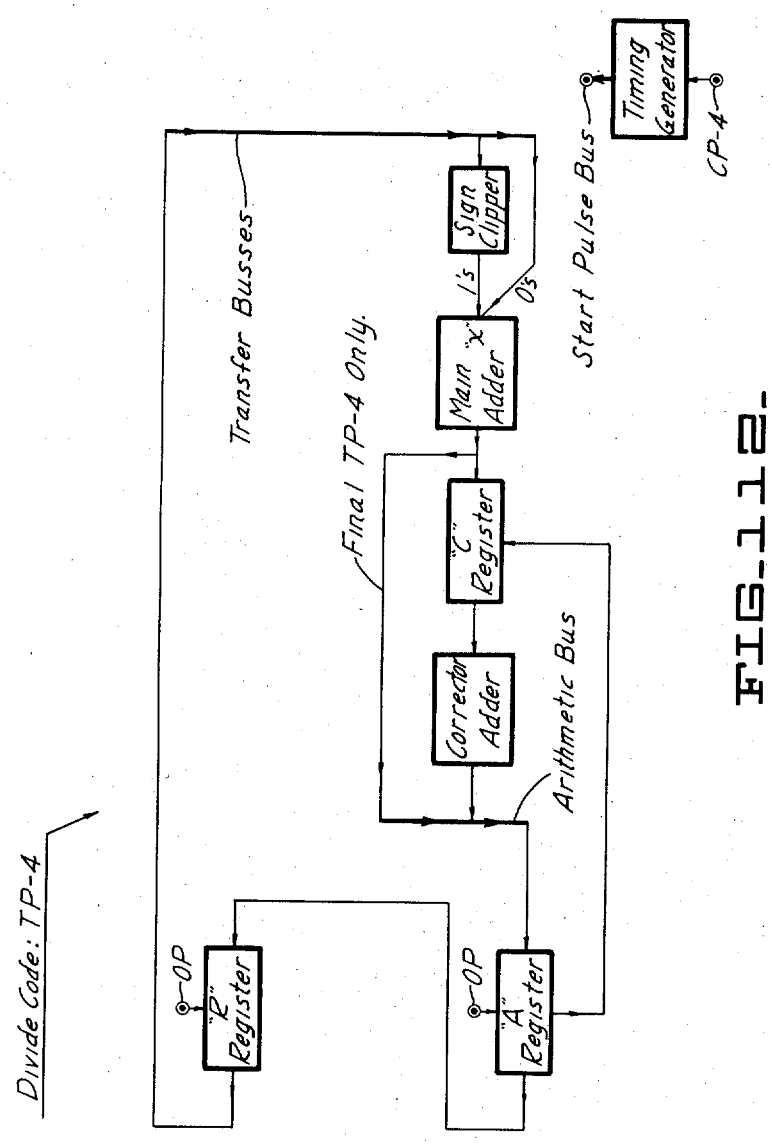
Figure 113:
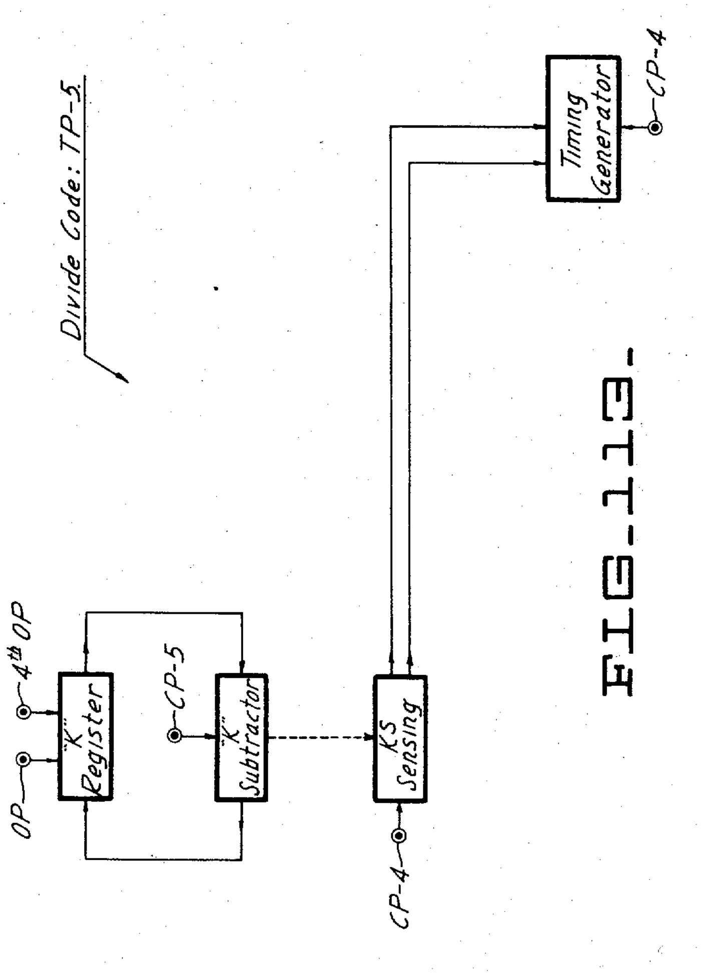
Figure 114:
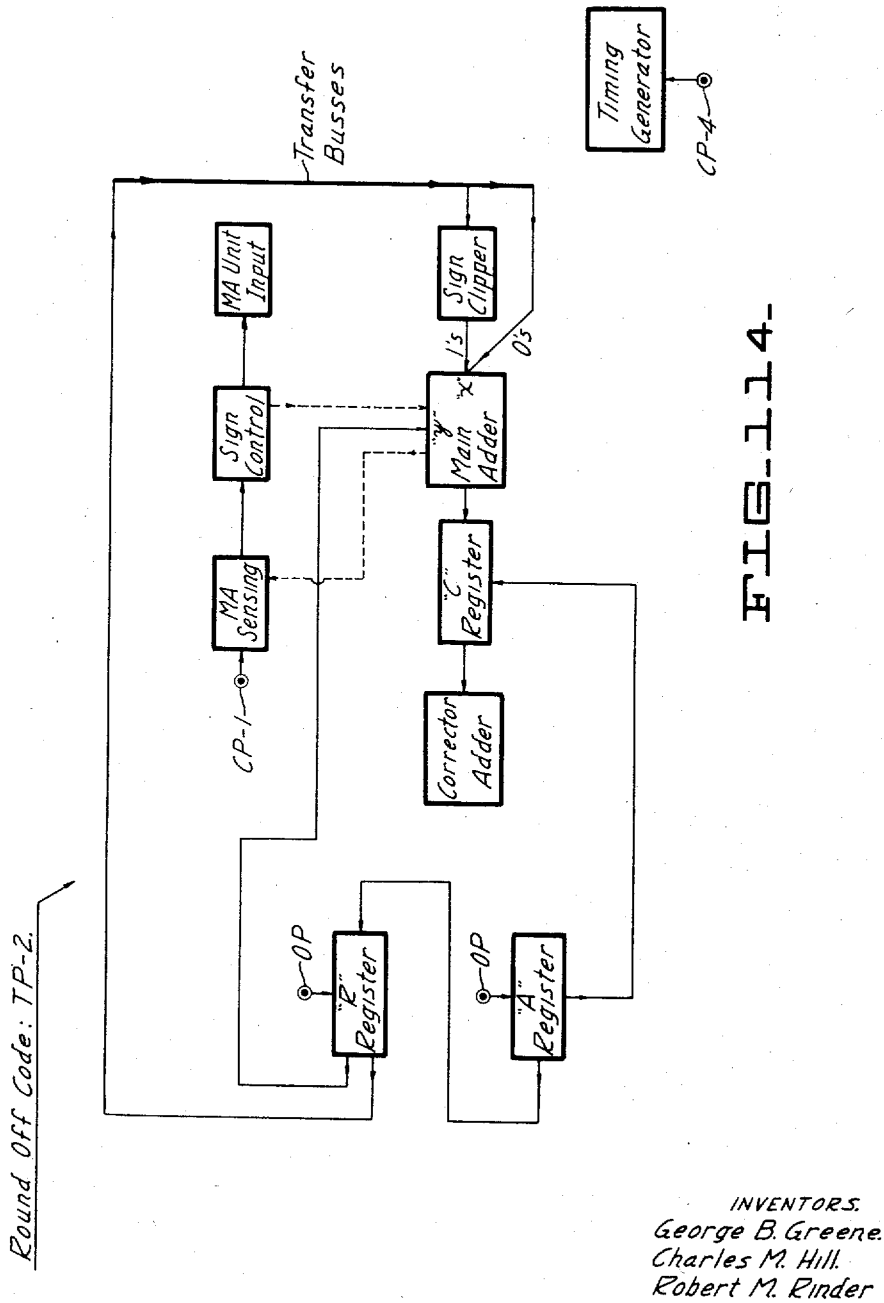
Figure 115:
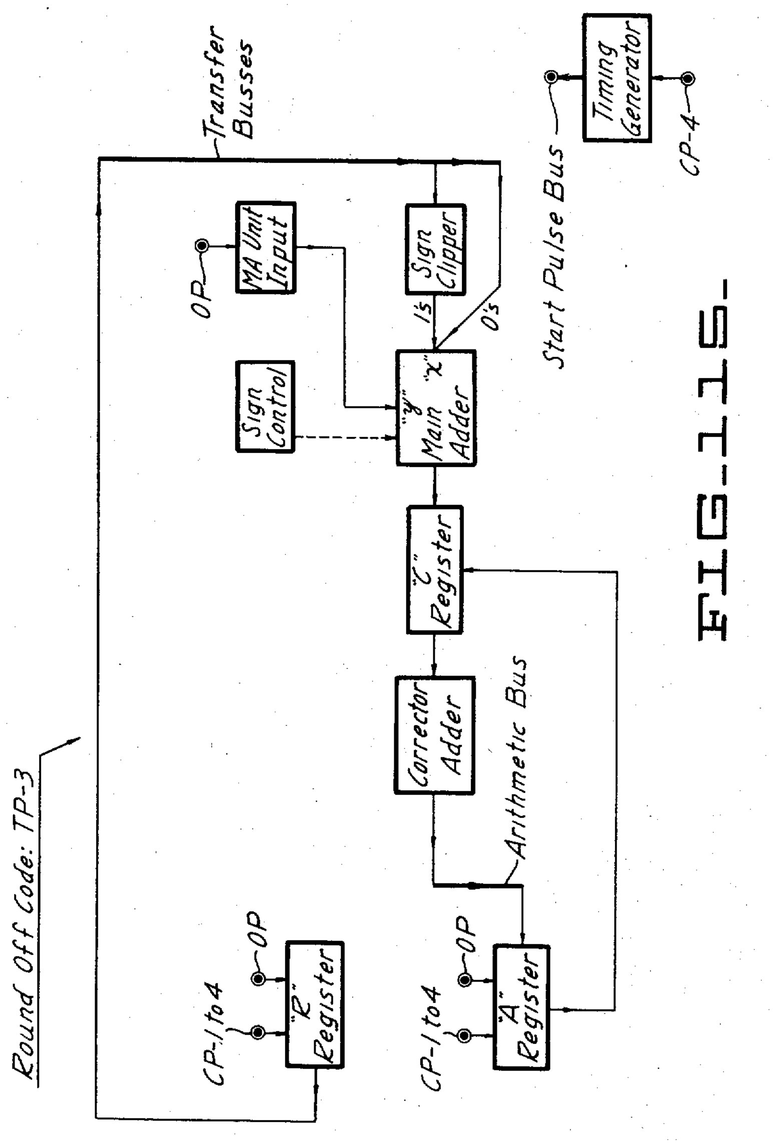

Figs. 33 and 34 together constitute a block diagram of the first embodiment of the invention;

Fig. 35 is a schematic drawing of the Memory Drum;

Fig. 36 is a schematic diagram showing the cell arrangement of a typical Information Band of Memory;

Fig. 37 is a schematic diagram showing the cell arrangement of the Clock Track of Memory;

Fig. 38 is a schematic diagram showing the cell arrangement of the Sector Track of Memory;

Fig. 39 is a schematic diagram of a typical transducing head;

Fig. 40 is a partially schematic and partially block diagram of the Clock Pulse Generator;

Fig. 41 is a block diagram of the Clock Pulse Distributor;

Fig. 42 is a block diagram of the Sector Synchronizer;

Fig. 43 is a block diagram of the Pattern Generator;

Fig. 44 is a schematic of a typical Read-Write Amplifier;

Fig. 45 is a schematic diagram of the Sector Read Amplifier;

Fig. 46 is a block diagram of the Interpreter;

Fig. 47 is a diagram of certain wave forms in the Interpreter;

Fig. 48 is a block diagram of the Read Control Circuit;

Fig. 49 is a block diagram of the Write Control Circuit;

Fig. 50 is a block diagram of the Sign Clipper;

Fig. 51 is a block diagram of the Main Adder;

Fig. 52 is a block diagram of the "C" Register;

Fig. 53 is a block diagram of the Corrector Adder;

Fig. 54 is a block diagram of the Main Adder Sensing Circuit;

Fig. 55 is a block diagram of the Sign Control Circuit;

Fig. 56 is a block diagram of the Main Adder Unit Input Circuit;

Fig. 57 is a block diagram of the "A" Register;

Fig. 58 is a block diagram of the "R" Register;

Fig. 59 is a block diagram of the "R" Adder;

Fig. 60 is a block diagram of the "D" Register;

Fig. 61 is a block diagram of the "K" Register;

Fig. 62 is a block diagram of the "K" Substractor;

Fig. 63 is a block diagram of the "K" Subtractor Sensing Circuit;

Fig. 64 is a block diagram of the "T" Register;

Fig. 65 is a block diagram of the "O" Register;

Fig. 66 is a block diagram of the "S" Register;

Fig. 67 is a block diagram of the Address Control Circuit;

Fig. 68 is a block diagram of the "O" Subtractor;

Fig. 69 is a block diagram of the Code-Band Pulse Distributor;

Fig. 70 is a block diagram of the Band Counter;

Fig. 71 is a block diagram of the Band Group Counter;

Fig. 72 is a block diagram of the Sector Coincidence Delay Circuit;

Fig. 73 is a timing diagram of the operation of the Sector Coincidence Delay Circuit;

Fig. 74 is a block diagram of the Sequencer;

Fig. 75 is a block diagram of the Start-Stop Circuit;

Fig. 76 is a block diagram of the Timing Generator;

Fig. 77 is a block diagram of Code Counter "A";

Fig. 78 is a block diagram of Code Counter "B";

Fig. 79 is a block diagram of Code Counter "C";

Fig. 80 is a block diagram of the Code Matrix;

Fig. 81 is a block diagram of the Code Distributor;

Fig. 82 is a block diagram of the Error Detection Circuit;

Fig. 83 is a block diagram showing the operation of the computer during Sequencing Phase 1;

Fig. 84 is a block diagram showing the operation of the computer during Sequencing Phase 2;

Fig. 85 is a block diagram showing the operation of the computer during Sequencing Phase 3;

Fig. 86 is a block diagram showing the operation of the computer during Sequencing Phase 4;

Fig. 87 is a block diagram showing the operation of the computer during the standard Timing Phase 1;

Fig. 88 is a block diagram showing the operation of the computer during Timing Phase 2 of the Read Code;

Fig. 89 is a block diagram showing the operation of the computer during Phases 1 and 2 of the Write Code;

Fig. 90 is a block diagram showing the operation of the computer during Phase 1 of the Add 1 Code;

Fig. 91 is a block diagram showing the operation of the computer during Phases 1 and 2 of the Jump Code;

Fig. 92 is a block diagram showing the operation of the computer during Phases 1 and 2 of the Logical Jump Code;

Fig. 93 is a block diagram showing the operation of the computer during Phase 2 of the Add Code;

Fig. 94 is a block diagram showing the operation of the computer during Phase 3 of the Add Code;

Fig. 95 is a block diagram showing the operation of the computer during Phase 3 of the Compare Code;

Fig. 96 is a block diagram showing the operation of the computer during Phase 2 of the Overflow Add Code;

Fig. 97 is a block diagram showing the operation of the computer during Phase 2 of the Left Shift Code;

Fig. 98 is a block diagram showing the operation of the computer during Phase 4 of the Left Shift Code;

Fig. 99 is a block diagram showing the operation of the computer during Phase 5 of the Left Shift Code;

Fig. 100 is a block diagram showing the operation of the computer during Phase 4 of the Right Shift Code;

Fig. 101 is a block diagram showing the operation of the computer during Phase 5 of the Right Shift Code;

Fig. 102 is a block diagram showing the operation of the computer during Phase 2 of the Delete Code;

Fig. 103 is a block diagram showing the operation of the computer during Phase 2 of the Match Code;

Fig. 104 is a block diagram showing the operation of the computer during Phase 1 of the Multiply Code;

Fig. 105 is a block diagram showing the operation of the computer during Phase 2 of the Multiply Code;

Fig. 106 is a block diagram showing the operation of the computer during Phase 3 of the Multiply Code;

Fig. 107 is a block diagram showing the operation of the computer during Phase 4 of the Multiply Code;

Fig. 108 is a block diagram showing the operation of the computer during Phase 5 of the Multiply Code;

Fig. 109 is a block diagram showing the operation of the computer during Phase 1 of the Divide Code;

Fig. 110 is a block diagram showing the operation of the computer during Phase 2 of the Divide Code;

Fig. 111 is a block diagram showing the operation of the computer during Phase 3 of the Divide Code;

Fig. 112 is a block diagram showing the operation of the computer during Phase 4 of the Divide Code;

Fig. 113 is a block diagram showing the operation of the computer during Phase 5 of the Divide Code;

Fig. 114 is a block diagram showing the operation of the computer during Phase 2 of the Round Off Code;

Fig. 115 is a block diagram showing the operation of the computer during Phase 3 of the Round Off Code.

Although the following description of a specific embodiment of the invention often refers to exact values as regards the number of stages in a register, pulse repetition rates and the like, it is to be understood that these values are merely illustrative. Such values may be varied, thereby adapting the computer to specific requirements, without departing from the scope of the invention.

NUMBER SYSTEMS

*In general.*—The computer hereinafter described is a digital computer, as distinguished from an analog computer, i.e., it processes and stores representations of discrete values. These values are expressed, internally in the computer, basically in the binary system of notation, but the binary values are often combined, or grouped, to represent values in any of four other systems of notation, viz, decimal, hexadecimal, octal or "special octal." The following subsections deal with the characteristics of the various number systems employed.

*Binary system.*—In the binary system of notation, only two marks are recognized, viz, the digits 0 and 1. Any ordinal digit 0 has an equivalent decimal value of 0, and any ordinal digit 1 has an equivalent decimal value of $2^{n-1}$, where "$n$" is the order number. There are three rules of addition in the binary system, as follows:

*Table I*

| | | |
|---|---|---|
| 0 | 0 | 1 |
| +0 | +1 | +1 |
| 0 | 1 | 0 (Carry +1) |

There are four rules of subtraction in the binary system, as follows:

*Table II*

| | | | |
|---|---|---|---|
| 0 | 1 | 1 | 0 |
| −0 | −0 | −1 | −1 |
| 0 | 1 | 0 | 1 (Carry −1) |

Binary addition and subtraction form the basis of all of the arithmetic operations performed in the present computer and will be referred to in describing such operations. In order to positively identify binary numbers, each such number will be followed by the alphabetical symbol "(B)," for example 10010110(B), having a decimal equivalent of 150.

*Decimal system.—In general.*—In the decimal system, there are the familiar nine permissible marks. Decimal values expressed in these marks will bear no identifying alphabetical symbol in the following description. In the present machine, however, decimal numbers are frequently expressed in groups of four binary digits, designated "decimal-grouped binary," or "DGB" representation, as follows:

*Table III*

| Decimal Digit | Decimal-grouped binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

For positive identification, decimal-grouped binary numbers will be followed by the alphabetical symbol "(DGB)," for example 1001/0110(DGB), having a decimal equivalent of 96.

*Addition and subtraction.*—It will be seen that a group of four binary orders has sixteen possible combinations of 1's and 0's, and that in normal binary counting, starting with 0000, the fifteenth count is 1111. The next count is 0000, with a carry of 1 from the fourth binary order to the fifth. Since, for the purpose of representing decimal digits, only ten combinations (for example, the combinations previously set forth opposite the ten decimal digits) are necessary or desirable, a carry must occur to the next group of four binary orders when any value greater than 9 is represented by a given decimal group. Also, the value greater than 9 must be reduced by 10. If the value is greater than 15, the carry occurs in the normal course of binary counting. If the value is greater than 9 but less than 16, the carry is accomplished in the present computer by detecting the presence of a 1 in either or both the second and third binary places of the decimal group (having equivalent decimal values of 2 and 4, respectively) simultaneously with the presence of a 1 in the most significant binary place (having a decimal equivalent of 8). It is seen that any such combination has a decimal equivalent in the range 10–15, inclusive, and that only such combinations have decimal equivalents in that range. When such a combination is detected, carry of a +1 is transmitted to the next higher decimal group. The reduction by 10 is accomplished in the present computer by adding the correction value 0110(DGB) to each decimal group in which a value greater than 9 has been detected, and permitting the stages of that group to carry internally in normal binary progression, but blocking carries between groups. Since a decimal group of four binary orders has a total capacity of sixteen counts, the addition of 6 is equivalent to the subtraction of 10. For example, in an addition:

*Table IV*

| | | |
|---|---|---|
| 06 | 0000/0110(DGB) | |
| +08 | +0000/1000(DGB) | |
| | 0001/1110 | |
| | +0110 | Correction |
| 14 | 0001/0100(DGB) | |

It will be seen from Table IV that the intermediate value 0001/1110 does not express the sum in any number system, based on a single radix, but must be corrected by the addition of 0110(DGB) to produce the sum 0001/0100(DGB).

In subtraction, on the other hand, the correction value 0110(DGB) must be subtracted from any result if that result includes a subtractive carry, but regardless of the value of the result. For example:

*Table V*

| | | |
|---|---|---|
| 18 | 0001/1000(DGB) | |
| −09 | −0000/1001(DGB) | |
| | 0000/1111 | |
| | −0110 | Correction |
| 09 | 0000/1001(DGB) | |

It will be seen from Table V that the intermediate value 0000/1111 in the above example, does not express the result in any number system, but must be corrected by the subtraction of 0110(DGB).

Algebraic subtraction consists of changing the sign of the subtrahend and adding. It is necessary to complement the result when the operation is subtraction and the absolute value of the subtrahend is greater than that of the minuend. The complement is obtained by subtracting the result from all 0's and disregarding the last subtractive carry. An example of subtraction requiring complementing of the result is as follows:

*Table VI*

| | | |
|---|---|---|
| 322 | 0011/0010/0010(DGB) | |
| −541 | −0101/0100/0001(DGB) | |
| | 1101/1110/0001 | |
| | −0110/0110/0000 | Correction |
| 781 | 0111/1000/0001(DGB) | Complementary form |
| 000 | 0000/0000/0000(DGB) | |
| −781 | −0111/1000/0001(DGB) | Complementary form |
| | 1000/0111/1111 | |
| | −0110/0110/0110 | Correction |
| −219 | −0010/0001/1001(DGB) | |

*Multiplication.*—Multiplication of two DGB numbers is performed as follows in the present computer. The multiplicand is added to an accumulated partial product (originally all 0's) once for each unit of value in the least significant decimal group of the multiplier, and the value of that multiplier group is reduced by unity for each such addition. When the value of the least significant decimal group of the multiplier is decreased to 0000(DGB), this indicates that the multiplicand has been added to the partial product a number of times that is equal to the original value of the multiplier group. The value 0000(DGB) in the lowest multiplier group is detected during a further addition of the multiplicand to the partial product and a further decrease of the multiplier group of 1. The multiplier group, in being decreased by 1, overflows to the value 1111(DGB). Next, the multiplicand is correctively subtracted once from the partial product, and the multiplier group is increased by unity to restore it to the value 0000(DGB). Then the multiplier and the partial product are shifted one decimal place (four binary places) to the right relative to the multiplicand, and the second least significant decimal group of the multiplier controls subsequent entry of the multiplicand into the partial product in the manner described above. The alternating entry and shift are continued until the value of the multiplier has been reduced to all 0's, at which time the accumulated partial product constitutes the full product of the multiplier and multiplicand. An example of a multiplication operation, 201×902=181,302, shown first in the conventional decimal system is as follows, where Md=Multiplicand, and $P_n$=*n*th partial product.

*Table VII*

| Operation | Multiplicand and Partial Product | Multiplier |
|---|---|---|
| $P_0$<br>+Md | 000<br>+902 | 201<br>−1 |
| $P_1$<br>+Md | 902<br>+902 | 200<br>−1 |
| $P_2$<br>−Md | 1804<br>−902 | 199<br>+1 |
| $P_3$<br>Right Shift | 902 | 200<br>Right Shift |
| $P_3$ (Shifted)<br>+Md | 0902<br>+902 | 020<br>−1 |
| $P_4$<br>−Md | 9922<br>−902 | 019<br>+1 |
| $P_5$<br>Right Shift | 0902 | 020<br>Right Shift |
| $P_5$ (Shifted)<br>+Md | 00902<br>+902 | 002<br>−1 |
| $P_6$<br>+Md | 91102<br>+902 | 001<br>−1 |
| $P_7$<br>+Md | 181302<br>+902 | 000<br>−1 |
| $P_8$<br>−Md | 271502<br>−902 | 999<br>+1 |
| $P_9$ | 181302 | 000 |

The same problem, expressed in DGB representation, is solved as follows:

*Table VIII*

| Operation | Multiplicand and Partial Product | Multiplier |
|---|---|---|
| $P_0$<br>+Md | 0000/0000/0000(DGB)<br>+1001/0000/0010(DGB) | 0010/0000/0001(DGB)<br>−0001(DGB) |
| $P_1$<br>+Md | 1001/0000/0010(DGB)<br>+1001/0000/0010(DGB) | 0010/0000/0000(DGB)<br>−0001(DGB) |
| | 0001/0010/0000/0100<br>+0110 Correction | 0001/1111/1111 Overflow |
| $P_2$<br>−Md | 0001/1000/0000/0100(DGB)<br>−1001/0000/0010(DGB) | +0001(DGB) |
| | 1111/0000/0010<br>−0110 Correction | 0010/0000/0000(DGB) |
| $P_3$<br>Right Shift | 1001/0000/0010(DGB) | Right Shift |
| $P_3$ (Shifted)<br>+Md | 0000/1001/0000/0010(DGB)<br>+1001/0000/0010(DGB) | 0000/0010/0000(DGB)<br>−0001(DGB) |
| $P_4$<br>−Md | 1001/1001/0010/0010(DGB)<br>−1001/0000/0010(DGB) | 0000/0001/1111 Overflow<br>+0001(DGB) |
| $P_5$<br>Right Shift | 0000/1001/0000/0010(DGB) | 0000/0010/0000(DGB)<br>Right Shift |
| $P_5$ (Shifted)<br>+Md | 0000/0000/1001/0000/0010(DGB)<br>+1001/0000/0010(DGB) | 0000/0000/0010(DGB)<br>−0001(DGB) |
| | 1001/0001/1011/0000/0010<br>+0110 Correction | |
| $P_6$<br>+Md | 1001/0001/0001/0000/0010(DGB)<br>+1001/0000/0010(DGB) | 0000/0000/0001(DGB)<br>−0001(DGB) |
| | 0001/0010/0001/0011/0000/0010<br>+0110 Correction | 0000/0000/0000(DGB) |
| $P_7$<br>+Md | 0001/1000/0001/0011/0000/0010(DGB)<br>+1001/0000/0010(DGB) | −0001(DGB) |
| | 0010/0001/0001/0101/0000/0010<br>+0110 Correction | 1111/1111/1111 Overflow |
| $P_8$<br>−Md | 0010/0111/0001/0101/0000/0010(DGB)<br>−1001/0000/0010(DGB) | +0001(DGB) |
| | 0001/1110/0001/0011/0000/0010<br>−0110 Correction | |
| $P_9$ | 0001/1000/0001/0011/0000/0010(DGB) | 0000/0000/0000(DGB) |

It will be seen in Table VIII that overflow groups in the multiplier are not corrected so as to be expressed in DGB representation. This is because the overflow group 1111 is not employed in computation, but is restored to the value 0000, along with subtractive entry of the multiplicand, and its final value is mathematically correct.

*Division.*—Division of two DGB numbers in the present computer is performed as follows. This divisor is subtracted from the dividend or remainder until a negative result is obtained. Corresponding to each such subtraction, a 1 is added to the quotient, which is originally all 0's. When a negative remainder is obtained by subtracting the divisor, the latter is added to the remainder one time to produce a positive remainder, and a 1 is subtracted from the quotient. Then the remainder and quotient are shifted one decimal place (four binary places) to the left and the divisor is subtracted from the shifted remainder in the manner previously described. An example of a division operation $$94 \div 1974 = 21$$

shown first in the conventional decimal system, is as follows, where Dr=divisor, Dd=dividend, and $R_n$=$n$th remainder.

*Table IX*

| Operation | Dividend, Remainder and Divisor | Quotient |
|---|---|---|
| Dd<br>−Dr | 1974<br>−94 | 000<br>+1 |
| $R_1$<br>+Dr | 92574 Overflow<br>+94 | 100<br>−1 |
| $R_2$<br>Left Shift | 1974 | 000<br>Left Shift |
| $R_2$ (Shifted)<br>−Dr | 1974<br>−94 | 000<br>+1 |
| $R_3$<br>−Dr | 1034<br>−94 | 010<br>+1 |
| $R_4$<br>−Dr | 0094<br>−94 | 020<br>+1 |
| $R_5$<br>+Dr | 9154 Overflow<br>+94 | 030<br>−1 |
| $R_6$<br>Left Shift | 0094 | 020<br>Left Shift |
| $R_6$ (Shifted)<br>−Dr | 0094<br>−94 | 020<br>+1 |
| $R_7$<br>−Dr | 0000<br>−94 | 021<br>+1 |
| $R_8$<br>+Dr | 9906 Overflow<br>+94 | 022<br>−1 |
| $R_9$ | 0000 | 021 |

The same problem, expressed in DGB representation, is solved as follows:

*Table X*

| Overflow | Dividend, Remainder and Divisor | Quotient |
|---|---|---|
| Dd<br>−Dr | 0001/1001/0111/0100(DGB)<br>−1001/0100(DGB) | 0000/0000/0000(DGB)<br>+0001(DGB) |
| | 1111/1000/0101/0111/0100<br>−0110/0110 Correction | 0001/0000/0000(DGB) |
| $R_1$<br>+Dr | 1001/0010/0101/0111/0100(DGB)<br>+1001/0100/(DGB) | −0001/(DGB) |
| | 1010/1011/1001/0111/0100<br>+0110/0110 Correction | 0000/0000/0000(DGB) |
| $R_2$<br>Left Shift | 0000/0001/1001/0111/0100(DGB) | Left Shift |
| $R_2$ (Shifted)<br>−Dr | 0001/1001/0111/0100(DGB)<br>−1001/0100(DGB) | 0000/0000/0000(DGB)<br>+0001(DGB) |
| $R_3$<br>−Dr | 0001/0000/0011/0100(DGB)<br>1001/0100(DGB) | 0000/0001/0000(DGB)<br>+0001(DGB) |
| | 0000/0110/1111/0100<br>−0110/0110 Correction | 0000/0010/0000(DGB) |
| $R_4$<br>−Dr | 0000/0000/1001/0100(DGB)<br>−1001/0100(DGB) | +0001(DGB) |
| | 1111/0111/0101/0100<br>−0110/0110 Correction | 0000/0011/0000(DGB) |
| $R_5$<br>+Dr | 1001/0001/0101/0100(DGB) Overflow<br>+1001/0100(DGB) | −0001(DGB) |
| | 1010/1010/1001/0100<br>+0110/0110 Correction | 0000/0010/0000(DGB) |
| $R_6$<br>Left Shift | 0000/0000/1001/0100(DGB) | Left Shift |
| $R_6$ (Shifted)<br>−Dr | 0000/0000/1001/0100(DGB)<br>−1001/0100(DGB) | 0000/0010/0000(DGB)<br>+0001(DGB) |
| $R_7$<br>−Dr | 0000/0000/0000/0000(DGB)<br>−1001/0100(DGB) | 0000/0010/0001(DGB)<br>+0001(DGB) |
| | 1111/1111/0110/1100<br>−0110/0110/0110/0110 Correction | 0000/0010/0010(DGB) |
| $R_8$<br>+Dr | 1001/1001/0000/0110(DGB) Overflow<br>+1001/0100(DGB) | −0001(DGB) |
| | 1010/1010/1010/1010<br>+0110/0110/0110/0110 Correction | 0000/0010/0001(DGB) |
| $R_9$ | 0000/0000/0000/0000(DGB) | |

*Hexadecimal system.—In general.*—In the hexadecimal system of notation, there are sixteen permissible marks, the first ten of which will arbitrarily be identified with the ten decimal digits, and the last six of which will be arbitrarily identified with the first six letters of the alphabet, italicized, as shown in Table XI.

*Table XI*

| Decimal | Hexadecimal |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | *A* |
| 11 | *B* |
| 12 | *C* |
| 13 | *D* |
| 14 | *E* |
| 15 | *F* |

An ordinal hexadecimal digit "$m$" has an equivalent decimal value of $m\times16^{n-1}$, where "$n$" is the order number. The hexadecimal system is useful principally for two reasons, viz: (1) each of its single digits can be expressed, like the decimal digits, in a four-place binary group, as hereinafter described, and can therefore be processed conveniently by DGB processing equipment; and (2) it is "compatible" with the binary system in the sense that its radix, or base, 16 is an integral power of the binary radix 2, i.e., $2^4+16$. The latter property of the hexadecimal system is desirable because it establishes the fact that any inter-order carry in the hexadecimal system must occur at a value where a carry occurs in the binary system. This property is useful where hexadecimal values are expressed in hexadecimal-grouped binary representation, hereinafter called "HGB" representation. Because of the compatibility between the binary and hexadecimal systems, binary values and HGB values require no intertranslation: identical values are represented by identical digits. For positive identification, hexadecimal values will be followed by the symbol "(H)", for example, the hexadecimal number 6*C*5(H), having a decimal equivalent of $$6\times16^2+12\times16^1+5\times16^0=1733$$

*Hexadecimal-grouped binary.*—Since the hexadecimal system has sixteen permissible marks, all sixteen combinations of a group of four binary digits are used in HGB representation to represent these sixteen marks, as follows:

*Table XII*

| Hexadecimal | Hexadecimal-Grouped Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| *A* | 1010 |
| *B* | 1011 |
| *C* | 1100 |
| *D* | 1101 |
| *E* | 1110 |
| *F* | 1111 |

In the following description, each HGB number will be followed by the symbol "(HGB)," for example, the number 0110/1100/0101(HGB), having a hexadecimal equivalent of 6*C*5(H) and a decimal equivalent of 1733.

*Addition and subtraction.*—Since all carries in the hexadecimal system occur at values where binary carries also occur, HGB addition and subtraction are performed entirely according to the rules of binary addition and subtraction. For example, the following addition problem compares the HGB system with the hexadecimal, binary, decimal and DGB systems:

*Table XIII*

| Decimal | Hexadecimal | Binary | HGB | DGB |
|---|---|---|---|---|
| 39<br>+19 | 27 (H)<br>13 (H) | 100111(B)<br>10011(B) | 0010/0111(HGB)<br>0001/0011(HGB) | 0011/1001(DGB)<br>0001/1001(DGB) |
| 58 | 3*A*(H) | 111010(B) | 0011/1010(HGB) | 0101/0010<br>0110 Correction |
| | | | | 0101/1000(DGB) |

Comparing the HGB problem to the binary problem, it is seen that the same significant digits appear in corresponding steps of the two problems. Comparing the HGB problem to the DGB problem, it is seen that no correction is required in the former, since all of the necessary carries can be considered as binary carries.

*Multiplication and division.*—In the HGB system, multiplication and division are performed as previously described in relation to the DGB system, except that in the former it is unnecessary to correctively add or subtract the value 0110, because of the compatibility with the normal binary system. In multiplication, each successive hexademical multiplier group is reduced by 1's until it overflows to 1111, and for each reduction of a multiplier group by unity, the multiplicand is added once to the accumulated partial product. Next, the overflow multiplier group is increased to 0000 while the multiplicand is subtracted once from the partial product. Then the partial product and multiplier are shifted one hexadecimal place to the right and the process is repeated. In division, the divisor is repetitively subtracted from the dividend or remainder until the latter overflows, and a 1 is added to the quotient for each such subtraction. Then the divisor is added once to the remainder to correct the overflow and a 1 is subtracted from the quotient. Next, the remainder and quotient are shifted one hexadecimal place to the left, and the process is repeated.

*Octal system.—In general.*—In the octal system of notation, there are eight permissible marks, and these will arbitrarily be identified with the first eight decimal digits, as follows:

*Table XIV*

| Decimal | Octal |
|---|---|
| 0 | 0 |
| 1 | 1 |
| 2 | 2 |
| 3 | 3 |
| 4 | 4 |
| 5 | 5 |
| 6 | 6 |
| 7 | 7 |

An ordinal octal digit "*m*" has an equivalent decimal value of $m \times 8^{n-1}$, where "*n*" is the order number. Numbers expressed in the octal system will be followed by the symbol "(Oc)," for example the number 274(Oc), having a decimal equivalent of $$2 \times 8^2 + 7 \times 8^1 + 4 \times 8^0 = 188.$$

The octal system, like the hexadecimal system, is compatible with the binary system in that its radix, 8, is an integral power of the binary radix 2, i.e., $2^3 = 8$. Therefore, octal values can be readily intertranslated with their equivalent binary values and either octal or binary can readily be translated into an octal-grouped binary representation, hereinafter designated "OGB."

*Octal-grouped binary.*—Since the octal system has eight permissible marks any octal digit can be expressed as a combination of three binary digits, as follows:

*Table XV*

| Octal | Octal-Grouped Binary |
|---|---|
| 0 | 000 |
| 1 | 001 |
| 2 | 010 |
| 3 | 011 |
| 4 | 100 |
| 5 | 101 |
| 6 | 110 |
| 7 | 111 |

In the following description, each OGB number will be followed by the symbol "(OGB)," for example, the number 010/111/100(OGB), having an octal equivalent of 274(Oc) and a decimal equivalent of 188.

Since the octal and binary systems are compatible, OGB addition and subtraction are performed in the present computer as pure binary operations. No multiplication or division is performed in OGB notation in the present computer.

*Special-octal-grouped binary.—In general.*—It is recalled that any octal digit can be expressed as three binary digits, whereas representation of a decimal or hexadecimal number with binary digits requires four such digits. It will be shown in the later descriptions of circuit units of the computer that equipment which is designed to transfer the four-digit DGB and HGB groups is readily adapted to transferring OGB groups if each normal OGB group of three digits is extended to four digits. This is accomplished by prefixing a 0 to each OGB group, as follows:

*Table XVI*

| Octal | OGB | Special OGB |
|---|---|---|
| 0 | 000 | 0000 |
| 1 | 001 | 0001 |
| 2 | 010 | 0010 |
| 3 | 011 | 0011 |
| 4 | 100 | 0100 |
| 5 | 101 | 0101 |
| 6 | 110 | 0110 |
| 7 | 111 | 0111 |

Numbers expressed in special OGB notation will be followed by the symbol "(SOGB)," for example, the number 0010/0111/0100(SOGB), having an octal equivalent of 274(Oc) and a decimal equivalent of 188.

*Addition and subtraction.*—Addition and subtraction in special OGB notation are performed as though the operands were expressed in normal binary form, except that no carry is propagated from the second most significant binary place to the most significant binary place in a special OGB group; instead, such carries are propagated to the least significant binary place of the next higher group. For example, in addition:

*Table XVII*

| Decimal | Octal | OGB | Special OGB |
|---|---|---|---|
| 15 | 17(Oc) | 001/111(OGB) | 0001/0111(SOGB) |
| +01 | +01(Oc) | +000/001(OGB) | +0000/0001(SOGB) |
| 16 | 20(Oc) | 010/000(OGB) | 0010/0000(SOGB) |

*Multiplication and division.*—Multiplication and division are performed exactly as in HGB notation, previously described, except that the most significant binary place in a special OGB group, again, never receives a carry. Since the octal and binary systems are compatible, the correction value 0110 need not be added to sums or subtracted from differences, as is the case in the previously described DGB notation.

BINARY DIGIT REPRESENTATIONS

Regardless of which of the foregoing number systems is employed for expressing a value, that value is represented internally in the present computer in terms of binary digits, i.e., it is represented either in normal binary notation or in DGB, HGB, OGB or special OGB notation. The binary digits per se are represented in the present computer in any of five forms.

A first form is employed on a Memory Drum, on which a selected area of a continuous magnetic medium is saturated in one direction of magnetization to represent a digit 0, and in the opposite direction to represent a digit 1. A multidigit number is represented by a series of such areas. All of the magnetized areas that are employed to represent a given multidigit number are successively contingnous; therefore, a change in the direction of magnetization occurs only where there is a change in value as between two successive digits.

A second form of value representation is employed in the Read-Write Amplifiers and in the Sector Read Amplifier, wherein a positive value represents a change in value from 0 to 1, as between two successive digits, and a negative pulse represents a change in digital value from 1 to 0. Obviously, the polarities of these two pulses may be reversed, as long as they remain opposite each other.

A third form of value representation is employed in the Transfer Busses wherein a pulse on a first bus represents a 0, and a pulse on a second bus represents a 1. These pulses may be either positive or negative, depending on the polarity of pulses required for operating a particular computer circuit.

The Arithmetic Bus, as well as some of the circuit units which receive information from the Transfer Busses is adapted to receive and transmit a fourth form of value representation, wherein the presence of a pulse represents a 1 and the absence of a pulse (at a time and place where a digit is being operated upon) represents a 0. Circuit units of this nature therefore receive pulses from only the 1's Transfer Bus, and may transmit information in this form to other circuits. It is obvious that a reverse arrangement is possible wherein the presence of a pulse represents a 0 and the absence of a pulse represents a 1.

The fifth form of binary digit representation is employed throughout the computer, wherein the reset state of a flip-flop, or the closed condition of a gate represents a 0, and the set state of a flip-flop, or the armed state of a gate represents a 1. Obviously, these two conventions may be reversed without changing the form of the representation.

For convenience of description, the pulses which represent individual binary digits, the groups of pulses which represent DGB, HGB, OGB or special OGB groups, and the larger groups of pulses which represent multidigit numbers, will often be referred to hereinafter as the respective digits, groups or multidigit numbers themselves.

SERIES OPERATION

The digital computer which embodies the present invention is primarily a "serial" computer, i.e., successive digits of a multidigit binary number are expressed seriatim while they are being transferred between circuit units of the computer. There are a few transferring operations, hereinafter described, wherein all digits of a multidigit number are transferred between the two circuit units simultaneously, or "in parallel."

TIMING

The computer of the present invention is timed by a special Memory section which is designated the "Clock Track," and which generates periodic timing signals. These signals ultimately control a Clock Pulse Distributor which, along with the Clock Track of Memory, will be described in detail hereinafter. The output of the Clock Pulse Distributor comprises six sequential control pulses, designated "CP–1," "CP–2," "CP–3," "CP–4," "CP–5" and "CP–6," respectively, followed by a train of forty pulses, designated "operating pulses" or OP's. The pulse pattern of six CP's followed by forty OP's is repeated cyclically throughout the computer operation. Each of the six CP's is transmitted on a separate output lead from the Clock Pulse Distributor to the various computer circuits which require a control pulse at that time for any of a number of control operations, described hereinafter. Each train of OP's is transmitted on a seventh output lead from the Clock Pulse Distributor to various computer circuits for causing shifting operations or the like.

The successive pulses in a train of OP's may be gated to represent the respective digits of a multidigit number, in which case the resulting number contains forty digits and is designated a "word." Alternatively, the last four of a series of CP's may be combined with the following train of forty OP's and may then be gated to represent the respective digits of a multidigit word, in which case the resulting word contains forty-four digits.

A word may constitute an operand, and the sign of that operand is represented by a forty-first or forty-fifth digit, which is coincident with the CP–6 preceding the word. A minus sign is represented by a digit 1 on CP–6, and a plus sign is represented by a digit 0 on CP–6. Alternatively, a word may represent a "command" which may or may not be preceded by a sign digit. In the first embodiment of the present invention, a command includes an "address" in Memory (comprising the twelve least significant binary digits, expressed as four OGB groups), a "code" (comprising the next eight binary digits, expressed as two HGB groups), and twenty 0's. The twenty 0's may be employed for representing a second command during the same word interval. In the second embodiment of the invention, a command includes an address in Memory (comprising the sixteen least significant binary digits, expressed as four special OGB groups), a code (comprising the next twelve binary digits, expressed as three special OGB groups), and twelve 0's. The significance of the various digits in a command will be described hereinafter.

The time interval between two successive digits of a word is designated a "digit interval," and has a duration of approximately three microseconds. Because of various delays employed in the computer circuits, a pulse representing a digit may occur at any time during its related digit interval. The expression "word interval" will be used to designate a time period embracing the forty-six digit intervals which include each set of six CP's and the related train of forty OP's.

CIRCUIT ELEMENTS

*In general.*—The following descriptions of circuit elements are intended to illustrate the types of basic elements which are employed as "building blocks" in the present computer. The specific elements shown and described are by no means the only ones of their types that can be incorporated successfully into the computer circuits, but each element described has been found to operate reliably in the circuits where it is used.

Figure 1:
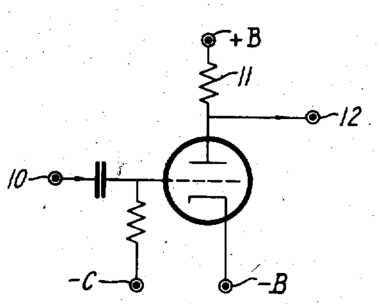
Fig. 1 is a schematic diagram of a typical triode amplifier.
Figure 2:
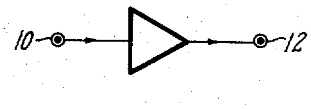
Fig. 2 is a block diagram employed to represent the triode amplifier shown in Fig. 1.

*Triode amplifier.*—One of the circuit elements employed in the present invention is a triode amplifier, an example of which is shown in Fig. 1. Input pulses are applied to the grid of the amplifier through a terminal 10. The grid is connected through a terminal —C to a source of bias potential. The potential of terminal —C can be chosen low enough to normally bias the tube below cutoff for class B or class C operation, in which case only positive input pulses are amplified. Alternatively, the potential of terminal —C can be chosen high enough to normally bias the tube to conduction for class A operation, in which case both positive and negative input pulses are amplified. Output signals from the amplifier are derived across a resistive anode impedance 11 through an output terminal 12. It is well known that the output signal from such an amplifier is reversed in polarity from the input signal. Fig. 2 illustrates the block representation of the triode amplifier as shown in the drawings of the computer circuits.

Figure 3:
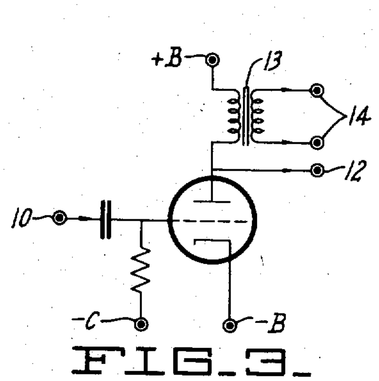
Fig. 3 is a schematic diagram of a typical phase inverter.
Figure 4:
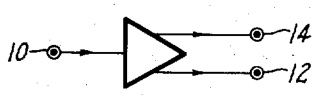
Fig. 4 is a block diagram employed to represent the phase inverter shown in Fig. 3.

*Phase inverter.*—A modification of the triode amplifier is a phase inverter, an example of which is shown in Fig. 3. The phase inverter is identical to the triode amplifier except that its output signals are applied to a pair of terminals 14 which are connected to opposite ends of the secondary winding of a transformer 13. The primary winding of transformer 13 constitutes the anode impedance of the triode. By connecting a selective one of the terminals 14 to a reference potential, the remaining terminal 14 may be employed for delivering an output signal, either of the same polarity as the input signal or of opposite polarity, depending upon which terminal 14 is connected to the reference potential. If a terminal 14 is used for delivering a signal of the same polarity as the input signal, a terminal 12 connected directly to the anode may be used for delivering an output signal of opposite polarity. Alternatively, the secondary winding of transformer 13 may be center-tapped to a reference potential, and both terminals 14 may then be employed, thereby providing two output signals of opposite polarity. Fig. 4 illustrates a block diagram of the phase inverter as shown in the drawings of the computer circuits.

Figure 5:
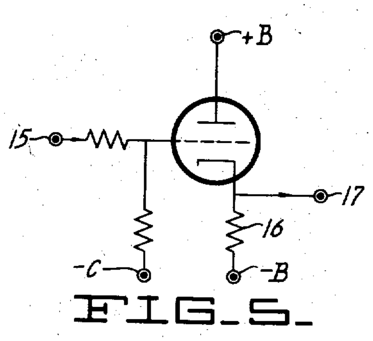
Fig. 5 is a schematic diagram of a typical cathode follower.
Figure 6:
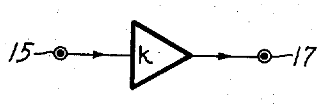
Fig. 6 is a block diagram employed to represent the cathode follower shown in Fig. 5.

*Cathode follower.*—A further circuit element employed in the present invention is a cathode follower, an example of which is shown in Fig. 5. The cathode follower is a triode current amplifier which receives input signals applied to its grid through an input terminal 15, and which delivers output signals, in phase with the input signals, across a cathode impedance 16. The cathode follower, like the triode amplifier, can be biased either for class A operation or for class B or C operation, depending on the value of a bias potential which may be applied to the grid through a terminal —C. Fig. 6 illustrates the block diagram of the cathode follower as shown in the drawings of the computer circuits.

Figure 7:
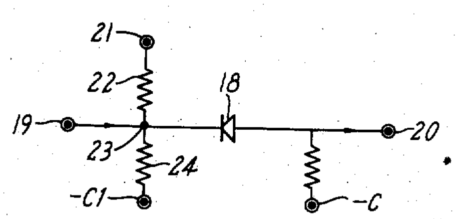
Fig. 7 is a schematic diagram of a typical diode gate.

*Diode gate.*—A first type of gating circuit employed in the present invention is a diode gate, an example of which is shown in Fig. 7. The gate includes a diode 18 which is oriented to transmit only negative pulses from an input terminal 19 to an output terminal 20. In order for a diode to transmit a negative pulse, however, the potential of its cathode must fall below the potential of its anode for the duration of the pulse. Therefore, negative input pulses may be prevented from passing through a diode by maintaining the potential of its cathode higher than that of its anode by an amount at least equal to the amplitude of the input pulses. The diode gate shown in Fig. 7 is adapted for selectively blocking or passing negative pulses by maintaining the anode of diode 18 at a fixed bias potential —C, and by applying a selectively high or low bias potential to its cathode. The bias potential is applied to the cathode through a potential divider comprising an arming terminal 21 in series with a first resistor 22, a junction 23 connected to the cathode, a second resistor 24 and a source of bias potential —C1. A selectively high or low potential may be applied to the arming terminal 21 by any of several means, such as by connecting it to one anode of a flip-flop circuit, hereinafter described. When terminal 21 is at its high potential, junction 23 is at a potential which is sufficiently high for blocking the negative input pulses applied to terminal 19, and the diode gate is said to be "closed." When terminal 21 is at its low potential, junction 23 is at a potential which is sufficiently low for transmitting the negative input pulses, and the gate is said to be "armed."

Figure 8:
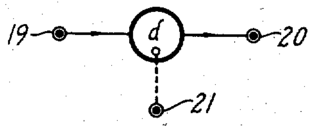
Fig. 8 is a block diagram employed to represent the diode gate as shown in Fig. 7.

Fig. 8 shows the block form of the diode gate as used in the computer circuit diagrams. In Fig. 8, as well as in the remaining block diagrams, a control lead is shown as a broken line and a pulse lead is shown as a solid line. Therefore, in Fig. 8, the arming lead connected to terminal 21 is shown as a broken line, and the input and output leads are shown as solid lines. It is noted that the diode gate, as well as the cathode follower gate hereinafter described, can be employed for gating D.C. potential levels as well as pulses. In such case, the input and output leads are shown as broken lines in the block represensations of the gates. However, for the purposes of the present invention, a square gating pulse of relatively long duration will be treated as an adjustable D.C. gating potential.

Figure 9:
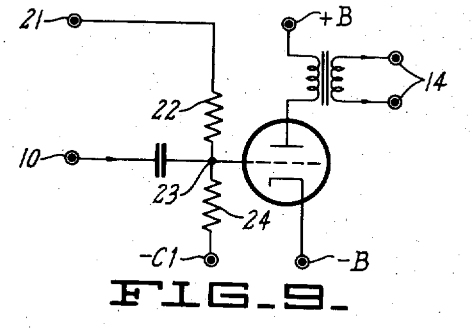
Fig. 9 is a schematic diagram of a typical triode gate.
Figure 10:
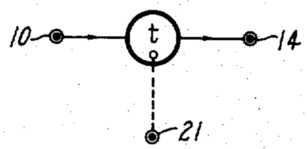
Fig. 10 is a block diagram employed to represent the triode gate shown in Fig. 9.

*Triode gate.*—A second type of gate employed in the invention is a triode gate, an example of which is shown in Fig. 9. This gate comprises a simple triode amplifier of the type previously described in connection with Fig. 1, having its control grid biased through the potential divider including arming terminal 21, resistor 22, junction 23, resistor 24 and terminal —C1. The triode gate is adapted to selectively pass or block positive signals applied to its input terminal 10. The bias potential —C1, and the arming potentials applied to terminal 21, are chosen such that when terminal 21 is at its low potential, the grid potential of the amplifier is below cutoff level by an amount exceeding the amplitude of the positive signals applied to terminal 10, and the gate is closed. When terminal 21 is at its high potential, the grid potential of the amplifier is slightly below cutoff, thereby arming the gate for amplifying positive signals applied to terminal 10. Fig. 10 shows the block representation of the triode gate, as employed in the computer circuit diagrams.

Figure 11:
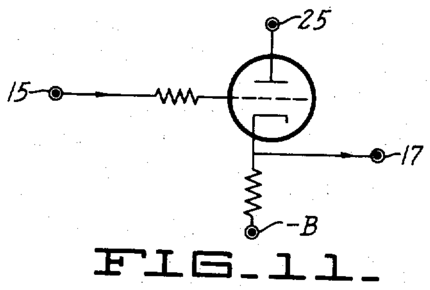
Fig. 11 is a schematic diagram of a typical cathode follower gate.
Figure 12:
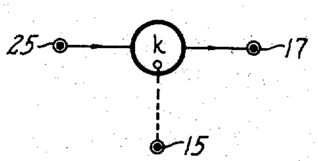
Fig. 12 is a block diagram employed to represent the cathode follower gate shown in Fig. 11.

*Cathode follower gate.*—A third type of gate employed in the present invention is a cathode follower gate, an example of which is shown in Fig. 11. This gate includes a cathode follower of the type described in relation to Fig. 5. The cathode follower gate is armed or closed by relatively high or low potentials, respectively, applied to its grid through terminal 15, and receives input signals applied to its anode through a terminal 25. The cathode follower conducts and produces an output signal at terminal 17 only when both input terminals 15 and 25 are at relatively high potentials. Fig. 12 illustrates the block form of the cathode follower gate, as employed in the computer circuit diagrams.

Figure 13:
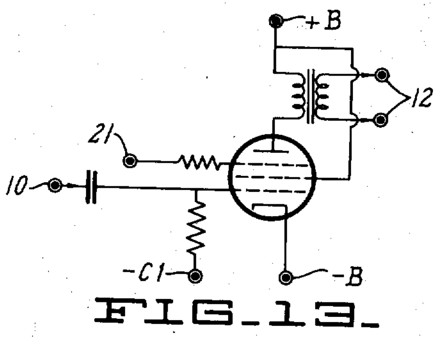
Fig. 13 is a schematic diagram of a typical pentode gate.
Figure 14:
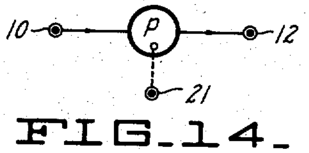
Fig. 14 is a block diagram employed to represent the pentode gate shown in Fig. 13.

*Pentode gate.*—A fourth type of gate employed in the present invention is a pentode gate, an example of which is shown in Fig. 13. In this gate, the arming terminal 21 is connected to the suppressor grid of a pentode, and positive input pulses are applied through the input terminal 10 to the control grid. The gate is normally closed by maintaining terminal 21 at its low potential, and a positive pulse applied to terminal 10 fails to cause the pentode to conduct. On the other hand, if terminal 21 is at its high potential, the gate is armed and the positive pulse applied to terminal 10 is amplified in the pentode to produce an output signal as previously described in relation to Figs. 1 and 3. Fig. 14 illustrates the block form of the pentode gate, as employed in the computer circuit diagrams.

*Multiple-control gate.*—Any of the previously described gates can be modified to form a multiple-control gate, which is identical to its related diode, triode, or pentode gate except for the arming circuit which provides for two or more arming inputs. All of the arming inputs of the multiple-control gate must be a high potential in order to arm the gate.

Figure 15:
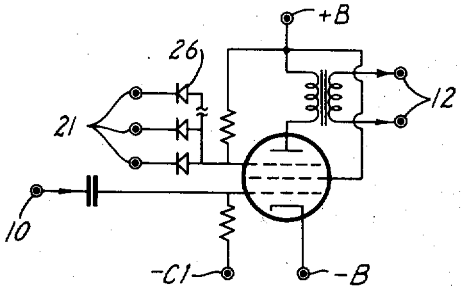
Fig. 15 is a schematic diagram of a typical multiple-control gate.
Figure 16:
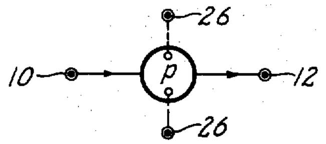
Fig. 16 is a first form of block diagram employed to represent the multiple-control gate shown in Fig. 15.
Figure 17:
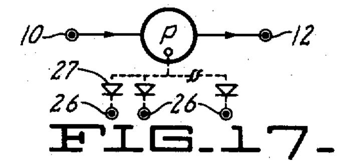
Fig. 17 is a second form of block diagram employed to represent the multiple-control gate shown in Fig. 15.

Fig. 15 shows a pentode gate modified to form a multiple-control gate. The arming circuit has two or more input terminals 21, each of which is connected through a respective diode 26 to the suppressor grid of the pentode. The suppressor grid is connected to +B through a resistor 27; therefore, if any terminal 21 is at a low potential, it receives current through its related diode 26 and the resistor 27, thereby causing a potential drop across resistor 27. This maintains the suppressor grid at a low potential and the gate is closed. If all of the arming terminals 21 are maintained at a high potential, there is substantially no current flow through resistor 27, and the suppressor grid is at a high potential, thereby arming the gate. Figs. 16 and 17 illustrate the two forms of block diagrams which are employed in the drawings of the computer circuits to represent a multiple-control gate.

In the accompanying drawings, diodes which are employed as elements of a multiple-control gate, are shown oriented like diodes 26 (Fig. 15). This orientation is shown wherever both a first "AND" a second potential source or pulse are employed for performing a specified function. In all other cases, since the polarities of pulses and control potentials are somewhat arbitrarily chosen, a diode is shown oriented in the described direction of pulse flow, or in the direction from a controlling circuit to a controlled circuit. Such orientation of diode symbols is intended to aid in tracing described circuits, and is not intended to represent an actual orientation, which latter will be obvious from a description of the circuit with reference to the description of the various circuit elements employed.

Figure 18:
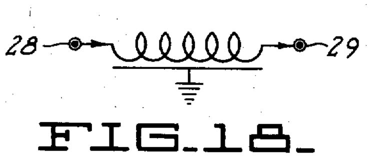
Fig. 18 is a schematic diagram of a typical delay circuit.
Figure 19:
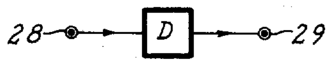
Fig. 19 is a block diagram employed to represent the delay circuit shown in Fig. 18.

*Delay circuit.*—A further circuit element employed in the invention is a delay circuit, an example of which is shown schematically in Fig. 18 as a distributed parameter delay line of the type disclosed in Fig. 5 of U.S. Patent No. 2,467,857, issued April 19, 1949, to J. H. Rubel et al., to which reference is made for a full description. It is to be understood that other delay circuits, such as lumped parameter delay lines may be employed. Pulses applied to an input terminal 28 of the delay line are delayed a few microseconds or a faction of a microsecond, and appear at an output terminal 29. Fig. 19 illustrates the block representation of the delay circuit as shown in the drawings of the computer circuits.

*Bistable circuit.*—A further element employed in the present invention is a bistable circuit such as the well-known Eccles-Jordan trigger circuit, or "flip-flop," described in "Theory and Application of Electron Tubes" by H. J. Reich. In one of its simplest forms, a flip-flop comprises two triode, vacuum tubes, with the grid of each tube cross-coupled to the anode of the other tube through a respective network comprising a resistor in parallel with a capacitor. One of the two tubes is always conducting while its companion tube is non-conducting, thereby providing a circuit having two stable operating states.

Figure 20:
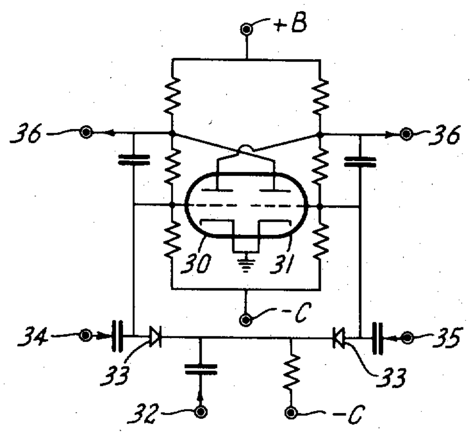
Fig. 20 is a schematic diagram of a typical flip-flop circuit.

A modification of the Eccles-Jordan circuit is shown in Fig. 20, and comprises two triodes 30 and 31, shown for convenience as the two sides of a twin triode. When the lefthand section 30, hereinafter referred to as the "0 side," is conducting, the flip-flop is said to be "reset"; when the righthand section 31, hereinafter referred to as the "1 side," is conducting, the flip-flop is said to be "set." Negative pulses may be applied through a "symmetrical" input terminal 32 and a respective diode 33 to the grid of each section 30 and 31. Each symmetrically applied input pulse reverses the state of operation of the flip-flop in a manner well known in the art. If the orientation of each diode 33 is reversed, the flip-flop can be made to respond to positive, rather than negative pulses. Alternatively, an input pulse may be applied through a "set" input terminal 34 or a "reset" input terminal 35. A negative pulse applied to terminal 34 sets the flip-flop to 1 if it does not already stand at 1, while a negative pulse through terminal 35 resets the flip-flop to 0 if it does not already stand at 0. On the other hand, a positive pulse applied to terminal 34 or 35 causes the flip-flop to be reset or set, respectively. A diode (not shown) may be inserted in series with each terminal 34 or 35. If each such diode is oriented to transmit only negative pulses to the grid of its related flip-flop section, then terminals 34 or 35 are designated the "reset" and "set" terminals, respectively, in accordance with the previously described effects of negative pulses applied to these terminals.

The flip-flop is adapted to control or operate other devices by means of the changing potential levels of the anodes of its two sections. When the flip-flop stands at 0, the potential of the anode of section 30 is relatively low while the potential of the other anode is relatively high, the converse being true when the flip-flop stands at 1. The changeable anode potentials of a flip-flop may be employed for controlling any of the previously described gates by connecting the appropriate anode of the flip-flop to the arming terminal of the gate through a flip-flop output terminal 36. It is also noted that when a flip-flop is reversed from one of its states to the other, a potential rise appears at one of its output terminals 36 and a potential drop appears at the other. These potential changes may be employed for operating other flip-flops or the like. In the block diagrams and descriptions of the computer circuits, the following convention is adhered to regarding the flip-flop output terminals 36: a gate which is armed by the 0 side, or through the 0 side output terminal of a flip-flop, has its arming terminal connected to that terminal 36 whose potential is appropriate for arming the gate when the flip-flop stands at 0. A similar convention is used in relation to a gate which is armed by the 1 side, or through the 1 side output terminal of the flip-flop. If a signal from the 0 side output terminal is employed for operating a next flip-flop, the output signal is understood to be taken from that terminal 36 which delivers a voltage change in the appropriate direction for operating the next flip-flop when the first flip-flop is reversed from 0 to 1. A similar convention is used in relation to a flip-flop which is operated in response to a change of state, from 1 to 0, of a previous flip-flop.

Figure 21:
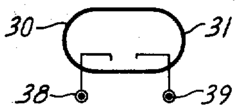
Fig. 21 is a partial schematic diagram of the flip-flop circuit of Fig. 20, showing an alternate arrangement of the cathodes of the flip-flop tubes.

A linear counter, hereinafter described, comprises a plurality of flip-flops. In a linear counter, the two cathodes of a flip-flop are not connected directly to ground, as shown in Fig. 20, but are connected to a pair of terminals 38 and 39, respectively, as shown in Fig. 21 and for reasons hereinafter described.

Figure 22:
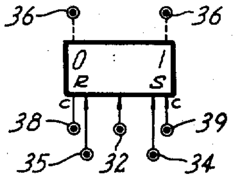
Fig. 22 is a block diagram employed to represent the flip-flop circuit shown in Figs. 20 and 21.

Fig. 22 illustrates the block form of the flip-flop, as employed in the computer circuit diagram. The flip-flop is shown as a rectangle, with the output terminal 36 at the top of the rectangle, the symmetrical input terminal 32 at the bottom center of the rectangle, the set and reset input terminals 34 and 35 at the bottom right and bottom left of the rectangle, respectively. In the case of a linear counter, the cathode terminals 38 and 39 are shown at the bottom left and bottom right of the rectangle, respectively, and cathode lead is identified by the letter *"c."*

Figure 23:
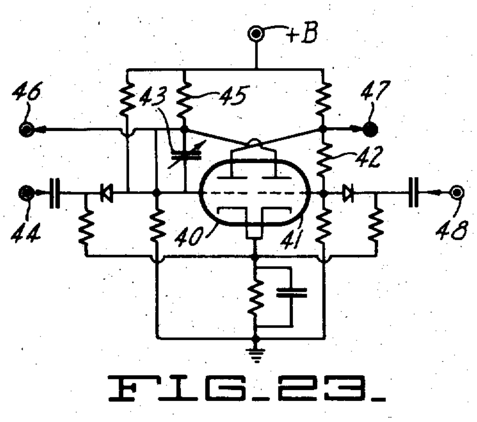
Fig. 23 is a schematic diagram of a typical univibrator.

*Univibrator.*—A further element employed in the invention is a one-shot multivibrator, or "univibrator," an example of which is shown in Fig. 23. This circuit is employed for producing square pulses of either polarity, but of constant width, in response to receiving input pulses of varying duration. The univibrator is fully described in the aforementioned publication by Reich.

Briefly, the univibrator comprises a pair of triode vacuum tubes 40 and 41, shown for convenience as the two sections of a twin triode. The anode of section 40 is cross-coupled to the grid of section 41 by a resistor 42, while the anode of section 41 is cross-coupled to the grid of section 40 by a variable capacitor 43. The circuit parameters are chosen such that section 40 is normally conducting and section 41 is normally nonconducting. By virtue of the cross-coupling circuits, only one section may be conducting at a time, the arrangement being similar in this respect to that of the flip-flop previously described in relation to Fig. 20.

Figure 24:
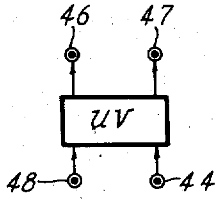
Fig. 24 is a block diagram employed to represent the univibrator shown in Fig. 23.

A negative triggering pulse is applied to the grid of section 40 through an input terminal 44, and cuts off section 40, thereby causing section 41 to conduct. The conduction of section 41 reduces the charge capacitor 43, but this capacitor is recharged through a resistor 45. When capacitor 43 has recharged to a value which is determined by the circuit parameters, section 40 is caused to reconduct and section 41 is cut off. The reversing of sections 40 and 41 from conduction to nonconduction and vice versa occurs rapidly, and the anode potentials of the two sections rise and fall sharply. Consequently, the output from the anode of section 41 is a substantially square negative pulse which may be applied to any desired circuit through an output terminal 46, and the output from the anode of section 40 is a substantially square positive pulse which may be applied to other circuits through an output terminal 47. The width of the output pulses may be controlled by varying the value of capacitor 43 to thereby vary the amount of time required to charge that capacitor to the extent necessary for causing section 40 to reconduct. The univibrator may be forced to assume its stable state before the end of its characteristic time period. A negative pulse applied to the grid of section 41 through a reset terminal 48 cuts off section 41 and causes 40 to conduct. Fig. 24 illustrates the block diagram which is employed to represent a univibrator in the drawings of the computer circuits.

Figure 25:
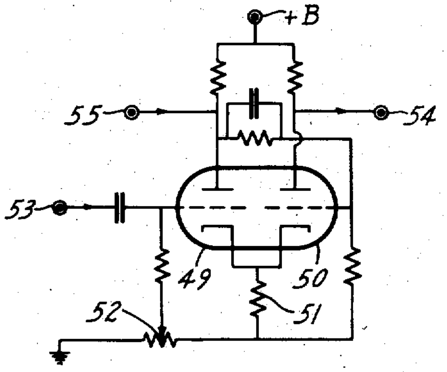
Fig. 25 is a schematic diagram of a typical Schmidt trigger.

*Schmidt trigger.*—Another circuit element employed in the invention is a "Schmidt trigger," an example of which is shown in Fig. 25. This circuit, like the univibrator previously described, is employed as a pulse generator; but unlike the univibrator, the Schmidt trigger produces an output pulse having a duration which depends upon the duration of the input signal.

Figure 26:
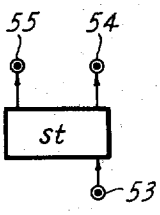
Fig. 26 is a block diagram employed to represent the Schmidt trigger shown in Fig. 25.

Referring to Fig. 25, the Schmidt trigger comprises two triode vacuum tubes 49 and 50, which are shown for convenience as the two sections of a twin triode. The anode of section 49 is cross-coupled to the grid of section 40, and both cathodes are returned to a source of reference potential through a single pair of resistors 51 and 52 arranged in series. Section 50 is normally biased to conduction, while section 49 is normally biased to nonconduction. Positive input signals are applied to the grid of section 49 through an input terminal 53. Whenever the amplitude of the input signal is sufficiently high to bias section 49 to conduction, the anode voltage of section 49 drops, thereby coupling a negative pulse to the grid of section 50 by cutting off the latter section. When the amplitude of the input signal again drops below the cutoff potential for section 49, that section is cut off, and its rising anode potential causes section 50 to again conduct. The changes from conduction to nonconduction, and vice versa, of section 50 are rapid, and the anode potential of that section therefore rises and falls sharply, producing a substantially square positive pulse at an output terminal 54, or a similar negative pulse at an output terminal 55. The block representation of the Schmidt trigger is shown in Fig. 26.

Figure 27:
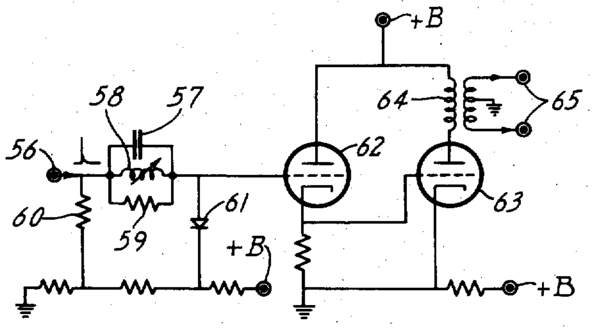
Fig. 27 is a schematic diagram of a typical pulse shaper.

*Pulse shaper.*—A further element employed in the present invention is a pulse shaper, an example of which is shown in Fig. 27. The pulse shaper, like the univibrator previously described in relation to Fig. 23, is used for producing square pulses of either polarity, but of constant width, in response to receiving input pulses of varying duration. The pulse shaper is less sensitive than the univibrator to power supply variations, but is best adapted to generating square pulses of relatively small width.

The pulse shaper comprises a resonant circuit which is caused to oscillate by a sharp input pulse. The resonant circuit produces an output signal at its characteristic frequency, and this signal is damped to limit it substantially to one-half cycle. The half-cycle signal is "clipped" to form a substantially square pulse which is transmitted through an impedance-matching cathode follower to an amplifier. The amplifier output is then transmitted to any desired circuit.

Figure 28:
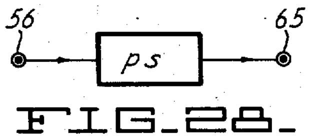
Fig. 28 is a block diagram employed to represent the pulse shaper shown in Fig. 27.

Referring to Fig. 27, the pulse shaper includes a parallel resonant circuit comprising a capacitor 57 in parallel with an inductor 58, and in parallel with a damping resistor 59. A sharp positive pulse may be applied to an input of the resonant circuit through a terminal 56 which is connected through a resistor 60 to a source of reference potential shown, for example, as a tap point on a potential divider. Each input pulse applied to terminal 56 causes the resonant circuit to produce an output signal at its characteristic frequency, beginning with a positive half cycle. The output signal of the resonant circuit is damped by resistor 59, and the positive half cycle is limited in amplitude, or "clipped," by a diode 61 connected between the resonant circuit output and an appropriate source of reference potential. By varying the value of the reference potential, the limiting amplitude of the resonant circuit output signal can be adjusted as required. The "clipped" positive half-cycle constitutes a substantially square pulse which is applied to the grid of a cathode follower 62. The cathode output of cathode follower 62 is applied to the control grid of an amplifier 63 which is biased well below cutoff through its cathode, and therefore responds to only the upper part of the signal input from the cathode follower, and does not respond to the damped secondary cycles of that signal. Amplifier 63 has an anode impedance comprising the primary winding of a transformer 64, the secondary winding of which is connected between a pair of terminals 65. The secondary winding of transformer 64 is center-tapped to a reference potential; therefore, the output signal may be taken from either terminal 65, depending on the desired polarity of the output pulse. Fig. 28 illustrates the block diagram which is employed to represent a pulse shaper in the drawings of the computer circuits.

Figure 29:
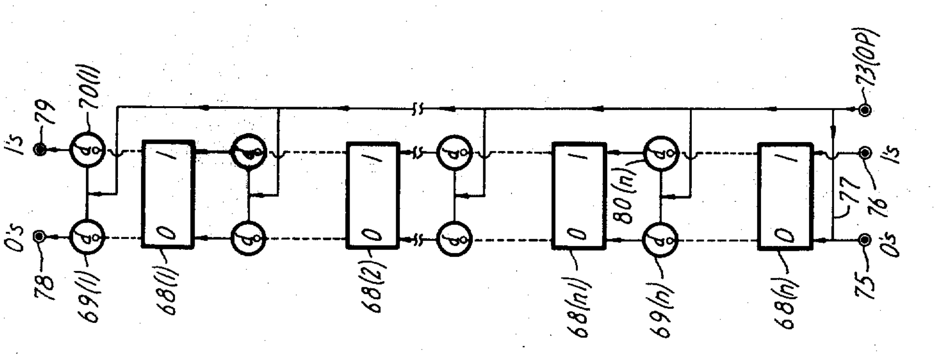
Fig. 29 is a block diagram of a typical shift register.

*Shift register.*—A further element employed in the computer is a shift register, an example of which is shown in Fig. 29. This register comprises a plurality of value-storing flip-flop stages 68(1) to 68($n$), the number of stages being determined by the number of digits in the longest binary word that is to be stored in the register. The stages are arranged in the drawing with the least significant stage at the top and the most significant stage at the bottom. The register is adapted to receive a binary word digi-by-digit into the most significant stage, to serially shift the word through the successively less significant stages, and to transmit the word digit-by-digit from the least significant stage to any desired unit of the computer.

Referring to Fig. 29, each flip-flop 68 controls a pair of shift gates 69 and 70. Each gate 69 is armed when its related stage stands at 0, while each gate 70 is armed when its related stage stands at 1. For shifting, consecutive OP's are applied through a terminal 73 to a shift buss 74 which transmits the OP's to the input of each shift gate 69 and 70. Each armed gate 69 or 70 transmits each OP to the next stage and sets or resets that stage accordingly. Values may be entered into the shift register from a 0's input terminal 75 and a 1's input terminal 76 which are connected, respectively, to the reset and set input terminals of the most significant stage. Alternatively, values may be entered into the register through the 1's input terminal 76 alone, in which case the shift terminal 73 is connected to the reset input of stage 68($n$) by a lead 77 for resetting that stage to 0 during any digit interval in which no 1's input pulse is received at terminal 76. The word standing in the register may be shifted out of the last stage, i.e., stage 68(1), through a 0's output terminal 78 and a 1's output terminal 79, which constitute the output terminals of the last stage shift gates 69(1) and 70(1), respectively.

In the description of the computer circuits and their operations, the term "right shift," as applied to a word standing in a shift register will be employed to designate a shifting of the entire word toward the less significant end of the register, i.e., a serial shift in the direction for which shifting is provided in the register shown in Fig. 29. If a binary word is right shifted by "$s$" binary places, the effect is equivalent to dividing the word by the value of $2^s$. The term "left shift" will be employed to designate a shift" will be employed to designate a shift toward the more significant end of a register. Since no provision is made, in the register shown in Fig. 29, for left shifting a word, this operation must be accomplished by recirculating the word from the register output back into the register input and employing $n-s$ pulses, where "$n$" is the number of stages in the register, and "$s$" is the number of binary places through which the word is to be left shifted. A left shift of "$s$" binary places is equivalent to a multiplication by $2^s$.

Figure 30:
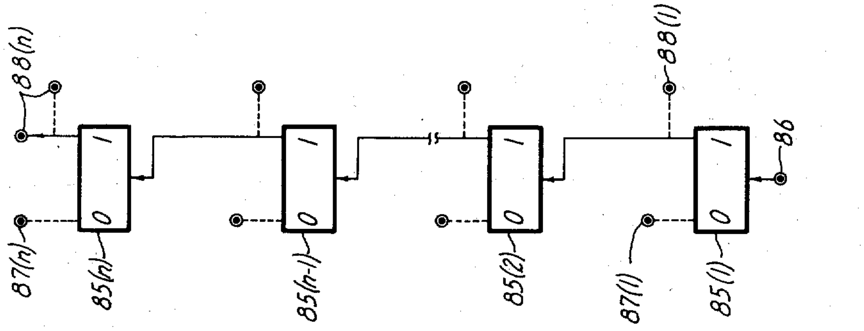
Fig. 30 is a block diagram of a typical cascade binary counter.

*Binary counter.*—A further element employed in the present invention is a multi-stage binary counter, an example of which is shown in Fig. 30. The binary counter comprises a plurality of flip-flop stages 85(1) to 85($n$). Input pulses are applied symmetrically to the least significant stage, i.e., stage 85(1), through a terminal 86, and each input pulse reverses stage 85(1). Each stage has a 0 side output terminal 87 and a 1 side output terminal 88 by means of which the stages are connected in binary cascade, i.e., one of the output terminals 87 or 88 of each flip-flop stage except the last is connected to the symmetrical input of the next stage. In the circuit shown in Fig. 30, the 1 side output terminal 88 of each stage is connected to the symmetrical input of the next stage; therefore, when each stage reverses from its 1 state to its 0 state, a sharp negative potential change is transmitted from that stage to the symmetrical input of the next stage, thereby reversing the state of the latter. Through this arrangement, the input pulses are counted in increasing order, and the circuit operates as an additive binary counter. By connecting the 0 side output terminal 87 of each stage to the symmetrical input terminal of the next stage, the circuit can be made to operate as a subtractive binary counter, i.e., each input pulse applied to stage 85(1) reduces by unity the value standing in the counter. The output terminals 87 and 88 of each stage may also be employed to control gates in the manner hereinbefore described.

Figure 31:
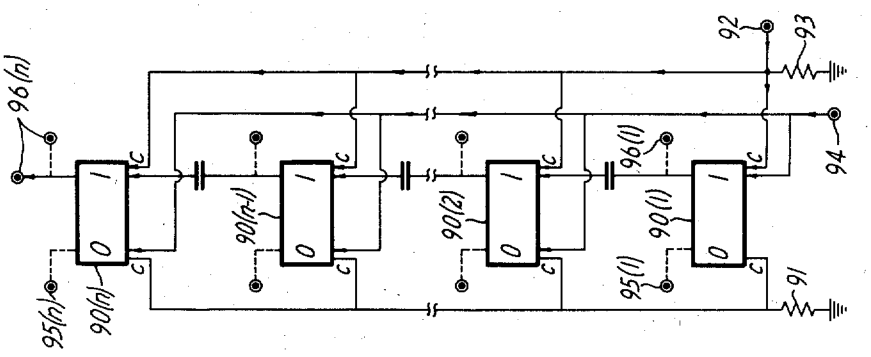
Fig. 31 is a block diagram of a typical linear counter.

*Linear counter.*—A further element employed in the computer in a linear counter, an example of which is shown in Fig. 31. This counter comprises a plurality of flip-flop stages 90(1) to 90(*n*), the number of stages being determined by the largest value which is to be counted. The stages are arranged in the drawing with the most significant stage at the top and the least significant stage at the bottom. Like the binary counter previously described in relation to Fig. 30, the linear counter is adapted to receive input pulses and to register, by the collective state of its flip-flop stages, the total number of pulses received. However, the linear counter does not register the total number of pulses received by a binary counting progression; instead, each stage of the linear counter is identified with a unique count, such that when a given number of pulses have been received, the corresponding counter stage is in its 1 state and all of the remaining stages are in their respective 0 states.

Referring to Fig. 31, the 0 side cathode of each stage 90(1) to 90(*n*) is connected to ground through a common cathode resistor 91 and the 1 side cathode of each stage is connected to an input terminal 92 and is also connected to ground through a common cathode resistor 93. The 1 side output terminal of each stage except the last is coupled to the set input terminal of the next successive stage. A clearing terminal 94 is connected to the set input terminal of stage 90(1) and to the reset input terminal of each remaining stage.

Prior to each counting operation, a clearing pulse is applied to all of the stages in parallel through terminal 94, thereby setting stage 90(1) to 1 and resetting all of the remaining stages to 0. Thereafter, positive counting pulses are applied to terminal 92. The first counting pulse raises the 1 side cathode potential of stage 90(1) sufficiently to cut off the 1 side of that stage and thereby reverse the latter to 0 in the manner previously described in relation to Fig. 20. Since the 1 side of the remaining stages is already cut off, the first input pulse has no effect on those stages. When stage 90(1) reverses from 1 to 0, the potential drop at its 1 side output terminal is coupled to the set input terminal of stage 90(2), thereby setting the latter stage to 1. Similarly, each subsequent input pulse resets the single stage that is in its 1 state, and that stage in turn sets the next succeeding stage to 1. It will be obvious that the 1 side output terminal of stage 90(*n*) can be coupled to the set input of stage 90(1) to form a "ring" counter in which the count circulates through the stages. The 0 side output terminals 95(1) to 95(*n*) and the 1 side output terminals 96(1) to 96(*n*) of the various stages can be employed for arming gates or for performing other control functions as previously described in relation to the flip-flop shown in Fig. 20.

GENERAL DESCRIPTION

*Computer sections.*—The first embodiment of the present computer may be considered, for convenience of description, as comprising six principal sections, as follows:

(1) Memory Section;
(2) Timing Section;
(3) Transfer Section;
(4) Arithmetic Section;
(5) Address Section; and
(6) Control Section.

Fig. 32 shows the manner in which Figs. 33 and 34 are oriented to form a complete block diagram of the first embodiment of the computer.

*Memory Section.*—The Memory Section is provided for selectively storing magnetic representations of data employed in various computer operations, and for producing signals representing selected items of the stored data. The selective control of the storage and removal of data in and from the Memory Section is controlled by the Address and Control Sections, hereinafter described.

Referring to Fig. 33 and 34, the Memory Section includes a continuously rotating Memory Drum 100. The drum 100 has a continuous magnetizable surface which, due to the location of sixty-four transducing heads adjacent the drum and spaced along its axis, may be regarded as having sixty-four circumferential "Information Bands" spaced along the drum axis. Each Information Band cooperates with a respective Read-Write Head 110(0) to 110(63) for receiving signals from and transmitting reading signals to the Transfer Section, hereinafter described. Each Information Band is divided into sixty-four "sectors" which are spaced in the direction of drum rotation, and each sector is divided into forty-six "cells" which also are spaced in the direction of drum rotation. A cell constitutes a unit storage area which can be magnetized with one polarity to represent the digit 0 or with the opposite polarity to represent the digit 1. The forty-six cells in each sector correspond to a series of six CP's followed by a train of forty OP's. Each sector is adapted to receive a sign digit followed by either a forty-digit word or a forty-four digit word; therefore, either five cells or one cell in each sector remains unused.

The Memory Section also includes the previously mentioned Clock Track, which is an auxiliary band on the Memory Drum 100. The Clock Track contains a number of cells equal to the total number of cells in each Information Band, vis., 64×46=2,944 cells, which are evenly spaced along the Clock Track. The Clock cells are permanently magnetized in a predetermined pattern, hereinafter described, and cooperate with a first auxiliary transducing head 110(64) designated the "Clock Head" to energize the latter for producing a repetitive timing signal. The timing signal is transmitted to the Timing Section, hereinafter described.

The Memory Section also includes a Sector Track, which is a further auxiliary band on the Memory Drum 100. The Sector Track is divided into sixty-four sectors corresponding to the sixty-four sectors of each Information Band. Each sector of the Sector Track contains a permanently written number which identifies that sector for purposes of locating addresses in Memory. The Sector Track cooperates with a secondary auxiliary transducing head 110(65) designated the "Sector Head" which sequentially reads the sector numbers stored on the Sector Track and transmits corresponding sector number signals to the Transfer Section, hereinafter described. Each sector of the Sector Track also contains a permanently written synchronizing value which is read by the Sector Head for transmitting a further signal to the Timing Section. The latter isgnal is employed for identifying the time in which a next sector comes into cooperative relation with the Sector Head, as hereinafter described.

*Timing Section.*—The Timing Section includes a Clock Pulse Generator 120 which receives the timing signal output from the Clock Head 110(64) and generates periodic clock pulses for transmission to a Clock Pulse Distributor 140 and a Sector Synchronizer 160, and for transmission to an Interpreter 270 in the Transfer Section, hereinafter described. The Clock Pulse Distributor is controlled by the Sector Synchronizer for separating the clock pulses into pulse cycles, each cycle comprising a set of six control pulses CP–1 to CP–6, and a subsequent train of forty operating pulses, or OP's. The CP's and OP's are employed throughout the computer as control and timing pulses. The Sector Synchronizer received the previously mentioned sector number signals and the sector synchronizing signals from the Sector Head 110(65) in the Memory Section, and in response to each sector synchronizing signal, it generates a synchronizing pulse which is transmitted to the Clock Pulse Distributor for cyclically controlling the latter. The Timing Section also includes a Pattern Generator 180 which operates, in response to signals from various units in the Arithmetic, Address, and Control Sections, to generate several pulse trains, each of which represents a repetitive pattern of 1's and 0's. These patterns are employed by various units in the computer as operands, control signals or timing signals.

*Transfer Section.*—The Transfer Section performs and controls the inter-transfer of words between the various transducing heads in Memory 100 and the Transfer Busses. It includes the previously mentioned sixty-four Read-Write Amplifiers 240(0) to 240(64), a respective one of which cooperates with the Read-Write Head 110 that is associated with each Information Band of Memory. Each word that is read from a selected Information Band of Memory is amplified by its related Read-Write Amplifier, and is transmitted thereby to the previously mentioned Interpreter 270. The Interpreter is provided for identifying each signal from the Read-Write Amplifiers, and for establishing the correct time relationship between that signal and a continuous train of clock pulses from the Clock Pulse Generator 120. The words that are transmitted by the Read-Write Amplifiers to the Interpreter are in the form, previously described, wherein a pulse occurs only when the values of two successive digits are different. The Interpreter converts this form of word representation into another form wherein each digit is represented by a separate pulse. The time-corrected digits in their new form are transmitted by the Interpreter to the 0's and 1's Transfer Busses which apply these digits to the inputs of various units of the Arithmetic and Address Sections, hereinafter described.

The Transfer Section also includes the previously mentioned Sector Read Amplifier 260 which receives the output of the Sector Track of Memory from the Sector Head 110(65) and transmits this output to the Interpreter 270. A Read Control Circuit 300 selectively enables the Sector Read Amplifier 260 for operation at times when no word is being read from an Information Band of Memory and enables the Interpreter during every reading operation. A Write Control Circuit 320 receives words from the Transfer Busses, where each digit is represented by a separate pulse, and converts these words into the form wherein a flip-flop changes state only when the values of two successive digits are different. The converted words are transmitted by the Write Control Circuit to all of the Read-Write Amplifiers, and a selected one of the Read-Write Amplifiers energizes its related Read-Write Head for writing the word in Memory. The selection of a Read-Write Amplifier for reading or writing, and the initiation of a reading or writing operation, are controlled by the Address Section and the Control Section, hereinafter described.

*Arithmetic Section.*—The Arithmetic Section is provided for receiving, storing, combining and transmitting operands during the various addressing and arithmetic operations of the computer. A Sign Clipper 340 of the Arithmetic Section receives the 1's digits of input words from the 1's Transfer Bus. If a minus sign is associated with an input word, it is represented by a digit 1 pulse preceding the word, and if a plus sign is associated with the word, it is represented by a digit 0 pulse preceding the word. Each minus sign pulse is routed by the Sign Clipper to a Sign Control Circuit 460, where it is combined with other sign digits for controlling the additive or subtractive nature of arithmetic operation performed in the Arithmetic Section, and/or for determining the signs of the results of those operations. All 1's pulses of an input word to the Arithmetic Section, subsequent to a minus sign pulse, are routed by the Sign Clipper to a Main Adder 360, and all 0's pulses of an input word to the Arithmetic Section from the 0's Transfer Bus, including a plus sign pulse, are entered directly into the Main Adder. The combined 0's and 1's input from the 0's Transfer Bus and from the Sign Clipper, respectively, constitute an "$x$" operand. A "$y$" operand may be received by the Main Adder from any of several sources, hereinafter described. Result words from the output of the Main Adder are transmitted to an Arithmetic Bus, either directly or through a "C" Register 400 and a Corrector Adder 420. The latter units are employed primarily for applying decimal correction values to the result words in the Main Adder during decimal operations.

A main Adder Sensing Circuit 440, hereinafter designated the MA Sensing Circuit, is provided for sensing the condition of the Main Adder after an arithmetic operation, and for controlling other circuits in the computer in accordance with the results of such sensing. A Main Adder Unit Input Circuit 500, hereinafter designated the MA Unit Input Circuit, is adapted for entering an extra value of 1 into the Main Adder as a "$y$" operand, in preparation for certain computer operations wherein the value of a word must be increased or decreased by unity.

The Arithmetic Section further includes three arithmetic registers, viz: an "A" Register 520, an "R" Register 550 and a "D" Register 600. These three registers are provided for receiving, storing and transmitting operands and results of arithmetic operations. An "R" Adder 580 cooperates with the "R" Register for adding or subtracting unity from the value standing in the "R" Register, under control of the Sign Control Circuit 460, when the contents of the "R" Register are circulated through the "R" Adder and back into the "R" Register during certain arithmetic operations such as multiplication.

A "K" Register 620 is provided primarily for counting predetermined numbers of word intervals during addressing or arithmetic operations, and cooperates with a "K" Subtractor 650 which subtracts unity from the value standing in the "K" Register each time the contents of that register are circulated through the "K" Subtractor and back into the "K" Register. A "K" Subtractor Sensing Circuit 660, hereinafter designated the KS Sensing Circuit, senses the condition of the "K" Subtractor during word-counting operations, and controls other circuits in the computer in response to detection of a predetermined condition of the "K" Subtractor. A "T" Register 680 is provided for receiving words from, and transmitting words to an electric input-output device, such as the well-known "Flexowriter."

It is recalled that if a minus sign is associated with a word, it is represented on the Transfer Busses by a digit 1 during the digit interval immediately preceding the word, and that a plus sign is represented by a digit 0 during the same digit interval. Each plus sign pulse on the 0's Transfer Bus is entered directly into the Main Adder 360, and each minus sign pulse on the 1's Transfer Bus is transmitted by the Sign Clipper 340 into the Sign Control Circuit 460. Subsequent pulses on the 1's Transfer Bus, representing the successive 1's digits of a word, are transmitted by the Sign Clipper 340 directly into the Main Adder.

Tht Main Adder additively or subtractively combines two operands and transmits them either to the "C" Register 400 or to the Arithmetic Bus. The "$x$" input to the Main Adder, comprising 0's pulses from the 0's Transfer Bus and 1's pulses from the Sign Clipper 340, is received ultimately from any of four sources, viz: (1) Memory 100; (2) the "A" Register 520; (3) the "R" Register 550; or (4) an "S" Register 730 (Fig. 34). The "$y$" input to the Main Adder comprising a 1's input from any of five sources, viz: (1) the MA Unit Input Circuit 500; (2) the "A" Register 520; (3) the "R" Register 550; (4) the "D" Register 600; or (5) and Address Control Circuit 750 (Fig. 34). A pair HGB operands or a pair of OGB operands are added or subtracted in the Main Adder (Fig. 33) in accordance with the unaltered rules of binary arithmetic previously set forth, since as hereinbefore explained, such operands are expressed with the same digits as if they were ordinary binary words. A pair of DGB operands, comprising decimal groups of four binary digits each, are also combined by the rules of binary arithmetic, but each group is tested for a decimal carry, and if such a carry occurs, the Main Adder is properly conditioned before the receipt of the next pair of operand groups. The additive or subtractive nature of the arithmetic operation performed by the Main Adder is determined by the state of the Sign Control Circuit 460. The output of the Main Adder, comprising 1's pulses of a sum or difference word, is transmitted to the Arithmetic Bus either directly or through the "C" Register 400 and a Corrector Adder 420.

During DGB operations, when the least significant digits of a decimal sum group have been transmitted from the Main Adder to the "C" Register, their collective values may indicate that a decimal carry will occur from the entire sum group of four digits if the fourth digit is a 1. The indication of a possible decimal carry exists if the second and/or third digit of a group is a 1, representing the respective decimal values 2 and 4. If the fourth digit is also a 1, it represents a decimal value of 8, and any additive combination of the value 8 with either value 2 or 4 is greater than the value 9, requiring a decimal carry from the sum group. Accordingly, when the first three digits of a decimal sum group have been entered into the "C" Register, and the second and/or third of these digits is a 1, the Main Adder is conditioned by the "C" Register to store a carry digit of +1 in preparation for receiving the next decimal group. It is also noted that a decimal carry of +1 is required, even in the absence of one of the above carry combinations, if the sum group has an equivalent decimal value equal to or greater than 16. In this case, a carry digit of +1 remains in the Main Adder after the addition of the operands which produce that sum group, and is automatically added to the next pair of input groups.

The "C" Register 400 is a four-stage binary shift register which receives the output of the Main Adder 360 and tests each decimal sum group from the Main Adder for conditioning the latter, if necessary, in preparation for receiving a next pair of operand groups. The "C" Register is also employed as an extra four stages of the "A" Register 520, hereinafter described. Each output group from the "C" Register is transmitted to the Corrector Adder 420, where it is corrected, if necessary, in accordance with the rules of DGB arithmetic previously set forth in Tables IV, V, VI, VIII and X. Hexadecimal groups that are shifted through the "C" Register into the Corrector Adder are not tested for decimal carry in the "C" Register since the hexadecimal system is compatible with the binary system, as hereinbefore described.

The Corrector Adder 420 is an adding circuit of the same general type as the Main Adder 360, and is provided for correctively adding to or subtracting from each decimal sum or difference group of four binary digits (from the output of the "C" Register 400) the value 0110, if certain conditions exist. It is recalled that during additive DGB operations, the corrective value 0110 is added to any sum group having a value whose decimal equivalent is greater than 9, and that during subtractive DGB operations, the same value is subtracted from any difference representing a value less than 0. It has been shown that any decimal sum group having a value from 9 to 15, inclusive, is detected in the "C" Register, and conditions the Main Adder for adding a carry digit of +1 to the next pair of decimal operand groups, and that any decimal sum group having a value greater than 15 automatically stores a carry digit of +1 in the Main Adder in preparation for receipt of the next pair of operand groups. When the Main Adder has been thus conditioned, the MA Sensing Circuit 440 detects the presence of a stored carry digit and, in cooperation with the Sign Control Circuit 460, conditions the Corrector Adder for adding the corrective value 0110 to the sum group whose value exceeded 9. Similarly, in subtractive operation, a difference of less than 0 is represented in the Main Adder by the presence of a carry digit of −1, and this digit is detected by the MA Sensing Circuit which, in cooperation with the Sign Control Circuit, conditions the Corrector Adder for correctively subtracting the value 0110 from the same difference group which left a carry digit of −1 in the Main Adder. Each output group from the Corrector Adder is transmitted through the Arithmetic Bus to the input of a selected one or more of the subsequently described registers "A," "R," "D," "K," "T" or "O."

The MA Sensing Circuit 440 is provided for sensing the 0 or 1 state of the Main Adder 360 to thereby control certain other circuits in the computer. It has been shown that the MA Sensing Circuit controls the Corrector Adder 420 in response to the sensing of a carry digit of +1 or −1 in the Main Adder at the beginning of each decimal group during DGB operation. During many of the codes, hereinafter described, the MA Sensing Circuit also controls the Sign Control Circuit 460 in response to the sensing of a 0 or 1 in the Main Adder at the end of each word interval, for thereby determining the additive or subtractive nature of an arithmetic operation that occurs during the next word interval. The sensing of a 0 indicates that no overflow of the "A" Register 520 occurred during the previous word interval, and the sensing of a 1 indicates that an overflow of the "A" Register did occur during that word interval.

During the Divide Code, a divisor word is subtracted in the Main Adder from successively less significant groups of orders of a dividend word, as hereinafter described. The first subtraction is made with the most significant digits of the divisor and dividend words aligned, and the plus or minus sign of the result of this first subtraction is sensed by the MA Sensing Circuit. If the Main Adder stands at 1 after the first subtraction in a division operation, this indicates that an overflow occurred in the "A" Register and that the result of the subtraction was negative. The present computer operates only on values between but not including −1 and +1; therefore, the dividend should be smaller than the divisor, and the negative result in the first subtraction of a division operation indicates that such is the case. A positive result of that subtraction indicates that the dividend was larger than the divisor and that the computer should be stopped. Accordingly, if the MA Sensing Circuit senses a 0 after the first subtraction in a division operation, if transmits a signal to a Start-Stop Circuit 890 (Fig. 34) through a connection not shown in Figs. 33 and 34, thereby stopping the computer, as hereinafter described.

In the present computer, addition and subtraction are algebraic in nature, i.e., the additive or subtractive nature of the operation which is performed in the Main Adder 360 (Fig. 33) is determined from the combination of two criteria, viz: (1) the additive or subtractive nature of the selected code, and (2) the signs of the two operands.

During the Add Code, the two operands are algebraically added according to their signs. Thus, if the signs are alike, i.e., both plus or both minus, the Main Adder performs addition and the sign of the result is the same as the signs of the two operands. In this case, there is an overflow of the "A" Register only when the combined values of the two operands exceed the capacity of that register, and any overflow which occurs requires that the computer be stopped. When the Main Adder performs addition, the result need not be complemented. On the other hand, if the signs of the two operands are different, the Main Adder subtracts the absolute value of the "*y*" operand from that of the "*x*" operand. If the absolute value of the "*x*" operand is greater than that of the "*y*"

operand there is never any overflow of the "A" Register and the result need not be complemented; but if the absolute value of the "y" operand is greater than that of the "x" operand, there is always an overflow of the "A" Register and the result must be complemented. The sign of the result word, after any necessary complementing, is the same as that of the operand having greater absolute value.

As will be shown in the description of the Add Code and its related secondary codes, a word standing in the "A" Register is added to or subtracted from a word from Memory 100. A first section of the Sign Control Circuit 460 stores the sign of the word standing in the "A" Register during addition and subtraction operations, and a second section of that circuit counts the 0, 1 or 2 minus signs associated with the two operands of an addition or subtraction operation. At the beginning of such an operation, any minus sign that is stored in the first section of the Sign Control Circuit is transmitted through the 1's Transfer Bus and the Sign Clipper 340 into the second section of the Sign Control Circuit where it is counted. Then, the second operand is transmitted from Memory, through the Sign Clipper into the Main Adder 360, and its sign digit, if minus, is routed from the Sign Clipper into the second section of the Sign Control Circuit where it, too, is counted. If the signs of the operand in the "A" Register and that from Memory are both plus, the sign count in the second section of the Sign Control Circuit is 0 and the Sign Control Circuit controls the Main Adder for causing the latter to perform an addition operation. If the sign of either one of the operands is minus and that of the other is plus, the sign count is 1, and the Sign Control Circuit causes the Main Adder to perform a subtraction operation. If the signs of both operands are minus, the sign count is 2, and the Sign Control Circuit causes the Main Adder to perform an additional operation.

The second section of the Sign Control Circuit, i.e., that section which counts minus signs, is also adapted to energize the Start-Stop Circuit 890 (Fig. 34), through a connection not shown in Figs. 33 and 34 when the signs of both operands are the same and the addition of those operands results in an overflow of the "A" Register 520 (Fig. 33).

A third section of the Sign Control Circuit is adapted to store a signal indicating that a result word must be complemented when the signs of the two operands are different and the absolute value of the "y" operand is greater than that of the "x" operand.

Under some circumstances, it is desirable that the computer not be stopped even though the capacity of the "A" Register be exceeded as the result of an addition operation. Instead of stopping the computer in such case, it is desirable that the overflow of the "A" Register cause a "scaling" operation comprising a right shift of one group of four binary places in order to retain the overflow group in the "A" Register. The Overflow Add Code is employed for this purpose, and causes the computer to automatically perform a right shift operation after each addition operation if, and only if the capacity of the "A" Register is exceeded. The Right Shift Code is programmed immediately following the Overflow Add Code, but if the capacity of the "A" Register is not exceeded as the result of the addition operation, the Right Shift Code is omitted by the process of adding an extra value of 1 to a code address standing in the "S" Register 730 (Fig. 34), hereinafter described.

It will be seen, however, that if the two operands which are added in the Main Adder 360 (Fig. 33) have different signs, and if the absolute value of the "x" operand is less than that of the "y" operand, an overflow of the "A" Register must occur, and the result must be complemented; therefore, the overflow does not indicate, in this case, that the capacity of the "A" Register has not been exceeded, and a right shift operation should not be initiated immediately following the Overflow Add Code. Thus, the sensing of an overflow addition of the "A" Register is employed for disabling the right shift operation by causing an extra value of 1 to be added to the contents of the "S" Register, in the same manner as the sensing of a non-overflow during other addition problems.

During the Write Code, the word standing in the "A" Register is written in a selected address of Memory, and its sign, which is stored in the first section of the Sign Control Circuit, must be written in Memory preceding the word. It will be shown that a word must be written in Memory two digit intervals ahead of its normal transfer time in the computer, i.e., the sign of the word must be written on CP-4 and the first word digit must be written on CP-5. Accordingly, means are provided for reading a sign digit out of the first section of the Sign Control Circuit and onto the Tranfer Busses in coincidence with CP-4, rather than CP-6 as during a normal transfer of a sign digit.

In the process of multiplying two factors, the sign of the product can be predetermined from the signs of the two factors. If the signs of the two factors are alike, i.e., both plus or both minus, the sign of the product is plus; and if the signs of the factors are different, the sign of the product is minus. In the present computer, each multiplicand word is stored in the "A" Register in preparation for a multiplying operation, and the sign of the multiplicand is stored in the first section of the Sign Control Circuit. In preparation for a multiplying operation, the multiplier word is read from Memory 100 through the related Read-Write Amplifier 240, the Interpreter 270, the Transfer Busses, the Sign Clipper 340, the Main Adder 360, the "C" Register 400, the Corrector Adder 420 and the Arithmetic Bus into the "R" Register 550. As the multiplier word passes through the Sign Clipper, its sign digit, if minus, is transmitted to the first section of the Sign Control Circuit 460 where it is counted with the sign of the multiplicand. Thus, before the multiplying process itself starts, the sign of the product is stored in the first section of the Sign Control Circuit.

It has been shown in connection with Tables VII and VIII that during a multiplying operation, the multiplicand word is added to the partial product word once for each unit of value of each multiplier group, and that a multiplier group is reduced in value by unity for each such addition. It has also been shown that each multiplier group is reduced in value in this manner until it overflows, that its value is subsequently increased by unity to restore it to 0, and that when the value of the multiplier group is reduced by unity, the multiplicand word is correctly subtracted once from the partial product. In order to subtract the multiplicand word from the partial product, the Main Adder must be conditioned for a subtractive operation. Accordingly, when the value of a multiplier group has overflowed, this condition is detected in the "R" Adder 580, which thereupon causes the Sign Control Circuit to condition the Main Adder for a subtractive operation during the next word interval.

The division process in the present computer comprises a series of successive subtractions of the divisor from the dividend, with a corrected addition of the divisor when the value of the remainder becomes less than 0 and an overflow of the "A" Register occurs. It is therefore necessary to provide means for selectively controlling an additive or subtractive operation during division. When an overflow is sensed in the MA Sensing Circuit during division, the latter circuit causes the Sign Control Circuit to condition the Main Adder and the Corrector Adder for an additive operation, and to condition the "R" Adder for a subtractive operation.

During the Compare Code, two words are compared for relative magnitude by subtracting one from the other, and the positive, negative or zero result of the subtraction is employed for controlling a next computer operation. After the subtraction operation, the MA Unit Input Circuit senses the first section of the Sign Control Circuit to determine the sign of the result; if that sign is plus, a signal is transmitted by the Sign Control Circuit back to the MA Unit Input Circuit, and if the sign is minus, no signal is transmitted to the MA Unit Input Circuit. If a signal is transmitted from the Sign Control Circuit back to the MA Unit Input Circuit, the latter causes an extra value of 1 to be added to the contents of the "S" Register 730 (Fig. 34), as hereinafter described, and the next consecutive command is omitted.

During the Round Off Code, the word that is to be rounded off stands partly in the "A" Register (Fig. 33) and partly in the "R" Register, the more significant half of the word standing in the "A" Register. The half word standing in the "R" Register is added to itself to determine whether or not its most significant decimal group has a value equal to or greater than 0101(DGB), in which case an overflow occurs due to a decimal carry of +1 in the most significant group. The carry digit of +1 is then added to the least significant decimal group of the half word standing in the "A" Register, and the result is returned to the "A" Register, which thereafter contains the rounded off word.

During each sector-searching phase of an addressing operation, it is necessary to repetitively subtract the value 1 from an initial sector number. This is accomplished by passing the initial sector number through the Main Adder which must be conditioned for a subtractive operation. Accordingly, at the appropriate time during an addressing operation, a Sequencer 850 (Fig. 34), which is located in the later-described Control Section, sets the Sign Control Circuit (Fig. 33) through a lead not shown in Figs. 33 and 34 for causing the Main Adder to perform a subtractive operation during the next word interval.

When the computer is stopped in response to an overflow of the "A" Register, it carries out the Logical Jump Code for reasons hereinafter described. It will be shown that the initiation of the Logical Jump Code requires a subtractive operation of the Main Adder. This subtractive operation is enabled by a signal from a Start-Stop Circuit 890 (Fig. 34) in the Control Section. The signal from the Start-Stop Circuit is applied to the Sign Control Circuit (Fig. 33) through a lead not shown in Figs. 33 and 34, and the Sign Control Circuit thereupon conditions the Main Adder for a subtractive operation following an overflow of the "A" Register.

During certain arithmetic and addressing operations of the computer, hereinafter described, it is desirable to apply an operand of 1 to the "*y*" input of the Main Adder. The MA Unit Input Circuit 500 is provided for entering this operand into the Main Adder either at the beginning of the next word interval following a predetermined event in the computer, or after a single word interval of delay following such an event.

During addressing operations, the selected sector number is subtracted as a "*y*" operand in the Main Adder from each successive sector number that is read by the Sector Head 110(65) as an "*x*" operand, until a difference of 0 is obtained, at which time the Memory Drum is in the proper rotational position for the initiation of an operation for reading from or writing in a selected sector of Memory. It will be shown that each sector number occupies the first six cells of its related sector in the Sector Track, and that the last nine cells in each of these sectors contain 1's. The entire word in each sector of the Sector Track constitutes an "*x*" operand from which the selected number is subtracted as a "*y*" operand, and the test for all 0's of the difference must therefore be made after the sixth digit interval of the word time, so that the entire sector number has been subtracted, but before the nine 1's occur, since these 1's would destroy any all-0's condition occurring in the subtraction. Therefore, the ninth OP of the word interval is employed to test for all 0's in the difference word. The Main Adder conditions the MA Unit Input Circuit when a difference of all-0's occurs, and the ninth OP is applied to the latter circuit from the previously mentioned Address Control Circuit 750 (Fig. 34) in the Address Section. If the condition of all-0's is detected by the ninth OP, the MA Unit Input Circuit (Fig. 33) energizes a Sector Coincidence Delay Circuit 830 (Fig. 34) in the Address Section, and thereby controls the termination or future course of the addressing operation, as hereinafter described.

The "A" Register 520 (Fig. 33), the "R" Register 550 and the "D" Register 600 are each forty-stage shift registers which are adapted to receive input words in the form of 1's pulses. The "A" Register receives such words either from the Arithmetic Bus or from the "T" Register 680, and transmits them either to the "R" Register or to the "*y*" input of the Main Adder. It is also adapted to transmit words in the form of, 0's and 1's pulses, to the Transfer Busses. The "R" Register 550 receives input words either from the "A" Register, from the "R" Adder 580 or from the Arithmetic Bus, and transmits them to the "*y*" input of the Main Adder. It is also adapted to transmit words in the form of 0's and 1's pulses, to the "R" Adder or to the Transfer Busses. The "D" Register 600 receives input words either from its own output or from the Arithmetic Bus, and transmits them either to its own input, or to the "*y*" input of the Main Adder, or to the Read Control Circuit 300.

It is recalled that in multiplication operation, the multiplier word stands in the "R" Register, and that beginning with the least significant decimal or hexadecimal group of that word, each group of four binary digits is repetitively decreased by unity until its value is 0. Each time a multiplier word is decreased by unity, the multiplicand word which stands in the "D" Register 600, is added to the partial product in the "A" Register. The subtraction of unity from the multiplier group is performed in the "R" Adder. When the value of the mupltiplier group reaches 0, the "R" Adder transmits a signal to a Timing Generator 920 (Fig. 34), through a lead not shown in Figs. 33 and 34, in the Control Section for causing the initiation of a right shift operation of four binary places of the multiplier word, to thereby position the next group of that word for continuing the multiplication operation. But during the detection of all 0's in a multiplier group, the "R" Adder (Fig. 33) subtracts an extra value of 1 from the zeroized group and causes an overflow, the "R" Adder, upon detection of all 0's in a multiplier group, energizes the Sign Control Circuit 460 which, in turn, sets the Main Adder 360 for a subtractive operation and sets the "R" Adder for an additive operation. The Main Adder then subtracts the multiplicand word once from the partial product word, and the "R" Adder adds a corrective value of 1 to the multiplier group before shifting operation. To enable the increasing or decreasing of the successive multiplier groups by unity, the multiplier word is shifted from the "R" Register through the "R" Adder, and back into the "R" Register, once each time the multiplicand word is added to or subtracted from the partial product word.

The "K" Register 620 is a four-stage shift register, which receives selected cycle-counting values, and cooperates with the "K" Subtractor 650 for reducing a cycle-counting value by unity during each cycle that is to be counted in the computer operation. Cycle-counting values are received by the "K" Register, in the form of 1's pulses, either from the Arithmetic Bus or from the "K" Subtractor. Such values may also be entered into the "K" Register by selected combinations of control pulses. A value standing in the "K" Register may be shifted into the "K" Subtractor in the form of 0's and 1's pulses.

The "K" Subtractor 650 is provided for circulating a cycle-counting value from the output of the "K" Register 620 to the input of the same register, and for decreasing that value by unity during each such circulation. Control voltages for indicating whether the cycle-counting value was zero or non-zero during its last pass through the "K" Subtractor are applied by the "K" Subtractor to a "K" Subtractor Sensing Circuit 660. The "K" Subtractor comprises a unit adder of the same general type as the "R" Adder 580, except that the former is permanently adapted for subtracting unity from each input value, whereas the latter is controlled by the Sign Control Circuit 460, as previously described, for selectively adding unity to or subtracting unity from an input word.

The "K" Subtractor Sensing Circuit 660, hereinafter designated the KS Sensing Circuit, is provided for sensing the 0 to 1 state of the "K" Subtractor, and for transmitting signals to the "C" Register 400 and to the Control Section, hereinafter described, in accordance with the results of the sensing operation, for initiating certain control operations in the various computer codes. If the "K" Subtractor stands at 0, a control pulse may be gated to the Control Section, and if the "K" Subtractor stands at 1, a signal may be transmitted either to the "C" Register and/or to the Control Section.

The "T" Register 680 is a six-stage shift register, and is adapted to receive serial input words from the Arithmetic Bus and parallel input words from the Typewriter 1200, and to transmit serial output words to the "A" Register and parallel output words to the typewriter.

*Address Section.*—The Address Section includes an "O" Register 710 (Fig. 34) which is adapted to receive, from the Arithmetic Bus, commands or addresses of commands. A command comprises (1) the address of an operand, and (2) a code number. First, the Address section is employed for locating, in Memory 100 (Fig. 33), the command whose address stands in the "O" Register (Fig. 34). That command is read out of Memory (Fig. 33), through the related Read-Write Amplifier 240, the Interpreter 270, the Sign Clipper 340, the Main Adder 360, and the Arithmetic Bus, to the "O" Register (Fig. 34). The address of the operand comprises four octal digits, expressed in the "O" Register in "OGB" notation. The two least significant octal digits represent the selected sector number of a band in Memory (where the operand is located); the next two octal digits represent the selected band number; and three additional octal digits represent the code value which determine what operation is to be performed on the operand in the selected address. In the addressing operation, the band is located first, then the sector. This terminates the addressing operation as to the selected operand. Next, the operand is read out of Memory and transmitted to some unit of the computer as determined by the code number standing in the "O" Register. The latter operation will be described in connection with the Control Section. The process of locating an operand in the selected address of Memory is as follows.

A first part of an addressing operation is employed to search for the selected band, as perviously mentioned. During this time, the entire contents of the "O" Register are circulated eight times through the "O" Subtractor 770 and back into the "O" Register, and the value 1 is subtracted from each octal digit of the band number during each such circulation, by means of an address pattern from the Pattern Generator 180 (Fig. 33), which pattern is gated to the "O" Subtractor (Fig. 34) through the previously mentioned Address Control Circuit 750. As each of the two octal digits in the band number passes through the "O" Subtractor, the latter unit transmits one of two kinds of signals to a Code-Band Pulse Distributor 790, hereinafter designated the CBP Distributor. If the octal digit is other than 0, and has not yet been reduced beyond 0, the CBP Distributor distributes the pulse to a corresponding one of two initially zeroized counters, a Band Counter 810 and a Band Group Counter 820. If the octal digit is 0, the output pulse from the "O" Subtractor disables transmission of further pulses from the CBP Distributor to the corresponding Band Counter or Band Group Counter. The CBP Distributor is commutated by selected pulses of the address pattern, which pulses are gated to the CBP Distributor by the Address Control Circuit. Thus at the end of eight circulations of the "O" Register contents through the "O" Subtractor, each of the two octal digits in the band number has been reduced in steps of one through the value 0 and back to its original value, and its related Band Counter or Band Group Counter has been advanced to a count corresponding to the original value of the octal digit.

When the Band Counter and the Band Group Counter have been set to the selected values, the address section then searches for the selected sector. The contents of the "O" Register continue to circulate through the "O" Subtractor, but nothing further is subtracted therefrom because the Address Control Circuit now blocks the address pattern from the "O" Subtractor. During each such circulation, the contents of the "O" Register are also transmitted to the Address Control Circuit, which transmits only the two octal sector digits to the "y" input of the Main Adder 360 (Fig. 33). The successive sector numbers from the Sector Track of Memory are transmitted through the Sector Head 110(65), the Sector Read Amplifier 260, the Interpreter 270, and the Transfer Busses, to the "x" input of the Main Adder, and the "y" input of the Main Adder is subtracted from the "x" input of that unit under control of the Sign Control Circuit 460. When the selected sector number matches the sector number that is read from the Sector Track of Memory, the Main Adder produces a difference of all 0's, which sets the MA Unit Input Circuit 500. Each ninth OP is transmitted from the Address Control Circuit (Fig. 34) to the MA Unit Input Circuit (Fig. 33) to sense for a Main Adder difference output of all 0's. When a difference of all 0's is sensed, the MA Unit Input Circuit energizes the previously mentioned Sector Coincidence Delay Circuit 830 (Fig. 34), hereinafter designated the SC Delay Circuit, on the ninth OP, and the latter circuit generates a Sector Coincidence Pulse, or "SC pulse," at the end of that word interval, and generates a delayed SC pulse at the end of the following word interval. Both the SC pulse and the delayed SC pulse are transmitted to the Control Section for initiating control operations, as hereinafter described. In response to the ninth OP, the SC Delay Circuit also energizes the Band Counter and the Band Group Counter to initiating a reading operation, as follows:

The Band Counter when energized, partially arms one Read-Write Amplifier 240 (Fig. 33) in each of eight groups of Read-Write Amplifiers, and the Band Group Counter (Fig. 34), when energized, partially arms one entire group of eight Read-Write Amplifiers (Fig. 33). Thus, when both the Band Counter (Fig. 34) and the Band Group Counter are energized, one and only one Read-Write Amplifier (Fig. 33) is partially armed by both of these counters, and becomes fully armed for performing a read operation, which is selected under control of the Control Section, hereinafter described. Although the Band Counter (Fig. 34) and the Band Group Counter are energized in response to the ninth OP of the word intervals during which sector coincidence is found, the selected Read-Write Amplifier (Fig. 33) inherently requires a substantial amount of time to be armed by these two counters. Thus, the actual reading operation is initiated by the delayed SC pulse in the Control Section. It has been stated that the delayed SC pulse is transmitted to the Control Section nearly two word intervals after sector coincidence has been found on the ninth OP; therefore, a reading operation occurs during the second word interval after sector coincidence is found, and each sector of each Information Band in Memory is offset two sectors from its corresponding sector of the Sector Track. But a writing operation, as well as a reading operation, is delayed in this manner, and the offsetting by any arbitrary number of sectors does not interfere with the timing of the computer.

During the reading operation, the operand at the selected address of Memory is read out and transmitted to a desired unit of the computer, and selected operation is performed on that operand in accordance with the code number in the command, and under control of the Control Section, as hereinafter described.

After the desired arithmetic or other operation has been performed, the Control Section enables the Address Section for performing a next step in the computer, viz: the setting up of the new command. During location of the operand address and the carrying out of the selected code operation on that operand, the previously mentioned "S" Register 730 (Fig. 34) stores the address of the command which controls such operation. After completion of such operation, the contents of the "S" Register are circulated through the Transfer Busses, the Sign Clipper 340 (Fig. 33), the Main Adder 360, and the Arithmetic Bus, and the first section of the "O" Register 710 (Fig. 34) into both the "S" Register and the second section of the "O" Register. When the command address passes through the Main Adder (Fig. 33), it is normally increased by the value 1, which increases the sector number of the address by the value 1. This is done because consecutive commands are stored in consecutive sectors of one or more Information Bands of Memory. Under certain circumstances, it is desirable to omit the next command. In such case, the Main Adder adds the value 2 to the command address, under control of the MA Unit Input Circuit 500 which presets the Main Adder for adding an extra value of 1. When the new command address has been returned to the "S" Register (Fig. 34) and entered into the second section of the "O" Register, the previously described addressing operation is carried out, beginning with the circulation of the contents of the "O" Register through the "O" Subtractor 770, and the command which is located at the new address in Memory (Fig. 33) is read out of Memory, and through the related Read-Write Amplifier 240, the Interpreter 270, the Transfer Busses, the Sign Clipper 340, the Main Adder 360, the Arithmetic Bus and into the "O" Register (Fig. 34). The "S" Register again stored the command address in preparation for once again increasing it by the value 1 or 2 after the present command has been performed.

*Control Section.*—The Control Section is provided for controlling the starting, stopping and sequencing of addressing and arithmetic operations of the computer. It includes the previously mentioned Sequencer 850 which controls each addressing operation by initiating and terminating the various steps thereof. The Sequencer divides each addressing operation into four basic time periods, designated sequencing phases SP–1 through SP–4. SP–1 is initiated, generally, in response to a Start pulse which is generated in any of several units of the computer, and is transmitted to the Sequencer upon termination of the preceding code. During SP–1, the Address and Arithmetic Sections are prepared for locating the Information Band in Memory (Fig. 33) where the next command is located. During SP–2, the band value is set up in the Band Counter 810 (Fig. 34) and the Band Group Counter 820 to represent the number of the Information Band (Fig. 33) where the next command is located. During SP–3, the sector number of the next command is located, and during SP–4, the next command is read out of Memory and into the "O" Register 710 (Fig. 34). Then SP–2 and SP–3 are repeated for locating the address of the next operand, this address being a part of the command value entered into the "O" Register during SP–4. During the second occurrence of SP–2, the code value, which forms a second part of the command value, is set up by the CBP Distributor in three linear counters designated Code Counter "A" 970, Code Counter "B" 990, and Code Counter "C" 1000.

At the end of the second occurrence of SP–3, a signal is transmitted by the Sequencer to the previously mentioned Timing Generator 920 which controls the initiation and termination of the various steps in the selected code operation. The Timing Generator divides each code operation into from two to five time periods, designated timing phases TP–1 to TP–5. Code Counters "A," "B" and "C" cooperate with the Timing Generator for energizing a Code Matrix 1040 which, in turn, energizes a Code Distributor 1060 for arming an appropriate set of gates throughout the computer during each timing phase of each code.

When the last timing phase of a code is terminated, a Start pulse is transmitted to the Sequencer for initiating a next addressing operation. During continuous operation of the computer, the Start pulse is transmitted to the Sequencer from the previously mentioned Start-Stop Circuit 890 which is also provided for controlling automatic or manual starting and stopping of the computer.

An Error Detection Circuit 1070 normally maintains an Error Light turned off, but is operable, in response to the non-occurrence of certain normally recurring operations in the computer for (1) energizing the Error Light; (2) energizing the Sequencer to initiate a special addressing operation during which the address of the present command is written in a predetermined address of Memory (Fig. 33); and (3) energizing the Start-Stop Circuit (Fig. 34) for stopping the computer and for causing the Start-Stop Circuit to control various other computer units for the generation of a Logical Jump Code which is employed during the special addressing operation for writing the address of the present command in Memory (Fig. 33). The Error Light (Fig. 34) is maintained in a de-energized state, for example, by a signal applied to the Error Detection Circuit from the Sequencer 850 during each SP–1 and each SP–4 of normally recurring addressing operations and if such a signal fails to occur, the Error Light is turned on, and the Logical Jump Code is generated, as described above.

MEMORY SECTION

*In general.*—The Memory Section is provided for selectively storing magnetic representations of data employed in various computer operations, and for producing signals representing selected items of the stored data. The selective storage and removal of data in and from the Memory Section is controlled by the Address and Control Sections, hereinafter described.

The Memory Section comprises a magnetic drum for receiving and storing magnetic representations of digital or other informaiton, and a series of magnetic transducers cooperating with the drum, and with other sections of the computer, for "reading" or "writing" such information. The Memory Section also includes means constituting elements of the drum-transducer system, for generating timing, or "clock" pulses, and for generating signals which represent the rotational position of the drum with respect to a fixed reference position.

*Memory drum.*—The Memory, shown schematically in Fig. 35, comprises a drum 101 which is mounted by hubs, such as 102, on a shaft 103, the shaft being driven by a motor (not shown). The drum comprises a main body 104 which may be formed of aluminum or other rigid material, and which is covered by a thin coating 105 of magnetizable material, such as magnetic iron oxide invested in a plastic base. An improved process for coating the drum is described and claimed in the copending application Serial No. 492,222, filed March 4, 1955, by George B. Greene and Wayne E. Willis, now abandoned.

The magnetizable drum surface may be considered as comprising sixty-six circumferential bands spaced along the drum axis, the first sixty-four bands constituting the Information Bands, a first additional band constituting the Clock Track, and a second additional band constituting the Sector Track. As previously described, each band may be considered as comprising sixty-four substantially equal sectors spaced in the direction of drum rotation, with each sector divided into forty-six cells also arranged in the direction of drum rotation.

Each cell in the Information Bands may be magnetized to saturation in either of two opposite directions, thereby representing the respective binary digits 0 and 1. An example of the cell arrangement in one sector of a typical Information Band is shown in Fig. 36. A respective Read-Write Head 110(0) to 110(63) (Fig. 35) cooperates with each Information Band on the drum and is connected to a respective Read-Write Amplifier 240(0) to 240(63) (Fig. 44). The entire Clock Track is permanently magnetized in a pattern representing alternate 0's and 1's, for reasons hereinafter described. The cell arrangement of one sector of the Clock Track is shown in Fig. 37. A Clock Head 110(64) (Fig. 35) is located adjacent the path of the Clock Track and is energized by the magnetized pattern of the Clock Track for transmitting to the Clock Pulse Generator (Fig. 40) a timing signal when the leading edge of each cell of the Clock Track passes the Clock Head 110(64) (Fig. 35). Each sector of the Sector Track is permanently magnetized in a pattern representing the related sector number and a synchronizing signal, hereinafter described. The cell arrangement of one sector of the Sector Track is shown in Fig. 38. A Sector Head 110(65) (Fig. 35) is located adjacent the path of the Sector Track and is energized by the magnetized pattern of the Sector Track for transmitting to a Sector Read Amplifier (Fig. 45) sector number signals and sector synchronizing signals.

*Read-Write Heads.*—A typical Read-Write Head 110 is shown in Fig. 39. The head comprises a magnetic core 111 which is substantially triangular in shape and which has a gap 112 located at one corner of the triangle. A magnetizing coil 113 is wound on that leg of the core which is opposite gap 112. The coil 113 has a center-tap connected to +B and a pair of end terminals 114 and 115 which are connected to a related Read-Write Amplifier (Fig. 44). The gap 112 (Fig. 39) is located adjacent the path of the related band of drum 101 for cooperation therewith. A particular cell is magnetized to a 0 state or a 1 state, or transmits a reading signal, only when it underlies gap 112. In order to write a 0, current is caused to flow from +B through the left half of winding 113 and terminal 114 to the related Read-Write Amplifier, in a manner hereinafter described. Similarly, in order to write a 1 current is caused to flow from +B through the right half of winding 113 and through terminal 115 to the related Read-Write Amplifier. Current flowing from +B through the left or right half of coil 113 establishes magnetic flux throughout a path which includes the core 111 and that cell of drum surface 105 which underlies gap 112. The magnetic material of the cell is thereby magnetized to saturation, either in the direction of rotation of the drum or in the opposite direction, depending upon the direction of current flow through coil 113.

An improved Read-Write Head, which may be employed in the present invention, is disclosed and claimed in the copending application Serial No. 297,441, filed July 7, 1952, by George B. Greene.

TIMING SECTION

*In general.*—The Timing Section includes the Clock Pulse Generator 120 (Fig. 33) which receives the timing signal output from the Clock Head 110(64) and generates periodic clock pulses for transmission to the Clock Pulse Distributor 140 and the Sector Synchronizer 160, and for transmission to the Interpreter 270 in the Transfer Section. The Clock Pulse Distributor is controlled by the Sector Synchronizer for separating the clock pulses into pulse cycles, each cycle comprising CP–1 to CP–6 and a subsequent train of forty OP's. The Sector Synchronizer receives the sector number signals and the sector synchronizing signals from the Sector Head 110(65) hereinbefore described. In response to each sector synchronizing signal, the Sector Synchronizer generates a synchronizing pulse which is transmitted to the Clock Pulse Distributor for controlling the latter, as previously mentioned. The Timing Section also includes the Pattern Generator 180 that operates, in response to signals from various units in the Arithmetic, Address and Control Sections, to generate several pulse trains, each of which represents a repetitive pattern of 1's and 0's.

*Clock Pulse Generator.*—The Clock Pulse Generator (Fig. 33) receives, from the Clock Head 110(64) the timing signal that is generated by the Clock Track, i.e., a continuous series of alternate 0's and 1's. Even though a substantially square wave is employed for writing the Clock Track, and therefore the signal output from the Clock Head would ideally be derivative of a square wave (alternate positive and negative pulses), the resolution properties of most commercially available transducing heads are such that the timing signal output from the Clock Head may be substantially sinusoidal. Since each alternate cell of the Clock Track contains a 1 and the remaining cells contain 0's, and the frequency of the sine wave output from the Clock Head is one-half the frequency with which the Clock Track cells pass the Clock Head. Accordingly, the Clock Pulse Generator first doubles the frequency of the sine wave input, then amplifies, rectifies and shapes the new signal to produce one sharp clock pulse for each cell of the Clock Track.

The sinusoidal timing signals from the Clock Head 110(64) (Fig. 35) are received by the Clock Pulse Generator (Fig. 40) at a terminal 121. The timing signals are capacitively coupled to the input of a tuned pentode voltage amplifier 122 which has a resonant anode circuit 123, including a capacitor 124 and the primary winding of a transformer 125, tuned to twice the frequency of the sine wave input to terminal 121. Amplifier 122 is biased for normal conduction by connecting its grid to its cathode through a resistor 126, and therefore distorts the input signal to produce harmonics, thereby causing the resonant circuit 123 to produce an output signal (having a frequency which is twice that of the input signal). The output signal from the resonant circuit 123 is coupled through transformer 125 to the input of a second tuned pentode voltage amplifier 127 which has a resonant anode circuit 128, including a capacitor 130 and the primary winding of a transformer 131. The resonant circuit 128 is tuned to the same frequency as the present circuit 123 of amplifier 122 and therefore produces a further amplified sine wave output signal of the same doubled frequency. The output signal from the resonant circuit 128 is coupled through transformer 131 to the input of a class A power amplifier 132 which may, for example, be of the type shown in Fig. 1. Amplifier 132 conducts at saturation in response to each positive half cycle of its input signal and produces an output signal with a flattened negative half cycle. Each negative half cycle of the output of amplifier 132 is differentiated by a pulse transformer 133 to produce a sharp positive pulse in response to each half cycle of the sine wave. Each positive output pulse from transformer 133 is coupled to the input of a class B phase inverter 134 (see also Fig. 3) which produces, at an output terminal 135, one positive clock pulse in response to each positive input pulse. Therefore, a positive clock pulse is produced for each cell of the Clock Track. It will be seen that a second phase inverter, having two output leads, may be connected to the output of phase inverter 134 for producing two coincident clock pulses of opposite polarity in response to each positive clock pulse produced by phase inverter 134. The clock pulses on terminal 135 are transmitted to the Clock Pulse Distributor (Fig. 41), the Sector Synchronizer (Fig. 42) and the Interpreter (Fig. 46), hereinafter described.

*Clock Pulse Distributor.*—The Clock Pulse Distributor 140 (Fig. 33) receives the continuous train of clock pulses from the Clock Pulse Generator 120 and arranges these pulses into word intervals, each word interval including forty-six pulses. The end of each word interval is determined in response to the end of a cycle of operation of the Clock Pulse Distributor. The end of this cycle is coincident with and synchronized by a synchronizing pulse from the Sector Synchronizer 160. Each of the first six pulses of each word interval is gated to a separate output lead as a respective control pulse CP–1 or CP–6, and the last forty pulses of each word interval are gated to a seventh output lead as a train of OP's. CP–1 to CP–4 are also gated by the Clock Pulse Distributor onto an eighth separate output lead. The eight output leads from the Clock Pulse Distributor are connected to various computer circuits, hereinafter described, which require control or operating pulses.

Referring to Fig. 41, the Clock Pulse Distributor includes a ring counter 141 having seven flip-flop stages 141(1) to 141(7), respectively, for controlling the gating of the CP's and OP's, and includes a binary counter 142 having six flip-flop stages 142(1) to 142(6), respectively, for determining the number of pulses in each OP train. To begin each word interval of operation, a synchronizing pulse from an output terminal 172 of the Sector Synchronizer (Fig. 42), hereinafter described, is connected through a delay line 153 (Fig. 41) to the set input of ring counter stage 141(1), and to the reset input of each of the remaining ring counter stages 141(2) to 141(7). Therefore, the synchronizing pulse sets the ring counter 141 to an initial counting stage wherein stage 141(1) is the only stage in the 1 state. Terminal 172 is also connected to the reset input of each binary counter stage 142(1), 142(2), and 142(3) and 142(5), and to the set input of each binary counter stage 142(4) and 142(6); therefore, the synchronizing pulse sets the binary counter 142 to the value 101000(B). A multiple arming gate 144 is armed jointly by the 1 states of binary counter stages 142(4) and 142(6), and is therefore armed by these stages in response to the synchronizing pulse applied to terminal 172. Clock pulses are applied to the input of gate 144 through the output terminal 135 from the Clock Pulse Generator (Fig. 40). The output of gate 144 (Fig. 41) is connected to the counting input of ring counter 141. The synchronizing pulse is applied to terminal 172 less than one digit interval following the last clock pulse that is generated by each sector of the Clock Track, as hereinafter described; therefore, gate 144 is armed synchronously with the last clock pulse in each word interval, and the first clock pulse in the next word interval passes through gate 144 to transfer the count of 1 from ring counter stage 141(1) to stage 141(2). Similarly, the next five clock pulses transfer the count of 1 through each of the intermediate ring counter stages to stage 141(7). The ring counter stages are employed as follows for gating the first six clock pulses of each word interval to generate CP–1 to CP–6 and a train of OP's.

The 1 side of each stage 141(1) to 141(7) arms a respective gate 145(1) to 145(7). The clock pulses from terminal 135 are applied to the input of each gate 145(1) to 145(7), and the outputs of these gates are connected to respective output terminals 146(1) to 146(7). Since stage 141(1) is set to 1 by the synchronizing pulse on terminal 172 as hereinbefore described, gate 145(1) is armed in response to that pulse; therefore, the same clock pulse that transfers the count of 1 from stage 141(1) to stage 141(2) also passes through gate 145(1) to terminal 146(1) and constitutes CP–1. Since stage 142(2) is set to 1 in response to the first clock pulse, gate 145(2) is armed at that time, and the second clock pulse passes through gate 145(2) to terminal 146(2) and constitutes CP–2. Similarly, an output pulse appears at each terminal 146(3) to 146(6) in response to the third to sixth clock pulses, respectively, and constitutes the corresponding control pulse CP–3 to CP–6. The first four CP's are frequently used together, and are therefore combined on a single output lead from the Clock Pulse Distributor by joining the outputs of gates 145(1) to 145(4) through respective diodes 147(1) to 147(4). The combined CP–1 to 4 output is transmitted through an amplifier 148 to an output terminal 149.

The output of gate 145(6), in addition to being connected to terminal 146(6), is also connected to the set input of binary counter stage 142(1) and to the reset input of each of the other binary counter stages 142(2) to 142(6). Therefore, CP–6 sets the binary counter to the value 000001(B). Since gate 144 is armed by the 1 state of binary counter stages 142(4) and 142(6), this gate is closed in response to CP–6, and the seventh and subsequent clock pulses do not cause any further transfer of the count of 1 in the ring counter. The count of 1 therefore remains in stage 141(7) to which it was transferred by the sixth clock pulse. The seventh and subsequent clock pulses pass through gate 145(7) and constitute train of OP's, which is limited to forty pulses in the following manner.

The output of gate 145(7), in addition to being connected to terminal 146(7), is also connected to the counting input of the binary counter 142, which it is recalled, was set to the value 000001(B) in response to the sixth clock pulse. Therefore, when the next thirty-nine clock pulses, i.e., the seventh to the forty-fifth clock pulses from the beginning of the word interval, have passed through gate 145(7), the binary counter stands at the value 101000(B), and gate 144 is once again armed by the binary counter stages 142(4) and 142(6). The forty-sixth clock pulse in the word interval passes through gate 144 to the counting input of the ring counter 141 and transfers the count of 1 from stage 141(7), to stage 141(1), thereby closing gate 145(7), and arming gate 145(1). The forty-sixth clock pulse also passes through gate 145(7), before the latter is closed, and advances the value standing in the binary counter to 101001(B). Since the forty-sixth clock pulse is the last clock pulse generated by a sector of the Clock Track, the next synchronizing pulse is received at terminal 172 less than a digit interval thereafter, and sets the binary counter 142 back to the value 101000(B) to begin a new word interval.

In the following description of the computer circuits, and in the drawings of the circuits, each terminal which receives a control pulse or a combination thereof, or which receives OP's, will be so designated, for example, "CP–1," "CP–2 to 4," or "OP."

A gate 151 is armed by the 0 side of ring counter stage 141(1) and is interrogated by each synchronizing pulse that is applied to terminal 172. The output of gate 151 is connected through an output terminal 152 to the Start-Stop Circuit (Fig. 75). Since stage 141(1) (Fig. 41) is normally in its 1 state when a synchronizing pulse is applied to terminal 172, as previously described, that pulse is normally blocked by gate 151. If the synchronizing pulse is passed by gate 151, an error is indicated, and a pulse is transmitted through terminal 152 to the Start-Stop Circuit (Fig. 75) for stopping the computer, as hereinafter described.

It will be understood that the CP's and OP's may be of either polarity, depending on the requirements of the various computer circuits that receive these pulses. Each output terminal 146(1) to 146(7) and 149 (Fig. 41) may be connected to a phase inverter of the type shown in Fig. 3, thereby providing an output pulse of each polarity. It will be understood that the value to which the binary counter 142 is set for arming gate 144 is arbitrarily chosen as 101000(B), and that any other value *"n"* may be used, provided the binary counter is set by CP–6 or otherwise to such value as will cause its value to increase to *"n"* in response to thirty-nine OP's.

*Sector Synchronizer.*—Referring to Fig. 38, it is seen that the first six cells of each sector in the Sector Track contained a sector identifying number, and that the last nine cells of each sector of the Sector Track contain 1's, the latter being employed for generating a synchronizing signal. Referring to Figs. 33 and 35, the Sector Head 110(64) reads the information in each consecutive sector of the Sector Track, and transmits that information to the Sector Synchronizer 160 and to the Sector Read Amplifier 260. The Sector Read Amplifier responds to the sector identifying sector, as hereinafter described; the Sector Synchronizer responds to the nine 1's at the end of each sector of the Sector Track and generates a synchronizing signal in response thereto.

Referring again to Fig. 38, it is seen that regardless of the value of a sector identifying number, it can contain no more than six consecutive 1's. The Sector Synchronizer (Figs. 33 and 35) is therefore adapted to respond to only a series of more than six 1's, and since the synchronizing value contains a series of nine 1's, the Sector Synchronizer responds thereto. Since the successive cells in any band of Memory are contiguous, as hereinbefore described, there is a change of magnetic state, as between two consecutive cells, only when the digit stored in one of the two cells is different from that stored in the other. And since a transducing head of the type shown in Fig. 39 responds only to changes in magnetic state, a signal is produced by the Sector Head 110(65) (Figs. 33 and 35) only when there is a change of stored value as between two successive cells in the Sector Track. It is arbitrarily established, by selective orientation of the Sector Head 110(65), that a change in value from 0 to 1 in the Sector Track produces a positive pulse output from the Sector Head, whereas a change in value from 1 to 0 produces a negative pulse output from the Sector Head.

Referring to Fig. 42, the signal output from the Sector Head 110(65) is transmitted through a cathode follower 161 to an input terminal 162 of the Sector Read Amplifier (Fig. 45), hereinafter described, and through an amplifier 163 (Fig. 42) to a phase inverter 164. An output signal from the Sector Head 110(65) is shown as having a leading positive pulse, representing a change from 0 to 1, and a trailing negative pulse representing a change from 1 to 0; therefore, the phase inverter 164, which produces two output signals of opposite phase, generates one signal having a leading negative pulse and another signal having a trailing negative pulse. The pulse inverter output having a leading negative pulse, representing a change from 0 to 1, is connected to the set input of a normally reset flip-flop 165, and the phase inverter output having a trailing negative pulse, representing a change from 1 to 0, is connected to the reset input of flip-flop 165. It will be seen that each value change from 0 to 1 in the Sector Track causes flip-flop 165 to be set to 1, whereas each change in value from 1 to 0 causes flip-flop 165 to be reset to 0. A gate 166 is armed by the 1 side of flip-flop 165 and has its input connected to the output terminal 135 from the Clock Pulse Generator (Fig. 40). The output of gate 166 (Fig. 42) is connected to the symmetrical input of a first stage 167(1) of a binary counter comprising three normally reset stages 167(1) to 167(3). A multiple-control gate 168 is armed by the concurrent 1 states of stages 167(1) to 167(3) and has its input connected to the Clock Pulse Generator output terminal 135. The output of gate 168 is connected through an amplifier 171 to an output terminal 172. Each of the counting stages 167(1) to 167(3) is reset by that output terminal from phase inverter 164 which produces a trailing negative pulse, representing a change in value from 1 to 0. The operation of the Sector Synchronizer is as follows.

When flip-flop 165 is set to 1, representing a change in value in the Sector Track from 0 to 1, gate 166 is armed and transmits each subsequent clock pulse from terminal 135 to the symmetrical input of counter stage 167(1). Any subsequent change in value of the Sector Track from 1 to 0 causes flip-flop 165 and counter stages 167(1) to 167(3) to be reset to 0. However, if flip-flop 165 remains set to 1, thereby maintaining gate 166 armed long enough to transmit seven consecutive clock pulses to the symmetrical input of counter stage 167(1), the value standing in the counter is increased to 111(B), thereby arming gate 168. The next clock pulse passes through gate 168 and amplifier 171 to terminal 172 and constitutes the sector synchronizing pulse. It is seen that the first 1 in the series of nine 1's at the end of each sector of the Sector Track sets flip-flop 165 to 1 and arms gate 166. During the next seven 1's on the Sector Track, gate 166 remains armed and transmits seven clock pulses from terminal 135 to the binary counter, setting the latter to the valve 111(B), and thereby arming gate 168. During the ninth 1 on the Sector Track, the corresponding clock pulse on terminal 135 is transmitted through gate 168 and amplifier 171 to terminal 172. It will be apparent that regardless of the value of a sector identifying number, it can contain no more than six consecutive 1's and that flip-flop 165 will be reset to 0 during, or at the end of the sector identifying number, before seven clock pulses can be transmitted through gate 166. Therefore, the Sector Synchronizer produces a synchronizing pulse only in response to the last cell in each sector of the Sector Track.

*Pattern Generator.—In general.*—The Pattern Generator 180 (Fig. 33) is employed for generating various repetitive pulse trains, or patterns, which represent, by the presence or absence of pulses, corresponding sequences of binary digits 1 and 0. The pulse trains are generated by selectively gating each train of OP's and the following CP–1 to CP–4, inclusive. For the purposes of the Pattern Generator, an active cycle of operation begins with the first OP in each word interval and ends with the following CP–4. Each CP–5 is employed for resetting certain units of the Pattern Generator to their initial states in preparation for a next cycle of operation.

The output pulse patterns are employed by various computer units during three distinct types of operation, viz.; (1) non-decimal arithmetic operations; (2) decimal arithmetic operations; and (3) sequencing operations. The circuits for generating the pulse patterns employed during each of the three above types of operation will be described separately, although it will be seen that much of the circuitry is used during more than one type of operation. Although the digit sequences represented by the pulse patterns which are produced by the Pattern Generator are shown in the drawings and in the following description in the normal way of showing values, i.e., with the most significant digit on the left, it will be understood that such digit sequences are produced with the least significant digit occurring first in time.

*Non-decimal arithmetic operation.*—During non-decimal arithmetic operations, it is not necessary to generate any pulse patterns as such, but it is necessary to separately gate the fourth OP and the fifth OP. The fourth OP is separately gated in the following manner.

Referring to Fig. 43, OP's are applied through a first diode 181 to the input of a mixing amplifier 183. CP–1 to CP–4 are applied through a second diode 182 to the input of amplifier 183. The output of amplifier 183 is connected by a lead 184 to the symmetrical input of a flip-flop that normally stands at 0, each CP–5 being applied to its reset input. Lead 184 is also connected to the input of a gate 186 that is armed by the 1 side of flip-flop 185. The output of gate 186 is connected to the symmetrical input of a flip-flop 190 that normally stands at 0, each CP–5 being applied to its reset input. The output of gate 186 is also connected to the input of a gate 191 that is armed by the 1 side of flip-flop 190. The output of gate 191 is connected to the input of a gate 192 that is armed by the 0 side of a flip-flop 193. In preparation for each arithmetic operation, flip-flop 193 is reset to 0 by a pulse applied to its reset input through an output terminal 795 of the CBP Distributor (Fig. 69), hereinafter described. The output of gate 192 (Fig. 43) is connected directly to an output terminal 193, and is connected through a diode 194 and a mixing amplifier 195 to an output terminal 196.

The first OP during each word interval is transmitted through diode 181, amplifier 183 and lead 184 to the symmetrical input of flip-flop 185, and sets the latter flip-flop to 1 for thereby arming gate 186. The first OP on lead 184 is also applied to the input of gate 186, but the inherent switching time of flip-flop 185 for arming gate 186 prevents the latter from being armed in time to pass the first OP. The second OP resets flip-flop 185 to 0, thereby closing gate 186, but is transmitted by gate 186 to the symmetrical input of flip-flop 190 and to the input of gate 191. The second OP is therefore blocked by gate 191 but sets flip-flop 190 to 1 for arming gate 191. The third OP is blocked by gate 186, but sets flip-flop 185 to 1, arming gate 186. The fourth OP is transmitted through gates 186, 191 and 192 to the output terminal 193. The fourth OP, from the output of gate 192, is also transmitted through diode 194 and mixing amplifier 195 to the output terminal 196. The fourth OP also resets flip-flops 185 and 190 to 0, thereby closing gates 186 and 191, and restoring the above circuit to its initial state.

It will be seen that flip-flops 185 and 190, and their related gates 186 and 191 constitute a two-stage binary counter of the type shown in Fig. 30 and, therefore, produce an output pulse in response to each fourth input pulse. It will also be seen that each fourth OP is transmitted to output terminals 193 and 196 (Fig. 43). The circuits, hereinafter described, that receive the fourth OP, respond only to that OP and it is therefore unnecessary to provide circuitry for blocking the eighth, twelfth and subsequent OP's whose numbers are multiple of four. Since a large number of circuits receive the various outputs from the Pattern Generator, each of its output terminals will be identified only by a reference numeral, and that reference numeral will be employed to identify the corresponding input terminal of each receiving circuit, hereinafter described.

The fifth OP is separately transmitted by the Pattern Generator during non-decimal arithmetic operation, as follows. It is recalled that gate 191 is armed by flip-flop 190 in response to the third OP and transmits the fourth OP. The output of gate 191, in addition to being connected to the input of gate 192, is connected by a lead 197 to the input of a gate 200 that is armed by the 0 side of a flip-flop 201. The latter flip-flop normally stands at 0, each CP–5 being applied to its reset input; therefore, gate 200 is normally armed. The output of gate 200 is connected to the set input of a flip-flop 202 that normally stands at 0. The 1 side of flip-flop 202 arms a gate 203, the input of which is connected by a lead 187 and by lead 184 to the output of the mixing amplifier 183. The output of gate 203 is connected directly to a terminal 204, and is connected through a diode 205 and the mixing amplifier 195 to the output terminal 196. The output of gate 203 is also connected to the reset input of flip-flop 202 and to the set input of flip-flop 201. The fourth OP, which is transmitted from the output of gate 191, passes through gate 200 and sets flip-flop 202 to 1, thereby arming gate 203. The fifth OP passes through gate 203 to terminal 204, from the output of gate 203, the fifth OP also (1) passes through diode 205 and amplifier 195 to terminal 196, (2) resets flip-flop 202 to 0 for closing gate 203, and (3) sets flip-flop 201 to 1 for closing gate 200. It is seen from the above description that terminal 196 receives both the fourth and fifth OP's during non-decimal operations. The circuits to which terminal 196 is connected respond to only the fourth OP, and no misoperation occurs when they receive the fifth OP. It will be shown hereinafter that the fourth OP, which must be transmitted from terminal 196 during both arithmetic and sequencing operations, is received during sequencing operations, from the output of gate 203, rather than from the output of gate 192 as in arithmetic operations. It is therefore necessary to connect the output of gate 203 to terminal 196, as shown and described.

*Decimal arithmetic operations.*—During decimal arithmetic operations, the fourth OP is transmitted by the Pattern Generator from the output terminal 196, and the fifth OP is transmitted from the output terminal 204, in the manner hereinbefore described in relation to non-decimal arithmetic operations. In addition, the Pattern Generator transmits pulse patterns representing the respective digit sequences 0110, 0001, and 1000. Referring again to Fig. 43, a flip-flop 210 has its reset input connected to an output terminal 975 from Code Counter "A" (Fig. 77) and to the Start Pulse Bus (Figs. 33 and 34). By means hereinafter described, a pulse from one or the other of the above two sources resets flip-flop 210 (Fig. 43) to 0 in preparation for all operations except decimal arithmetic operations. The set input of flip-flop 210 is connected to an output terminal 988 from Code Counter "A" (Fig. 77). In preparation for a decimal arithmetic operation, a pulse from terminal 988 sets flip-flop 210 (Fig. 43) to 1, as hereinafter described.

A pulse pattern representing the digit sequence 0110 is generated as follows. The 1 side of flip-flop 210 arms a first gate 211 which receives its input from the output of mixing amplifier 183. The output of gate 211 is connected to the input of gate 212 that is armed by the 0 side of flip-flop 185. The output of gate 212 is connected to the symmetrical input of a flip-flop 213 that normally stands at 0, each CP–5 being applied to its reset input. The 1 side of flip-flop 213 arms a gate 214, the input of which is connected to the output of gate 211. The output of gate 214 is connected to an output terminal 215. Since flip-flop 210 stands at 0 during decimal arithmetic operations, gate 211 is armed and the entire OP train and CP–1 to 4 pass through that gate to the inputs of gates 212 and 214. It is recalled that flip-flop 185 initially stands at 0, and is reset to 0 by each even-numbered OP as well as by CP–2 and CP–4; therefore, gate 212 passes the first OP and all subsequent odd-numbered OP's, as well as CP–1 and CP–3. The first OP passes through gate 212 and sets flip-flop 213 to 1, thereby arming gate 214. The second OP is blocked by gate 212 and flip-flop 213 remains set to 1. The second OP, however, passes through gate 214 to the output terminal 215. Since flip-flop 213 remains set to 1, gate 214 remains armed, and the third OP also passes through gate 214 to output terminal 215. The third OP, however, passes through gate 212 and resets flip-flop 213 to 0, thereby closing gate 214. The fourth OP is blocked by gate 212 but resets flip-flop 185 to 0 for arming gate 212. It is seen that after the fourth OP, flip-flops 185 and 213 stand at 0, gate 212 armed, and gate 214 is closed, this being the initial condition of the circuits. Therefore, the pulse pattern which is produced at terminal 215 in response to the first four OP's, and which represents the digit sequence 0110, is repeated throughout the cycle of operation of the Pattern Generator.

A pulse pattern representing the digit sequence 0001 is generated as follows. The output of gate 212, in addition to being connected to the symmetrical input of flip-flop 213, is also connected to the input of a gate 216 that is armed by the 0 side of flip-flop 190. The output of gate 216 is connected to an output terminal 217. It is recalled that an output pulse from gate 212 occurs in response to each odd-numbered OP, and in response to CP–1 and CP–3. It is further recalled that flip-flop 190 initially stands at 0, and is reset to 0 in response to each fourth OP, and in response to CP–4. Therefore, the first OP in each group of four OP's, as well as CP–1, passes through gate 216 to the terminal 217, thereby producing at that terminal an output pulse pattern which represents the repetitive digit sequence 0001.

A pulse pattern representing the digit sequence 1000 is produced by the Pattern Generator in the following manner. The output of gate 191, in addition to being connected to the inputs of gates 192 and 200, is also connected by a lead 218 to the input of a gate 220 that is armed by the 1 side of flip-flop 210. The output of gate 200 is connected directly to an output terminal 221, and is connected through a delay line 222 to an output terminal 223. It is recalled that gate 191 produces an output pulse in response to each fourth OP and in response to CP–4, and that flip-flop 210 is in its 1 state during decimal arithmetic operations. Therefore, during such operations, each fourth OP and CP–4 from the output of gate 191 are transmitted through lead 218 and the armed gate 220 to terminal 221. From the output of gate 220, these pulses are also transmitted through delay line 222 to terminal 223. Thus, the output pulse train from terminal 221 represents the repetitive digit sequence 1000, and the output pulse train from terminal 223 represents the same digit sequence, delayed.

*Sequencing operations.*—During sequencing operations, the fourth OP and a digit sequence comprising three 0's followed by the repeated sequence 100, are produced by the Pattern Generator. Referring again to Fig. 43, the fourth OP is separately transmitted in the following manner. It is recalled that flip-flop 210 stands at 0 during sequencing operations, therefore, gate 211 and 220 are closed and the output pulses from the mixing amplifier 183 are applied only to lead 184. This lead, it is recalled, is connected to the symmetrical input of flip-flop 185, to the input of gate 186 which is armed by the 1 side of flip-flop 185, and to lead 187. In turn, lead 187 is connected to the input of a gate 230 that is armed by the 0 side of flip flop 190. The output gate 230 is connected to the input of a gate 231 that is armed by the 1 side of flip-flop 193. It is recalled that flip-flop 193 stands at 0 during all arithmetic operations. In preparation for sequencing operations, a pulse is applied to the set input terminal of flip-flop 193 from an output terminal 867 of the Sequencer (Fig. 74), thereby setting flip-flop 193 (Fig. 43) to 1 and arming gate 231. The output of gate 231 is connected through a delay line 232 to the set input of flip-flop 185.

The first OP is blocked by gate 186, but sets flip-flop 185 to 1, thereby arming gate 186. The first OP also passes through the normally armed gates 230 and 231, and through delay line 232, to the set input of flip-flop 185, but since the latter flip-flop is already set to 1, it is not affected by this pulse. The second OP passes through gates 186 and 230, and resets flip-flop 185 to 0, thereby closing gate 186. From the output of gate 186, the second OP is blocked by gate 191 but sets flip-flop 190 to 1, thereby arming gate 191 and closing gate 230. From the output of gate 230, the second OP passes through gate 231 and delay line 232 and sets flip-flop 185 back to 1, thereby reopening gate 186. The third OP passes through gate 186 but resets flip-flop 185 to 0, thereby closing gate 186. From the output of gate 186, the third OP is blocked by gate 230 and passes through gate 191, but resets flip-flop 190 to 0, thereby arming gate 230 and closing gate 191. From the output of gate 191, the third OP passes through lead 197 and the normally armed gate 200 to the set input of flip-flop 202, thereby setting the latter flip-flop to 1 for arming gate 203. The fourth OP is blocked by gate 186 but resets flip-flop 185 to 1, thereby opening gate 186. The fourth OP also passes through lead 187, gates 230 and 231, and delay line 232 to the set input of flip-flop 185 which is already set to 1. The fourth OP on lead 187 also passes through gate 203, diode 205 and amplifier 195 to the output lead 196. The fourth OP from the output of gate 203 also resets flip-flop 202 to 0, thereby closing gate 203, and sets flip-flop 201 to 1, thereby closing gate 200. The fourth OP from the output of gate 203 is further applied to the output terminal 204 but is not employed by any circuit that is connected to that terminal. However, no misoperation results from transmitting the fourth OP from terminal 204; therefore, no means is provided for blocking that pulse. Since gate 200 is closed by the fourth OP from the output of gate 203, and is not re-armed until flip-flop 201 is reset to 0 by the next CP–5, flip-flop 202 cannot be set to 1 until the next word interval, and gate 203 remains closed. Therefore, only the fourth OP during each word interval is transmitted from the output terminal 196.

The Pattern Generator produces a digit sequence comprising three 0's followed by the repeated sequence 100 during sequencing operations, in the following manner. The output of gate 191, which is armed by the 1 side of flip-flop 190, is connected through lead 218 and a lead 233 to the input of a multiple-control gate 234 that is armed jointly by the 1 side of flip-flop 193 and the 1 side of a flip-flop 235. The output of gate 234 is connected to an output terminal 236. Flip-flop 235 normally stands at 0, each CP–5 being connected to its reset input. The output of gate 191 is connected through lead 218 and a lead 237 to the set input of flip-flop 235. It is recalled that during sequencing operations, an output pulse is transmitted from gate 191 in response to the third OP but not in response to the first or second OP. The third OP from the output of gate 191 is transmitted through leads 218 and 233, and is blocked by gate 234. The third OP from the output of gate 191 also passes through leads 218 and 237 to the set input of flip-flop 235, thereby setting the latter flip-flop to 1 for fully arming the multiple-control gate 234. It is also recalled that following the third OP, flip-flop's 185 and 190 both stand at 0, so that gates 196 and 191 are closed, and gate 230 is armed. The following Table XVIII recapitulates the state of each flip-flop 185, 190 and 235, and gates 186, 191, 230 and 234 following each of the first three OP's, and further shows the state of each of these elements following each subsequent OP through the sixth OP. Table XVIII also indicates an output digit of 0 from terminal 236 in response to each OP that does not pass through gate 234, and indicates an output digit of 1 from terminal 236 in response to each OP that does pass through gate 234.

*Table XVIII*

| OP's | Flip-Flops | | | 186 | 191 | 230 | 234 | Output 236 |
|---|---|---|---|---|---|---|---|---|
| | 185 | 190 | 235 | | | | | |
| Initial state | 0 | 0 | 0 | Closed | Closed | Armed | Closed | ----- |
| 1 | 1 | 0 | 0 | Armed | do | do | do | 0 |
| 2 | 1 | 1 | 0 | do | Armed | Closed | do | 0 |
| 3 | 0 | 0 | 1 | Closed | Closed | Armed | Armed | 0 |
| 4 | 1 | 0 | 1 | Armed | do | do | do | 0 |
| 5 | 1 | 1 | 1 | do | Armed | Closed | do | 0 |
| 6 | 0 | 0 | 1 | Closed | Closed | Armed | do | 1 |

It will be seen from XVIII that the output gate 234 is first interrogated by the third OP which is blocked by that gate, representing a digit 0. However, the third OP also sets flip-flop 235 to 1, arming gate 234 which then remains armed during the rest of the word interval until flip-flop 235 is reset to 0 by the next CP–5. It is also seen that each subsequent OP whose number is divisible by three, i.e., each of the sixth, ninth, etc. OP's, interrogates gate 234 and passes through that gate to the output terminal 236, thereby representing a digit 1. Therefore, the total output pattern from terminal 236 during a word interval represents three 0's followed by the repeated sequence 100.

TRANSFER SECTION

*In general.*—Referring to Fig. 33, the Transfer Section performs and controls the intertransfer of words between the various transducing heads in Memory 100 and the Transfer Busses. It includes the sixty-four Read-Write Amplifiers 240(0) to 240(63), a respective one of which cooperates with the Read-Write Head 110 that is associated with each Information Band of Memory. Each word that is read from a selected Information Band of Memory is amplified by its related Read-Write Amplifier and is transmitted thereby to the previously mentioned Interpreter 270. The Interpreter is provided for identifying each signal from the Read-Write Amplifiers, and for establishing the correct time relationship between that signal and a continuous train of clock pulses from the Clock Pulse Generator 120. The words that are transmitted by the Read-Write Amplifiers to the Interpreter are in the form, previously described, wherein a pulse occurs only when the values of two successive digits are different. The Interpreter converts this form of word representation into another form wherein each digit is represented by a separate pulse. The time-corrected digits in their new form are transmitted by the Interpreter to the 0's and 1's Transfer Busses.

The Transfer Section also includes the Sector Read Amplifier 260 which receives the output of the Sector Track of Memory from the Sector Head 110(65) and transmits this output to the Interpreter 270. The Read Control Circuit 300 selectively enables the Sector Read Amplifier 260 at times when no word is being read from an Information Band of Memory. The Write Control Circuit 320 receives words from the Transfer Busses, whereon each digit is represented by a separate pulse, and converts these words into the form wherein a flip-flop changes state only when the values of two successive digits are different. The converted words are transmitted by the Write Control Circuit to all of the Read-Write Amplifiers, and a selected one of the Read-Write Amplifiers energizes its related Read-Write Head for writing the word in Memory. The selection of a Read-Write Amplifier for reading or writing, and the initiation of a reading or writing operation, are controlled by the Address Section and the Control Section, hereinafter described.

*Read-Write Amplifiers.*—Each of the previously described Read-Write Heads 110(0) to 110(63) (Fig. 39) receives its writing signal from a respective Read-Write Amplifier 240(0) to 240(63), an example of which is shown in Fig. 44. Each end of the magnetizing coil 113 of the Read-Write Head 110 is connected to the anode of a respective triode multiple-control gate 241(0) to 241(1), shown as the two sections of a twin triode. Both gates 241(0) and 241(1) are normally closed, the grid of each gate being connected through a respective resistor 242(0) or 242(1) to a common bias lead 245. Lead 245 is connected through a diode 246 and an input terminal 818 to a corresponding output terminal of the Band Counter (Fig. 70) in the Address Section, hereinafter described. Lead 245 is also connected through a resistor 247 and an input terminal 827 to a corresponding output terminal of the Band Group Counter (Fig. 71) in the Address Section. It will be shown that when a particular Read-Write Amplifier has been selected by the Band Counter and the Band Group Counter, both of its input terminals 818 and 827 (Fig. 44) are at a relatively high potential and that at all other times at least one terminal 818 or 827 is at a relatively low potential. Therefore, lead 245 is at a relatively low potential at all times except when there has been a selection of the particular Read-Write Amplifier 240(0) to 240(63). When a Read-Write Amplifier has been selected, its lead 245 is at a relatively high potential, thereby arming both of its gates 241(0) 241(1).

After a Read-Write Amplifier has been selected, thereby arming its related gates 241(0) and 241(1), each of a series of information signals is applied to the grid of one gate or the other, according to the values of the successive digits in the word which is to be written in Memory (Fig. 35). In order to write one or more successive digits 0, a relatively highly potential is applied through an output terminal 334(0) (Fig. 44) of the Write Control Circuit (Fig. 49), hereinafter described, and through a diode 244(0) (Fig. 44) to the grid of section 241(0), causing that section to conduct and thereby causing anode current to flow from +B through the lefthand section of winding 113. Similarly, in order to write one or more successive digits 1, a relatively high potential is applied through an output terminal 234(1) of the Write Control Circuit (Fig. 49) and a diode 244(1) (Fig. 44) to the grid of section 241(1), causing that section to conduct and thereby causing anode current to flow from +B through the righthand section of winding 113.

Except during a writing operation, the magnetic pattern on each Information Band of Memory continuously energizes the winding 113 on its related Read-Write Head 110. The signals induced on winding 113 in this manner are resisitively coupled to one end of winding 113 to the grid input of a class A triode amplifier 252. The anode output of amplifier 252 is capacitively coupled to the grid input of a cathode follower 254 which is normally biased well below conduction, its grid being connected through a resistor 255 to the previously described bias lead 245. When the proper Read-Write Amplifier has been selected, and lead 245 is therefore at its high potential, cathode follower 254 is biased to conduction and the signals applied to its grid input are transmitted through its cathode and an output terminal 256 to the Interpreter (Fig. 46).

*Sector Read Amplifier.*—Referring to Fig. 42, it is recalled that the signals induced on winding 113 of the Sector Head 110(65) are transmitted from one end of winding 113 through a cathode follower 161 and a terminal 162 to the Sector Read Amplifier. Referring to Fig. 45, the signals received by the Sector Read Amplifier at terminal 162 are resistively coupled. The anode of amplifier 262 is capacitively coupled to the grid input of a cathode follower 264 which is normally biased to conduction, its grid being connected through a resistor 265 and an input terminal 315 to a corresponding output terminal of the Read-Control Circuit (Fig. 48). At all times except during the reading of a word from an Information Band of Memory (Fig. 35), terminal 315 (Fig. 45) is at a relatively high potential, biasing cathode follower 264 to conduction, and the signals that are applied to the grid input of cathode follower 264 are transmitted through its cathode to an output terminal 256. The latter terminal is common with the output terminal 256 in each of the Read-Write Amplifiers 240(0) to 240(63) (Fig. 44), and is connected ot the input of the Interpreter (Fig. 46).

*Interpreter.*—It has been shown that a change from 0 to 1, or vice versa, as between two successive digital values in a Memory Band (Figs. 33 and 35 to 38) is represented by a reversal of magnetic state from one region of saturation to the other. It has also been shown that the signal output from a Read-Write Head comprises the derivative of the written signal, i.e., a positive pulse when and only when there is a change from 0 to 1 as between the digit stored in two consecutive cells of the related Memory Band, and a negative pulse when and only when there is a similar change from 1 to 0. However, it has been shown that words on the Transfer Busses appear in the form of one pulse for each digit 0 to 1, rather than one pulse for each change in value. The Interpreter is provided for receiving the first form of signals from Memory, and for converting them to equivalent signals of the second form for transmission to other circuits through the Transfer Busses.

If uniform signals are available from Memory, the converting process may be performed quite simply. Such uniform signals are available, for example, when the Memory Band which is being read contains a regular pattern such as alternate 0's and 1's. However, the Information Bands and the Sector Track contain randomly arranged 0's and 1's, and it has been found that a positive output pulse from a Read-Write Amplifier, or from the Sector Read Amplifier may have any of the forms shown in Fig. 47, and that a negative pulse may be similarly shaped although opposite in polarity. Each of the five pulses shown in Fig. 47 represents a change in the recorded value at a time corresponding to the center one of the three clock pulses shown. It will be seen that information pulses III, IV and V are of such duration that they might be mistaken as having occurred in coincidence with the first or third clock pulse, rather than the second clock pulse, thereby erroneously changing the value of the output word from Memory. Pulses II to V might be accurately interpreted by detecting only the top part of each pulse, i.e., only that part of the pulse which occurs entirely between the first and third clock pulses. It will be seen, however, that information pulse I, which is a type that occurs at the output of a Read-Write Amplifier or the Sector Read Amplifier when the value in the related Memory Band is alterntaing between 0's and 1's, is of relatively low amplitude and would not be detected at all if only the tops of the pulses were detected. Therefore, means must be provided for interpreting all of the possible shapes of output pulses from the Read-Write Amplifiers, and for converting them to uniform and properly timed pulses. The Interpreter 270, which is shown in Fig. 46, performs the necessary shaping and timing functions, as follows.

The output terminal 256 of each Read-Write Amplifier 240(0) to 240(63) (Fig. 44), and of the Sector Read Amplifier 260 (Fig. 45), is connected to an input lead 271 of the Interpreter (Fig. 46). It is recalled that at all times, signals are transmitted either from the output terminal 256 of the Sector Read Amplifier (Fig. 45), or from the output terminal 256 of a selected one of the Read-Write Amplifiers (Fig. 44). It is further recalled that when an Information Band of Memory is selected, the normally non-conducting cathode follower 254 (Fig. 44) of the related Read-Write Amplifier is biased to conduction, and when no Information Band is selected, cathode follower 264 (Fig. 45) of the Sector Read Amplifier is biased to conduction. Therefore, one of the sixty-five cathode followers 254 or 264 that are connected to the common output terminal 256 (Fig. 46) is always conducting, and the potential of terminal 256, as well as the potential of the input lead 271 of the Interpreter (Fig. 46), is maintained at a substantially constant reference level.

The input lead 271 of the Interpreter is connected to the input of a phase inverter 272. A typical read signal is shown at the input of phase inverter 272, and comprises a leading negative pulse and a trailing positive pulse. The negative pulse indicates a change from 0 to 1 of the digit value in the selected Memory Band, and the positive pulse indicates a subsequent change from 1 to 0 of that value, one or more digits later. Although a change of digit value from 0 to 1 has been previously been described as producing a positive output pulse from a Read-Write Head 110 (Figs. 39 and 44), amplifier 252 of each Read-Write Amplifier (Fig. 44) inverts the reading signal, and cathode follower 254 (Fig. 46) does not re-invert the signal; therefore, a negative pulse at the input of the Interpreter indicates a change in digit value from 0 to 1.

The inverted output from phase inverter 272 is transmitted through an amplifier 273 which again inverts the signal to produce a positive pulse for each change in value from 1 to 0. The uninverted output from phase inverter 272 is transmitted through an amplifier 274 which inverts its input signal to produce a positive pulse output for each change in the value from 0 to 1. The outputs of amplifiers 273 and 274 are employed controlling the transmission pulses to the 0's and 1's Transfer Busses. The circuit for transmitting pulses to the 0's Transfer Bus is substantially identical to the circuit for transmitting pulses to the 1's Transfer Bus, and only the former will be described in detail.

The output of amplifier 273 is connected to the input of a Schmidt trigger 275, and the output of amplifier 274 is connected to the input of a Schmidt trigger 276. Trigger 276 is biased to produce a negative output pulse in response to only that portion of each negative input pulse which has an absolute value of amplitude greater than lines "*a*" in Fig. 47, while trigger 274 (Fig. 46) is biased to produce a positive input pulse in response to that portion of each positive pulse lined above lines "*b*" in Fig. 47. Therefore, if a negative input pulse has a absolute value of amplitude greater than line "*a*," trigger 276 (Fig. 46) produces a negative output pulse having a width equal to the width of that portion of the input pulse which lies above line "*a*" (Fig. 47). Trigger 275 (Fig. 46) produces a positive square output pulse having a width equal to the width of each positive input pulse at line "*b*" (Fig. 47). The pulse output from trigger 275 (Fig. 46) arms a gate 277; the normal output from trigger 276 partially arms the multiple-control gate 278; and the negative pulse output from trigger 276 closes gate 278 for the duration of the pulse, if the latter gate is open. Gate 278 is also armed by the 1 side of a flip-flop 279 that normally stands at 0, each CP–3 being applied to its reset input. The inputs of gate 277 and 278 are connected to the output terminal 135 of the Clock Pulse Generator (Fig. 40) through an amplifier 281 (Fig. 46), a delay line 282, and an amplifier 283. It is desirable for each clock pulse to interrogate gates 277 and 278 at substantially the middle of each output pulse from trigger 275. To accomplish this, there must be taken into consideration an inherent delay of each reading signal in the Read-Write Amplifier (Fig. 44) and in the input section of the Interpreter 270 (Fig. 46). Therefore, delay line 282 is provided for delaying each clock pulse long enough to make it coincide substantially with the center of the corresponding output pulse from trigger 275. The output of gate 277 is connected to the set input of flip-flop 279, and the output of gate 278 is connected to the reset input of flip-flop 279, and to the reset input of a flip-flop 284 which normally stands at 0, each CP–5 being connected to its reset input. Gate 277 and flip-flop 279 are employed for selecting the one delayed clock pulse which corresponds to the center of each information pulse representing a change in band value from 1 to 0. Gate 278 is employed for transmitting the succeeding clock pulse to the reset input of flip-flop 284, which then controls the transmission of succeeding OP's to the 0's Transfer Bus until the band value subsequently changes from 0 to 1.

It is recalled that the input signals to the Interpreter are delayed part of a digit interval by the Read-Write Amplifiers, so that each input signal to the Interpreter is part of a digit interval behind its corresponding clock pulse. An additional delay of a full digit interval occurs in the Interpreter before flip-flop 284 is reset to 0 as described above. Therefore, reset pulses applied to flip-flop 284 are delayed more than one, and less than two digit intervals. By employing OP's for reading out flip-flop 284, as described above, the reading signal is delayed exactly two digit intervals, and the word pulse transmission to the 0's Transfer Bus is two full digit intervals behind the corresponding clock pulses. To compensate for this delay, words are written in Memory two full digit intervals ahead of their corresponding clock pulses in a manner hereinafter described; therefore, the output from the Interpreter is correctly timed with the OP trains.

A gate 285 is armed by the 0 side of flip-flop 284 and has its output connected through an amplifier 287 to the 0's Transfer Bus. A gate 286 is armed by the 1 side of flip-flop 284 and has its output connected through an amplifier 288 to the 1's Transfer Bus. During a reading operation, each CP–6 (which is synchronous with the sign digit pulse on the 1's Transfer Bus), and each train of OP's are applied to the inputs of gates 285 and 286 from an output terminal 312 of the Read Control Circuit (Fig. 48), hereinafter described.

The operation of the 0's section of the Interpreter will be described in relation to the five possible shapes of pulses which may be applied to the inputs of Schmidt triggers 275 and 276. Information pulse I (Fig. 47) is a thin pulse of low amplitude. Therefore, trigger 276 (Fig. 46) does not respond to this pulse, but trigger 275 does respond and produces a square output pulse which arms gate 277. The clock pulse preceding the center of the information pulse, hereinafter referred to as the "first" of the three clock pulses related to each information pulse, is blocked by gates 277 and 278. The second clock pulse, i.e., that clock pulse which is substantially coincident with the center of the Information pulse, is transmitted through the armed gate 277 for setting flip-flop 279 to 1, thereby partially arming gate 278. Since there is no output from trigger 276 to close gate 278, that gate is fully armed when flip-flop 279 is set to 1 in response to the second clock pulse, but the inherent switching time of the flip-flop prevents gate 278 from being armed in time to pass the second clock pulse. The third clock pulse is blocked by gate 277 and is transmitted through gate 278, resetting flip-flop 279 to 0 for closing gate 278, and resetting flip-flop 284 to 0 if the latter does not already stand at 0. Therefore, subsequent OP's from the output terminal 312 of the Read Control Circuit (Fig. 48) are transmitted through gate 285 (Fig. 46) and amplifier 287 to the 0's Transfer Bus until flip-flop 284 is set to 1 in a manner hereinafter described.

Information pulse II (Fig. 47) is of short duration and high amplitude, and energizes both triggers 275 and 276 (Fig. 46) during a time which includes the occurrence of the second clock pulse, thereby arming gate 277 and closing gate 278 during that time. However, neither of these gates is armed at the time it receives the first of the three related clock pulses, and that clock pulse is blocked by both gates. The second clock pulse is transmitted through gate 277 for setting flip-flop 279 to 1 and partially arming gate 278, which is maintained closed by the negative pulse from trigger 276. By the time the third clock pulse is applied to gate 277, the latter gate is closed. However, the third clock pulse is transmitted through gate 278, which is reopened by the termination of the pulse from trigger 276, and resets flip-flop 279 to 0 for closing gates 278. The output pulse from gate 278 also resets flip-flop 284 to 0 if the latter does not already stand at 0. Thereafter, OP's from the output terminal 312 of the Read Control Circuit (Fig. 48) are transmitted through gate 285 (Fig. 46) and amplifier 287 to the 0's Transfer Bus until such time as flip-flop 284 is set to 1.

Information pulse II (Fig. 47) is of long duration and high amplitude. It rises above both potential levels "*b*" and "*a*" after the first and before the second clock pulse, then falls below level "*a*" between the second and third clock pulses, and finally falls below level "*b*" after the third clock pulse. Therefore, pulse III energizes trigger 276 (Fig. 46) to produce an output pulse having a width which encompasses only the second of the three clock pulses. Pulse III also energizes trigger 275 to produce an output pulse having a width which encompasses both the second and third clock pulses. The first of the three related clock pulses is blocked by both gates 277 and 278. The second clock pulse is transmitted through gate 277, thereby setting flip-flop 279 to 1 and partially arming gate 278, but the output pulse from trigger 276 maintains gate 278 closed during the second clock pulse. The third clock pulse is transmitted through gate 278 which is fully armed upon termination of the output pulse from trigger 276, and the third clock pulse is therefore applied to the reset inputs of flip-flops 279 and 284, as hereinbefore described. The third clock pulse is also transmitted through gate 277 to the set input of flip-flop 279. The pulses simultaneously applied to the reset and set inputs of flip-flop 279 operate as a symmetrical input and reverse flip-flop 279 to its 0 state, thereby closing gate 278. Subsequent OP's are thereafter transmitted through gate 285 and amplifier 287 to the 0's Transfer Bus until such time as flip-flop 284 is set to 1.

Information pulse IV (Fig. 47) is also of long duration and high amplitude. It rises to potential level "*b*" before the first of the three related clock pulses, then rises above level "*a*" before the second clock pulse, and finally falls below both levels "*a*" and "*b*" before the third clock pulse. Information pulse IV therefore energizes trigger 276 (Fig. 46) to produce an output pulse having a width which encompasses only the second clock pulse, and energizes trigger 275 for producing an output pulse having a width which encompasses both the first and second clock pulses. The first clock pulse is blocked by gate 278, but is transmitted through gate 277, thereby setting flip-flop 279 to 1 for fully arming gate 278, which is already partially armed by the normal output from trigger 276 during the first clock pulse. The second clock pulse is also transmitted through gate 277, but has on effect on flip-flop 279 which already stands at 1. The second clock pulse is blocked by gate 278 which is closed by the output pulse from trigger 276. The third clock pulse is blocked by gate 277, but is transmitted through gate 278 to the reset input of flip-flop 279, thereby closing gate 278. The output pulse from gate 278 is also transmitted to the reset input of flip-flop 284, causing subsequent OP's to be transmitted to the 0's Transfer Bus until flip-flop 284 is subsequently set to 1.

Information pulse V (Fig. 47 )is of long duration and high amplitude. It rises above potential level "*b*" prior to the first of the three related clock pulses, then rises above level "*a*" prior to the second pulse, then falls below level "*a*" prior to the third clock pulse, finally falls below level "*b*" subsequent to the third clock pulse. Information pulse V, therefore, energizes trigger 276 (Fig. 46) to produce an output pulse having a width which encompasses only the second of the three related clock pulses, and energizes trigger 275 for producing an output pulse which has a width encompassing all three of the related clock pulses. The first clock pulse is blocked by gate 278, but is transmitted through gate 277, thereby setting flip-flop 279 to 1 for arming gate 278. The second pulse is blocked by gate 278, which is closed by the output pulse from trigger 276, but is transmitted through gate 277 to the set input of flip-flop 279 which already stands at 1. The third clock pulse is transmitted simultaneously through gates 277 and 278 to apply both a set and reset pulse to flip-flop 279, thereby reversing the latter to 0 in the manner hereinbefore described. The pulse output from gate 278 also resets flip-flop 284 to 0; therefore, subsequent OP's are transmitted to the 0's Transfer Bus until such time as flip-flop 284 is set to 1.

Flip-flop 284 is set to 1 in response to each pulse from the Read-Write Amplifiers which signifies a change in the band value from 0 to 1. The circuit for setting flip-flop 284 to 1 is substantially identical to the circuit previously described for resetting that flip-flop to 0, and includes a pair of Schmidt triggers 290 and 291 which are biased, respectively, to respond to that part of an information pulse which lies above potential levels "*a*" and "*b*" (Fig. 47). The output of the previously described amplifier 273 (Fig. 46) is connected to the input of trigger 290, and the output of amplifier 274 is connected to the input of trigger 291. The clock pulse output from amplifier 281, delay line 282 and amplifier 283 is applied to a gate 292 which is armed by the output of trigger 291. The output of gate 292 is connected to the set input of a flip-flop 293 which normally stands at 0, each CP–3 being applied to its reset input. The clock pulse output from amplifier 283 is also applied to the input of a multiple-control gate 294 which is armed by the 1 side of flip-flop 293. The output of gate 294 is connected to the reset input of flip-flop 293 and to the set input of the previously described flip-flop 284. Each information pulse representing a change from 0 to 1 of the band digit is operated upon by triggers 290 and 291, flip-flop 293, and gates 292 and 294 in the manner hereinbefore described, and sets flip-flop 284 to 1; therefore, subsequent OP's are transmitted through gate 286 and amplifier 288 to the 1's Transfer Bus until the next change in value of the band digit causes flip-flop 284 to be reset to 0.

In summary, the Interpreter identifies the proper time position of each information pulse and then employs that pulse for controlling the transmission of subsequent 0's or 1's pulses to the Memory Busses until a next information pulse is received. The time position of each information pulse is identified by detecting the amplitude of the pulse during each digit interval embraced by the pulse. If the pulse has more than a predetermined amplitude during a first digit interval, its timing is conditionally identified with the clock pulse occurring during that digit interval. If the information pulse is subsequently found to have more than a second, and higher, predetermined amplitude during the second digit interval, the first identification is ignored, and the pulse is re-identified with the next clock pulse. If the information pulse does not have the higher minimum amplitude during the second digit interval, the first identification is maintained. It will be seen that the above principle of multiple sampling of the signal can be extended to testing for "*n*" minimum amplitudes during a corresponding "*n*" successive digit interval, and ultimately identifying and timing of the information pulse with the clock pulse occurring during the digit interval in which the greatest amplitude is detected.

*Read Control Circuit*.—The Read Control Circuit 300 (Fig. 33) is provided for selectively enabling the Sector Read Amplifier 260 and for selectively reading out the Interpreter 270 onto the Transfer Busses.

Referring to Fig. 48, the Read Control Circuit includes a flip-flop 301 that normally stands at 0, each CP–1 being applied to its reset input terminal. Each CP–6 and each OP train are applied to the input of a gate 302 that is armed by the 0 side of flip-flop 301. Each CP–6 and the signals from an output terminal 612 of the "D" Register (Fig. 60), hereinafter described, are applied to the input of a gate 303 (Fig. 48) that is armed by the 1 side of flip-flop 301. Each CP–5 is applied to the input of a gate 304 that is armed by the Code Distributor (Fig. 81), and the output of gate 304 (Fig. 48) is connected to the set input of flip-flop 301. In the accompanying drawings, each gate that is armed by the Code Distributor has its arming terminal designated "CD."

The outputs of gates 302 and 303 are joined and are connected through the input of a gate 307 that is armed either by the 1 side of a flip-flop 308, or by the Sequencer (Fig. 74) during sequencing phase 3. In the accompanying drawings, each gate that is armed by the Sequencer during a particular sequencing phase has its arming terminal designated "SP–*n*," where "*n*" is the number of the sequencing phase. Flip-flop 308 (Fig. 48) normally stands at 0, each CP–1 being applied to its reset input. This flip-flop may also be reset to 0 through an output terminal 336 of the Write Control Circuit (Fig. 49) or by CP–3 applied through a gate 306 that is armed by the Code Distributor. Flip-Flop 308 may be set to 1 either through an output terminal 881 of the Sequencer (Fig. 74) or through an output terminal 937 of the Timing Generator (Fig. 74). The output of gate 307 (Fig. 48) is connected through an output terminal 312 to the Interpreter (Fig. 46), as hereinbefore described. The 0 side output terminal of flip-flop 308 (Fig. 48) is connected through a cathode follower 313 to the arming terminal of a gate 314. The input of gate 314 is connected to a source +C of bias potential and the output of gate 314 is connected through an output terminal 315 to the Sector Read Amplifier (Fig. 45), as hereinbefore described.

Since flip-flop 308 (Fig. 48) normally stands at 0, gate 314 is normally armed, thereby applying +C potential through the output terminal 315 to the Sector Read Amplifier (Fig. 45) for enabling the latter. Since flip-flop 301 (Fig. 48) normally stands at 0, gate 302 is normally armed and transmits each CP–6 and each OP train to the input terminal of gate 307. Although flip-flop 308 normally stands at 0 and therefore does not arm gate 306, the latter gate is armed by the Sequencer during SP–4, when a sector number reading operation occurs, as hereinafter described, and CP–6 and the OP train are transmitted through output terminal 312 (Fig. 48) to the Interpreter (Fig. 46) for reading out the sector numbers into the Transfer Busses. During the reading of an Information Band of Memory, flip-flop 308 (Fig. 48) is set to 1 through either terminal 881 or 937, thereby closing gate 314 and arming gate 307. When gate 314 is closed, the +C bias potential is removed from terminal 315 and the Sector Read Amplifier (Fig. 45) is disabled, and when gate 307 (Fig. 48) is armed, CP–6 and the OP train from the output of gate 302 are transmitted through terminal 312 to the Interpreter for reading out an information word from the selected Read-Write Amplifier (Fig. 44) onto the Memory Busses.

During certain operations, such as matching and deleting, hereinafter described, it is desirable to transmit CP–6 and the contents of the "D" Register (Fig. 60) through terminal 312 (Fig. 48) to the Interpreter (Fig. 46). For this purpose, gate 304 (Fig. 48) is armed by the Code Distributor and passes the next CP–5 for setting flip-flop 301 to 1, thereby arming gate 303. CP–6 and the contents of the "D" Register are then transmitted through gates 303 and 307 and terminal 312 to the Interpreter (Fig. 46).

*Write control circuit*.—The writing signals that are applied through terminals 334(0) and 334(1) (Fig. 44) of each Read-Write Amplifier are generated in the Write Control Circuit 320, shown in Fig. 49. The Write Control Circuit receives all 0's and 1's pulses which appear on the Transfer Busses, and during the Write Code converts these pulses into a word representation wherein only changes in digit value cause changes in the signal. The output signal from the Write Control Circuit is transmitted to each of the Read-Write Amplifiers 240(0) to 240(63).

The Write Control Circuit comprises a first flip-flop 321 which normally stands at 0, each CP–1 being applied to its reset input. During the Write Code, CP–3 is applied to the set input of flip-flop 321 through a gate 335 that is armed by the Code Distributor. The output of gate 336 is also transmitted to the Read Control Circuit (Fig. 48) through the previously described output terminal 336. The 1 side of flip-flop 321 arms a pair of gates 323 and 324 through a cathode follower 325. The 0's Transfer Bus is connected to the input of gate 323, and the 1's Transfer Bus is connected to the input of gate 324. The output of gate 323 is connected to the reset input of a second flip-flop 330, and the output of gate 324 is connected to the reset input of flip-flop 330. The 0 side and 1 side output terminals of flip-flop 330 are connected through respective cathode followers 331(0) and 331(1) to the inputs of a pair of gates 332(0) and 332(1), both of which gates are armed by the 1 side of flip-flop 321 through cathode follower 325. The output of gate 332(0) is connected through a cathode follower 333(0) to the 0's input terminal 334(0) of each Read-Write Amplifier 240(0) to 240(63) (Fig. 44). Similarly, the output of gate 332(1) (Fig. 49) is connected through a cathode follower 333(1) to the 1's input terminal 334(1) of each of the Read-Write Amplifiers (Fig. 44). Therefore, during the Write Code, the 0's and 1's pulses of a word from the Transfer Busses are transmitted through gates 323 and 324 (Fig. 49), respectively, setting or resetting flip-flop 330 in accordance with the values represented by the pulses. The resulting 0's and 1's outputs of flip-flop 330 are transmitted through cathode followers 331, gate 332 and cathode followers 333 to the 0's and 1's inputs 334 of all sixty-four of the Read-Write Amplifiers (Fig. 44), and the selected Read-Write Amplifier drives its related Read-Write Head (Fig. 35) to write the word in Memory, as hereinbefore described. At the beginning of each word interval, CP–1 resets flip-flop 321 (Fig. 49) to 0, and CP–3 resets flip-flop 330 to 0, thereby preparing these flip-flops for the receipt of a next word from the Transfer Busses, and closing gates 323, 324, 332(0) and 332(1).

ARITHMETIC SECTION

*In general.*—The Arithmetic Section is provided for receiving, storing, combining and transmitting operands during the various addressing and arithmetic operations of the computer. Referring to Fig. 33, the Sign Clipper 340 of the Arithmetic Section receives the 1's digits of input words from the 1's Transfer Bus. If a minus sign is associated with an input word, it is represented by a digit 1 pulse preceding the word, and if a plus sign is associated with the word, it is represented by a digit 0 pulse preceding the word. Each minus sign pulse is routed by the Sign Clipper to the Sign Control Circuit 460, where it is combined with other sign digits for controlling the additive or subtractive nature of arithmetic operations performed in the Arithmetic Section and/or for determining the signs of the results of those operations. All 1's pulses of an input word to the Arithmetic Section, subsequent to a minus sign pulse, are routed by the Sign Clipper to the Main Adder 360, and all 0's pulses of an input word to the Arithmetic Section from the 0's Transfer Bus, including a plus sign pulse, are entered directly into the Main Adder, the combined 0's and 1's input from the 0's Transfer Bus and from the Sign Clipper, respectively, constitute an "*x*" operand. A "*y*" operand may be received by the Main Adder from any of several sources, hereinafter described. Result words from the output of the Main Adder are transmitted to the Arithmetic Bus, either directly or through the "C" Register 400 and the Corrector Adder 420. The latter units are employed primarily for applying decimal correction values to the result words in the Main Adder during the decimal operations. The MA Sensing Circuit 440 is provided for sensing the condition of the Main Adder after an arithmetic operation, and for controlling other circuits in the computer in accordance with the results of such sensing. The MA Unit Input Circuit 500 is adapted for entering an extra value of 1 into the Main Adder in preparation for certain computer operations wherein the value of a word must be increased or decreased by unity.

The Arithmetic Section further includes three arithmetic registers, viz: the "A" Register 520, the "R" Register 550 and the "D" Register 600. These three registers are provided for receiving, storing and transmitting operands and results of arithmetic operations. The "R" Adder 580 cooperates with the "R" Register for adding or subtracting unity from the value standing in the "R" Register, under control of the Sign Control Circuit 460, when the contents of the "R" Register are circulated through the "R" Adder and back into the "R" Register during certain arithmetic operations such as multiplication. The "K" Register 620 is provided primarily for counting predetermined numbers of word intervals during addressing or arithmetic operations, and cooperates with the "K" Subtractor 650 which subtracts unity from the value standing in the "K" Register each time the contents of that register are circulated through the "K" Subtractor and back into the "K" Register. The KS Sensing Circuit 660 senses the condition of the "K" Subtractor during word counting operations, and controls other circuits in the computer in response to detection of a predetermined condition of the "K" Subtractor. The "T" Register 680 is provided for receiving words from, and transmitting words to an electric input-output device, such as the well-known "Flexowriter."

*Sign clipper.*—It is recalled that a minus sign which is associated with a word is represented on the Transfer Busses by a digit 1 during the digit interval immediately preceding the word. Since the Interpreter 270 (Fig. 33) generates either a 0 pulse or a 1 pulse during that digit interval, a plus sign is represented by a digit 0 during the same digit interval. Each plus sign pulse on the 0's Transfer Bus is entered directly into the Main Adder 360, hereinafter described, and each minus sign pulse on the 1's Transfer Bus is transmitted by the Sign Clipper 340 into the Sign Control Circuit 460, hereinafter described. Subsequent pulses on the 1's Transfer Bus representing the successive 1's digits of a word, are transmitted by the Sign Clipper 340 directly into the Main Adder 360.

Referring to Fig. 50, the Sign Clipper comprises a flip-flop 341 that is reset to 0 by each CP–3 and is set to 1 by each CP–6. The 0 side of flip-flop 341 arms a gate 344 through a cathode follower 342 and a delay line 343. The 1's Transfer Bus is connected to the input of gate 344, and the output of that gate is connected through an output terminal 345 to a corresponding input terminal of the Sign Control Circuit (Fig. 55). The 1 side of flip-flop 341 (Fig. 50) arms a gate 348 through a cathode follower 346 and a diode 347. The 1's Transfer Bus is connected to the input of gate 348, and the output of that gate is connected through an output terminal 351 to a corresponding 1's input terminal of the Main Adder (Fig. 51).

Since CP–3 always resets flip-flop 341 to 0 (Fig. 50), gate 344 is armed when the minus sign pulse, if any, occurs on the 1's Transfer Bus in coincidence with CP–6, and that pulse is transmitted by gate 344 through terminal 345 to the Sign Control Circuit (Fig. 55). CP–6 sets flip-flop 341 (Fig. 50) to 1, thereby closing gate 344 and arming gate 348. Subsequent pulses on the 1's Transfer Bus are therefore transmitted by gate 348 through terminal 351 to the 1's input of the Main Adder (Fig. 51).

During the Write Code, hereinafter described, a word is transmitted from the Transfer Busses through the Sign Clipper (Fig. 50) two digit intervals early, i.e., the first digit of the word is transmitted on CP–5, rather than on the first CP of a word interval. In this case, the sign digit occurs in coincidence with CP–4 rather than CP–6. Therefore, flip-flop 341 must be set to 1 by CP–4. For this purpose, CP–4 is applied to the set input of flip-flop 341 through a gate 352 which is armed during the Write Code by the Code Distributor.

During several of the codes, such as the Multiply Code, hereinafter described, it is necessary to by-pass the operation of flip-flop 341 and arm gate 348 independently. Therefore, gate 348 is adapted to be armed at the appropriate times by the Code Distributor through a diode 353.

*Main Adder.*—*In general.*—The Main Adder 360 (Fig. 33) additively or subtractively combines two operands and transmits them either to the "C" Register 400 or to the Arithmetic Bus. An input to the Main Adder for a first operand, designated the "*x*" operand, comprises a 0's input and a 1's input that are received, respectively, from the 0's Transfer Bus and from the 1's Transfer Bus through the Sign Clipper 340. The "*x*" operand on the Transfer Busses is received from any one of four sources, viz: (1) Memory 100; (2) the "A" Register 520; (3) the "R" Register 550; or (4) the "S" Register 730 (Fig. 34). An input to the Main Adder (Fig. 33) for a second operand, designated the "*y*" operand, comprises a 1's input from any one of five sources, viz: (1) the MA Unit Input Circuit 500 (Fig. 33); (2) the "A" Register 520; (3) the "R" Register 550; (4) the "D" Register 600; or (5) the Address Control Circuit 750 (Fig. 34). A pair of HGB operands or a pair of OGB operands are added or subtracted in the Main Adder (Fig. 33) in accordance with the unaltered rules of binary arithmetic since, as hereinbefore explained, such operands are expressed with the same digits as if they were ordinary binary words. On the other hand, a pair of DGB operands, comprising decimal groups of four binary digits each, are combined by the rules of binary arithmetic, but each group is tested for a decimal carry and if such a carry occurs, the Main Adder is properly conditioned before the receipt of the next group.

In operation, each 1's digit of the "y" operand conditions the Main Adder for subsequently transmitting or blocking the ordinally corresponding 0 to 1 pulse of the "x" operand. The gating conditions are established in accordance with a first rule of operation for additively combining the operands, and in accordance with a second rule of operation for subtractively combining the operands. The additive or subtractive rule of operation is determined by the state of the Sign Control Circuit 460 which establishes the appropriate gating conditions in the Main Adder, as hereinafter described. The gated 0's and 1's pulses of the "x" operand are transmitted by the Main Adder, as 1's pulses of the sum difference word, either through the "C" Register 400 and the Corrector Adder 420 to the Arithmetic Bus, or directly to the Arithmetic Bus.

*Binary arithmetic.*—The following is an analysis of the binary arithmetic performed by the Main Adder.

In binary addition, there are four possible additive combinations of two positive operands:

| | | | | |
|---|---|---|---|---|
| x | 0 | 1 | 0 | 1 |
| +y | +0 | +0 | +1 | +1 |
| Sum | 0 | 1 | 1 | 0 (carry +1) |

It is noted that a carry occurs in the last sum. In a multidigit binary addition, the operation of entering the carry into the next higher column gives rise to a second set of four additive combination:

| | | | | |
|---|---|---|---|---|
| +carry | +1 | +1 | +1 | +1 |
| x | 0 | 1 | 0 | 1 |
| +y | +0 | +0 | +1 | +1 |
| Sum | 1 | 0 (carry +1) | 0 (carry +1) | 1 (carry +1) |

Similarly, the subtraction of a binary number from another binary number gives rise to four algebraic combinations:

| | | | | |
|---|---|---|---|---|
| x | 0 | 1 | 1 | 0 |
| −y | −0 | −0 | −1 | −1 |
| Difference | 0 | 1 | 0 | 1 (carry −1) |

It is noted that a carry of −1 occurs in the last difference. This carry of −1 gives rise to a second set of algebraic combination wherein the first four combinations are combined with the carry digit of −1:

| | | | | |
|---|---|---|---|---|
| −carry | −1 | −1 | −1 | −1 |
| x | 0 | 1 | 1 | 0 |
| −y | −0 | −0 | −1 | −1 |
| Difference | 1 (carry −1) | 0 | 1 (carry −1) | 0 (carry −1) |

*Main adder structure.*—An adding circuit that may be employed as the Main Adder in the present computer is separately described and claimed in the copending application Serial No. 400,522, filed December 28, 1953, by Charles M. Hill. This adder is adapted to solve the above sixteen addition and subtraction problems as follows.

Referring to Fig. 51, the 0's pulses of the "x" operand are received from the 0's Transfer Bus and are transmitted through an amplifier 361 and a delay line 362 to the input of a gate 363. The 1's pulses of the "x" operand are received from the previously described output terminal 351 of the Sign Clipper (Fig. 50) and are transmitted through a delay line 364 (Fig. 51) to the input of a gate 365. Gates 363 and 365 are armed by the respective 1 and 0 sides of a flip-flop 368 that normally stands at 0, each CP–5 being applied to its reset input. The outputs of gates 363 and 365 are joined and are connected to the input of a gate 369, the output of which is connected through an output terminal 370 to a corresponding input terminal of the "C" Register (Fig. 52). The outputs of gates 363 and 365 (Fig. 51) are also connected to the input of a by-pass gate 392, and are connected through an output terminal 386 to a corresponding input terminal of the MA Sensing Circuit (Fig. 54), hereinafter described. The 0 and 1 sides of flip-flop 368 (Fig. 51) are connected through a pair of arming terminals of the MA Sensing Circuit. During arithmetic operations, gate 369 is normally open and gate 392 is normally closed by means hereinafter described.

The 0's input to gate 363 is also connected to the input of a gate 371 that is armed, during addition operations, through an output terminal 473 of the Sign Control Circuit (Fig. 55). The output of gate 371 (Fig. 51) is connected to the input of a gate 372 that is armed through a cathode follower 373 by the 0 side of a normally reset flip-flop 395, hereinafter described. The output of gate 372 is connected to the input of a gate 374 that is armed by the 1 side of flip-flop 368. The output of gate 374 is connected to the reset input of flip-flop 368.

The 0's input terminal 351, in addition to being connected to the input of delay line 364, is also connected to the input of a gate 375 that is armed, during subtractive operations, through an output terminal 474 from the Sign Control Circuit (Fig. 55). The output of gate 375 (Fig. 51) is connected through a delay line 376 and an amplifier 377 to the input of gate 374.

The five previously mentioned "y" operand inputs are joined and are connected through an amplifier 380 to the symmetrical input of flip-flop 368. The "y" inputs are also connected to the input of a gate 381 that is armed by the 1 side of flip-flop 368. The output of gate 381 is connected through a cathode follower 382, a delay line 383 and an amplifier 384 to the set input of flip-flop 368.

*Operation.*—In order to set forth the operation of the Main Adder, its response to each of the previously outlined eight addition and eight subtraction problems is described. In the eight addition problems, gate 371 is armed. In the first four addition problems, which do not involve a stored carry digit, flip-flop 368 initially stands at 0, representing the absence of a stored carry digit of +1.

In the first example of addition, both the "x" and "y" operand digits are 0. Since the "y" operand is represented only by 1's pulses, no "y" input pulse is received, and flip-flop 368 remains in its 0 state. A delayed 0 pulse of the "x" operand passes through gate 371 and the normally armed gate 372, but is blocked by gate 374, and flip-flop 368 remains in its 0 state. The delayed 0 pulse of the "x" operand is also blocked by gate 363 and there is no output pulse to the "C" Register (Fig. 52) through gate 369 (Fig. 51) and terminal 370; this condition represents the entry of a sum digit of 0 into the "C" Register.

In the second example of addition, the "y" digit is a 0 and flip-flop 368 remains in its 0 state. The "x" digit is a 1, and its representative pulse is blocked by gate 375; therefore, flip-flop 368 remains in its 0 state. The delayed 1 pulse of the "x" operand passes through gates 365 and 369, and through the output terminal 370 to the "C" Register (Fig. 52), representing the entry of a sum digit of 1 into the "C" Register.

In the third example of addition, the "y" digit is a 1 and the "y" input pulse sets flip-flop 368 (Fig. 51) to 1, thereby arming gates 363, 374 and 381. Because of the inherent switching time of flip-flop 368, however, the "y" input pulse is blocked by gate 381, and flip-flop 368 remains set to 1. The "x" digit is a zero, and its representative pulse is transmitted by gates 363 and 369 to terminal 370, representing entry of a sum digit of 1 into the "C" Register (Fig. 52). The delayed 0 pulse of the "x" operand is also transmitted through the armed gates 371, 372 and 374 (Fig. 51) for resetting flip-flop 368 to 0.

In the fourth example of addition, the "y" digit is a 1, and flip-flop 368 is set to 1 in the manner described above. The "x" digit is also a 1, and its representative pulse is blocked by gate 365, representing entry of a sum digit of 0 into the "C" Register (Fig. 52). The undelayed 1 pulse of the "x" operand is blocked by gate 375

(Fig. 51), and flip-flop 368 remains set to 1, representing a stored carry digit of +1.

In the fifth to eighth addition problems, inclusive, flip-flop 368 initially stands at 1, representing a stored carry digit of +1; therefore, gates 363, 374 and 381 are initially armed.

In the fifth example of addition, the "y" digit is a 0 and flip-flop 368 remains set to 1. The "x" digit is also a 0, and its representative pulse is transmitted by the armed gates 363 and 369 to terminal 370, representing entry of a sum digit of 1 into the "C" Register (Fig. 52). The delayed 0 pulse of the "x" operand is transmitted through the armed gates 371, 372 and 374 (Fig. 51) and resets flip-flop 368 to 0.

In the sixth example of addition, the "y" digit is a 0 and flip-flop 368 remains set to 1. The "x" digit is a 1, and its representative pulse is blocked by gate 365, representing entry of a sum digit of 0 into the "C" Register (Fig. 52). The 1 pulse of the "x" operand is also blocked by gate 375 (Fig. 51), and flip-flop 368 remains set to 1, representing a stored carry digit of +1.

In the seventh example of addition, the "y" digit is a 1 and the "y" input pulse resets flip-flop 368 to 0 through amplifier 380, thereby closing gates 363, 374 and 381. The "y" input pulse also passes through the armed gate 381 before that gate is closed by the resetting of flip-flop 368, and the output pulse from gate 381 is transmitted through cathode follower 382, delay line 383 and amplifier 384 to the set input of flip-flop 368. The characteristic delay time of delay line 383 is greater than that of delay line 362. Therefore, since the "x" digit is a 0, the 0 pulse of the "x" operand from the output of delay line 362 is blocked by gate 363, representing entry of a sum digit of 0 into the "C" Register (Fig. 52). The 0 pulse of the "x" operand passes through gates 371 and 372 (Fig. 51) but is blocked by gate 374. Subsequently, the "y" input pulse through delay line 383 sets flip-flop 368 back to 1, representing a stored carry digit of +1.

In the eighth example of addition, the "y" digit is a 1 and the "y" input pulse resets flip-flop 368 to 0 and passes through gates 381 and cathode follower 382 into delay line 383. The "x" digit is also a 1, and its representative pulse passes through gates 365 and 369 to terminal 370, representing entry of a sum digit of 1 into the "C" Register (Fig. 52). The 1 pulse of the "x" operand is blocked by gate 375 (Fig. 51). Subsequently, the delayed 1 pulse of the "y" operand is transmitted from delay line 383 through amplifier 384 for setting flip-flop 368 back to 1, representing a stored carry digit of 1.

It is recalled that during subtractive operations, gate 372 is closed and gate 375 is armed. In the first four subtraction problems, flip-flop 368 initially stands at 0, representing the absence of a stored carry digit of 1.

In the first example of subtraction, the "y" digit is a 0, and flip-flop 368 remains in its 0 state. The "x" digit is also a 0, and its representative pulse is blocked by gate 363, representing entry of a difference digit of 0 into the "C" Register (Fig. 52). The 0 pulse of the "x" operand is blocked by gate 371 (Fig. 51), and flip-flop 368 remains in its 0 state.

In the second example of subtraction, the "y" digit is a 0, and flip-flop 368 remains in its 0 state. The "x" digit is a 1, and its representative pulse is transmitted by gates 365 and 369 to terminal 370, representing entry of a difference digit of 1 in the "C" Register (Fig. 52). The 1 pulse of the "x" operand passes through gate 375 (Fig. 51), delay line 376, and amplifier 377 but is blocked by gate 374. At the end of the second example of subtraction, flip-flop 368 stands at 0, representing the absence of a carry digit of —1.

In the third example of subtraction, the "y" digit is a 1, and the "y" input pulse sets flip-flop 368 to 1, but is blocked by gate 381. The "x" digit is also a 1, and its representative pulse is blocked by gate 365, representing entry of a difference digit of 0 into the "C" Register (Fig. 52). The 1 pulse of the "x" operand is transmitted through gate 375 (Fig. 51), delay line 376, amplifier 377 and gate 374, resetting flip-flop 368 to 0 for representing the absence of a stored carry digit of —1.

In the fourth example of subtraction, the "y" digit is a 1, and the "y" input pulse sets flip-flop 368 to 1, but is blocked by gate 381. The "x" input pulse is a 0, and its representative pulse passes through gates 363 and 369 to terminal 370, representing entry of a difference digit of 1 into the "C" Register (Fig. 52). The 0 pulse of the "x" operand is blocked by gate 371 (Fig. 51), and flip-flop 368 remains set to 1, representing a stored carry digit of —1.

In the fifth to eighth subtraction problems, inclusive, flip-flop 368 initially stands at 1, thereby representing a stored carry digit of —1.

In the fifth example of subtraction, the "y" digit is a 0, and flip-flop 368 remains in its 1 state. The "x" digit is also a 0, and its representative pulse passes through gates 363 and 369 to terminal 370, representing entry of a difference digit of 1 into the "C" Register (Fig. 52). The 0 pulse of the "x" operand is blocked by gate 371 (Fig. 51) and flip-flop 368 remains set to 1, thereby representing a stored carry digit of —1.

In the sixth example of subtraction, the "y" digit is a 0, and flip-flop 368 remains in its 1 state. The "x" digit is a 1, and its representative pulse is blocked by gate 365, representing entry of a difference digit of 0 into the "C" Register (Fig. 52). The 1 pulse of the "x" operand passes through gate 375 (Fig. 51), delay line 376, amplifier 377 and gate 374 for resetting flip-flop 368 to 0, thereby representing the absence of a carry digit of —1.

In the seventh example of subtraction, the "y" digit is a 1, and the "y" operand pulse resets flip-flop 368 to 0 through amplifier 380, and passes through gate 381 and cathode follower 382 into delay line 383. The "x" digit is also a 1, and its representative pulse passes through gates 365 and 369 to terminal 370, representing entry of a difference digit of 1 into the "C" Register (Fig. 52). The 1 pulse of the "x" operand passes through gate 375 (Fig. 51), delay line 376 and amplifier 377, but is blocked by gate 374. Subsequently, the "y" input pulse in delay line 383 is transmitted through amplifier 384 for setting flip-flop 368 back to 1, thereby representing a stored carry digit of —1.

In the eighth example of subtraction, the "y" digit is a 1, and its representative pulse passes through amplifier 380 for resetting flip-flop 368 to 0, and passes through gate 381 and cathode follower 382 into delay line 383. The "x" operand is a 0, and its representative pulse is blocked by gate 363, representing entry of a difference digit of 0 into the "C" Register (Fig. 52). The 0 pulse of the "x" operand is blocked by gate 371 (Fig. 51). Subsequently, the "y" operand pulse in delay line 383 is transmitted through amplifier 384 for setting flip-flop 368 back to 1, thereby representing a stored carry digit of —1.

The output gate 369, which is normally open during arithmetic operations for transmitting the sum or difference output of the Main Adder to the input of the "C" Register (Fig. 52), is armed by the 0 side of a flip-flop 387 (Fig. 51) that normally stands at 0, each CP–4 being applied to its reset input. Flip-flop 387 may be set to 1, thereby closing gate 369, by CP–5 applied to its set input through either of two gates 388 and 390, the former of which is armed by the Code Distributor, and the latter of which is armed either by the Sequencer (Fig. 74) during SP–1 or SP–4, or by the Code Distributor. Flip-flop 387 (Fig. 51) may also be set to 1 by a pulse applied to its set input from an output terminal 916 of the Start-Stop Circuit (Fig. 75), or from an output terminal 958 of the Timing Generator (Fig. 76). The output of gate 390 (Fig. 51) is also connected to the set input of a flip-flop 391 that normally stands at 0, each CP–4 being applied to its reset input. Flip-flop 391 may also be set to 1 through an output terminal 916 of the Start-Stop Circuit (Fig. 75). The 1 side of flip-flop 391 (Fig. 51) arms the previously described by-pass gate 392, the output of which is connected through an amplifier 393 to the Arithmetic Bus. It will be seen that any pulse from the output of gate 390, or from the output terminal 958 of the Timing Generator (Fig. 76), sets both flip-flops 387 and 391 (Fig. 51) to 1, thereby closing the output gate 369 and arming the by-pass gate 392. It will also been seen that any pulse from the output of gate 388 merely sets flip-flop 387 to 1, closing gate 369, and that gate 392 remains closed. It will be shown hereinafter that gate 369 is normally armed and that gate 392 is normally closed during arithmetic operations, and that the reverse condition normally exists during addressing operations, but that under some circumstances, both gates 369 and 392 are closed.

*Auxiliary input circuits.*—During certain computer operations, hereinafter described, it is necessary to enter an "*x*" operand of all 0's into the Main Adder. For this purpose, OP's are applied to the input of a gate 398 that is armed either by the Code Distributor or through an output terminal 914 of the Start-Stop Circuit (Fig. 75), hereinafter described. The output of gate 398 (Fig. 51) is connected to the 0's Transfer Bus.

The contents of the "S" Register (Fig. 66) are increased by unity during an addressing operation, as hereinafter described. For this purpose, the Main Adder flip-flop 368 (Fig. 51) is preset to 1, and the contents of the "S" Register are then entered into the Main Adder as an "*x*" operand. A pulse for resetting flip-flop 368 to 1 is applied to the set input terminal of that flip-flop from an output terminal 862 of the Sequencer (Fig. 74).

During DGB operation, when the three least significant digits of a decimal group have been transmitted from the Main Adder to the "C" Register (Fig. 52), their collective values may indicate that a decimal carry will occur from the entire group of four digits if the fourth digit is a 1. This indication exists if the second and/or third digit of a group is a 1, representing the respective decimal values 2 and 4. If the fourth digit is also a 1, it represents a decimal value of 8, and any additive combination of 8 with 2 or 4 is greater than 9, requiring a decimal carry from the group. Accordingly, when the first three digits of a decimal sum group have been entered into the "C" Register, and the second and/or third of these digits is a 1, the Main Adder is conditioned to store a carry digit of +1 in preparation for receiving the next decimal group. It is also noted that a decimal carry of +1 is required, even in the absence of one of the above carry combinations, if the sum group has an equivalent decimal value equal to or greater than 16. In this case, a carry digit of +1 remains in the Main Adder flip-flop 368 (Fig. 51) after the addition of the operands which produced that sum group, and is automatically added to the next pair of input groups.

Referring again to Fig. 51, the previously mentioned flip-flop 395 normally stands at 0, thereby arming gate 372, which is located on the 0's reset input to flip-flop 368. The delayed pattern 1000 from the Pattern Generator (Fig. 43) is applied to the reset input of flip-flop 395 (Fig. 51) for maintaining that flip-flop in its 0 state. The 1 side of flip-flop 395 arms a gate 397 through a cathode follower 396. The input to gate 396 is received from the joined outputs of gate 363 and 365, and the outputs of gate 397 is connected to the set input of flip-flop 368. When a possible carry condition is detected in the "C" Register (Fig. 52), in the manner hereinafter described, a pulse is applied to the set input of flip-flop 395 (Fig. 51) through an output terminal 412 of the "C" Register (Fig. 52), thereby closing gate 372 (Fig. 51) and arming gate 397. If the next sum digit is a 1, i.e., if there is an output pulse from either gate 363 or gate 365, the output pulse is transmitted through gate 397 for setting flip-flop 368 to 1, thereby representing a stored carry digit of +1 which is subsequently combined with the next pair of input decimal operand groups. Since a decimal carry which is due to exceeding the decimal sum of 9 can occur only during addition, and not during substraction, gate 375, which is located on the 1's reset input to flip-flop 368, is closed; therefore, if the fourth sum digit of the decimal group is formed in response to the entry of an "*x*" operand digit of 1, the pulse representing that digit is blocked by gate 375, and no reset pulse is applied to flip-flop 368 in interference with the set pulse applied through gate 397. On the other hand, if the decimal carry condition has been indicated by the "C" Register (Fig. 52), flip-flop 395 (Fig. 51) is set to 1 and gate 372 is also closed. Therefore, if the fourth sum digit is formed in response to the input of an "*x*" operand digit of 0, the pulse representing that digit is blocked by gate 372, and is prevented from reaching the reset input of flip-flop 368. If flip-flop 395 has been set to 1 by a pulse from the "C" Register in preparation for the fourth pair of operand digits, it is reset to 0 by the 1 pulse in the delayed pattern 1000 from the Pattern Generator (Fig. 43).

*"C" Register.*—The "C" Register 400 (Fig. 33) is a four-stage binary shift register which receives the output of the Main Adder 360 and tests each decimal group from the Main Adder for conditioning the latter, if necessary, in preparation for receiving a next pair of decimal groups. The "C" Register is also employed as an extra four stages of the "A" Register 520, giving the latter an effective total of forty-four stages for certain operations, hereinafter described. Each output group from the "C" Register is transmitted to the Corrector Adder 420, where it is corrected, if necessary, in accordance with the rules of DGB arithmetic previously set forth in Tables IV, V, VI, VIII and X. Hexadecimal groups that are shifted through the "C" Register into the Corrector Adder are not tested for decimal carry in the "C" Register since the hexadecimal system is compatible with the binary system, as hereinbefore described.

Referring to Fig. 52, the "C" Register comprises a four-stage shift register, the stages being designated 401(1) to 401(4), the input, or most significant stage 401(4) being shown at the bottom of the drawing. The shift register may be of the type shown in Fig. 29. The 1's input to the "C" Register is received from the 1's output terminal 370 of the Main Adder (Fig. 51). The shift pulses for the "C" Register are received through an amplifier 402 (Fig. 52) through an output terminal 533 of the "A" Register (Fig. 57). It will be shown hereinafter that all shift pulses that are applied to the "A" Register for shifting an input into that register, are also applied through terminal 533 (Fig. 52) to the "C" Register; therefore, the "C" Register is shifted whenever an input is shifted into the "A" Register. A pair of output gates 403(0) and 403(1) are armed by the respective 0 and 1 sides of the "C" Register output state 401(1), and the 0's and 1's output pulses from gates 403(0) and 403(1) are transmitted to the Corrector Adder (Fig. 53). Each stage of the "C" Register may be reset to 0 by a pulse from an output terminal 667 of the KS Sensing Circuit (Fig. 63), herein after described, applied through a gate 405 (Fig. 52) that is armed by the Code Distributor.

In order to condition the Main Adder (Fig. 51) for a possible decimal carry, the "C" Register must test the second and third binary digits in each decimal group and transmit a pulse to the Main Adder if either of these digits is a 1. However, such testing must occur after the third sum digit of a group is transmitted from the Main Adder to the "C" Register but before the fourth sum digit is transmitted. At this time, the second and third sum digits stand in the two most significant "C" Register stages 403(3) and 401(4) (Fig. 52), respectively, and they must be tested in those stages. Accordingly, the 1 side of stage 401(3) arms a gate 407 through a cathode follower 406, and the 1 side of stage 401(4) arms a gate 411 through a cathode follower 408. The pattern 1000 is applied to the inputs of both gates 407 and 411 from the Pattern Generator (Fig. 43), and the outputs of gates 407 and 411 (Fig. 52) are joined and are connected through the previously described output terminal 412 to the Main Adder (Fig. 51). Therefore, if either gate 407 or 411 is armed at the beginning of any fourth digit interval, i.e., if a digit 1 stands in either stage 401(3) or 401(4) at such time, the pulse representing the digit 1 in the pattern 1000 is transmitted through the armed gate or gates 407 and 411 and through terminal 412 to the Main Adder (Fig. 51), thereby conditioning the latter circuit for a possible decimal carry.

*Corrector Adder.*—Referring to Fig. 33, the Corrector Adder 420 is an adding circuit of the same type as the previously described Main Adder 360 (see also Fig. 51), and is provided for correctively adding to or subtracting from each decimal sum or difference group of four binary digits from the "C" Register 400 the value 0110 if certain conditions exist. It is recalled that during additive DGB operations, the corrective value 0110 is added to any sum group having a value whose decimal equivalent is greater than 9, and that during subtractive DGB operations, the same value is subtracted from any difference representing a value less than 0. It has been shown that any decimal sum group having a value from 9 to 15, inclusive, is detected in the "C" Register, and conditions the Main Adder for adding a carry digit of +1 to the next pair of decimal operand groups, and that any decimal sum group having a value greater than 15 automatically stores a carry digit of +1 in the Main Adder in preparation for receipt of the next pair of decimal operand groups. When the Main Adder has been thus conditioned, the MA Sensing Circuit 440, hereinafter described, detects the presence of a stored carry digit and, in cooperation with the Sign Control Circuit 460, conditions the Corrector Adder for adding the corrective value 0110 to the sum group whose value exceeded 9. Similarly, in subtractive operations, a difference of less than 0 is represented in the Main Adder by the presence of a carry digit of −1, and this digit is detected by the MA Sensing Circuit which in cooperation with the Sign Control Circuit, conditions the Corrector Adder for correctively subtracting the value 0110 from the same difference group which left a carry digit of −1 in the Main Adder. Each output group from the Corrector Adder is applied to the Arithmetic Bus.

Referring to Fig. 53, the Corrector Adder comprises a flip-flop 421 that normally stands at 0, the pattern 0001 being applied to its reset input from the Pattern Generator (Fig. 43). The 0 side of flip-flop 421 (Fig. 53) arms a gate 422, and the 1 side of that flip-flop arms a gate 423. The 1's output terminal 404(1) of the "C" Register (Fig. 52) is connected to the input of gate 422 (Fig. 53) through a delay line 424 and an amplifier 425. The 0's output terminal 404(0) of the "C" Register (Fig. 52) is connected to the input of gate 423 (Fig. 53) through a delay line 426 and an amplifier 427. The outputs of gates 422 and 423 are joined and are connected through an amplifier 428 to the Arithmetic Bus which, as has been shown, is a 1's bus. The terminals 404(0) and 404(1) constitutes the "*x*" input to the Corrector Adder.

The output of amplifier 427, in addition to being connected to the input of gate 423, is also connected to the input of an add gate 431 that is armed through the previously mentioned output terminal 473 of the Sign Control Circuit (Fig. 55). Similarly, the output of amplifier 425 (Fig. 53) is connected to the input of a subtract gate 432 that is armed through the previously mentioned output terminal 474 of the Sign Control Circuit (Fig. 55). Referring to Fig. 51, it is recalled that output terminals 473 and 474 of the Sign Control Circuit (see also Fig. 55) arm the add and subtract gates 371 and 375 respectively of the Main Adder; therefore, the Main Adder and the Corrector Adder are both conditioned for the same add or subtract operation at the same time. The outputs of gates 431 and 432 (Fig. 53) are joined and are connected to the input of a gate 433 that is armed by the 1 side of flip-flop 421, and the output of gate 433 is connected to the reset input of flip-flop 421.

The Corrector Adder is adapted to receive as its only "*y*" operand the pattern 0110 from the Pattern Generator (Fig. 43). This pattern is applied to the input of a gate 434 (Fig. 53) that is armed by the 0 side of a flip-flop 435. The latter flip-flop normally stands at 1, the pattern 1000 being applied to its set input; therefore, gate 434 is normally closed. When the value 0110 is to be entered into the Corrector Adder for a corrective addition to, or subtraction from the output of the "C" Register (Fig. 52), a pulse from an output terminal 452 of the MA Sensing Circuit (Fig. 54), hereinafter described, is applied to the reset input of flip-flop 435 (Fig. 53) in coincidence with entry into the Corrector Adder of the least significant digit of each group from the "C" Register (Fig. 52). Gate 434 (Fig. 53) remains armed during entry of a second and third digit of the input group and is then closed when flip-flop 435 is set to 1 by the 1 pulse in the pattern 1000 in coincidence with entry of the fourth digit of the input group. While gate 434 is armed, the 1's pulses of the pattern 0110 are transmitted through that gate to the symmetrical input of flip-flop 421. The output of gate 434 is also connected to the input of a gate 436 that is armed by the 1 side of flip-flop 421. The output of gate 436 is connected to the set input of flip-flop 421 through a delay line 437. The operation of the Corrector Adder in additively or subtractively combining the "*x*" operand from the "C" Register (Fig. 52) with the "*y*" operand of 0110 is substantially the same as the operation of the Main Adder (Fig. 51), previously described.

*Main Adder Sensing Circuit.*—Referring to Fig. 33, the MA Sensing Circuit 440 is provided for sensing the 0 or 1 state of the Main Adder 360 to thereby control certain other circuits in the computer. It has been shown that the MA Sensing Circuit controls the Corrector Adder 420 in response to the sensing of a carry digit of +1 or −1 in the Main Adder at the beginning of each decimal group during DGB operation. During many of the codes, hereinafter described, the MA Sensing Circuit also controls the Sign Control Circuit 460 in response to the sensing of a 0 or 1 in the Main Adder at the end of each word interval, for thereby determining the additive or subtractive nature of an arithmetic operation that occurs during the next word interval. The sensing of a 0 indicates that no overflow of the "A" Register 520 occurred during the previous word interval, and the sensing of a 1 indicates that an overflow of the "A" Register did occur during that word interval.

During the Divide Code, a divisor word is subtracted from successively less significant groups of orders of a dividend word, as hereinafter described. A first subtraction is made with the most significant digits of the divisor and dividend words aligned, and the plus or minus sign of the result of this first subtraction is sensed by the MA Sensing Circuit. If the Main Adder 360 stands at 1 after the first subtraction in a division operation, this indicates that an overflow occurred in the "A" Register 520, and that the result of the subtraction was negative. The present computer operates only on valves between but not including −1 and +1; therefore, the divdend should be smaller than the divisor, and a negative result in the first subtraction of a division operation indicates that such is the case. A positive result of that subtraction indicates that the dividend was larger than the divisor and that the computer should be stopped. Accordingly, if the MA Sensing Circuit senses a 0 after the first subtraction in a division operation, it transmits a signal to the Start- Stop Cicuit 890 (Fig. 34), thereby stopping the computer, as hereinafter described.

Referring to Fig. 54, the MA Sensing Circuit receives control potentials from the two previously mentioned output terminals 366 and 367 of the Main Adder (Fig. 51). It is recalled that terminal 366 is at gate-arming potential when a digit 0 stands in the Main Adder, and that terminal 367 is at gate-arming potential when a digit 1 stands in the Main Adder. Each CP–1 is applied to the input of a gate 441 (Fig. 54) that is armed by the Code Distributor. The output of gate 441 is connected to the input of a gate 442 that is armed, when a digit 0 stands in the Main Adder (Fig. 51) through terminal 366. The output of gate 442 (Fig. 54) is connected through an output terminal 443 to a first input of the Sign Control Circuit (Fig. 55). The output of gate 441 (Fig. 54) is also connected to the input of a gate 444 that is armed, when a digit 1 stands in the Main Adder (Fig. 51), through terminal 367 (Fig. 54). The output of gate 444 is connected through an output terminal 445 to a second input of the Sign Control Circuit (Fig. 55). Each CP–5 is applied to the input of a gate 446 (Fig. 54) that is armed by the Code Distributor. The output of gate 446 is connected to the input of a gate 447 that is armed by the Main Adder (Fig. 51) through terminal 367 (Fig. 54). The output of gate 447 is connected through an output terminal 448 to a third input of the Sign Control Circuit (Fig. 55), and to an input of the Timing Generator (Fig. 76). Terminals 443 and 445 (Fig. 54) are hereinafter designated the "nonoverflow" and "overflow" terminals, respectively, for addition and subtraction operations, while terminal 448 is an overflow terminal that is employed during division operations.

The pattern 0001 from the Pattern Generator (Fig. 43) is applied to the input of a gate 451 (Fig. 54) that is armed by the Main Adder (Fig. 51) through terminal 367 (Fig. 54). The output of gate 451 is connected through the previously described output terminal 452 to the corresponding input terminal of the Corrector Adder (Fig. 53) for controlling the input of the pattern 0110 into the Corrector Adder when decimal correction is required, as hereinbefore described.

Each CP–2 is applied to the input of a gate 453 (Fig. 54) that is armed by the Main Adder (Fig. 51) through terminal 367 (Fig. 54). The output of gate 453 is connected to the reset input of a flip-flop 454. Each CP–4 is applied to the input of a gate 455 that is armed by the Code Distributor during the Divide Code, and the output of gate 455 is connected to the set input of flip-flop 454. Each CP–3 is applied to the input of a gate 456 that is armed by the 1 side of flip-flop 454 and the output of gate 456 is connected to the reset input of flip-flop 454, and is connected through an output terminal 457 to a corresponding input terminal of the Start-Stop Circuit (Fig. 75). When gate 455 (Fig. 54) is armed by the Code Distributor during the Divide Code, as hereinafter described, CP–4 sets flip-flop 454 to 1 in preparation for a first subtractive operation, thereby arming gate 456. If the Main Adder (Fig. 51) stands at 1 at the end of a next word interval, indicating that the divisor was properly larger than the dividend, as explained above, CP–2 resets flip-flop 454 (Fig. 54) through gate 453, and closes gate 456. CP–3 is then blocked by gate 456 and no stop signal is transmitted to the Start-Stop Circuit (Fig. 75). On the other hand, if the Main Adder (Fig. 51) stands at 0, indicating that the divisor was smaller than the dividend, CP–2 is blocked by gate 453 (Fig. 54) and flip-flop 454 remains in its 1 state, thereby maintaining gate 456 armed. CP–3 is then transmitted by gate 456 and terminal 457 to the Start-Stop Circuit (Fig. 75) for stopping the computer. The output pulse from gate 456 (Fig. 54) also resets flip-flop 454 to 0, and the next CP–3 is blocked by gate 456.

*Sign control circuit.—Addition and subtraction.*—In the present computer, addition and subtraction are algebraic in nature, i.e., the actual addition or subtraction operation that is performed in the Main Adder 360 (Fig. 33) is determined from the combination of two criteria, viz: (1) the additive or subtractive nature of the selected code, and (2) the signs of the two operands.

During the Add Code, the two operands are algebraically added according to their signs. Thus, if the signs are alike, i.e., both plus or both minus, the Main Adder performs addition and the sign of the result is the same as the signs of the two operands. In this case, there is an overflow of the "A" Register 520 only when the combined values of the two operands exceed the capacity of that register, and any overflow which occurs requires that the computer be stopped. When the Main Adder performs addition, the result need not be complemented.

On the other hand, if the signs of the two operands are different, the Main Adder subtracts the absolute value of the "$y$" operand from that of the "$x$" operand. If the absolute value of the "$x$" operand is greater than that of the "$y$" operand, there is never any overflow of the "A" Register and the result need not be complemented; but if the absolute value of the "$y$" operand is greater than that of the "$x$" operand, there is always an overflow of the "A" Register and the result must be complemented. The sign of the result word, after any necessary complementing, is the same as that of the operand having the greater absolute value. During algebraic addition, the two operands are additively or subtractively combined in accordance with the rules set forth above and recapitulated in Table XIX, below.

*Table XIX*

| Sign of $x$ | Sign of $y$ | Relative Magnitude | Main Adder Operation | Overflow | Complement | Sign of Result |
|---|---|---|---|---|---|---|
| + | + | Any | Add | [1] | No | + |
| − | − | Any | Add | [1] | No | − |
| − | + | $x$ $y$ | Subtract | No | No | − |
| − | + | $x$ $y$ | do | Yes | Yes | + |
| + | − | $x$ $y$ | do | No | No | + |
| + | − | $x$ $y$ | do | Yes | Yes | − |

[1] Any overflow in this case indicates that the capacity of the "A" Register has been exceeded and requires the computer to be stopped.

As will be shown in the description of the Add Code and its related secondary codes, the word standing in the "A" Register is added to or subtracted from a word from Memory 100. A first section of the Sign Control Circuit 460 stores the sign of the word standing in the "A" Register during addition and subtraction operations, and a second section of that circuit counts the 0, 1 or 2 minus signs associated with the two operands of an addition or subtraction operation. At the beginning of such an operation, any minus sign that is stored in the first section of the Sign Control Circuit is transmitted through the 1's Transfer Bus and the Sign Clipper 340 into the second section of the Sign Control Circuit where it is counted. Then, the second operand is transmitted from Memory through the Sign Clipper into the Main Adder 360, and its sign digit, if minus, is routed from the Sign Clipper into the second section of the Sign Control Circuit where it, too, is counted. If the signs of the operand in the "A" Register and that from Memory are both plus, the sign count in the second section of the Sign Control Circuit is 0 and the Sign Control Circuit controls the Main Adder for causing the latter to perform an addition operation in accordance with the rules set forth in Table XIX. If the sign of either one of the operands is minus and that of the other is plus, the sign count is 1, and the Sign Control Circuit causes the Main Adder to perform a subtraction operation. If the signs of both operands are minus, the sign count is 2, and the Sign Control Circuit causes the Main Adder to perform an addition operation.

The second section of the Sign Control Circuit, i.e., that section which counts minus signs, is also adapted to energize the Start-Stop Circuit 890 (Fig. 34) under the circumstances set forth in Table XIX, namely, when the signs of both operands are the same and the addition of those operands results in an overflow of the "A" Register.

A third section of the Sign Control Circuit is adapted to store a signal indicating that a result word must be complemented when, as shown in Table XIX, the signs of the two operands are different and the absolute values of the "y" operand is greater than that of the "x" operand. After a description of the circuit structure of the Sign Control Circuit, the operation of that circuit will be described in relation to each possible combination of signs and relative magnitudes of the two operands.

Referring to Fig. 55, the first section of the Sign Control Circuit 460 comprises a flip-flop 461, the 0 or 1 state of which represents the sign of the word in the "A" Register (Fig. 57) during addition and subtraction operations. When flip-flop 461 (Fig. 55) stands at 0, it represents a plus sign, and when it stands at 1, it represents a minus sign. The non-overflow output terminal 443 of the MA Sensing Circuit (Fig. 54) is connected to the input of a gate 462 (Fig. 55) that is armed by a flip-flop 471 in the second section of the Sign Control Circuit, hereinafter described. The output of gate 462 is connected to the symmetrical input of flip-flop 461. Each CP–5 is applied to the input of a gate 464 that is armed by the Code Distributor. The output of gate 464 is connected to the input of a gate 465 that is armed by the 1 side of flip-flop 461. The output of gate 465 is connected to the 1's Transfer Bus. It will be shown that at the beginning of each addition or subtraction operation, the sign of the operand in the "A" Register is stored in flip-flop 461. This sign, if it is minus, will be counted in the second section of the Sign Control Circuit, along with the sign of an operand from Memory. It is recalled that the sign of an operand from Memory is represented by a 0 or 1 pulse on CP–6 preceding the operand word; therefore, the sign of the "A" Register operand is read out of the Sign Control Circuit on CP–5 preceding the operand word from Memory. At this time, gate 464 is armed by the Code Distributor and CP–5 is transmitted by that gate to the input of gate 465. If flip-flop 461 stands at 1, representing a minus sign of the "A" Register operand, gate 465 is armed and the pulse is transmitted through the 1's Transfer Bus and the Sign Clipper (Fig. 50) to the second section of a Sign Control Circuit (Fig. 55), as hereinafter described.

If an arithmetic operation requires as an operand the absolute value of a word standing in the "A" Register (Fig. 57), the sign of that word, which sign is stored in the Sign Control Circuit (Fig. 55), can be made plus by applying a pulse to the reset input of flip-flop 461 from an output terminal 1011 of Code Counter "C" (Fig. 79). Similarly, the sign of the "A" Register word can be made minus, for operation with its negative absolute value, by applying a pulse to the set input of flip-flop 461 (Fig. 55) through an output terminal 1018 of Code Counter "C" (Fig. 79). Finally, the sign of the "A" Register word can be simply reversed by applying a pulse to the symmetrical input of flip-flop 461 (Fig. 55) through an output terminal 1007 of Code Counter "C" (Fig. 79).

The second section of the Sign Control Circuit comprises the previously described flip-flop 471 which arms gate 462 in the first section of the Sign Control Circuit. Flip-flop 471 normally stands at 0, each CP–4 being applied to its reset input, and is employed for counting pulses from the Sign Clipper (Fig. 50), which pulses represent minus signs of operands. The 0 state of flip-flop 471 (Fig. 55) represents a count of 0 or 2 minus signs, and the 1 state of that flip-flop represents a count of 1 minus sign. Each minus sign pulse from the output terminal 345 of the Sign Clipper (Fig. 50) is applied to the input of a gate 472 (Fig. 55) that is armed by the Code Distributor. The output of gate 472 is connected to the symmetrical input of flip-flop 471. The 0 side of flip-flop 471 is connected through the previously described control terminal 473 to the corresponding add-control input terminals of the Main Adder (Fig. 50) and the Corrector Adder (Fig. 53), and to a substract-control input terminal of the "R" Adder (Fig. 59). Similarly, the 1 side of flip-flop 471 (Fig. 55) is connected through the previously described control terminal 474 to the corresponding subtract-control input terminals of the Main Adder (Fig. 51) and the Corrector Adder (Fig. 53), and to an add-control input terminal of the "R" Adder (Fig. 59). The overflow output terminal 445 of the MA Sensing Circuit (Fig. 54) is connected to the inputs of a pair of gates 475 and 476 (Fig. 55) that are armed by the 0 and 1 sides, respectively, of flip-flop 471. The output of gate 475 is connected to the input of a gate 477 that is armed by the Code Distributor, and the output of gate 477 is joined to the previously described output terminal 457 of the MA Sensing Circuit (Fig. 54), and is connected to the corresponding input terminal of the Start-Stop Circuit (Fig. 75). The output of gate 476 (Fig. 55) is connected to the set input of a flip-flop 491 in the third section of the Sign Control Circuit, hereinafter described.

The sign of an operand from Memory may be reversed for subtraction by a pulse applied to the set input of flip-flop 471 through an output terminal 1014 of Code Counter "C" (Fig. 79), a diode 484 (Fig. 55) and a delay line 486. The output of delay line 486 is also connected to the reset input of flip-flop 491.

A third section of the Sign Control Circuit comprises the previously mentioned flip-flop 491 whose 1 state represents a stored indication that a result word standing in the "A" Register should be complemented. Each CP–5 is applied to the input of a gate 493 that is armed by the 1 side of flip-flop 491 through a diode 492. The output of gate 493 is connected through diode 484 and delay line 486 to the reset input of flip-flop 491 and to the set input of flip-flop 471. Therefore, when flip-flop 491 stands at 1, indicating that a result word in the "A" Register (Fig. 57) must be complemented, gate 493 (Fig. 55) is armed and the next CP–5 is transmitted through that gate, and through diode 484 and delay line 486 to the set input of flip-flop 471, thereby setting the latter flip-flop to its "Subtract" state. During the next word interval, the word in the "A" Register (Fig. 57) is subtracted in the Main Adder (Fig. 51) from a word comprising all 0's, as hereinafter described. The output pulse from delay line 486 (Fig. 55) also resets flip-flop 491 to its "No Complement" state in preparation for a subsequent operation.

The following is a description of the operation of the Sign Control Circuit during addition, with each of the possible combinations of signs and relative magnitudes of the two operands, as shown in Table XIX, above. In preface, it is to be assumed as it will later be shown, that an addition or subtraction operation includes a first word interval during which a "y" operand in the "A" Register (Fig. 33) is added to or subtracted from an "x" operand from Memory, the result being entered into the "A" Register. The operation also includes a second word interval in which the result word is transmitted through the Sign Clipper 340, the Main Adder 360, the "C" Register 400 and the Corrector Adder 420 back into the "A" Register, and is complemented, if necessary, by subtracting it from a word comprising all 0's. It is further assumed that flip-flop 471 and 491 (Fig. 55) both stand at 0 initially and that flip-flop 461 stands initially at 0 if the sign of the "y" operand is plus.

In the first example, the signs of both the "x" and "y" operands are plus. Therefore, flip-flop 461 stands at 0, and gate 465 is closed for blocking CP–5; consequently, no "y" operand minus sign is counted by flip-flop 471, which remtins in its 0 state. Also, no "x" operand minus sign is counted by flip-flop 471 which continues to stand at 0. Therefore, the Main Adder (Fig. 51) and the Corrector Adder (Fig. 53) are conditioned for an addition operation, gate 475 (Fig. 55) is armed, and gates 462 and 476 are closed. If the addition does not cause an overflow of the "A" Register, a non-overflow pulse is received from the MA Sensing Circuit (Fig. 54) on terminal 443 (Fig. 55), but is blocked by gate 462. If the addition causes an overflow of the "A" Register (Fig. 57) an overflow pulse is received at terminal 445 (Fig. 55) and is transmitted through gates 475 and 477 and terminal 457 to the Start-Stop Circuit (Fig. 75) for stopping the computer. The overflow pulse is blocked by gate 476 (Fig. 55), and flip-flop 491 therefore remains in its 0 state so that the result word is not complemented during the next word interval. The 0 state of flip-flop 461 indicates that the sign of the result word in the "A" Register (Fig. 57) is plus. It will be seen that the foregoing operation is not affected by the relative magnitudes of the "*x*" and "*y*" operands.

In the second example, both the "*x*" and "*y*" operands have minus signs. The minus sign of the "*y*" operand is represented by the initial 1 state of flip-flop 461 (Fig. 55); therefore, CP–5 passes through gates 464 and 465, the 1's Transfer Bus, the Sign Clipper (Fig. 50), terminal 345 (Fig. 55) and gate 472 to the symmetrical input of flip-flop 471, thereby reversing the latter to its 1 state. The minus sign pulse of the "*x*" operand, occurring on CP–6, also passes through the Sign Clipper (Fig. 50), terminal 345 (Fig. 55) and gate 472, resetting flip-flop 471 to 0. Therefore, the Main Adder (Fig. 51) and the Corrector Adder (Fig. 53) are set for an addition operation, gate 475 (Fig. 55) is armed, and gates 462 and 476 are closed. It is apparent that the Sign Control Circuit stands in the same condition as when both operands have plus signs, and the operation is the same as described above, except that the 1 state of flip-flop 461 indicates that the sign of the result in the "A" Register (Fig. 57) is minus.

In the third example, the "*y*" operand has a plus sign and flip-flop (Fig. 55) 461 initially stands at 0; therefore, no minus sign pulse is entered into flip-flop 471 on CP–5, and this flip-flop remains in its 0 state. However, the "*x*" operand has a minus sign, and a minus sign pulse on CP–6 sets flip-flop 471 to 1, thereby conditioning the Main Adder (Fig. 51) and the Corrector Adder (Fig. 53) for a substraction operation, closing gate 475 (Fig. 55) and arming gates 462 and 476. The absolute value of the "*x*" operand is greater than that of the "*y*" operand, and no overflow can occur. Therefore, although gate 476 is armed, no complementing pulse is received at the overflow terminal 445 for transmission through gate 476, and the result is not complemented. A non-overflow pulse is received at terminal 443 and passes through gate 462 for setting flip-flop 461 to 1, thereby indicating that the sign of the result word is minus.

In the fourth example, the sign of the "*y*" operand is again plus, and flip-flop 471 is not set to 1 on CP–5. The sign of the "*x*" operand is again minus, and flip-flop 471 is set to 1 on CP–6, thereby conditioning the Main Adder (Fig. 51) and the Corrector Adder (Fig. 53) for subtraction operations, and arming gates 462 and 476 (Fig. 55) and closing gate 475. The absolute value of the "*x*" operand is less than that of the "*y*" operand, and no overflow necessarily occurs in the "A" Register (Fig. 57). Therefore, an overflow pulse is received at terminal 445 (Fig. 55) after the first word interval, and this pulse passes through gate 476, thereby setting flip-flop 491 to 1 for causing the result word to be complemented during the second word interval. The overflow pulse is blocked by gate 475 and the Stop-Start Circuit (Fig. 75) is not energized. Since a non-overflow pulse is not received at terminal 443 (Fig. 55) flip-flop 461 remains in its 0 state, indicating that the sign of the result word is plus.

In the fifth example, the sign of the "*y*" operand is minus, and flip-flop 471 is set to 1 on CP–5. The sign of the "*x*" operand is plus, and flip-flop 471 remains set to 1 when no minus pulse is received on CP–6. Therefore, the Main Adder (Fig. 51) and the Corrector Adder (Fig. 53) are conditioned for subtractive operations, gates 462 and 476 (Fig. 55) are armed, and gate 475 is closed. The absolute value of the "*x*" operand is greater than that of the "*y*" operand, and an overflow of the "A" Register cannot occur. The absence of an overflow pulse at terminal 445 prevents flip-flop 491 from being set to its "Complement" state through gate 476, and the result word is not complemented. A non-overflow pulse at terminal 443 passes through gate 462, resetting flip-flop 461 to 0 for indicating that the sign of the result word is plus.

In the sixth example, the sign of the "*y*" operand is again minus, and flip-flop 471 is set to 1 on CP–5. The sign of the "*x*" operand is again plus, and flip-flop 471 remains set to 1 when no minus pulse is received on CP–6. Therefore, the Main Adder (Fig. 51) and the Corrector Adder (Fig. 53) are conditioned for subtractive operations, gates 462 and 476 (Fig. 55) are armed, and gate 475 is closed. The absolute value of the "*x*" operand is less than that of the "*y*" operand, and an overflow must occur. An overflow pulse, which occurs at terminal 445 after the first word interval, passes through gate 476 and sets flip-flop 491 to 1, and the result word is complemented during the second word interval. The overflow pulse is blocked by gate 476, and the Start-Stop Circuit (Fig. 75) is not energized. The absence of a non-overflow pulse at terminal 443 (Fig. 55) prevents flip-flop 461 from being reset to 0, and its 1 state indicates that the sign of the result word is minus.

*Overflow addition.*—Under some circumstances, it is desirable that the computer not be stopped even though the capacity of the "A" Register 520 (Fig. 33) be exceeded as the result of an addition operation. Instead of stopping the computer in such case, it is desirable that the overflow of the "A" Register cause a "scaling" operation comprising a right shift of one group of four binary places in order to retain the overflow group in the "A" Register. In such case, the Overflow Add Code is employed, and this causes the computer to automatically perform a right shift operation after each addition operation if the capacity of the "A" Register is exceeded. The Right Shift Code is programmed immediately following the Overflow Add Code, but if the capacity of the "A" Register is not exceeded as the result of the addition operation, the Right Shift Code is omitted by the process of adding an extra value of 1 to the code address standing in the "S" Register 730 (Fig. 34). The Overflow Add Code may also be employed for other purposes hereinafter described.

Referring to Fig. 55, the non-overflow output terminal 443 of the MA Sensing Circuit (see also Fig. 54) is connected through a diode 495 to the input of a gate 497 that is armed, during the Overflow Add Code, by the Code Distributor. The output of gate 497 is connected to an output terminal 498 to a corresponding input terminal of the MA Unit Input Circuit (Fig. 56). If an overflow does not occur as the result of an addition operation during the Overflow Add Code, a non-overflow pulse on terminal 443 (Fig. 55) passes through diode 495, gate 497 and terminal 498 to the MA Unit Input Circuit (Fig. 56), and causes an extra value of 1 to be added to the contents of the "S" Register (Fig. 66), as hereinafter described, and the Right Shift Code that is programmed immediately following the Overflow Add Code is omitted.

By reference to Table XIX, supra, it will be seen that if the two operands which are added have different signs, and if the absolute value of the "*x*" operand is less than that of the "*y*" operand, an overflow of the "A" Register (Fig. 57) must occur, and the result must be complemented; therefore, the overflow does not indicate, in this case, that the capacity of the "A" Register has been exceeded, and a right shift operation should not be initiated immediately following the Overflow Add Code. Thus, the sensing of an overflow condition of the "A" Register must be employed for disabling the right shift operation by causing an extra value of 1 to be added to the contents of the "S" Register (Fig. 66), in the same manner as the sensing of a non-overflow in other addition problems.

Referring again to Fig. 55, the output of gate 476, which gate is armed by the 1 side of flip-flop 471, is connected through a diode 496 to the input of gate 497. If an overflow occurs when flip-flop 471 stands in its "Subtract" state, this indicates that the capacity of the "A" Register (Fig. 57) has not been exceeded, and an overflow pulse on terminal 445 (Fig. 55) from the MA Sensing Circuit (see also Fig. 54) passes through gate 476, diode 496, gate 497 and terminal 498 to the MA Unit Input Circuit (Fig. 56), for causing the extra value of 1 to be added to the contents of the "S" Register (Fig. 66), as hereinafter described.

*Writing of sign digit*.—During the Write Code, the word standing in the "A" Register (Fig. 57) is written in a selected address of Memory (Fig. 35), and its sign, which is stored in flip-flop 461 (Fig. 55) in the first section of the Sign Control Circuit, must be written in Memory preceding the word. It is recalled that a word is written in Memory two digit intervals ahead of its normal transfer time in the computer, i.e., the sign of the word is written on CP–4 and the first word digit is written on CP–5. Accordingly, each CP–4 is applied to the input of a gate 463 that is armed by the Code Distributor during the Write Code, and the output of gate 463 is joined to that of gate 464, previously described, and is connected to the input of gate 465, which is armed by the 1 side of flip-flop 461. At the appropriate time during the Write Code, hereinafter described, CP–4 is transmitted by gate 463 to the input of gate 465. If flip-flop 561 stands at 1, indicating that the sign of the word in the "A" Register (Fig. 57) is minus, gate 465 (Fig 55) is armed and the pulse is passed to the 1's Transfer Bus for transmission to the Write Control Circuit (Fig. 49).

*Multiplication*.—In the process of multiplying two factors, the sign of the product can be predetermined from the signs of the two factors. If the signs of the two factors are alike, i.e., both plus or both minus, the sign of the product is plus; and if the signs of the factors are different, the sign of the product is minus. In the present computer, each multiplicand word is stored in the "A" Register 520 (Fig. 33) in preparation for a multiplying operation, and the sign of the multiplicand is stored in the first section of the Sign Control Circuit 460. In preparation for a multiplying operation, the multiplier word is read from Memory through the related Read-Write Amplifier 240, the Interpreter 270, the Transfer Busses, the Sign Clipper 340, the Main Adder 360, the "C" Register 400, the Corrector Adder 420 and the Arithmetic Bus into the "R" Register 550, and as it passes through the Sign Clipper, its sign digit, if minus, is transmitted to the first section of the Sign Control Circuit where it is counted with the sign of the multiplicand. Thus, before the multiplying process itself starts, the sign of the product is stored in the first section of the Sign Control Circuit.

Referring to Fig. 55, the output terminal 345 of the Sign Clipper (see also Fig. 50), in addition to being connected to the input of the previously described gate 472, is also connected to the input of a gate 468 that is armed during the Multiply Code by the Code Distributor, gate 472 being closed during this code. The output of gate 468 is connected to the symmetrical input of flip-flop 461. When the multiplier word is transferred from Memory (Fig. 35) to the "R" Register (Fig. 58) through the Sign Clipper (Fig. 50), its minus sign pulse, if any, is transmitted through terminal 345 (Fig. 55) and gate 468 to the symmetrical input of flip-flop 468, thereby reversing the state of that flip-flop. This, if the multiplication factors collectively have 0 or 2 minus signs, flip-flop 461 stands at 0, and if the factors collectively have 1 minus sign, flip-flop 461 stands at 1. After the multiplying process is complete, the sign of the product, if minus, can be read out of the Sign Control Circuit onto the 1's Transfer Bus in the manner hereinbefore described.

It has been shown in connection with Tables VII and VIII that during a multiplying operation, the multiplicand word is added to the partial product word once for each unit of value of each multiplier group, and that a multiplier group is reduced in value by unity for each such addition. It has also been shown that each multiplier group is reduced in value in this manner until it overflows, and that its value is subsequently increased by unity to restore it to 0, and when the value of the multiplier group is increased by unity, the multiplicand word is correctively subtracted once from the partial product. In order to subtract the multiplicand word from the partial product, the Main Adder (Fig. 51) must be conditioned for a subtractive operation. Accordingly, when the value of a multiplier group has overflowed, a pulse from an output terminal 504 of the "R" Adder (Fig. 59), hereinafter described, is applied to the set input of flip-flop 471 (Fig. 55), thereby setting that flip-flop to its "Subtract" state, and the Main Adder (Fig. 51) is conditioned for a subtractive operation during the next word interval.

*Division*.—The division process in the present computer comprises a series of successive subtractions of the divisor from the dividend, with a corrective addition of the divisor when the value of the remainder becomes less than 0 and an overflow of the "A" Register occurs. It is therefore necessary to provide means for selectively controlling an additive or subtractive operation during division.

Referring to Fig. 55, each CP–4 is applied to the input of a gate 483 that is armed at certain times during the Divide Code, hereinafter described. The output of gate 483 is connected through the previously described diode 484 and delay line 486 to the set input of flip-flop 471 in the second section of the Sign Control Circuit. When gate 483 is armed, it transmits the next CP–4 through diode 484 and delay line 486 for setting flip-flop 471 to 1 and thereby conditioning the Main Adder (Fig. 51) and the Corrector Adder (Fig. 53) for a subtractive operation, and conditioning the "R" Adder (Fig. 59) for an additive operation. When an overflow is sensed in the MA Sensing Circuit (Fig. 54) during division, the latter circuit transmits an overflow pulse from its output terminal 448 to the Sign Control Circuit (Fig. 55), and this terminal transmits the overflow pulse to the reset input of flip-flop 471 for resetting that flip-flop to 0 and thereby conditioning the Main Adder (Fig. 51) and the Corrector Adder for an additive operation, and conditioning the "R" Adder for a subtractive operation.

*Comparison*.—During the Compare Code, two words are compared for relative magnitude by subtracting one from the other, and the positive, negative or 0 result of the subtraction is employed for controlling a next computer operation. After the subtraction operation, the MA Unit Input Circuit 500 (Fig. 33), hereinafter described, senses the first section of the Sign Control Circuit 460 to determine the sign of the result: if that sign is plus, a signal is transmitted by the Sign Control Circuit back to the MA Unit Input Circuit, and if the sign is minus, no signal is transmitted back to the MA Unit Input Circuit. If a signal is transmitted from the Sign Control Circuit back to the MA Unit Input Circuit, the latter causes an extra value of 1 to be added to the contents of the "S" Register, as hereinafter described, and the next consecutive command is omitted.

Referring to Fig. 55, an output terminal 516 of the MA Unit Input Circuit (see also Fig. 56) is connected to the input of a gate 466 that is armed by the 0 side of flip-flop 461 in the first section of the Sign Control Circuit. The output of gate 466 is connected through an output terminal 467 to a corresponding input terminal of the MA Unit Input Circuit (Fig. 56). When a subtraction operation has been performed during the Compare Code, as hereinafter described, the sign of the result is represented by the state of flip-flop 461 (Fig. 55), as in other subtraction operations. If the sign of the result is plus, flip-flop 461 stands at 0, and if the sign of the result is minus, flip-flop 461 stands at 1. After the subtraction operation, a pulse from terminal 516 of the MA Unit Input Circuit (Fig. 56) is applied to the input of gate 466 (Fig. 55), and if flip-flop 461 stands at 0, representing a plus sign of the result, gate 466 is armed, and the pulse is transmitted by that gate through terminal 467 and back into the MA Unit Input Circuit (Fig. 56).

*Round Off.*—During the Round Off Code, the word that is to be rounded off stands partly in the "A" Register 520 (Fig. 33) and partly in the "R" Register 550, the more significant half of the word standing in the "A" Register. The half word standing in the "A" Register is added to itself to determine whether or not its most significant decimal group has a value equal to or greater than 0101(DGB), in which case an overflow occurs due to a decimal carry of +1 in the most significant group. The carry digit of +1 is then added to the least significant decimal group of the half word standing in the "A" Register, and the result is returned to the "A" Register, which thereafter contains the rounded off word.

Referring to Fig. 55, flip-flop 471 stands at 0 during the Round Off Code, and gate 475 is therefore armed. The output of gate 475, in addition to being connected to the input of the previously described gate 477, is also connected to the input of a gate 481 that is armed during the Round Off Code, by the Code Distributor. The output of gate 481 is connected through an output terminal 482 to a corresponding input terminal of the MA Unit Input Circuit (Fig. 56), hereinafter described. During the Round Off Code, gate 477 (Fig. 55) is closed; therefore, a pulse output from gate 475 does not energize the Start-Stop Circuit (Fig. 75). If an overflow has been sensed after the half word in the "R" Register (Fig. 58) is added to itself during a round off operation, an overflow pulse from the MA Sensing Circuit (Fig. 54) on terminal 445 (Fig. 55) passes through gates 475 and 481, and through output terminal 482 to the MA Unit Input Circuit (Fig. 56), thereby conditioning the latter for causing the value 1 to be added to the half word standing in the "A" Register (Fig. 57), as hereinafter described.

*Miscellaneous sign controls.* — During each sector-searching phase of an addressing operation, it is necessary to repetitively subtract the value 1 from an initial sector number. This is accomplished by passing the initial sector number through the Main Adder (Fig. 51) which must be conditioned for a subtractive operation. Accordingly, flip-flop 471 (Fig. 55) is set to 1, at the appropriate time during an addressing operation, by a pulse applied to its set input through an output terminal 874 of the Sequencer (Fig. 74), and causes the Main Adder (Fig. 51) to perform a subtractive operation during the next word interval.

When the computer is stopped in response to an overflow of the "A" Register (Fig. 57), it carries out the Logical Jump Code for reasons hereinafter described. It will be shown in the section titled "Start-Stop Circuit" that the initiation of the Logical Jump Code requires a subtractive operation of the Main Adder (Fig. 51). This operation is enabled by a pulse applied to the set input of flip-flop 471 (Fig. 55) through an output terminal 916 of the Start-Stop Circuit (Fig. 75), a diode 485 (Fig. 55), and the previously described delay line 486. The subtraction-enabling pulse is received on terminal 916 of the Start-Stop Circuit (Fig. 75) in response to the sensing of an overflow of the "A" Register (Fig. 57), as hereinafter described.

It is also necessary to enable a subtractive operation of the Main Adder (Fig. 51) during the Match Code. For this purpose, gate 493 (Fig. 55), which is adapted to be armed, during the Add Code, by the 1 side of flip-flop 491, and is also adapted to be armed, at the appropriate time during the Match Code, by the Code Distributor through a diode 494. When gate 495 is armed, the next CP–5 passes through that gate, and through diode 484 and delay line 486 to the set input of flip-flop 471, thereby setting the latter to its "Subtract" state.

*Main Adder Unit Input Circuit.*—During certain operations of the computer, it is desirable to apply an operand of 1 to "*y*" input of the Main Adder 360 (Fig. 33). The MA Unit Input Circuit 500 is provided for entering this operand into the Main Adder either at the beginning of the next word interval following a predetermined event in the computer, or after a single word interval of delay following such an event.

Referring to Fig. 56, the MA Unit Input Circuit includes a flip-flop 501 that normally stands at 0. Each OP train is applied to the input of a gate 502 that is armed by a 1 side of flip-flop 501. The output of gate 502 is connected to the reset input of flip-flop 501 and is connected through an output terminal 503 to the "*y*" input of the Main Adder (Fig. 51). When flip-flop 501 (Fig. 56) is set to 1, by means hereinafter described, the first OP of the next OP train passes through gate 502 and enters the Main Adder (Fig. 51) as a "*y*" operand digit of 1. The output pulse from gate 502 (Fig. 56) also resets flip-flop 501 to 0, thereby preventing further OP's from passing through gate 502. Flip-flop 501 may be set to 1 from any of five sources, as follows.

Regarding the first set input to flip-flop 501, it has been stated previously that in order to generate the Logical Jump Code, it is necessary for the Main Adder (Fig. 51) to perform a subtractive operation. During this operation, a "*y*" operand of 1 is subtracted from an "*x*" operand of all 0's. To enable entry of the "*y*" operand of 1 into the Main Adder, a pulse is applied to the set input terminal of flip-flop 501 (Fig. 56) from an output terminal 916 of the Start-Stop Circuit (Fig. 75), as hereinafter described.

The second set input to flip-flop 501 is employed during the Add 1 Code, when a "*y*" operand of 1 is added to a word from Memory. CP–6 is applied to the input of a gate 504 (Fig. 56), that is armed by the Code Distributor during the Add 1 Code. The output of gate 504 is connected to the set input of flip-flop 501 for enabling entry of a "*y*" operand of 1 into the Main Adder (Fig. 51).

The third set input of flip-flop 501 (Fig. 56) is employed during the Round Off Code. Referring to Fig. 55, it has been shown that during the Round Off Code, a pulse is transmitted from the output terminal 482 of the Sign Control Circuit to the corresponding input terminal of the MA Unit Input Circuit (Fig. 56) if the value 1 is to be added to the half word standing in the "A" Register (Fig. 57). Terminal 482 (Fig. 56) is connected to the set input of flip-flop 501, and a pulse on that terminal enables entry of the "*y*" operand of 1 into the Main Adder (Fig. 51).

The fourth set input to flip-flop 501 (Fig. 56) is employed during the Match Code, at which time, it is desirable to omit a programmed command unless there is a match between two words that are being compared by subtracting one word from the other. Each CP–4 is applied to the input of a multiple-control gate 507 that is armed jointly by the Code Distributor, during the Match Code, and by the 1 side of flip-flop 505 through a cathode follower 506. The output of gate 507 is connected to the set input of flip-flop 501. Flip-flop 505 normally stands at 0, each CP–5 being applied to its reset input, and gate 507 is normally closed; therefore, CP–4 is normally blocked by gate 507, and flip-flop 501 remains in its 0 state, thereby failing to enable entry of a "*y*" operand of 1 into the Main Adder (Fig. 51). In this case, a command word in the "S" Register (Fig. 66) constitutes the "x" operand of the Main Adder (Fig. 51), and since a "y" operand of 0 is entered into the Main Adder, the value of the command word in the "S" Register (Fig. 66) is not increased by an extra value of 1, and the next command is not omitted. However, flip-flop 505 (Fig. 56) is set to 1, thereby fully arming gate 507 during the Match Code, by any pulse which is transmitted from the previously described output terminal 386 of the Main Adder (Fig. 51), and it is recalled that the pulse is transmitted to the MA Unit Input Circuit (Fig. 56) on terminal 386 if any digit 1 appears in the result of an addition or subtraction operation in the Main Adder. Therefore, if during the Match Code, when the values of two words have been compared by subtracting one from the other, the difference word contains all 0's, indicating a match, flip-flop 505 remains in its 0 state and the extra value of 1 is not added to the contents of the "S" Register (Fig. 66). However, if any digit 1 occurred in the difference word, there is no match, and flip-flop 505 (Fig. 56) is set to 1, thereby fully arming gate 507. The next CP–4 passes through gate 507 and sets flip-flop 501 to 1, thereby enabling entry of a "y" operand of 1 into the Main Adder (Fig. 51) for adding an extra value of 1 to the contents of the "S" Register (Fig. 66) and the next command is omitted.

The fifth set input to flip-flop 501 (Fig. 56) is received from the output of a gate that is armed by the 1 side of a flip-flop 503. The latter flip-flop normally stands at 0, its reset input being connected to the output of gates 507 and 514, as well as to the previously described output terminal 482 from the Sign Control Circuit (Fig. 55). Each CP–1 is applied to the input of gate 514 (Fig. 56). During any of three computer operations, it is desirable to enter a "y" operand of 1 into the Main Adder (Fig. 51) after a delay of one word interval, the necessity for this delay being explained hereinafter. In these three operations, upon the occurrence of a predetermined event in the computer, flip-flop 513 is set to 1, thereby arming gate 514. The next CP–1 passes through gate 514 to the set input of flip-flop 501, enabling entry of a "y" operand of 1 into the Main Adder (Fig. 51) in the manner hereinbefore described. The output pulse from gate 514 (Fig. 56) also resets flip-flop 513 to 0, thereby closing gate 514. The means by which flip-flop 513 may be set to 1 for enabling the delayed entry of a "y" operand of 1 into the Main Adder (Fig. 51) are as follows.

It has been shown in connection with the description of the Sign Control Circuit (Fig. 55) that under certain circumstances during the Compare Code, and under some circumstances during the Overflow Add Code, it is necessary to add an extra value of 1 to the contents of the "S" Register (Fig. 66), and that for these purposes, pulses are transmitted from the output terminals 467 and 498, respectively of the Sign Control Circuit (Fig. 55) to the MA Unit Input Circuit (Fig. 56). In Fig. 56, it is shown that both terminals 467 and 498 are connected to the set input of flip-flop 513; therefore, a pulse on either of these terminals causes delayed entry of a "y" operand of 1 into the Main Adder (Fig. 51). This operand is subsequently combined with the contents of the "S" Register (Fig. 66) as an "x" operand, in a manner hereinafter described.

The third set input to flip-flop 513 (Fig. 56) is also employed during the Compare Code. It is recalled that it is necessary to add an extra value of 1 to the contents of the "S" Register (Fig. 66) during a comparing operation if the subtraction comparison produces a result equal to or greater than 0, and that a pulse is transmitted from terminal 467 (Figs. 55 and 56) only if the sign of the result is plus. Since a result of minus 0 is possible in the Main Adder (Fig. 51), such a result must be employed for setting flip-flop 513 to 1 (Fig. 56), even though no set pulse is applied to that flip-flop through terminal 467. Accordingly, each CP–5 is applied to the input of a gate 515 that is armed by the Code Distributor during the Compare Code. The output of gate 515 is connected to the input of a gate 517 that is armed through cathode follower 508 by the 0 side of flip-flop 505. The output of gate 517 is connected to the set input of flip-flop 513. When flip-flop 505 stands at 0 during the Compare Code, thereby indicating that the result of the last subtraction wass all 0's, gate 517 is armed and CP–5 is transmitted through gates 515 and 517 for setting flip-flop 513 to 1. The output of gate 515 is also connected through the previously described output terminal 516 to the input of gate 466 in the Sign Control Circuit (Fig. 55) to test for a positive result of the last subtraction operation, as hereinbefore described.

During addressing operations, a selected sector number is subtracted, as a "y" operand in the Main Adder (Fig. 51), from each successive sector number that is read by the Sector Head 110(65) (Fig. 35), as an "x" operand, until a difference of 0 is obtained, at which time the Memory Drum is in the proper rotational position for the initiation of an operation for reading from or writing in the selected sector of Memory.

Referring to Fig. 38, it is recalled that each sector number occupies the first six cells of its related sector in the Sector Track, and that the last nine cells of each of these sectors contain 1's. Since the entire word in each sector of the Sector Tract constitutes the "x" operand from which the selected sector number is subtracted, the test for all 0's of the difference must be made after the sixth digit interval of the word time, so that the entire sector number has been subtracted, but before the nine 1's occur, since these 1's would destroy any all-0's condition occurring in the subtraction. Therefore, the ninth OP is employed to test for all 0's in the following manner.

Referring to Fig. 56, the 0 side of flip-flop 505 arms a gate 511 through a cathode follower 508. The ninth OP is applied to the input of gate 511 from an output terminal 766 of the Address Control Circuit (Fig. 67), and the output of gate 511 (Fig. 56) is connected through an output terminal 512 to a corresponding input terminal of the SC Delay Circuit (Fig. 72). If flip-flop 505 (Fig. 56) stands at 0 when the ninth OP is applied to terminal 766, gate 511 is armed, thereby indicating that the result of the last subtraction in the Main Adder was all 0's and gate 511 transmits the pulse to the SC Delay Circuit (Fig. 72) through terminal 512 as a "sector location" pulse, hereinafter designated as "SL" pulse.

*"A" Register.*—The "A" Register 520 (Fig. 33) is a forty-stage shift register of the type shown in Fig. 29, and is adapted to receive words, in the form of 1's pulses, either from the Arithmetic Bus or from the "T" Register 680 (Fig. 33), and to transmit such words either to the "R" Register 550 or to the "y" input of the Main Adder 360. It is also adapted to transmit words, in the form of 0's and 1's pulses, to the Transfer Busses. The transfers of words into and out of the "A" Register are controlled by OP trains and various control pulses, which are gated singly or in groups to the "A" Register as shift pulses during the various codes, hereinafter described. All shift pulses that are applied to the "A" Register are transmitted by that unit to the "C" Register 400 for reasons previously explained.

Referring to Fig. 57, the forty "A" Register stages are designated 521(1) to 521(40), the input, or most significant stage 521(40) being shown at the bottom of the figure. A shift bus 532 of the "A" Register receives shift pulses through an amplifier 531 from any of five sources, viz: (1) CP–1 and CP–2 applied through a shift gate 522 that is armed by the Code Distributor; (2) CP–1 to 4 applied through a shift gate 523 that is armed by the Code Distributor; (3) CP–1, CP–2, CP–5 and CP–6 applied through a shift gate 524 that is armed by the Code Distributor; (4) CP–6 applied through a pair of shift gates 525 and 526 that are connected in series and armed, respectively, through an output terminal 1025 of Code Counter "C" (Fig. 79), and by the Code Distributor; or (5) OP's applied through a shift gate 527 (Fig. 57) that is armed by the Code Distributor. The output pulses from amplifier 531 are transmitted not only to the shift bus 532, but also to the reset input of stage 521(40), and through the previously described output terminal 533 to the corresponding shift pulse input terminal of the "C" Register (Fig. 52).

The 1's input to the "A" Register is received from an output terminal 705 to the "T" Register (Fig. 64), or from the Arithmetic Bus through an input gate 534 (Fig. 57) that is armed by the Code Distributor.

Each of a pair of 0 and 1 output gates 541(0) and 541(1) from stage 521(1) of the "A" Register has its output connected to the 0's or 1's Transfer Bus through a respective output gate 542(0) or 542(1), both of the latter two gates being armed by the Code Distributor. The 1's output from gate 541(1) is also connected to the "y" input of the Main Adder (Fig. 51) through a gate 543 (Fig. 57) that is armed by the Code Distributor, and through an output terminal 544. The 1's output from gate 541(1) is further connected to the 1's input of the "R" Register (Fig. 58) through a gate 545 (Fig. 57) that is armed by the Code Distributor, and through an output terminal 546.

*"R" Register.*—The "R" Register 550 (Fig. 33) is a forty-stage shift register of the type shown in Fig. 29, and is adapted to receive words, in the form of 1's pulses, either from the "A" Register 520 (Fig. 33), from the "R" Adder 580, or from the Arithmetic Bus, and to transmit such words to the "y" input of the Main Adder 360. It is also adapted to transmit words, in the form of 0's and 1's pulses, to the "R" Adder or to the Transfer Busses. The transfers of words into and out of the "R" Register are controlled by OP trains and control pulses which are gated to the "R" Register as shift pulses during the various codes, hereinafter described.

Referring to Fig. 58, the forty "R" Register stages are designated 551(1) to 551(40), the input, or most significant stage 551(40) being shown at the bottom of the figure. A shift bus 555 of the "R" Register receives shift pulses through an amplifier 554 from either of two sources, viz: (1) CP–1 to 4 applied through a shift gate 552 that is armed by the Code Distributor; or (2) OP's applied through a shift gate 553 that is armed by the Code Distributor.

The 1's input to the "R" Register is received either from the Arithmetic Bus through an input gate 561 that is armed by the Code Distributor, or from the previously described output terminal 546 of the "A" Register (Fig. 57) and the "R" Adder (Fig. 59) through a cathode follower 556 (Fig. 58), a delay line 557 and an amplifier 558.

Each of a pair of 0 and 1 output gates 562(0) and 562(1) from stage 551(1) of the "R" Register has its output connected to the input of a respective gate 563(0) and 563(1), both of which are armed by the Code Distributor. The outputs of gates 563(0) and 563(1) are connected through respective terminals 564(0) and 564(1) to corresponding 0's and 1's input terminals of the "R" Adder (Fig. 59), hereinafter described. The 0's and 1's outputs of gates 562(0) and 562(1) (Fig. 58) are also connected to the inputs of a pair of gates 565(0) and 565(1), respectively, which are armed through a diode 567 by the Code Distributor or through a diode 572 by the 1 side of a normally reset flip-flop 571, hereinafter described. The outputs of gate 565(0) and 565(1) are connected through a pair of amplifiers 566(0) and 566(1) to the 0's and 1's Transfer Busses, respectively. The 1's output of gate 562(1) is also connected to the "y" input of the Main Adder (Fig. 51) through a gate 573 (Fig. 58) that is armed by the Code Distributor, and through an output terminal 574.

During the Right Shift Code, hereinafter described, it is desirable to shift the word standing in the "R" Register onto the Transfer Busses in synchronism with an OP train, but to delete the four least significant binary digits of that word (the first four binary digits that are shifted out of the "R" Register) during the shifting operation. For this purpose, gates 565(0) and 565(1) are maintained closed long enough to block the first four output digits from the "R" Register, and are then opened during the fourth digit interval of the shift operation, in preparation for transmitting the fifth and subsequent output digits from the "R" Register, as follows: The 4th OP from the Pattern Generator (Fig. 43) is applied to the input of a gate 572 (Fig. 58) that is armed by the Code Distributor. The output of gate 572 is connected to the set input of the previously-described flip-flop 571. During the appropriate word interval of the Right Shift Code, gate 572 is armed by the Code Distributor, and the 4th OP passes through gate 572 for setting flip-flop 571 to 1 and arming gates 565(0) and 565(1). The fifth and subsequent digits shifted out of the "R" Register are then transmitted through gates 565(0) and 565(1) to the Transfer Busses.

*"R" Adder.*—It is recalled that in multiplication operations, the multiplier word stands in the "R" Register 550 (Fig. 33), and that beginning with the least significant decimal or hexadecimal group of that word, each group of four binary digits is repetitively decreased by unity until its value is zero. Each time a multiplier word is decreased by unity, the multiplicand word, which stands in the "D" Register 600, is added to the partial product in the "A" Register 520. The subtraction of unity from a multiplier group is performed in the "R" Adder 580. When the value of a multiplier group reaches 0, the "R" Adder transmits a signal to the Timing Generator 920 (Fig. 34) for causing initiation of a right shift operation of four binary places of the multiplier word, to thereby position the next group of that word for continuing the multiplication. But during the detection of all 0's in a multiplier group, the "R" Adder subtracts an extra value of 1 from the zeroized group and causes an overflow in that group. In order to correct this overflow, the "R" Adder, upon detection of all 0's in a multiplier group, energizes the Sign Control Circuit 460 which, in turn, sets the Main Adder 360 for a subtractive operation and sets the "R" Adder for an additive operation. The Main Adder then subtracts the multiplicand word once from the partial product word, and the "R" Adder adds a corrective value of 1 to the multiplier group before the shifting operation. To enable the increasing or decreasing of the successive multiplier groups by unity, the multiplier word is shifted from the "R" Register through the "R" Adder, and back into the "R" Register, once each time the multiplicand word is added to or subtracted from the partial product word. A unit adder that may be employed in the present invention is separately disclosed and claimed in the copending application Serial No. 400,521, filed December 28, 1953, by Charles M. Hill.

The "R" Adder receives 0's and 1's pulses from the output terminals 564(0) and 564(1) of the "R" Register (Fig. 58). Referring to Fig. 59, terminals 564(0) and 564(1) are connected to the inputs of a pair of gates 582 and 583, respectively, that are armed by the respective 1 and 0 sides of a flip-flop 581. The latter flip-flop normally stands at 1, each CP–5 being applied to its set input. The outputs of gates 582 and 583 are joined to the previously described output terminal 584 from the "A" Register (Fig. 57), which terminal is connected to the 1's input of the "R" Register (Fig. 58). Terminals 564(0) and 564(1) (Fig. 59) are also connected to the reset input of flip-flop 581 through an add gate 585 and a subtract gate 586, respectively, which are armed by the respective output terminals 474 and 473 of the Sign Control Circuit (Fig. 55). When the Sign Control Circuit flip-flop 471 is set to 1, thereby conditioning the Main Adder (Fig. 51) for an additive operation, gate 585 of the "R" Adder (Fig. 59) is armed, and the "R" Adder is conditioned for a subtractive operation, as hereinafter described. Thus, during multiplication, while the Main Adder (Fig. 51) is adding the multiplicand word to the partial product word, the corresponding group of the multiplier word is being decreased by unity in the "R" Adder (Fig. 59). Similarly, when the Sign Control Circuit flip-flop 471 (Fig. 55) stands at 0, conditioning the Main Adder for a subtractive operation, gate 586 of the "R" Adder (Fig. 59) is armed, and the "R" Adder is conditioned for an additive operation, as hereinafter described. Thus, during multiplication, while the Main Adder (Fig. 51) is correctively subtracting the multiplicand word from the partial product word, the "R" Adder (Fig. 59) is correctively increasing the value of a corresponding multiplier group by unity.

In additive operation, the "R" Adder may be considered as storing an original operand digit of +1, which is added to each successive digit of an input word, in the manner of a positive chain carry, until a digit 0 appears in the input word for ending the chain carry. In other words, during additive operation of the "R" Adder, each digit 1 of an input word is transmitted from the "R" Adder as a sum digit of 0 until the first input digit of 0 occurs, after which time each 0 input digit is transmitted as a 0 and each 1 input digit is transmitted as a 1. In subtractive operation, the "R" Adder may be considered as storing an initial operand digit of −1, which is subtracted from each successive digit of an operand word in the manner of a negative chain carry, until a digit 1 appears in the input word to terminate the chain carry.

Referring to Fig. 59, an initial operand digit of +1 is stored in flip-flop 581 by CP–5 which sets that flip-flop to 1. During additive operation, when gate 582 is initially armed by the 1 state of flip-flop 581, and gate 585 is armed by the Sign Control Circuit (Fig. 55), each digit 1 input pulse from terminal 564(1) (Fig. 59) is blocked by gate 583, and the absence of an output at terminal 584 appears as a sum digit of 0. Each digit 1 input pulse is also blocked by gate 586, and flip-flop 581 remains set to 1. The first digit 0 input pulse from terminal 564(0) passes through gate 583 to the output terminal 584 as a sum digit of 1, and passes through gate 585 for resetting flip-flop 581 to 0, thereby arming gate 583 and closing gate 582. Thereafter, each digit 1 input pulse from terminal 564(1) passes through gate 583 as a sum digit of 1, and each digit 0 input pulse from terminal 564(0) is blocked by gate 582, the absence of an output pulse on terminal 584 appears as a sum digit of 0.

During subtractive operation, gate 582 is initially armed by the 1 state of flip-flop 581, and gate 586 is armed by the Sign Control Circuit (Fig. 55). Each digit 0 input pulse from terminal 564(0) passes through gate 582 to the output terminal 584 as a difference digit of 1, but is blocked by gate 585, and flip-flop 581 remains in its 1 state. The first digit 1 input pulse from terminal 564(1) is blocked by gate 583, and the absence of an output pulse on terminal 584 appears as a difference digit of 0. However, the first digit 1 input pulse passes through gate 586 and resets flip-flop 581 to 0, thereby arming gate 583 and closing gate 582. Thereafter, each digit 0 input pulse from terminal 564(0) is blocked by gate 582, and the absence of an output pulse on terminal 584 appears as a difference digit of 0, while each digit 1 input pulse from terminal 564(1) passes through gate 583 to terminal 584 as a difference digit of 1.

It is therefore seen that the initial setting of flip-flop 581 by CP–5 enables the propagation of a chain carry, and is disabled, in addition operation, by the first input digit of 0, and in subtraction operations, by the first input digit of 1.

The following means are provided for detecting all 0's in the single active multiplier group, and after a delay of one word interval, for conditioning the Main Adder (Fig. 51) for a corrective subtraction operation, and the "R" Adder (Fig. 59) for a corrective addition operation. The fifth OP during each word interval is transmitted from the Pattern Generator (Fig. 43) to the input of a multiple-control gate 591 that is armed jointly by the 1 side of flip-flop 581 and, during the Multiply Code, by the Code Distributor. The output of gate 591 is connected to the set input of a flip-flop 582. Each CP–5 is applied to the input of a gate 593 that is armed by the 1 side of flip-flop 592. The output of gate 593 is connected to the reset input of flip-flop 592, and is connected through the previously output terminal 594 to the corresponding input terminal of the Sign Control Circuit (Fig. 55), and to a corresponding input terminal of the Timing Generator (Fig. 76.)

When a multiplier group is being repetitively decreased by unity through a subtractive operation of the "R" Adder 580 (Fig. 33) the subtraction always occurs in the least significant group of the multiplier word, which is right-shifted, as explained hereinbefore, to replace the one active multiplier group in that position. Also, when the multiplier word in the "R" Register 550 is being circulated through the "R" Adder and back into the "R" Register for subtracting the value 1 from the active multiplier group, the shifting operation occurs in time with the fourth OP of a word interval. Therefore, the condition of all 0's of the active multiplier group is detected by the absence of an input digit of 1 to the "R" Adder during the first four digit intervals of a word interval, starting with the first OP of that word interval.

If the least significant group of the multiplier word comprises all 0's, flip-flop 81 (Fig. 59) remains set to 1, and gate 591 is armed. The fifth OP passes through gate 591 and sets flip-flop 592 to 1, thereby arming gate 593. The next CP–5 passes through gate 593 and terminal 594, and sets flip-flop 471 (Fig. 55) of the Sign Control Circuit to 1, thereby conditioning the Main Adder (Fig. 51) for a corrective subtraction operation, and conditioning the "R" Adder (Fig. 59) for a corrective addition operation. The output pulse from gate 593 also resets flip-flop 592 to 0, thereby closing gate 593, and conditions the Timing Generator (Fig. 76) for causing a right shift operation. If the least significant group of the multiplier word includes one or more digits 1, flip-flop 581 (Fig. 59) is reset to 0 through gate 586, and gate 591 is closed when it is interrogated by the fifth OP. Therefore, flip-flop 592 remains in its 0 state, and gate 593 remains closed, thereby blocking CP–5. The absence of an output pulse on terminal 594 causes flip-flop 471 (Fig. 55) of the Sign Control Circuit to remain in its 0 state; therefore, the Main Adder (Fig. 51) remains in its additive condition, and the "R" Adder (Fig. 59) remains in its subtractive condition. Also, the Timing Generator (Fig. 76) is not energized to initiate the right shift operation.

During the Match Code, one of the words that is to be matched against the other stands in the "R" Register 550 (Fig. 33). This word is shifted out of the "R" Register and into the Main Adder 360 as a "y" operand. However, this word is also circulated from the output of the "R" Register through the "R" Adder 580 and back into the "R" Register, for use in a next matching operation, if necessary. But when the match word is circulated through the "R" Adder, it is necessary that nothing be added to it.

Referring to Fig. 59, it is recalled that flip-flop 581 is initially set to 1 by CP–5, and thereby stores an operand digit of 1, which is combined with an input word, but that when flip-flop 581 is reset to 0, by means hereinbefore described, it is disabled for adding any further value to the input word. Accordingly, each CP–6 is applied to the input of a gate 587 that is armed by the Code Distributor during the Match Code. The output of gate 587 is connected to the set input of flip-flop 581. Therefore, after CP–5 sets flip-flop 581 to 1, CP–6 resets that flip-flop to 0 through gate 587, during the Match Code, and the match word that is circulated through the "R" Adder is not altered.

"D" *Register*.—The "D" Register 600 (Fig. 33) is a forty-stage shift register of the type shown in Fig. 29, and is adapted to receive input words, in the form of 1's pulses, either from its own output or from the Arithmetic Bus, and to transmit such words either to the "y" input of the Main Adder 360 or to the Read Control Circuit 300. The transfers of words into and out of the "D" Register are controlled by OP trains which are gated to the "D" Register as shift pulses during the various codes, hereinafter described.

Referring to Fig. 60, the forty "D" Register stages are designated 601(1) to 601(40), the input, or most significant stage 601(40) being shown at the bottom of the figure. A shift bus 604 of the "D" Register receives shift pulses through an amplifier 603 from OP trains applied through a shift gate 602 that is armed by the Code Distributor. The 1's input to the "D" Register is received either from the Arithmetic Bus through an input gate 605 that is armed by the Code Distributor, or from the output of the "D" Register, hereinafter described.

A 1's output gate 606 from stage 601(1) of the "D" Register has its output connected to the input of a gate 607 that is armed by the Code Distributor. The output of gate 607 is connected through an output terminal 608 to the "y" input of the Main Adder (Fig. 51). The output of gate 606 is also connected to the input of a gate 611 that is armed by the Code Distributor. The output of gate 611 is connected through the previously mentioned output terminal 612 to a corresponding input terminal of the Read Control Circuit (Fig. 48), and is connected through a cathode follower 613 (Fig. 60), a delay line 614 and an amplifier 615 to the set input of the "D" Register input stage 601(40).

"K" *Register*.—The "K" Register 620 (Fig. 33) is a four-stage shift register of a type shown in Fig. 29, which receives selected cycle-counting values, and cooperates with the "K" Subtractor for reducing a cycle-counting value by unity during each cycle that is to be counted in a computer operation, as hereinafter described. Cycle-counting values are received by the "K" Register, in the form of 1's pulses, either from the Arithmetic Bus or from the "K" Subtractor. Such values may also be entered into the "K" Register by selected combinations of control pulses. A value standing in the "K" Register may be shifted into the "K" Subtractor in the form of 0's and 1's pulses. The transfers of values into and out of the "K" Register are controlled either by CP–1 to 4 or by the first four OP's in an OP train during the various codes, hereinafter described.

Referring to Fig. 61, the four "K" Register states are designated 621(1) to 621(4), the input, or most significant stage 621(4) being shown at the bottom of the figure. The shift bus 632 of the "K" Register receives shift pulses from either of two sources, viz: (1) CP–1 to 4 applied through an input shift gate 622 that is armed either during SP–1 or SP–4, or by the Code Distributor; or (2) OP's applied through an input shift gate 624, an amplifier 625, and either of a pair of gates 627 or 628. Gates 627 and 628 are armed either during SP–2 or by the Code Distributor, and gate 624 is armed by the 1 side of a flip-flop 623 that normally stands at 1, each CP–5 being applied to its set input. The fourth OP of each train is applied from the Pattern Generator (Fig. 43) to the reset input of flip-flop 623 (Fig. 61), thereby resetting the latter flip-flop to 0 and closing gate 624. Therefore, only the first four OP's of any OP train are transmitted through gate 624 and ultimately to the shift bus 632. The output of amplifier 625, in addition to being connected to the inputs of gate 627 and 628, is also connected through an output terminal 626 to a shift input of the "T" Register (Fig. 64) hereinafter described; therefore, the first four OP's of each train are transmitted through gate 624 (Fig. 61), amplifier 625 and output terminal 626 to the "T" Register.

A pair of 0 and 1 output gates 634(0) and 634(1), respectively, of the output stage 621(1) are separately shifted through an output shift gate 633 that is armed, along with the previously described gate 627, either during SP–2 or by the Code Distributor. The outputs of gates 622, 627 and 628 are connected to the input of gate 633; therefore, the output gates 634(0) and 634(1) may be shifted either by CP–1 to 4 or by the first four OP's of an OP train. The outputs of gates 634(0) and 634(1) are connected through respective output terminals 635(0) and 635(1) to corresponding 0's and 1's input terminals of the "K" Subtractor (Fig. 62), hereinafter described.

The 1's input to the "K" Register may be received from the Arithmetic Bus through a gate 636 (Fig. 61) that is armed by the Code Distributor, or may be received through a cathode follower 645, a delay line 646 and an amplifier 647 from any of five sources, viz: (1) CP–1 applied through a gate 641; (2) CP–2 applied through a gate 642; (3) CP–3 applied through a gate 643; (4) CP–4 applied through a gate 644; or (5) the 1's output terminal 644 of the "K" Subtractor (Fig. 62). Each gate 641, 642, 643 and 644 (Fig. 61) may be armed by the Code Distributor, and gates 641, 642 and 643 are armed during SP–1 and SP–4.

"K" *Subtractor*.— The "K" Subtractor 650 (Fig. 33) is provided for circulating a cycle-counting value from the output of the "K" Register 620 to the input of the same register, and for decreasing that value by unity during each such circulation. Control voltages indicating whether the cycle-counting value is zero or non-zero during its last pass through the "K" Subtractor are applied by the "K" Subtractor to the KS Sensing Circuit 660. The "K" Subtractor comprises a unit adder of the same general type as the "R" Adder 580, previously described in connection with Fig. 59, except that the former is permanently adapted only for subtracting unity from each input value, whereas the latter is controlled by the Sign Control Circuit 460 for selectively adding unity to or subtracting unity from an input word.

Referring to Fig. 62, the "K" Subtractor includes a flip-flop 651 that normally stands at 1, each CP–5 being applied to its set input. The 0's output terminal 635(0) from the "K" Register (Fig. 61) is connected to the input of a gate 652 (Fig. 62) that is armed by the 1 side of flip-flop 651, and the 1's output terminal 635(1) of the "K" Register (Fig. 61) is connected to the input of a gate 653 (Fig. 62) that is armed by the 0 side of flip-flop 651. The outputs of gates 652 and 653 are joined and are connected through the previously described output lead 654 to the 1's input of the "K" Register (Fig. 61). The 1's input terminal 635(1) (Fig. 62), in addition to being connected to the input of gate 653, is also connected to the reset input of flip-flop 651. The operation of the "K" Subtractor is identical to the subtractive operation of the "R" Adder (Fig. 59) when gate 586 is open and gate 585 is closed, and each value from the "K" Register output on terminals 635(0) and 635(1) (Fig. 61) is decreased by unity in the "K" Subtractor (Fig. 62) and transmitted through terminal 654 to the 1's input of the "K" Register (Fig. 61).

The 0 and 1 sides of flip-flop 651 (Fig. 62) are connected through respective control terminals 655 and 656 to corresponding inputs of the KS Sensing Circuit (Fig. 63). If the value of an input word to the "K" Subtractor (Fig. 62) is all 0's, flip-flop 651 remains in its 1 state, and control terminal 656 is at a relatively high potential, whereas if the word is not all 0's flip-flop 651 is reset to 0 and control terminal 655 is at a relatively high potential.

"K" *Subtractor Sensing Circuit*.—The KS Sensing Circuit 660 (Fig. 33) is provided for sensing the 0 or 1 state of the "K" Subtractor 650, as previously described, and for transmitting signals to the "C" Register 400, the Sequencer 850 (Fig. 34), the Timing Generator 920, and Code Counter "C" 1000 in accordance with the results of the sensing operation, and for purposes hereinafter described in relation to the various computer codes. If the "K" Subtractor stands at 0, a control pulse may be gated to the Timing Generator, and if the "K" Subtractor stands at 1, a signal from the Sequencer is transmitted back to the Sequencer, and a control pulse may be gated to the "C" Register, the Timing Generator and/or to the Code Counter "C."

Referring to Fig. 63, each CP–4 is applied to the input of a gate 661, that is armed by the 0 side control terminal 655 of the "K" Subtractor (Fig. 62). The output of gate 661 (Fig. 63) is connected to the inputs of a pair of gates 662 and 664, each of which is armed by the Code Distributor. The outputs of gates 662 and 664 are connected through respective output terminals 663 and 665 to corresponding input terminals of the Timing Generator (Fig. 76).

Each CP–4 is applied to the input of a gate 666 (Fig. 63) that is armed by the 1 side control terminal 656 of the "K" Subtractor (Fig. 62). The output of gate 666 (Fig. 63) is connected through the previously described output terminal 667 to the corresponding reset input terminal of the "C" Register (Fig. 52), and is connected to the inputs of three gates 668, 672 and 674 (Fig. 63), each of which is armed by the Code Distributor. The output of gate 668 is connected through an output terminal 671 to a corresponding input terminal of the Timing Generator (Fig. 76); the output of gate 672 (Fig. 63) is connected through an output terminal 673 to a corresponding input terminal of the Timing Generator (Fig. 76); and the output of gate 674 (Fig. 63) is connected through an output terminal 675 to a corresponding input terminal of Code Counter "C" (Fig. 79). A signal from an output terminal 871 of the Sequencer (Fig. 74) is applied to the input of a gate 676 (Fig. 63) that is armed through the 1 side control terminal 656 of the "K" Subtractor (Fig. 62). The output of gate 676 (Fig. 63) is connected through an output terminal 677 back to the Sequencer (Fig. 74).

*"T" Register.*—The "T" Register 680 (Fig. 33) is a six-stage shift register of the type shown in Fig. 29, and is adapted to receive serial input words from the Arithmetic Bus and parallel input words from the Typewriter 1200, and to transmit serial output words to the "A" Register 520 and parallel output words to the Typewriter. The serial transfers of words into and out of the "T" Register are controlled by CP's or OP trains which are gated to the "T" Register as shift pulses during the various codes, hereinafter described. Certain special values may also be entered into the "T" Register by gated CP's.

Referring to Fig. 64, the six "T" Register stages are designated 681(1) to 681(6), the input, or most significant stage 681(6) being shown at the bottom of the figure. A shift bus 687 of the "T" Register receives shift pulses through an amplifier 686 from any of four sources, viz: (1) CP–1 and CP–2 applied through a shift gate 682 that is armed by the Code Distributor; (2) CP–6 applied through a multiple-control shift gate 683 that is armed jointly by the Code Distributor and through the previously described output terminal 1025 of Code Counter "C" (Fig. 79); (3) the first four OP's from the previously described output terminal 626 of the "K" Register (Fig. 61) applied through a shift gate 684 (Fig. 64) that is armed by the Code Distributor; or (4) OP's applied through a shift gate 685 that is armed by the Code Distributor. The serial 1's input to the "T" Register is received from the Arithmetic Bus through an input gate 688 that is armed by the Code Distrbutor along with the previously described shift gate 685.

Stage 681(4) may be separately reset by CP–3 applied through a gate 691 that is armed jointly by the Code Distributor and through the previously mentioned output terminal 1025 from Code Counter "C" (Fig. 79). Stage 681(5) (Fig. 64) may be reset to 0 while stage 681(6) is set to 1 by CP–3 applied through a gate 692 that is armed by the Code Distributor. Similarly, stage 681(5) may be set to 1 while stage 681(6) is being reset to 0 by CP–3 applied through a gate 693 that is armed by the Code Distributor. The reset input of each stage 681(1) to 681(6) is received through a respective 0's input terminal 698(1) to 698(6) from the Typewriter (Fig. 33), and the set input of each stage 681(1) to 681(6) (Fig. 64) is received through a respective 1's input terminal 699(1) to 699(6) of the Typewriter (Fig. 33). The 1 side output terminal of each stage 681(1) to 681(6) (Fig. 64) is connected through a respective amplifier 696(1) to 696(6) and a corresponding 1's output terminal 697(1) to 697(6) to the Typewriter (Fig. 33). A 1's output gate 701 (Fig. 64) from stage 681(1) has its output connected through a cathode follower 702, a delay line 703, an amplifier 704, and the previously mentioned output terminal 705 to the 1's input of the "A" Register (Fig. 57). The Typewriter 1200 is described in detail in United States Patent No. 2,700,446, issued January 25, 1955, to E. O. Blodgett.

ADDRESS SECTION

*In general.*—The Address Section includes the "O" Register 710 (Fig. 34) that is adapted to receive, from the Arithmetic Bus, commands or addresses of commands. A command comprises (1) the address of an operand, and (2) a code number. First, the Address Section is employed for locating, in Memory 100 (see also Fig. 33), the command whose address stands in the "O" Register (Fig. 34). That command is read out of Memory, through the related Read-Write Amplifier 240, the Interpreter 270, the Sign Clipper 340, the Main Adder 360, and the Arithmetic Bus, to the "O" Register 710. The address of the operand comprises four octal digits, expressed in the "O" Register in OGB notation. The two least significant octal digits represent the selected sector number of a band in Memory (where the operand is located); the next two octal digits represent the selected band number; and three additional octal digits represent the code value which determines what operation is to be performed on the operand in the selected address. In the addressing operation, the band is located first, then the sector. This terminates the addressing operation as to the selected operand. Next, the operand is read out of Memory and transmitted to some unit of the computer as determined by the code number standing in the "O" Register. The latter operation will be described in connection with the Control Section. The process of locating an operand in the selected address of Memory is as follows.

A first part of an addressing operation is employed to search for the selected band, as previously mentioned. During this time, the entire contents of the "O" Register are circulated eight times through the "O" Subtractor 770 and back into the "O" Register, and the value 1 is subtracted from each octal digit of the band number during each such circulation, by means of an address pattern from the Pattern Generator 180, which pattern is gated to the "O" Subtractor through the Address Control Circuit 750. As each of the two octal digits in the band number passes through the "O" Subtractor, the latter unit transmits a pulse, through one of two paths, to the CBP Distributor 790. If the octal digit is other than 0, and has not been reduced beyond 0, the CBP Distributor distributes the pulse to a corresponding one of two initially zeroized counters, the Band Counter 810 and the Band Group Counter 820. If the octal digit is 0, the output pulse from the "O" Subtractor disables transmission of further pulses from the CBP Distributor to the corresponding Band Counter or Band Group Counter. The CBP Distributor is commutated by pulses of the address pattern, which pulses are gated by the Address Control Circuit. Thus, at the end of eight circulations of the "O" Register contents through the "O" Subtractor, each of the two octal digits in the band number has been reduced in steps of 1 through the value 0 and back to its original value, and its related Band Counter or Band Group Counter has been advanced to a count corresponding to the original value of the octal digit.

When the Band Counter and the Band Group Counter have been set to the selected values, the Address Section then searches for the selected sector. The contents of the "O" Register continue to circulate through the "O" Subtractor, but nothing further is subtracted therefrom because the Address Control Circuit now blocks the address pattern from the "O" Subtractor. During each such circulation, the contents of the "O" Register are also transmitted to the Address Control Circuit, which transmits only the two octal sector digits to the "y" input of the Main Adder 360. The successive sector numbers from the Sector Track of Memory are transmitted through the Sector Head 110(65), the Sector Read Amplifier 260, the Interpreter 270, and the Transfer Busses, to the "x" input of the Main Adder, and the "y" input of the Main Adder is subtracted from the "x" input of that unit under control of the Sign Control Circuit 460. When the selected sector number matches the sector number that is read from the Sector Track of Memory, the Main Adder produces a difference of all 0's, which sets the MA Unit Input Circuit 500. Each ninth OP is transmitted from the Address Control Circuit to the MA Unit Input Circuit to sense for a Main Adder difference output of all 0's. When a difference of all 0's is sensed, the MA Unit Input Circuit energizes the SC Delay Circuit 830 on the ninth OP, and the latter circuit generates a Sector Coincidence pulse, or "SC pulse," at the end of that word interval, and generates a delayed SC pulse at the end of the following word interval. Both the SC pulse and the delayed SC pulse are transmitted to the Control Section for initiating control operations, as hereinafter described. In response to the ninth OP, the SC Delay Circuit also energizes the Band Counter and the Band Group Counter to initiate a reading operation, as follows.

The Band Counter, when energized, partially arms one Read-Write Amplifier 240 in each of eight groups of Read-Write Amplifiers, and the Band Group Counter, when energized, partially arms one entire group of eight Read-Write Amplifiers. Thus, when both the Band Counter and the Band Group Counter are energized, one and only one Read-Write Amplifier is partially armed by both of these counters, and becomes fully armed for performing a reading operation, which is selected under control of the Control Section, hereinafter described. Although the Band Counter and the Band Group Counter are energized in response to the ninth OP of the word interval during which sector coincidence is found, the selected Read-Write Amplifier inherently requires a substantial amount of time to be armed by these two counters. Thus, the actual reading operation is initiated by the delayed SC pulse in the Control Section. It has been stated that the delayed SC pulse is transmitted to the Control Section nearly two word intervals after sector coincidence has been found on the ninth OP; therefore, a reading operation occurs during the second word interval after sector coincidence is found, and each sector of each Information Band in Memory is offset two sectors from its corresponding sector of the Sector Track. But a writing operation, as well as a reading operation, is delayed in this manner and the offsetting by any arbitrary number of sectors does not interfere with the timing of the computer.

During the reading operation, the operand at the selected address of Memory is read out and transmitted to a desired unit of the computer, and a selected operation is performed on that operand in accordance with the code number in the command, and under control of the Control Section, as hereinafter described.

After the desired arithmetic or other operation has been performed, the Control Section enables the Address Section for performing a next step in the computer, viz., the setting up of the address of a new command. During location of the operand address and the carrying out of the selected code operation on that operand, the "S" Register 730 stores the address of the command which controls such operation. After completion of such operation, the contents of the "S" Register are circulated through the Transfer Busses, the Sign Clipper 340, the Main Adder 360, the Arithmetic Bus, and the first section of the "O" Register 710 into both the "S" Register and the second section of the "O" Register. When the command address passes through the Main Adder, it is normally increased by the value 1, which increases the sector number of the address by the value 1. This is done because consecutive commands are stored in consecutive sectors of one or more Information Bands of Memory. Under certain circumstances, it is desirable to omit the next command. In such case, the Main Adder adds the value 2 to the command address, under control of the MA Unit Input Circuit 500 which presets the Main Adder for adding an extra value of 1. When the new command address has been returned to the "S" Register and entered into the second section of the "O" Register, the previously described addressing operation is carried out, beginning with the circulation of the contents of the "O" Register through the "O" Subtractor 770, and the command which is located at the new address in Memory is read out of Memory, and through the related Read-Write Amplifier 240, the Interpreter 270, the Transfer Busses, the Sign Clipper 340, the Main Adder 360, the Arithmetic Bus, and into the "O" Register. The "S" Register again stores the command address in preparation for once again increasing it by the value 1 or 2 after the present command has been performed.

*"O" Register.*—The "O" Register 710 (Fig. 34) is a forty-stage shift register of the type shown in Fig. 29, and includes a first section of twenty-eight stages and a second section of twelve stages. The "O" Register is adapted to receive words, in the form of 1's pulses, either from the Arithmetic Bus or from the "O" Subtractor 770. The first section of the "O" Register is adapted to transmit words, in the form of 1's pulses, to the "S" Register 730, and the second section is adapted to transmit such words to the Address Control Circuit 750. The second section is also adapted to transmit words, in the form of 0's and 1's pulses, to the "O" Subtractor. Words are shifted into and out of the two sections of the "O" Register by OP's that are gated to form shift pulses during addressing operations.

A word that is shifted into the "O" Register includes either a command or the address of a command. It is recalled that a command comprises (1) the address of an operand and (2) a code number. The operand address is expressed as four octal groups of three binary digits each, the two least significant octal groups of a word representing a sector value of 000/000(OGB) to 111/111(OGB), and the two next most significant octal groups representing a band value of 000/000(OGB) to 111/111(OGB). Therefore, the twelve least significant binary places in a command word are employed for representing the address of an operand. The next eight binary places are employed for representing a code number, also expressed in OGB notation, from 00/000/000 (OGB) to 11/111/111(OGB). It is seen that the most significant octal group of the code number has only two binary digits, this is so because the value of that group never exceeds 011(OGB), and its third digit is always 0 and may be ignored. Since the command requires only twenty binary places, the twenty most significant places of a command word are available for representing a second command in dual-addressing operations, or for representing special values that may be included with a command word for controlling sub-routine operations or the like. If a word received by the "O" Register includes only the address of a command, this address is expressed, like an operand address, by the four least significant octal groups of the word.

Referring to Fig. 65, the "O" Register stages are designated 711(1) to 711(40), the least significant, or input stage 711(40) being shown at the bottom of the drawing. A shift bus 714 receives shift pulses through an amplifier 713 from OP's applied through a gate 712 that is armed either by the Sequencer during SP–1 or SP–2 or SP–4, or by the Code Distributor. The 1's input to the "O" Register is received either from an output terminal 782 of the "O" Subtractor (Fig. 68) or from the Arithmetic Bus through a gate 715 (Fig. 65) that is armed either by the Sequencer during SP–1 or 4, or by the Code Distributor.

A pair of output gates 717(0) and 717(1) of the output stage 711(1) are separately shifted by OP's applied through a gate 716 that is armed either by the Sequencer during SP–2, or by the Code Distributor. The outputs of gates 717(0) and 717(1) are connected through respective output terminals 718(0) and 718(1) to corresponding inputs of the "O" Subtractor (Fig. 68). Output terminal 718(1) (Fig. 64) is also connected to a corresponding input of the Address Control Circuit (Fig. 67).

It is also recalled that each command address which is shifted into the "O" Register 710 (Fig. 34) is transmitted by the latter to the "S" Register 730. For this purpose, the shift pulses on bus 714 (Fig. 65) are applied to the input of a gate 712 that is armed by the 1 side of "O" Register state 711(13). The output of gate 721 is connected through an amplifier 722 and an output terminal 723 to a corresponding input terminal of the "S" Register (Fig. 66). Therefore, each digit 1 that is shifted from stage 711(13) (Fig. 65) to stage 711(12) is also transmitted to the "S" Register (Fig. 66) through terminal 723.

*"S" Register.*—The "S" Register 730 (Fig. 34) is a twelve-stage shift register of the type shown in Fig. 29, and is adapted to receive input words, in the form of 1's pulses, from the output of the first section of the "O" Register 710, and to transmit words, in the form of 0's and 1's pulses, to the Transfer Busses. The transfers of words into and out of the "S" Register are controlled by CP's and OP trains which are gated to the "S" Register as shift pulses during addressing operations.

Referring to Fig. 66, the twelve "S" Register stages are designated 731(1) to 731(12), the input, or most significant stage 731(12) being shown at the bottom of the figure. A shift bus 735 of the "S" Register receives shift pulses through an amplifier 734 from either of two sources, viz: (1) CP–5, CP–6 and OP trains applied through a shift gate 732 that is armed by the Code Distributor; (2) OP trains that are applied through a shift gate 733 that is armed either by the Sequencer during SP–1, or by the Code Distributor. The 1's input to the "S" Register is received from the previously described output terminal 723 of the first section of the "0" Register (Fig. 65) through an input gate 741 (Fig. 66) that is armed either by the Sequencer during SP–1, or by the Code Distributor, the output of gate 741 being connected to the 1's input of the "S" Register through a cathode follower 742, a delay line 743, and an amplifier 744. A pair of output gates 737(0) and 737(1) from the output stage 731(1) of the "S" Register are separately shifted through a gate 736 that is armed either by the Sequencer during SP–1, or by the Code Distributor. The shift pulses applied to gate 736 are received either from the output of gate 732 or from the output of gate 733, previously described. The outputs of gates 737(0) and 737(1) are connected through a pair of amplifiers 738(0) and 738(1) to the respective 0's and 1's Transfer Busses.

*Address Control Circuit.*—The Address Control Circuit 750 (Fig. 34) receives each command or command address word that is shifted out of the "O" Register 710, and transmits the first two octal groups of the word, representing a sector number, to the "y" input of the Main Adder 360 (see also Fig. 33). The Address Control Circuit also receives from the Pattern Generator 180 the address pattern comprising three 0's followed by the repeated group "100." During the first part of an addressing operation, when a band is being selected, the above pattern is transmitted by the Address Control Circuit to the "O" Subtractor 770 for subtracting the value 1 from each octal group, excluding the first two octal groups which represent the sector number. The Address Control Circuit also alters the address pattern by changing the sixth digit from 1 to 0, and transmits the altered pattern to the "O" Subtractor for sensing the 0 or 1 state of that unit, as hereinafter described. The altered pattern is also transmitted to the CBP Distributor for controlling the commutation of pulses from the "O" Subtractor to the Band Counter 810, the Band Group Counter 820, and the Code Counters 970, 990, and 1000.

When the selected band has been located, and the computer begins to locate the selected sector, the Address Control Circuit transmits the first digit 1 in each cycle of the altered pattern, i.e., the ninth OP of each word interval, to the MA Unit Input Circuit 500 to test for all 0's in the output of the Main Adder for determining sector coincidence. During the location of the selected sector, the Address Control Circuit also energizes the SC Delay Circuit 830 but no longer transmits the unaltered address pattern to the "O" Subtractor.

The 1's output terminal 718(1) from stage 711(1) of the "O" Register (Fig. 65) is connected to the input of a gate 752 (Fig. 67) that is armed by the 0 side of a flip-flop 751. The output of gate 752 is connected through an output terminal 753 to the "y" input of the Main Adder (Fig. 51). Flip-flop 751 (Fig. 67) normally stands at 0, each CP–5 being applied to its reset input. The address pattern of three 0's followed by the repeated group 100 is applied to the set input of flip-flop 751 through a cathode follower 754, a delay line 755 and an amplifier 756. Therefore, any 1's that occur in the first six digits of the "O" Register output (the sector number) are transmitted through gate 752 and terminal 753 to the Main Adder (Fig. 51); the digit 1 in the sixth binary place of the address pattern sets flip-flop 751 (Fig. 67) to 1; and the subsequent "O" Register digits are not transmitted to the Main Adder.

The address pattern is also applied to the input of a gate 763 that is armed by the 0 side of flip-flop 762. The output of gate 763 is connected through an output terminal 764 to a set input of the "O" Subtractor (Fig. 68), hereinafter described. Flip-flop 762 (Fig. 67) is reset to 0 by each CP–5, and therefore normally arms gate 763 for enabling the address pattern to be transmitted to the set input of the "O" Subtractor (Fig. 68). The address pattern is also applied to the input of a gate 758 (Fig. 67) that is armed by the 1 side of flip-flop 757. The latter flip-flop normally stands at 0, each CP–5 being applied to its reset input. The address pattern is applied to the set input of flip-flop 757, and the first digit 1 in that pattern sets flip-flop 757 to 1 for arming gate 758. The output of gate 758 is connected through an output terminal 761 to the sensing input of the "O" Subtractor (Fig. 68), and to the commutating input of the CBP Distributor (Fig. 69). Since flip-flop 757 (Fig. 67) is reset to 0 by each CP–5, gate 758 is closed at the beginning of each word interval and blocks the first digit 1 in the address pattern. However, the same digit 1 sets flip-flop 757 to 1 and arms gate 758; therefore, the remainder of the address pattern is transmitted to the "O" Subtractor (Fig. 68) and to the CBP Distributor (Fig. 69) through terminal 761 (Fig. 67).

The altered address pattern is also applied to the input of a gate 765 that is armed by the 1 side of flip-flop 762. The output of gate 765 is connected through the previously described output terminal 766 to the MA Unit Input Circuit (Fig. 56). After the selected band has been located, flip-flop 762 (Fig. 67) is set to 1 through an output terminal 874 of the Sequencer (Fig. 74), thereby closing gate 763 (Fig. 67) and arming gate 766. This blocks the unaltered address pattern from the "O" Subtractor (Fig. 68) and transmits each subsequent altered address pattern to the MA Unit Input Circuit (Fig. 56). The first digit 1 in each altered address pattern occurs on the ninth OP, and senses the MA Unit Input Circuit for all 0's to test for sector coincidence. Each CP–4 is applied to the input of a gate 767 (Fig. 67) that is also armed by the 1 side of flip-flop 762. The output of gate 767 is connected through an output terminal 768 to a corresponding input of the SC Delay Circuit (Fig. 72). Therefore, after flip-flop 762 (Fig. 67) has been set to 1 for sector searching, the next CP–4 is transmitted through gate 767 and terminal 768 to the SC Delay Circuit (Fig. 72).

*"O" Subtractor.*—The "O" Subtractor 770 (Fig. 34) is provided for subtracting the value 1 from each octal group, starting with the third such group, in the command word or command address word standing in the "O" Register 710 during each of the eight word intervals of band searching. By this means, each octal group in the band number or code number is separately reduced to 0. At the end of each input octal group from the "O" Register, the "O" Subtractor is sensed to determine whether or not that input group was all 0's. If it was not all 0's, a counting pulse is transmitted to the CBP Distributor 790, and if it was all 0's, a count-disabling pulse is transmitted to the CBP Distributor. The input word, after the value 1 has been subtracted from each of its octal groups starting with the third group, is transmitted back to the 1's input of the "O" Register.

Referring to Fig. 68, the "O" Subtractor is a unit subtractor similar to the "K" Subtractor (Fig. 62), previously described. Output words from the "O" Register (Fig. 65) on terminals 718(0) and 718(1) (Fig. 68) are applied to the inputs of respective gates 773 to 775. Gate 773 is armed through a cathode follower 772 by the 1 side of the flip-flop 771, and gate 775 is armed through a cathode follower 774 by the 0 side of flip-flop 771. The latter flip-flop normally stands at 0, each CP–5 being applied to its reset input. The 1's input terminal 718(1) is also connected to the reset input of flip-flop 771, and the previously described output terminal 764 from the Address Control Circuit (Fig. 67) is connected to the set input of flip-flop 771 (Fig. 68). The outputs of gates 773 and 775 are joined, and are connected to the input of a gate 776 that is armed either by the Sequencer during SP–2, or by the Code Distributor. The output of gate 776 is connected through a cathode follower 777, a delay line 778, an amplifier 781, and the previously described output terminal 782, to the 1's input of the "O" Register (Fig. 65).

Since flip-flop 771 (Fig. 68) normally stands at 0, gate 775 is normally armed, and gate 773 is normally closed. This causes 0's pulses from terminal 718(0) to be blocked and 1's pulses from terminal 718(1) to be passed, and the output word to the "O" Register (Fig. 65) is the same as the input word, i.e., nothing is subtracted from the input word. However, the unaltered address pattern is applied to the set input of flip-flop 771 (Fig. 68) through terminal 764, and each digit 1 of that pattern sets the "O" Subtractor for a subtractive operation. The first digit 1 occurs on the sixth OP (the last digit of the second octal group), and sets the "O" Subtractor for subtracting the value 1 from the next octal group (the first octal group of the band number). The second digit 1 in the address pattern occurs on the ninth OP, and again sets flip-flop 771 to 1 in case it has been set to 0 by the occurrence of a digit 1 in the third octal group of the input words. If no digits 1 occurred in the third octal group of the input word, flip-flop 771 already stands at 1 when the second digit 1 of the address pattern is applied to the set input of that flip-flop, and the latter digit 1 has no affect. In this manner, the value 1 is subtracted from each subsequent octal group in the input word.

At the end of each octal input group, starting with the third group, the "O" Subtractor is sensed to determine whether or not any 1's occurred in that input group. The altered address pattern, comprising a digit 1 occurring on each third digit interval starting with the ninth OP, is applied to the inputs of a pair of gates 783 and 784 that are armed by the respective 0 and 1 sides of flip-flop 771. The output of gate 783 is connected through an amplifier 785 and an output terminal 787 to a corresponding counting input terminal of the CBP Distributor (Fig. 69). The output of gate 784 (Fig. 68) is connected through an amplifier 786 and an output terminal 788 to a corresponding disabling input terminal of the CBP Distributor. If one or more digits 1 occur in an octal group of the input word from the "O" Register (Fig. 65), flip-flop 771 (Fig. 68) is reset to 0, and gate 784 is armed; the digit 1 pulse occurring at the end of that group in the altered address pattern passes from terminal 761 through gate 783, amplifier 785 and terminal 787 to the counting input of the CBP Distributor (Fig. 69). If no digits 1 occur during the group, flip-flop 771 (Fig. 68) remains in its 1 state, and gate 784 is armed; therefore, the sensing pulse from terminal 761 passes through gate 784, amplifier 786 and terminal 788 to the disabling input of the CBP Distributor (Fig. 69).

*Code-Band Pulse Distributor.*—The CBP Distributor 790 (Fig. 34) receives the sensing pulses from the "O" Subtractor 770 representing the zero or non-zero value of each octal group in the band and/or code number of a command or command address that is being circulated from the "O" Register 710 through the "O" Subtractor and back into the "O" Register. Each non-zero sense pulse from the "O" Subtractor indicates, as previously described, that the value standing in the corresponding Band Counter 810, Band Group Counter 820, or Code Counter 970, 990 or 1000, should be increased by unity, and the CBP Distributor accordingly transmits that pulse to the appropriate counter. If a zero-sense pulse is transmitted to the CBP Distributor from the "O" Subtractor in response to the sensing of an octal group, this indicates that the value standing in the corresponding counter should not be increased any further, and the CBP Distributor output to that particular counter is accordingly disabled. The CBP Distributor inputs are related to its various outputs to the counters, in succession, by commutating pulses received from the Address Control Circuit 750. The CBP Distributor inputs are initially related to an output connected to the Band Counter. The first commutating pulse occurs after the sensing of the third octal group of the word standing in the "O" Register, i.e., the group representing the least significant octal digit of the selected band number. This commutating pulse relates the CBP Distributor inputs to an output connected to the Band Group Counter, and so on through the entire series of octal groups in the command or command address. The Band Counter, the Band Group Counter and the Code Counters each receive one counting pulse during each pass of the command or command address through the "O" Subtractor until its related octal digit is reduced to zero, after which time it receives no more than pulses. Since the contents of the "O" Register are circulated through the "O" Subtractor eight times, and since an octal digit can have a value no greater than 7(Oc), each of the octal digits is reduced to zero during one of these circulations.

Referring to Fig. 69, the CBP Distributor includes a five-state linear counter 791 of the type shown in Fig. 31. The five stages of the linear counter are designated 791(1) to 791(5), the least significant stage 791(1) being shown at the bottom of the drawing. At the end of each word interval, CP–4 is applied to the set input of stage 791(1), thereby causing that stage to conduct and cutting off any other conducting stage. Counting pulses are received by the CBP Distributor from the previously described output terminal 761 of the Address Control Circuit (Fig. 67), and are applied to the input of linear counter 791 (Fig. 69) through an amplifier 792 and a cathode follower 793. Non-zero sense pulses from the output terminal 787 of the "O" Subtractor (Fig. 68) are applied to the inputs of five gates 796(1) to 796(5) (Fig. 69) that are armed by the 1 sides of the respective counting stages 791(1) to 791(5). Similarly, the zero-sense pulses from the output terminal 788 of the "O" Subtractor (Fig. 68) are applied to the inputs of five gates 797(1) to 797(5) (Fig. 69) that are armed by the 1 sides of the respective linear counter stages 791(1) to 791(5). The outputs of gates 796(1) to 796(5) are connected to the respective inputs of five gates 801(1) to 801(5), each of which is armed by the 1 side of a respective flip-flop 798(1) to 798(5), and the output of each gate 797(1) to 797(5) is connected to the reset input of a corresponding flip-flop 798(1) to 798(5). The output of gate 801(1) is connected through an output terminal 802(1) to the counting input of the Band Counter (Fig. 70); the output of gate 801(2) (Fig. 69) is connected through an output terminal 802(2) to the counting input of the Band Group Counter (Fig. 71); and the output of each gate 801(3) to 801(5) (Fig. 69) is connected through a respective output terminal 802(3) and "A" (Figs. 79, 78 and 77, respectively). At the end of either SP–1 or SP–4 during an addressing operation, a pulse is applied through an output terminal 684 of the Sequencer (Fig. 74) to the set input of each flip-flop 798(1) to 798(5) (Fig. 69), thereby arming all of the gates 801(1) to 801(5).

The first possible non-zero sense pulse of a word interval occurs, if at all, on the ninth OP, and is transmitted through gates 796(1) and 801(1) and through terminal 802(1) to the counting input of the Band Counter (Fig. 70). The first commutating pulse also occurs on the ninth OP and is received by the CBP Distributor (Fig. 69) from the output terminal 761 of the Address Control Circuit (Fig. 67). The commutating pulse is applied to the counting input of linear counter 791 (Fig. 69) through amplifier 792 and cathode follower 703, thereby cutting off stage 791(1) and causing stage 791(2) to conduct. This closes gates 796(1) and 797(1) and arms gates 796(2) and 797(2). Similarly, each commutating pulse advances the state of counter 791 for arming the pair of gates 796 and 797 that correspond to the octal group from the testing of which the next non-zero or zero-sense pulse occurs on the respective input terminals 787 or 788. When a zero-sense pulse occurs on terminal 788, indicating that the value of he corresponding octal group of the command or command address is 0, it passes through the related gate 797 and resets the related flip-flop 798 to 0, thereby closing its related gate 801, which then remains closed throughout the remainder of the addressing operation and until the next pulse on terminal 864 sets all flip-flops 798 to 1 for a further addressing operation. When a gate 801 has been thus closed, it blocks all subsequent non-zero sense pulses that it receives from terminal 787 through its related gate 796, and no further counting pulses are transmitted to the corresponding Band Counter (Fig. 70), Band Group Counter (Fig. 71) or Code Counter (Figs. 77 to 79) through the related output terminal 802 (Fig. 69).

During each word interval of an addressing operation, when linear counter 791 is advanced to the count of five, and state 791(5) conducts, the Pattern Generator (Fig. 43) is energized to terminate the address pattern for the remainder of the word interval. This prevents the subtraction of the address pattern from the sixteen most significant digits of the contents of the "O" Register (Fig. 65). For this purpose, each commutating pulse on terminal 761 (Fig. 69) is applied to the input of a gate 794 that is armed by the 1 side of stage 791(5). The output of gate 794 is connected through the previously described output terminal 795 to the Pattern Generator (Fig. 43). When stage 791(5) (Fig. 69) of counter 791 conducts, gate 794 is armed, and the next commutating pulse passes through that gate and through the output terminal 795 to the Pattern Generator (Fig. 43), thereby terminating the address pattern for the remainder of the word interval.

*Band Counter.*—The Band Counter 810 (Fig. 34) is a linear counter which is adapted to receive a counting input from a corresponding output of the CBP Distributor 790 during the band-searching part of each addressing operation. The number of counting pulses received by the Band Counter corresponds to the less significant octal digit of the selected band number, and corresponds to the selected band in each of the eight groups of bands. After the Band Counter has been set to the selected value, it receives an energizing signal from the SC Delay Circuit 830, and in response thereto partially arms one Read-Write Amplifier 240 (Fig. 33) in each of the eight groups of Read-Write Amplifiers.

Referring to Fig. 70, the Band Counter includes an eight-stage linear counter 811 of the type shown in Fig. 31. The stages of counter 811 are designated 811(0) to 811(7), the least significant stage 811(0) being shown at the bottom of the drawing. Counting pulses are applied to the input of counter 811 from the output r-minal 802(1) of the CBP Distributor (Fig. 69) through an amplifier 812 (Fig. 70). An energizing signal from an output terminal 837 of the SC Delay Circuit (Fig. 72), hereinafter described, is applied to the inputs of eight gates 816(0) to 816(7) (Fig. 70), each of which is armed by the 1 side of a respective counter stage 811(0) to 811(7) of the linear counter 811. The output of each gate 816 is connected through a respective cathode follower 817 and output terminal 818 to the previously described arming input terminal 818 of one Read-Write Amplifier (Fig. 44) in each group of Read-Write Amplifiers. During the eight word intervals of the band-searching part of each addressing operation, linear counter 811 (Fig. 70) receives a number of counting pulses corresponding to the less significant of the two octal groups in the selected band number, thereby causing a corresponding one of the counter stages to conduct. After the counting pulses have been received, the previously mentioned energizing signal on terminal 837 passes through the one gate 816 that is armed, and through the related cathode follower 817 and output terminal 818 to partially arm the selected Read-Write Amplifier (Fig. 44) in each group of eight Read-Write Amplifiers.

The following means are provided for zeroizing linear counter 811 (Fig. 70) in preparation for each addressing operation. A flip-flop 813 is normally maintained in its 0 state, each CP–6 being applied to its reset input. The 1 side output terminal of flip-flop 813 is connected through an amplifier 814 to the set input of stage 811(0) and to the reset inputs of stages 811(1) to 811(7). In preparation for an addressing operation, the pulse is applied to the set input of flip-flop 813 through the previously described output terminal 864 of the Sequencer (Fig. 74). The pulse on terminal 864 (Fig. 70) sets flip-flop 813 to 1, and a pulse is transmitted from the 1 side output terminal of that flip-flop through amplifier 814 to the set input of stage 811(0) and to the reset inputs of the remaining stages, thereby causing stage 811(0) to conduct, and cutting off any other conducting stage. The output pulse from amplifier 814 is also transmitted through an output terminal 815 to a corresponding zeroizing input of the Band Group Counter (Fig. 71).

*Band Group Counter.*—The Band Group Counter 810 (Fig. 34) is a linear counter which is adapted to receive a counting input from a corresponding output of the CBP Distributor 790 during the band searching part of each addressing operation. The number of counting pulses received by the Band Group Counter corresponds to the more significant octal digit of the selected band number, and corresponds to the one selected group of eight bands. After the Band Group Counter has been set to the selected value, it receives an energizing signal from the SC Delay Circuit 830, and in response thereto partially arms one group of eight Read-Write Amplifiers 240 (Fig. 33).

Referring to Fig. 71, the Band Group Counter includes an eight-stage linear counter 821 of the type shown in Fig. 31. The stages of counter 821 are designated 821(0) to 821(7), the least significant stage 821(0) being shown at the bottom of the drawing. Counting pulses are applied to the input of counter 821 from the output terminal 802(2) of the CBP Distributor (Fig. 69) through an amplifier 822 (Fig. 71). An energizing signal from the output terminal 837 of the SC Delay Circuit (Fig. 72), hereinafter described, is applied to the inputs of eight gates 823(0) to 823(7) (Fig. 71), each of which is armed by the 1 side of a respective counter stage 821(0) to 821(7) of the linear counter 821. The output of each gate 823 is connected through a respective pair of amplifiers 824 and 825, a cathode follower 826 and an output terminal 827 to the previously described arming input terminals 827 of one group of eight Read-Write Amplifiers (Fig. 44). During the eight word intervals of the band-searching part of each addressing operation, linear counter 821 (Fig. 71) receives a number of counting pulses corresponding to the more significant of the two octal groups in the selected band number, thereby causing a corresponding one of the counter stages to conduct. After the counting pulses have been received, the previously mentioned energizing signal on terminal 837 passes through the one gate 823 that is armed, and through the related amplifiers 824 and 825, cathode follower 827 and output terminal 828 to partially arm the selected group of eight Read-Write Amplifiers (Fig. 44). In preparation for an addressing operation, linear counter 821 (Fig. 71) is zeroized by a pulse applied to the set input of stage 821(0) and to the reset input of each of the remaining stages through the previously described output terminal 815 of the Band Counter (Fig. 70).

*Sector Coincidence Delay Circuit.*—The SC Delay Circuit 820 (Fig. 34) is provided for energizing the Band Counter 810 and the Band Group Counter 820 from the time a sector number match is detected until the end of the reading or writing operation for which the addressing operation was initiated. When the Band Counter and Band Group Counter have been energized, they jointly arm the selected Read-Write Amplifier 240 (see also Fig. 33), as hereinbefore described, but a substantial amount of time is required to arm a Read-Write Amplifier, and a reading or writing operation is therefore delayed almost two more word intervals after a sector number match occurs. For this purpose, the SC Delay Circuit generates an SC pulse and a delayed SC pulse that are transmitted to the Control Section for controlling the initiation of the reading or writing operation.

It is recalled that each successive sector number from the Sector Track of Memory 100 is compared with the selected sector number from the "O" Register 710 by subtracting one of these numbers from the other in the Main Adder 360 during the first six digit intervals of each word interval of sector searching, and that when the two numbers match, the Main Adder sets the MA Unit Input Circuit 500 to indicate a result of all zeros. It is also recalled that on the ninth OP following the occurrence of a sector number match, the MA Unit Input Circuit transmits a pulse to the SC Delay Circuit for initiating the energization of the Band Counter and the Band Group Counter, and for generating an SC pulse, and, one word interval later a delayed SC pulse.

The ninth OP from the output terminal 512 (Fig. 56) of the MA Unit Input Circuit (Fig. 56) is received by the SC Delay Circuit (Fig. 72) at a corresponding input terminal, and is applied to the input of a univibrator 833 that is adapted to remain in its non-stable state for approximately four word intervals. The previously mentioned output pulse on CP–4 from terminal 768 of the Address Control Circuit (Fig. 67), which pulse occurs at the beginning of a sector-searching operating, is applied to the input of a gate 835 (Fig. 72) that is armed through a cathode follower 834 by univibrator 833. The output of gate 835 is connected through an output terminal 836 to the SC pulse input of the Sequencer (Fig. 74). The output of cathode follower 834 (Fig. 72) is also connected through the previously described control terminal 837 to the energizing input of the Band Counter (Fig. 70) and the Band Group Counter (Fig. 71). When a sector number match occurs, the following ninth OP on terminal 512 (Fig. 72) sets univibrator 833 to its non-stable state, arming gate 835 and energizing the Band Counter (Fig. 70) and the Band Group Counter (Fig. 71). The next CP–4 from the Address Control Circuit (Fig. 67) on terminal 768 passes through gate 835 (Fig. 72) and terminal 836 to the Sequencer (Fig. 74), and constitutes the SC pulse. The time relationship between the sector number match, the ninth OP, and the SC pulse is shown in Fig. 73.

The output of gate 835 (Fig. 72) is also connected to the set input of a normally reset flip-flop 841. Each CP–4 is applied to the input of a gate 842 that is armed by the 1 side of flip-flop 841. The output of gate 842 is connected to the reset input of flip-flop 841, and is connected through an output terminal 843 to a corresponding input of the Sequencer (Fig. 74). The SC pulse from gate 835 (Fig. 72) on CP–4 sets flip-flop 841 to 1 and arms gate 842. The next CP–4, one word interval later, passes through gate 842 and terminal 843 to the Sequencer (Fig. 74) and constitutes the delayed SC pulse. This pulse also resets flip-flop (Fig. 72) to 1, and closes gate 842 for preventing the transmission of further pulses to the Sequencer (Fig. 74) from terminal 843 (Fig. 72).

The output of gate 835 is also connected to the set input of a flip-flop 844, and the output of gate 842 is connected to the reset input of flip-flip 844. Each CP–3 is applied to the input of a gate 845 that is normally armed by the zero side of flip-flop 844. The output of gate 845 is connected to the reset input of univibrator 833. When univibrator 833 has been set to its non-stable state by a ninth OP, the next CP–3 passes through the normally open gate 845 to the reset input of that univibrator. However, the parameters of univibrator 833 are chosen such that it is biased sufficiently into its non-stable state so as not to be forceably reset to its stable state by the first CP–3 from the output of gate 845, this CP–3 occurring thirty-four digit intervals after the ninth OP which set univibrator 833 to its non-stable state. The SC pulse from the output of gate 835 on the next CP–4 sets flip-flop 844 to 1, closing gate 845 to block the next CP–3 from the reset input of univibrator 833. The delayed SC pulse from the output of gate 842 on the following CP–4 resets flip-flop 844 to 0, again arming gate 845. The time of occurrence of the delayed SC pulse is shown in Fig. 73. The CP–3 which occurs one word interval following the delayed SC pulse on CP–4, passes through gate 845 (Fig. 72) to the reset input of univibrator 833, and forceably resets the latter to its stable state, thereby closing gate 835 and removing the energizing potential from terminal 837, to de-energize the Band Counter (Fig. 70) and the Band Group Counter (Fig. 71). At the time the delayed SC pulse is transmitted to the Sequencer (Fig. 74), a reading or writing operation is initiated by the Control Section, in the manner hereinafter described, and this operation is terminated by the deenergization of the Band Counter (Fig. 70) and the Band Group Counter (Fig. 71) on the next CP–3, as indicated in Fig. 73.

If a failure should occur in the Clock Pulse Distributor (Fig. 41), and CP–3 should therefore fail to pass through gate 845 (Fig. 72) for resetting univibrator 833 to its stable state, the latter univibrator nevertheless automatically resumes its stable state after approximately four word intervals, and de-energizes the Band Counter (Fig. 70) and the Band Group Counter (Fig. 71) for preventing the selected Read-Write Amplifier (Fig. 44) from being damaged by remaining armed for an excessive period of time.

CONTROL SECTION

*In General.*—The Control Section is provided for controlling the starting, stopping and sequencing of addressing and arithmetic operations of the computer. Referring to Fig. 34, the Control Section includes the Sequencer 850 which controls each addressing operation by initiating and terminating the various steps thereof. The Sequencer divides each addressing operation into four basic time periods, designated sequencing phases SP–1 through SP–4. SP–1 is initiated, generally, in response to a Start pulse which is generated upon termination of the preceding code. During SP–1, the Address and Arithmetic Sections are prepared for locating the Information Band in Memory where the next command is located. During SP–2, the band value is set up in the Band Counter 810 and the Band Group Counter 820 to represent the number of the Information Band where the next command is located. During SP–3, the sector number of the next command is located, and during SP–4, the next command is read out of Memory and into the "O" Register 710. Then SP–2 and SP–3 are repeated for locating the address of the next operand, this address being a part of the command value entered into the "O" Register during SP–4. During the second occurrence of SP–2, the code value, which forms a second part of the command value, is set up in Code Counter "A" 970, Code Counter "B" 990, and Code Counter "C" 1000.

At the end of the second occurrence of SP–3, a signal is transmitted by the Sequencer to the Timing Generator 920 which controls the initiation and termination of the various steps in the selected code operation. The Timing Generator divides each code operation into from two to five time periods, designated timing phases TP–1 to TP–5. Code Counters "A," "B" and "C" cooperate with the Timing Generator for energizing the Code Matrix 1040 which, in turn, energizes the Code Distributor 1060 for arming an appropriate set of gates throughout the computer during each timing phase of each code.

When the last timing phase of a code is terminated, a Start pulse is transmitted to the Sequencer for initiating a next addressing operation. During continuous operation of the computer, the Start pulse is transmitted to the Sequencer from the Start-Stop Circuit 890 which is also provided for controlling automatic or manual starting and stopping of the computer.

The Error Detection Circuit 1080 normally maintains the Error Light turned off, but is operable, in response to the non-occurrence of certain normally recurring operations in the computer for (1) energizing the Error Light; (2) energizing the Sequencer to initiate a special addressing operation during which the address of the present command is written in a predetermined address of Memory; and (3) energizing the Start-Stop Circuit for stopping the computer and for causing the Start-Stop Circuit to control various other computer units for the generation of the Logical Jump Code which is employed during the special addressing operation for writing the address of the present command in Memory. The Error Light is maintained in a de-energized state, for example, by a signal applied to the Error Detection Circuit from the Sequencer 850 during each SP–1 and each SP–4 of normally recurring addressing operations, and if such a signal fails to occur, the Error Light is turned on, and the Logical Jump Code is generated, as described above.

*Sequencer.—In general.*—The Sequencer 850 (Fig. 34) is provided for controlling the sequence of addressing operations. It divides each addressing operation into four time periods, designated the sequencing phases SP–1 through SP–4, and controls a specific set of word transfers, counting operations and the like during each sequencing phase.

SP–1 is initiated on CP–4 by a pulse applied to the Sequencer from the Start-Stop Circuit 890, hereinafter described, and causes the contents of the "S" Register 730 (the address of the previous command) to be shifted through the Transfer Busses, the Sign Clipper 340 (see also Fig. 33), the Main Adder 360, the Arithmetic Bus and the first section of the "O" Register 710 back into the "S" Register, as well as into the second section of the "O" Register. While the command is being shifted through the Main Adder, the value 1 is added to it for establishing the address of the next consecutive command, or the value 2 is added for omitting the next command and establishing the address of the command that is two sectors removed, in Memory 100, from the previous command. During SP–1, the Sequencer causes the value 0111(B) to be set into the "K" Register 620 in preparation for counting the first eight word interval of a band-searching operation during SP–2. SP–1 also prepares the Sequencer for initiating SP–4 in response to the next delayed SC pulse, which will occur after SP–2 and SP–3, and enables the Start-Stop Circuit for initiating a next sequencing cycle during continuous operation of the computer. SP–1 is terminated on CP–4 one word interval after it is started, and the signal which causes its termination also resets the CBP Distributor 790, the Band Counter 810, the Band Group Counter 820, and the Code Counters 970, 990 and 1000, and initiates SP–2.

During SP–2, the value 0111(B) in the "K" Register 620 is recirculated through the "K" Subtractor 650 where it is reduced by unity each word interval until the value 0000(B) is sensed in the "K" Subtractor by the KS Sensing Circuit 660 to mark the eight word interval. During each of the eight word intervals, the contents of the "O" Register 710 (the address of the next command) are circulated through the "O" Subtractor 770 and back into the "O" Register. SP–2 sets the Pattern Generator 180 for generating the sequencing patterns, and by means of one such pattern, the address pattern, the value 1 is subtracted from each of the two octal groups of the band number in the "O" Register during each pass of the contents of that register through the "O" Subtractor, thereby setting the Band Counter and the Band Group Counter to the selected values, as hereinbefore described. When the value 0000(B) is sensed by the KS Sensing Circuit, no further subtraction occurs in the "O" Subtractor, and SP–3 is initiated. SP–2 continues along with SP–3, and is effective to continue recirculating the contents of the "O" Register through the "O" Subtractor.

During SP–3, which is initiated on CP–3 by the sensing of the value 0000(B) in the KS Sensing Circuit, the Sequencer disables the sensing of the KS Sensing Circuit, and disables further subtraction of the "O" Subtractor. The Sequencer also sets the Sign Control Circuit 460 for causing the Main Adder 360 to perform subtractive operations, and causes the successive sector numbers in the Sector Track of Memory 100 to be read through the Interpreter 270 into the Main Adder as an "*x*" operand. During each of a variable number of word intervals, the sector number of the next command (standing in the "O" Register) is entered into the Main Adder as a "*y*" operand, and is also recirculated through the "O" Subtractor and back into the "O" Register. Each time a sector number from the "O" Register passes through the Main Adder, it is subtracted from the sector number from the Sector Track, and when a difference word of all 0's occurs, the selected sector has been found in Memory, and an SC pulse, which is thereupon generated in the SC Delay Circuit 830, terminates both SP–3 and SP–2.

SP–4 has a duration of one word interval and is initiated by the delayed SC pulse which occurs one word interval after the termination of the first occurrence SP–2 and SP–3. During SP–4, the next command, which has been located in Memory at the address stored in the "O" Register, is read out of Memory and into the "O" Register in preparation for locating the operand whose address constitutes a first part of the command or for writing a word in that address, and in preparation for carrying out the code whose value constitutes a second part of the command. During SP–4, the Sequencer again causes the value 0111(B) to be entered into the "K" Register 620, and again zeroizes the CBP Distributor 790, the Band Counter 810, and the Band Group Counter 820, and the Code Counters 970, 990 and 1000. SP–4 is automatically terminated on CP–4 one word interval after it was initiated, and its termination again initiates SP–2.

During the second occurrence of SP–2, and during a second occurrence of SP–3 which follows, the selected operand is located in Memory, and the CBP Distributor also sets the Code Counters for carrying out the selected code. The SC pulse which terminates the second occurrence of SP–2 and SP–3 is transmitted by the Sequencer to the Timing Generator 920 for initiating a code operation, as hereinafter described.

*Sequencing phase 1.*—Referring to Fig. 74, the Sequencer includes four normally reset flip-flops 851, 852, 853 and 854, the 1 state of each of which represents and controls a respective sequencing phase SP–1, SP–2, SP–3 and SP–4. A pulse on CP–4 from an output terminal 906 of the Start-Stop Circuit (Fig. 75) sets flip-flop 851 (Fig. 74) to 1 for initiating SP–1. A control terminal SP–1 is connected to the one side output terminal of flip-flop 851 through a cathode follower 856, and is at arming potential throughout SP–1. Each CP–5 is applied to the input of a gate 857 that is armed by the output of cathode follower 856. The output of gate 857 is connected to the set input of a normally reset flip-flop 855, hereinafter described, and is connected through an output terminal 858 to an input of the Start-Stop Circuit (Fig. 75). The first CP–5 following the initiation of SP–1 passes through gate 857 (Fig. 74) for setting flip-flop 855 to 1, and passes through terminal 858 to the Start-Stop Circuit (Fig. 75) for enabling the latter to initiate a next SP–1 during continuous operation of the computer. Each CP–6 is applied to the input of a gate 861 (Fig. 74) that is armed by the output of cathode follower 856. The output of gate 861 is connected through the previously described output terminal 862 to the set input of flip-flop 368 (Fig. 51) of the Main Adder (Fig. 51). The first CP–6 following the initiation of SP–1 passes through gate 861 (Fig. 74) and terminal 862, thereby setting the Main Adder (Fig. 51) for adding the value 1 to the contents of the "S" Register (Fig. 66). Each CP–4 is applied to the input of a gate 863 (Fig. 74) that is armed either by the output of cathode follower 856 or by the output of a cathode follower 875 which is connected to the 1 side output terminal of flip-flop 854, hereinafter described. The output of gate 863 is connected to the reset input of flip-flop 851, to the set input of flip-flop 852, and to the reset input of flip-flop 854. The output of gate 863 is also connected through the previously described output terminal 864 to the reset inputs of the CBP Distributor (Fig. 69), the Band Counter (Fig. 70) and Code Counter "A" (Fig. 77). Therefore, the first CP–4 following the initiation of SP–1, i.e., the CP–4 that occurs one word interval after SP–1 is initiated, passes through gate 863 (Fig. 74) for zeroizing the CBP Distributor, the Band Counter, the Band Group Counter and the Code Counters in preparation for a band-searching operation. The output pulse from gate 863 also resets flip-flop 851 to 0 for terminating SP–1, resets flip-flop 854 to 0 for terminating SP–4, as hereinafter described, and sets flip-flop 852 to 1 for initiating SP–2.

It is desirable, when the computer power is turned on, that all flip-flops 851 to 855, inclusive, be in their 0 states. For this purpose, a power reset pulse from an output terminal 1082 of the Error Detection Circuit (Fig. 82), hereinafter described, is applied to the reset input of each flip-flop 851 to 855, inclusive (Fig. 74), when the computer power is turned on.

*Sequencing phase 2.*—SP–2 is initiated when flip-flop 852 is set to 1 from the output of gate 863, as described above. Flip-flop 852 may be set to 1 for initiating SP–2 by a pulse applied to its set input from an output terminal 975 of Code Counter "A" (Fig. 77), in connection with the Add 1 Code, hereinafter described. The 1 side output terminal of flip-flop 852 (Fig. 74) is connected through a cathode follower 865 to a control terminal SP–2 which is at arming potential when flip-flop 852 stands at 1. Each CP–6 is applied to the input of a gate 866 that is armed by the output of cathode follower 865. The output of gate 866 is connected through the previously described output terminal 867 to an input of the Pattern Generator (Fig. 43) and is connected to the input of a gate 873 (Fig. 74) hereinafter described, that is armed by the 1 side of flip-flop 853 through a cathode follower 872. Each CP–6 following the initiation of SP–2 passes through gate 866 and terminal 867 to the Pattern Generator (Fig. 43) for causing the latter to generate sequencing patterns. Each CP–3 is applied to the input of a multiple-control gate 868 (Fig. 74) that is armed jointly by the output of cathode follower 865 and by the 0 side of flip-flop 853. The output of gate 868 is connected through the previously described output terminal 871 to a corresponding zero-sensing input terminal of the KS Sensing Circuit (Fig. 63). Each CP–3 after the initiation of SP–2 passes through gate 868 (Fig. 74) and terminal 871 to the KS Sensing Circuit (Fig. 63) where it senses the "K" Subtractor (Fig. 62) for a result of all 0's to determine the end of the eight word intervals of band searching. SP–2 may be terminated by resetting flip-flop 852 (Fig. 74) to 0. This flip-flop may be reset either from the power reset pulse from the previously described terminal 1082 of the Error Detection Circuit (Fig. 82), or by a pulse from an output terminal 916 of the Start-Stop Circuit (Fig. 75), or by an SC pulse from the previously described output terminal 836 of the SC Delay Circuit (Fig. 72).

*Sequencing phase 3.*—SP–3 is initiated when a result of all 0's in the "K" Subtractor (Fig. 62) is detected by the KS Sensing Circuit (Fig. 63). When all 0's are detected, a pulse from the output terminal 677 of the KS Sensing Circuit (Fig. 63) is applied to the set input of flip-flop 853 (Fig. 74), setting the latter flip-flop to its 1 state. This closes gate 868 and prevents any subsequent CP–3 from interrogating the KS Sensing Circuit. The 1 side of flip-flop 853 is also connected through the previously mentioned cathode follower 872 to a control terminal SP–3 which is at arming potential when flip-flop 853 stands at 1. The output of the previously mentioned gate 873, which is armed by the output of cathode follower 872, is connected through the previously described output terminal 874 to the corresponding input terminals of the Sign Control Circuit (Fig. 55) and the Address Control Circuit (Fig. 67). When flip-flops 852 and 853 (Fig. 74) both stand at 1, each CP–6 passes through both gate 866 and 873, and through terminal 874 to the Sign Control Circuit (Fig. 55) for setting the latter to its "Subtract" state which, in turn causes the Main Adder (Fig. 51) to perform a subtractive operation. The output pulse from terminal 874 (Fig. 74) is also transmitted to the Address Control Circuit (Fig. 67) for causing the latter to disable further subtraction by the "O" Subtractor (Fig. 68), as hereinbefore described. SP–3 is terminated by the same means, and at the same time as previously described for terminating SP–2, viz: by a pulse from terminal 916 of the Start-Stop Circuit (Fig. 75) or, as usually the case, by the SC pulse from the output terminal 836 of the SC Delay Circuit (Fig. 72).

*Sequencing phase 4.*—SP–4 is initiated by the delayed SC pulse that occurs one word interval after the SC pulse which terminates both SP–2 and SP–3. The SC pulse from the SC Delay Circuit (Fig. 72) is applied to the input of a gate 876 (Fig. 74) that is armed by the 0 side of the previously mentioned flip-flop 855. The output of gate 876 is connected through a terminal 877 to a starting input of the Timing Generator (Fig. 76), and to a decimal-sensing input of Code Counter "A" (Fig. 77), hereinafter described. It is recalled that flip-flop 855 (Fig. 74) is set to 1 from the output of gate 857 by the first CP–5 during SP–1. Therefore, gate 876 is closed when the first SC pulse occurs during sequencing operation, and the latter pulse is not transmitted to the Timing Generator (Fig. 76) or to Code Counter "A" (Fig. 77). Each delayed SC pulse from the previously described output terminal 843 of the SC Delay Circuit (Fig. 72) is applied to the input of a gate 878 (Fig. 74) that is armed by the 1 side of flip-flop 855. The output of gate 878 is connected through the previously described output terminal 881 to the enabling input of the Read Control Circuit (Fig. 48) and is connected to the reset input of flip-flop 855 (Fig. 74) and to the set input of flip-flop 854. Since flip-flop 855 is set to 1 during SP–1, the first delayed SC pulse during an addressing operation passes through gate 878 and terminal 881 to the Read Control Circuit (Fig. 48), thereby enabling the reading of a command word from the selected address in Memory (Fig. 35) to the "O" Register (Fig. 65). The output pulse from gate 878 (Fig. 74) also resets flip-flop 855, thereby closing gate 878 and arming gate 876, and sets flip-flop 854 to 1, thereby initiating SP–4. SP–4 may also be initiated by the pulse from terminal 916 of the Start-Stop Circuit (Fig. 75) which terminates SP–2 and SP–3.

The 1 side output terminal of flip-flop 854 (Fig. 74) is connected through the previously mentioned cathode follower 875 to a control terminal SP–4, which is at arming potential throughout SP–4. It is recalled that the output of cathode follower 875 also arms gate 863. Therefore, the first CP–4 after the initiation of SP–4, passes through gate 863 and terminal 864 to reset the CBP Distributor (Fig. 69), the Band Counter (Fig. 70), the Band Group Counter (Fig. 71) and the Code Counters "A," "B" and "C" (Figs. 77, 78 and 79, respectively), in preparation for locating the operand. The output pulse from gate 863 (Fig. 74) is also applied to the reset input of flip-flop 854 for terminating SP–4.

When SP–2 and SP–3 have been repeated for finding an operand in the selected address of Memory (Fig. 35), or for writing a word in that address, as hereinbefore described, the next SC pulse on terminal 836 (Fig. 74) passes through the now-armed gate 876 and through terminal 877 to Code Counter "A" (Fig. 77) for testing for a decimal operation, as hereinafter explained, and to the Timing Generator (Fig 76) for initiating a code operation.

*Start-Stop Circuit.*—The Start-Stop Circuit 890 (Fig. 34) is provided for controlling the automatic or manual starting and stopping of the computer and for enabling the computer to restart with a proper operation after it has been stopped. The computer may be started manually after each code or after a stop, or it may be started automatically after each code. The computer may be stopped manually or by a stop Code, or by a Special Stop Code. It may also be stopped in response to an error occurring in the Clock Pulse Generator 120 (see also Fig. 33) or by other computer errors which are sensed in the Error Detection Circuit 1070.

When the computer is stopped manually under certain circumstances, or when an overflow occurs, or when the computer is restarted after detection of an error, it is necessary that the address of the command being executed when the stop, overflow, or error occurred be recorded in a fixed reserved position of Memory where it will be available to the operator for use in trouble shooting or restarting the program. The Start-Stop Circuit, in response to any of these events, accordingly causes the Logical Jump command to be generated, and this code in turn causes the generation of a Jump Command containing the address of the command which was being executed when the above-mentioned event occurred. This Jump Command is then stored at a reserved position in memory, the address of which is specified in the Logical Jump Command; in the embodiment described this address is 111/111/111/111(OGB) primarily because of the ease with which it can be generated. The code value of the Logical Jump Command also consists of all binary 1's for the same reason and may be written 11/111/111(OGB). In octal notation the Logical Jump Command is therefore 3777777(Oc) in which, from left to right, 377(Oc) is the code, 77(Oc) specifies the band and 77(Oc) specifies the sector of memory in which the Jump Command will be stored and in the computer described is the last sector in the last band. The Start-Stop Circuit causes the Logical Jump Command to be generated by subtracting the value 1 from a word comprising all 0's in the Main Adder, and shifting the result into the "O" Register.

Referring to Fig. 75, the Start-Stop Circuit includes a flip-flop 896 that normally stands at 0 when the computer is stopped and normally stands at 1 when the computer is in operation. Each Start pulse on the Start Pulse Bus is applied to the input of a multiple-control gate 897 that is armed jointly by the 1 side of flip-flop 896 and by +C applied through a Continuous Run Switch 898 that is closed during automatic operation of the computer. The output of gate 897 is connected through the previously described output terminal 906 to the set input of SP–1 flip-flop 851 (Fig. 74) in the Sequencer. When flip-flop 896 (Fig. 75) stands at 1 during automatic operation, each Start pulse, designating the end of a previous code, passes through gate 897 and terminal 906 to the Sequencer for initiating SP–1, as hereinbefore described.

Each CP–4 is applied to the input of a gate 901 that is armed by +C applied either through a Start Switch 902 that is normally maintained open, by a spring (not shown), during computer operation, or through a Special Stop Disable Switch 903, and a gate 904 that is armed by the Code Distributor. Switch 903 may be closed to prevent the computer from stopping during the Special Stop Code, as hereinafter described. The output of gate 901 is connected to the input of a gate 905 that is armed by the 0 side of flip-flop 896. When the computer is stopped and flip-flop 896 has been reset to 0, by means hereinafter described, gate 905 is armed. When the Start Switch 902 is closed, arming gate 901, the next CP–4 passes through gates 901 and 905, and through output terminal 906 to the Sequencer (Fig. 74) for initiating SP–1. Therefore, when the computer has been stopped and flip-flop 896 (Fig. 75) stands at 0, gate 897 is closed and the Sequencer cannot be energized for restarting the computer until gate 901 is armed either through switch 902 or through switch 903 and gate 904.

The computer can be stopped, i.e., flip-flop 896 can be set to 0, by a pulse from the previously described output terminal 152 of the Clock Pulse Distributor (Fig. 41), this terminal being connected to the reset input of flip-flop 896 (Fig. 75). A source of −B potential may also be connected to the reset input of flip-flop 896 through a normally open Stop Switch 907 and a limiting resistor 908, thereby resetting flip-flop 896 to 0 for stopping the computer. When any of certain types of errors appear in the computer, a pulse is transmitted to the reset input of flip-flop 896 through an output terminal 1082 of the Error Detection Circuit (Fig. 82), and the computer is accordingly stopped. Each CP–6 is applied to the input of a gate 911 (Fig. 75) that is armed by the Code Distributor during the Stop Code, and the output of gate 911 is connected to the reset input of flip-flop 896. When gate 911 has been armed, the next CP–6 passes through that gate for resetting flip-flop 896 to 0, thereby stopping the computer. Each CP–2 is applied to the input of a multiple-control gate 894 that is armed jointly by the Code Distributor, during the Read Code, and by +C applied through a selectively settable normally open Controlled Stop Switch 895. The output of gate 894 is connected to the reset input of flip-flop 896. After switch 895 has been closed, gate 894 is fully armed during the next Read Code, and the next CP–2 passes through that gate for resetting flip-flop 896 to 0, thereby stopping the computer.

The output of gate 894, in addition to being connected to the reset input of flip-flop 896, is also connected to the set input of a flip-flop 912 that normally stands at 0, each CP–1 being applied to its reset input. Each CP–5 is applied to the input of a gate 915 that is armed through a cathode follower 913 by the 1 side of flip-flop 912. The output of cathode follower 913 is connected through an arming terminal 914 to the previously described corresponding arming terminal on the Main Adder (Fig. 51). The output of gate 915 (Fig. 75) is connected to the set input of flip-flop 896, and is connected through an output terminal 916 to the previously described corresponding input terminal of the Main Adder (Fig. 51), the Sign Control Circuit (Fig. 55), the MA Unit Input Circuit (Fig. 56) and the Sequencer (Fig. 74), and to corresponding input terminals of the Timing Generator (Fig. 76) and Code Counter "A" (Fig. 77), hereinafter described. When gate 894 (Fig. 75) has been armed during the Read Code, and the next CP–2 resets flip-flop 896 to 0 for stopping the computer, this closes gate 897, and the next Start pulse on CP–4 is blocked by that gate and not transmitted to the Sequencer (Fig. 74) for automatically starting the computer. The output pulse from gate 894 sets flip-flop 912 (Fig. 75) to 1 and arms gate 915; therefore, the CP–5 that occurs one digit interval after the blocked Start pulse, passes through gate 915 for setting flip-flop 896 back to 1. In this manner, flip-flop 896 is restored to its operating condition, but the initiation of SP–1 in the Sequencer (Fig. 74) is avoided. However, SP–4 is initiated, instead, by the output pulse from gate 915 (Fig. 75) through terminal 916. This pulse is also transmitted to the Main Adder (Fig. 51) for opening the "C" Register by-pass gate 390, thereby connecting the Main Adder output directly to the Arithmetic Bus. The output pulse from gate 915 (Fig. 75) also sets the Sign Control Circuit (Fig. 55) to its "Subtract" state and presets the value 1 into the MA Unit Input Circuit (Fig. 56). Finally, the output pulse from gate 915 (Fig. 75) resets the Timing Generator (Fig. 76) for stopping any code operations, and zeroizes Code Counters "A," "B" and "C" (Figs. 77, 78 and 79, respectively) in preparation for setting up the Logical Jump Code. The output of cathode follower 913 (Fig. 75), through terminal 914, arms gate 398 (Fig. 51) in the Main Adder for causing the latter unit to receive an input word of all 0's, as hereinbefore described. The value 1 that is set into the MA Unit Input Circuit (Fig. 56) is subtracted from the Main Adder Input word of all 0's (Fig. 51) under control of the Sign Control Circuit (Fig. 55), and the result word of all 1's is entered into the "O" Register (Fig. 65) under Control of the Sequencer (Fig. 74) during SP–4. During the second occurrence of SP–2 and SP–3, which automatically follow SP–4, the Logical Jump Code is set up in the Code Counters (Figs. 77 to 79) under control of the Sequencer (Fig. 74), and during the following code operation, the address of the previous command is written in the address 7777(Oc) of Memory (Fig. 35), as hereinafter described.

The Logical Jump Code may also be initiated in response to restarting the computer by means of an error reset circuit hereinafter described in connection with the Error Detection Circuit (Fig. 82). When an error reset operation occurs, a pulse from an output terminal 1085 of the Error Detection Circuit is applied through a corresponding input terminal of the Start-Stop Circuit (Fig. 75) to the set input of flip-flop 912, thereby initiating the Logical Jump Code as hereinbefore described. This code is also initiated by a pulse from the previously described output terminal 457 of the MA Sensing Circuit (Fig. 54), which pulse indicates that an undesired overflow of the "A" Register (Fig. 57) has occurred. Terminal 457 is connected to the set input of flip-flop 912 (Fig. 75) for initiating the Logical Jump Code, and is connected to the set input of a flip-flop 917. The 1 side output terminal of flip-flop 917 energizes an Overflow Light (not shown). Therefore, when an overflow pulse occurs on terminal 457 flip-flop 917 is set to 1, and terminal 918 energizes the Overflow Light. The output of the previously described gate 901 is connected to the reset input of flip-flop 917. Therefore, when gate 901 is armed by +C, either through switch 902 or through switch 903 and gate 904, the next CP–4 passes through gate 901 and resets flip-flop 917 to 0, thereby de-energizing the Overflow Light.

*Timing Generator.—In general.*—The Timing Generator 920 (Fig. 34) is provided for cooperating with the Code Counters 970, 990 and 1000, to energize the Code Matrix 1040 and, in turn, the Code Distributor 1060 to thereby control the sequence of computer operations during each of the various codes. These operations are divided by the Timing Generator into five timing phases, designated TP–1 through TP–5. During each timing phase, which is initiated and terminated in the Timing Generator, the Code Distributor controls various gating, shifting and other operations, throughout the computer. A series of timing operations occurs after each series of sequencing operations, hereinbefore described, and at the end of the series of timing operations, a Start pulse is generated for initiating a next series of sequencing operations. Each computer code employs both TP–1 and TP–2, while TP–3, TP–4 and TP–5 are optionally employed one or more times during a code as required to control the various steps of the code.

Referring to Fig. 76, the Timing Generator includes five normally reset flip-flop 921 to 925, each of which is associated with and controls the duration of a respective timing phase TP–1 to TP–5. A timing phase TP–1 to TP–5 is in progress when and only when its related flip-flop 921 to 925 stands at 1. The 1 state of each flip-flop 921 to 925 applies an arming potential to a related output terminal TP–1 to TP–5 through a respective amplifier 931 to 935 and cathode follower 941 to 945. Terminals TP–1 to TP–5 are connected to corresponding inputs of the Code Matrix (Fig. 80), hereinafter described.

*Timing phase 1.*—The previously described output terminal 877 from the Sequencer (Fig. 74) is connected to the set input of flip-flop 921 (Fig. 76); therefore, each SC pulse that appears on terminal 877 (on CP–4) sets flip-flop 921 to 1 and initiates TP–1. Each CP–2 is applied to the input of a gate 936 that is armed by the 1 side of flip-flop 921. The output of gate 936 is connected through the previously described output terminal 937 to corresponding inputs of the Read Control Circuit (Fig. 48), and Code Counter "C" (Fig. 79). The first CP–2 which occurs following the initiation of TP–1 passes through gate 936 (Fig. 76) and output terminal 937 to the Read Control Circuit (Fig. 48) for initiating a possible reading operation, and to Code Counter "C" (Fig. 79) for testing the latter to detect the presence or absence of any of a first group of secondary codes, the significance of which will be hereinafter described. Each CP–4 is applied to the input of a gate 938 (Fig. 76) that is armed by the 1 side of flip-flop 921. The output of gate 938 is connected to the reset input of flip-flop 921 and the set input of flip-flop 922, and is connected through an output terminal 939 to a corresponding input terminal of Code Counter "C" (Fig. 79). Therefore, the CP–4 that occurs one word interval following the initiation of TP–1 passes through gate 938 (Fig. 76) and resets flip-flop 921 to 0 for terminating TP–1. This pulse also sets flip-flop 922 to 1 for initiating TP–2 and passes through terminal 939 to Code Counter "C" (Fig. 79) for testing the latter circuit for the presence or absence of any of a second group of secondary codes, as hereinafter described.

*Timing phase 2.*—TP–2 is automatically initiated, as described above, by the termination of TP–1, or it may be initiated by a pulse applied to the set input of flip-flop 922 on CP–4 from an output terminal 1027 of Code Counter "C" (Fig. 79) during the Roundoff Code, hereinafter described. Each CP–4 is applied to the input of a gate 946 (Fig. 76) that is armed by the 1 side of flip-flop 922, and the output of gate 946 is connected to the reset input of flip-flop 922. Therefore, the CP–4 that occurs one word interval following the initiation of TP–2 passes through gate 946 and resets flip-flop 922, thereby terminating TP–2.

*Timing phase 3.*—TP–3 is initiated when flip-flop 923 is set to 1 by any of three means, viz: (1) by CP–4 applied through a gate 947 that is armed by the Code Distributor; (2) by a pulse on the previously described output terminal 663 of the KS Sensing Circuit (Fig. 63); or (3) a pulse from the previously described output terminal 671 of the KS Sensing Circuit.

TP–3 is terminated when flip-flop 923 (Fig. 76) is reset to 0 by any of four means, viz: (1) a pulse from the previously described output terminal 665 of the KS Sensing Circuit (Fig. 64); (2) a pulse on the previously described output terminal 916 of the Start-Stop Circuit (Fig. 75); (3) a Start pulse from the Start Pulse Bus; or (4) CP–4 applied through a gate 953 (Fig. 76) that is armed by the 1 side of a normally reset flip-flop 927. The latter flip-flop is set to 1 for arming gate 953 when a pulse is applied to its set input either from the previously described output terminal 448 or the MA Sensing Circuit (Fig. 54) or from the previously described output terminal 594 of the "R" Adder (Fig. 59). The output of gate 953 (Fig. 76), in addition to being connected to the reset input of flip-flop 923, is also connected to the reset input of flip-flop 927 and to the set input of flip-flop 924. Therefore, each CP–4 which passes through gate 953, in addition to terminating TP–3, also resets flip-flop 927 to 0 for closing gate 953, and sets flip-flop 924 to 1 for initiating TP–4, as hereinafter described. A Start pulse for terminating TP–3 is received from the Start Pulse Bus, and may be generated by certain means hereinafter described, as well as by either of two circuits shown in Fig. 76, viz: (1) CP–4 applied through a gate 948 that is armed by the Code Distributor; or (2) CP–4 applied through a first gate 951 that is armed by the 1 side of flip-flop 924, and through a second gate 952 that is armed by the 1 side of a normally reset flip-flop 928. The latter flip-flop is set to 1, for arming gate 952, by a pulse from either of the previously described output terminals 671 and 673 of the KS Sensing Circuit (Fig. 63), and is reset to 0, for closing gate 952 (Fig. 76), by any Start pulse on the Start Pulse Bus.

*Timing phase 4.*—TP–4 is initiated when flip-flop 924 is set to 1 by any of four means, viz: (1) a pulse from the previously described output terminal 665 of the KS Sensing Circuit (Fig. 63); (2) CP–4 applied through gate 953 (Fig. 76) when flip-flop 927 stands at 1; (3) a pulse from the previously described output terminal 673 of the KS Sensing Circuit (Fig. 63) applied through a gate 961 (Fig. 76) that is armed by the Code Distributor; or (4) CP–4 applied through a first gate 962 that is armed by the 1 side of a normally reset flip-flop 926, and through a second gate 963 that is armed by the 1 side of flip-flop 928. Flip-flop 926 is set to 1, for arming gate 962, by a pulse applied to its set input through an input terminal 929 from the Typewriter (Fig. 33) each time an input digit is typed, as hereinafter described; flip-flop 926 (Fig. 76) is reset to 0, for closing gate 962, by CP–2 applied to its reset input through a gate 969 that is armed by the 1 side of flip-flop 925 during TP–5.

TP–4 is terminated when flip-flop 924 is reset to 0 by any of four means, viz: (1) a pulse from output terminal 663 of the KS Sensing Circuit (Fig. 63); (2) a pulse from output terminal 671 of the KS Sensing Circuit; (3) a pulse from output terminal 1027 of Code Counter "C" (Fig. 79); or (4) a Start pulse from the Start Pulse Bus.

*Timing phase 5.*—TP–5 is initiated when flip-flop 925 (Fig. 76) is set to 1 by any of three means, viz: (1) CP–4 applied through a gate 966 that is armed by the Code Distributor; (2) CP–4 applied through gate 962 when the flip-flop 926 stands at 1, and through a gate 963 that is armed by the 1 side of flip-flop 928; or (3) CP–4 applied through gate 951 when flip-flop 924 is in its 1 state, through a gate 964 that is armed by the 0 side of flip-flop 928, and through a gate 964 that is armed by the 0 side of flip-flop 925. TP–5 is terminated by CP–4 applied to the reset input of flip-flop 925 through a gate 968 that is armed by the 1 side of flip-flop 925; therefore, the first CP–4 which occurs after the initiation of TP–5 passes through gate 968 and resets flip-flop 925 to 0, in this manner limiting the duration of TP–5 to one word interval.

*Code Counters.—In general.*—The Code Counters 970, 990 and 1000 (Fig. 34) are linear counters of the type shown in Fig. 31 that are set by the CBP Distributor 790 (Fig. 34) in accordance with each code number which is entered into the "O" Register 710. After they have been set to represent a selected code, the Code Counters cooperate with the Timing Generator 920 for energizing the Code Matrix 1040 which, in turn, energizes the Code Distributor 1060 for arming the appropriate set of gates throughout the computer during each timing phase of the selected code. Code Counter "A" is set by the CBP Distributor to represent the value of the most significant octal group of the code number; Code Counter "B" is set to represent the value of the middle octal group of the code number; and Code Counter "C" is set to represent the value of the least significant octal group of the code number. Ordinarily, Code Counters "A" and "B" cooperate to determine the selected basic code, such as Add, Multiply, etc., and Code Counter "C" determines any selected secondary code, such as changing the sign of an operand. The operation of the Code Counters in response to the receipt of specific code numbers will be described hereinafter in relation to the codes themselves, with reference to the following descriptions of the Code Counter structures.

*Code Counter "A."*—Code Counter "A" 970 (Fig. 34) is a four-stage linear counter which is adapted to receive from the CBP Distributor 790, during each code-searching operation, a number of pulses representing the value of the most significant octal group in the selected code number. It is recalled that the value of this octal group never exceeds 011(Oc), and is therefore, expressed by only two binary digits. Consequently, only four linear counter stages are necessary in Code Counter "A" for representing the four possible values of this group, namely, 00, 01, 10, and 11.

Referring to Fig. 77, the four stages of a linear counter 971 are designated 971(0) to 971(3), the least significant state 971(0) being shown at the bottom of the drawing. Counting pulses are applied to the input of linear counter 971 from the previously described output terminal 802(5) of the CBP Distributor (Fig. 69). Linear counter 971 (Fig. 77) may be reset to a count of 0 by a pulse applied to the set input of stage 971(0) and to the reset input of each stage 971(1) to 971(3) from any of five sources, viz.: (1) CP–4 applied through a gate 972 that is armed by the Code Distributor, and through an amplifier 976; (2) a pulse from the previously described output terminal 864 of the Sequencer (Fig. 74) applied through an amplifier 973 (Fig. 77) and amplifier 976; (3) a pulse from the previously described output terminal 916 of the Start-Stop Circuit (Fig. 75) applied through amplifiers 973 and 976 (Fig. 77); or (4) a pulse from an output terminal 1027 of Code Counter "C" (Fig. 79), hereinafter described, applied through amplifiers 973 and 976

(Fig. 77). The output of amplifier 973 is also transmitted through an output terminal 974 to a corresponding reset input of Code Counter "B" (Fig. 78); the output of gate 972 (Fig. 77) is also transmitted through the previously described output terminal 975 to the corresponding input in the Pattern Generator (Fig. 43) and in the Sequencer (Fig. 74); and the output of amplifier 976 (Fig. 77) is also transmitted through an output terminal 977 to a corresponding reset input of Code Counter "C" (Fig. 79).

The 1 side output terminal of stage 971(0) (Fig. 77) is connected through a cathode follower 978(0) and a series of seven output terminals 980(1) to 980(7), to corresponding input terminals of the Code Matrix (Fig. 80). Terminals 980(1) to 980(7) are numbered to correspond to the seven most significant stages of Code Counter "B" (Fig. 78) for reasons which will be apparent from the later description of Code Counter "B." Output terminal 980(5) (Fig. 77), in addition to being connected to the Code Matrix (Fig. 80), is also connected to an arming input of Code Counter "C" (Fig. 79), hereinafter described. The 1 side output terminals of stages 971(1) and 971(2) (Fig. 77) are connected through a cathode follower 978(1, 2) and a series of eight output terminals 981(0) to 981(7) to the Code Matrix (Fig. 80), the latter output terminals being numbered to correspond to the eight states of Code Counter "B" (Fig. 78). The 1 side output terminal of stage 971(3) (Fig. 77) is connected through a cathode follower 978(3) and a series of five output terminals 983(4) to 983(6), 983(7–1) and 983(7–2) to the Code Matrix (Fig. 80). Terminals 983(4) to 983(6), 983(7–1) and 983(7–2) (Fig. 77) are numbered to correspond to the four most significant stages of Code Counter "B" (Fig. 78). The output of cathode follower 978(3) (Fig. 77) is also connected through an output terminal 984 to a corresponding input terminal of Code Counter "C" (Fig. 79). Output terminals 980, 981 and 983 (Fig. 77) are employed, as hereinafter described, for partially energizing the Code Matrix (Fig. 80) in the control of the computer during the various codes. It should be noted at this point, however, that any code which calls for a decimal arithmetic operation is characterized by the group 01(Oc) in the most significant octal place of its code number; therefore, when such a code has been selected, stage 971(1) (Fig. 77) of linear counter 971 is in its 1 state. The 1 side output terminal of stage 971(1) arms a gate 987, the input of which is received from the previously described output terminal 877 of the Sequencer (Fig. 74). The output of gate 987 (Fig. 77) is connected through the previously described output terminal 988 to the decimal-setting input of the Pattern Generator (Fig. 43). Therefore, when a decimal code has been selected, a pulse on terminal 877 (Fig. 77) passes through gate 987, which is armed by stage 971(1), and through terminal 988 to the Pattern Generator for setting the latter to generate the previously described decimal patterns.

*Code Counter "B."*—Code Counter "B" 990 (Fig. 34) is an eight-stage linear counter which is adapted to receive from the CBP Distributor 790, during each code-searching operation, a number of pulses representing the value of the middle octal group in the selected code number. Code Counter "B" cooperates with Code Counter "A" 970 for partially energizing the Code Matrix 1040 for controlling the computer during the selected code.

Referring to Fig. 78, the eight stages of a linear counter 991 are designated 991(0) to 991(7), the least significant stage 991(0) being shown at the bottom of the drawing. Counting pulses are applied to the input of linear counter 991 from the previously described output terminal 802(4) of the CBP Distributor (Fig. 69). Linear counter 991 (Fig. 78) may be reset to a count of 0 by a pulse applied to the set input of stage 991(0) and to the reset input of each stage 991(1) to 991(7) from the previously described output terminal 974 of Code Counter "A" (Fig. 77). The 1 side output terminal of each stage 991(0) to 991(7) (Fig. 78) is joined, through a respective cathode follower 992(0) to 992(7), to an output terminal 981(0) to 981(7) from Code Counter "A" (Fig. 77), and is connected to a corresponding input terminal of the Code Matrix (Fig. 80). The output of each cathode follower 992(1) to 992(7) (Fig. 78) is also joined to a respective output terminal 981(1) to 981(7) from Code Counter "A" (Fig. 77), and is connected to a corresponding input terminal of the Code Matrix (Fig. 80); and the output of each cathode follower 992(4) to 992(6) (Fig. 78) is joined to a respective output terminal 983(4) to 983(6) from Code Counter "A" (Fig. 77), and is connected to a corresponding input terminal of the Code Matrix (Fig. 80). The output of cathode follower 992(4) (Fig. 78) is also joined to the previously described output terminal 984 from Code Counter "A" (Fig. 77), and is connected to a corresponding input terminal of Code Counter "C" (Fig. 79). Output terminal 980(5) (Fig. 78), as hereinbefore explained, is also connected to a corresponding input terminal of Code Counter "C" (Fig. 79) in addition to being connected to an input terminal of the Code Matrix (Fig. 80). The output of cathode follower 992(7) (Fig. 78) is also joined to the previously described output terminals 983(7–1) and 983(7–2) from Code Counter "A" (Fig. 77), which are connected to corresponding input terminals of the Code Matrix (Fig. 80). An output terminal 980(1) to 980(7) (Figs. 77 and 78), 981(0) to 981(7), 983(4) to 983(6), 983(7–1), 983(7–2), or 984 is at an energizing potential when and only when both of its related counter stages 971(0) to 971(4) (Fig. 77) and 991(0) to 991(7) (Fig. 78) stands at 1, and the corresponding input terminal of the Code Matrix (Fig. 80), is thereby energized, as hereinafter described. In some codes, it is necessary for an output of Code Counter "C," as well as respective outputs from Code Counters "A" and "B," to be at energizing potential in order for a corresponding input of the Code Matrix to be energized.

*Code Counter "C."*—Code Counter "C" 1000 (Fig. 34) is an eight-stage linear counter which is adapted to receive from the CBP Distributor 790, during each code-searching operation, a number of pulses representing the value of the least significant octal group in the selected code number. In accordance with the value set into Code Counter "C," that unit controls other units of the computer, during the selected code, for carrying out certain necessary operations such as setting up secondary codes, as hereinafter described.

Referring to Fig. 79, the eight stages of a linear counter 1001 are designated 1001(0) to 1991(7), the least significant stage 1001(0) being shown at the bottom of the drawing. Counting pulses are applied to the input of linear counter 1001 from the previously described output terminal 801(3) of the CBP Distributor (Fig. 69). Linear counter 1001 (Fig. 79) may be reset to a count of 0 by a pulse applied to the set input of stage 1001(0) and to the reset input of each stage 1001(1) to 1001(7) through the previously described output terminal 977 of the Code Counter "A" (Fig. 77).

The 1 side output terminal of stage 1001(1) (Fig. 79) is connected to the input of a multiple-control gate 1002 that is armed jointly by Code Counter "A" (Fig. 77) and Code Counter "B" (Fig. 78) through their previously described output terminal 980(5). The output of gate 1002 (Fig. 79) is connected through a cathode follower 1003 and an output terminal to the Typewriter 1200 (Fig. 33); hereinafter described. The previously described output terminal 937 of the Timing Generator (Fig. 76) is connected to the inputs of three gates 1006, 1008 and 1017 (Fig. 79). Gate 1006 is armed by the 1 side of stage 1001(2) through a cathode follower 1005; gate 1008 is armed by the 1 side of stage 1001(3); and gate 1017 is armed by the 1 side of stage 1001(5). The outputs of gates 1006, 1008 and 1017 are connected through the previously described output terminal 1007, 1011 and 1018, respectively, to the corresponding inputs of the Sign Control Circuit (Fig. 55). The previously described output terminal 939 from the Timing Generator (Fig. 76) is connected to the input of a gate 1013 (Fig. 79) that is armed by the 1 side of stage 1001(4) through a cathode follower 1012. The output of gate 1013 is connected through the previously described output terminal 1014 to the corresponding input of the Sign Control Circuit (Fig. 55). The output of cathode follower 1012 is also joined to the previously described output terminal 983(7–1) from Code Counter "A" (Fig. 77) and Code Counter "B" (Fig. 78), and is connected to a corresponding input of the Code Matrix (Fig. 80). The output of cathode follower 1012 is further joined to the previously described output terminal 984 from Code Counters "A" and "B" (Figs. 77 and 78), and is connected through a cathode follower 1015 (Fig. 79) and an output terminal 1016 to a corresponding input terminal of the Code Matrix (Fig. 80).

The previously described output terminal 675 from the KS Sensing Circuit (Fig. 63) is connected to the inputs of a pair of gates 1022 and 1026 (Fig. 79). Gate 1022 is armed by the 0 side of stage 1001(6) through a cathode follower 1021, and gate 1026 is armed by the 1 side of stage 1001(6) through a cathode follower 1024. The output of cathode follower 1024 is also connected through the previously described output terminal 1025 to corresponding input terminals of the "A" Register (Fig. 57) and the "T" Register (Fig. 64). The output of gate 1022 (Fig. 79) is connected to the Start Pulse Bus, which is connected to the reset input of a normally reset flip-flop 1023. The output of gate 1026 is connected to the set input of flip-flop 1023, and is connected through the previously described output terminal 1027 to the corresponding input terminals of Code Counter "A" (Fig. 77) and the Timing Generator (Fig. 76). The 1 side output terminal of flip-flop 1023 is connected through a cathode follower 1028 and an output terminal 1031 to a corresponding input terminal of the Code Matrix (Fig. 80). It will be seen that each Start pulse resets flip-flop 1023 (Fig. 79) to 0, and removes energizing potential from terminal 1031. If the least significant octal digit of a selected code is a 6, stage 1001(6) is set to 1, arming gate 1026; the next pulse on terminal 675 passes through gate 1026 and sets flip-flop 1023 to 1, thereby applying energizing potential through output terminal 1031 to the Code Matrix (Fig. 80).

The 1 side output terminal of stage 1001(7) (Fig. 79) is joined, through a cathode follower 1032, to the previously described output terminal 983(7–2) from Code Counter "A" (Fig. 77) and Code Counter "B" (Fig. 78), and is connected to a corresponding input terminal of the Code Matrix (Fig. 80).

*Code Matrix.*—The Code Matrix 1040 (Fig. 34) is a matrix having a first set of inputs from the Timing Generator 920 and a second set of inputs from the Code Counters 970, 990 and 1000. Each of the Timing Generator inputs partially energizes the Code Matrix during a respective timing phase, and each of the Code Counter inputs partially energizes the Code Matrix throughout a respective code. The Code Matrix has a respective output connected to the Code Distributor 1060 corresponding to each timing phase of each code, and relates its two sets of inputs such that one and only one of its outputs is energized during a particular timing phase of a particular code.

Referring to Fig. 80, the first set of inputs to the Code Matrix comprises the five output terminals TP–1 through TP–5 of the Timing Generator (Fig. 76). Terminal TP–1 (Fig. 80) is connected to the inputs of a series of five cathode follower gates 1041(1) to 1041(5), each of which is armed by a respective output terminal from the Code Counters (Figs. 77 to 79), as shown in Fig. 80. A respective output terminal 1051(1) to 1051(5) from each gate 1041(1) to 1041(5) is connected to a corresponding input terminal of the Code Distributor, hereinafter described. If the Code Counters (Figs. 77 to 79) are set to values which cause energization of the arming terminal of any gate 1041(1) to 1041(5) (Fig. 80) as hereinbefore described, then the corresponding output terminal 1051(1) to 1051(5) is energized during the next TP–1, and in turn energizes the corresponding input terminal of the Code Distributor for arming that set of computer gates which is related to TP–1 of the code whose value stands in the Code Counters (Figs. 77 to 79). It will be shown in the later description of each code that the Code Matrix (Fig. 80) is energized during TP–1 in only five of the codes; therefore, only five gates 1041 (Fig. 80) are interrogated by input terminal TP–1 from the Timing Generator (Fig. 76). The relationship between each output terminal 1051 (Fig. 80) and a specific code will be pointed out hereinafter in the descriptions of the codes.

Twenty-one of the codes employ TP–2; therefore, input terminal TP–2 (Fig. 80) is connected to the inputs of a series of twenty-one cathode follower gates 1042(1) to 1042(21), each having a respective output terminal 1052(1) to 1052(21) connected to a corresponding input terminal of the Code Distributor. Each gate 1042 is armed by a respective output terminal from the Code Counters (Figs. 77 to 79), as shown in Fig. 80. Similarly, input terminal TP–3 is connected to the inputs of a series of six cathode follower gates 1043(1) to 1043(6), each having a respective output terminal 1053(1) to 1053(6); input terminal TP–4 is connected to the inputs of a series of four cathode follower gates 1044(1) to 1044(4), each having a respective output terminal 1054(1) to 1054(4); and input terminal TP–5 is connected to the inputs of a series of nine cathode follower gates 1045(1) to 1045(9), each having a respective output terminal 1055(1) to 1055(9). The respective output terminals of each series 1053, 1054 and 1055 are connected to corresponding input terminals of the Code Distributor, and the respective gates of each series 1043, 1044 and 1045 are armed through output terminals of the Code Counters (Figs. 77 to 79), as shown in Fig. 80.

*Code Distributor.*—The Code Distributor 1060 (Fig. 34) is a network for distributing arming potential, a respective input of the network being energized by the Code Matrix 1040 during each timing phase of each selected code. In response to energization of one of its inputs, the Code Distributor distributes arming potential to certain gates, throughout the computer which must be armed during the related timing phase of the selected code.

Each output terminal 1051 through 1055 (Fig. 80) of the Code Matrix is connected to a corresponding input terminal of the Code Distributor (Fig. 81), but only one such input terminal is shown in Fig. 81 by way of illustration. This is terminal 1052(2) which, as will be shown hereinafter, is energized during TP–2 of the Read Code. Terminal 1052(2) is connected through each of a series of seven diodes, such as 1061, to a respective output terminal. Each of the seven output terminals is numbered to correspond to a previously described computer gate which is armed by that terminal. A terminal 441 is connected to the arming input of gate 441 in the MA Sensing Circuit (Fig. 54); a pair of terminals 464 and 472 (Fig. 81) are connected to the respective arming terminals of gates 464 and 472 in the Sign Control Circuit Fig. 55); three further output terminals 523, 527 and 534 (Fig. 81) are connected to the respective arming terminals of gates 523, 527 and 534 of the "A" Register (Fig. 57); and a final output terminal 948 (Fig. 81) is connected to the arming terminal of gate 948 of the Timing Generator (Fig. 76). The sequence of operations produced in response to arming the above seven gates (Fig. 81) during TP–2 of the Read Code will be described in relation to that code hereinafter.

Each of the remaining 41 output terminals from the Code Matrix (Fig. 80) is similarly connected, by a Code Distributor circuit of the type shown in Fig. 81, to the arming terminals of one or more gates in the computer for arming those gates during the appropriate timing phase of the appropriate code. The identity and location of the gates which are armed by the Code Distributor during each timing phase of each code will be pointed out hereinafter in the description of that code.

*Error Detection Circuit.*—The Error Detection Circuit 1070 (Fig. 34) is adapted to detect an error in the computer, and energizes the Error Light, when that error causes a failure to initiate a next addressing operation for more than a predetermined period of time. Since there may be an indefinite delay before the next addressing operation during error-free typing operations, and during a programmed stop, energization of the Error Light is prevented in such cases, even in the absence of an addressing operation during the predetermined period of time. After an error has occurred, the Error Detection Circuit resets the Sequencer 850 and the Start-Stop Circuit 890 in preparation for a next starting operation. An Error Reset Switch is provided for causing the Error Detection Circuit to energize the Start-Stop Circuit, after detection of an error, for generating a Logical Jump Code as hereinbefore described.

Referring to Fig. 82, the Error Detection Circuit comprises an amplifier 1071 having inputs from the Sequencer on SP–1, SP–4 from the Code Distributor during the Stop Code, and the previously described output terminal 1086 of the Typewriter 1200 (Fig. 33). The output of amplifier 1071 is connected through a cathode follower 1072 to the cathode of a normally nonconducting diode 1073. The anode of diode 1073 is connected through a resistor 1074, in parallel with the capacitor 1075, to a source +B of positive potential. The anode of diode 1073 is also connected through a cathode follower 1076 and a terminal 1077 to the Error Light (not shown). If diode 1073 remains nonconducting for more than a predetermined period of time, capacitor 1075 is discharged through resistor 1074, and +B potential is applied through cathode follower 1076 to terminal 1077, thereby turning on the Error Light. However, each time amplifier 1071 receives an input signal, it transmits an output pulse through cathode follower 1072 to the cathode of diode 1073, thereby causing the latter to conduct and charge capacitor 1075. Therefore, if amplifier 1071 fails to receive an input signal for a sufficient period of time, capacitor 1075 becomes discharged and the Error Light is turned on. During each SP–1 or SP–4 of an addressing operation, amplifier 1071 receives an input signal to maintain the Error Light de-energized. The time constant of the circuit comprising resistor 1074 and capacitor 1075 is such that the Error Light is turned on if an addressing operation fails to occur in the normal manner following the preceding code, as hereinbefore described.

During the Stop Code and during typing operations, it is possible that no addressing operation will be initiated by the Sequencer (Fig. 74) for an indefinite period of time, even though the computer is operating normally. For this reason, amplifier 1071 (Fig. 82) is energized by the Code Distributor during the Stop Code, and by the Typewriter (Fig. 33) through a terminal 1086 during typing operations, and the Error Light is prevented from being turned on, even though neither SP–1 nor SP–4 occurs.

The output of cathode follower 1076 (Fig. 82), in addition to being connected to the Error Light, also arms a gate 1081 that receives each CP–2 as an input. The output of gate 1081 is connected through the previously described power reset output terminal 1082 to corresponding inputs of the Sequencer (Fig. 74) and the Start-Stop Circuit (Fig. 75). Therefore, when the Error Light is turned on, gate 1081 (Fig. 82) is armed, and the next CP–2 is transmitted through that gate and through terminal 1082 to the Sequencer (Fig. 74) and to the Start-Stop Circuit (Fig. 75) for preparing the latter units for a starting operation, as hereinbefore described.

The output of gate 1081 (Fig. 82) is also connected to the input of a gate 1083 that is armed by +C applied through a normally open Error Reset Switch 1084. The output of gate 1083 is connected through the previously described output terminal 1085 to the corresponding input terminal of the Start-Stop Circuit (Fig. 75). When the computer has been stopped because of the detection of an error, the closure of switch 1084 (Fig. 82) permits gate 1083 to pass the next CP–2 from the output of gate 1081 to terminal 1085 of the Start-Stop Circuit (Fig. 75) for generating the Logical Jump Code in the manner hereinbefore described.

ADDRESSING OPERATION

*In general.*—The following is a description of a complete addressing operation of the present computer, beginning with a Start pulse that is generated at the end of a preceding code operation, and ending with the initiation of TP–1 of the next code. Reference is made to Figs. 83 to 86 which show, in block form, the computer units that are employed during each of the sequencing phases SP–1 to SP–4, respectively. Reference is also made to the previously described drawings of the individual computer units, shown in Fig. 35 and Figs. 40 to 82, inclusive. When an addressing operation begins, the first section of the "O" Register (Fig. 65) contains the previous code value, the second section of the "O" Register contains tht address of the previous operand, and the "S" Register (Fig. 66) contains the address of the previous command.

*Sequencing phase 1.*—Referring to Fig. 83, SP–1 is initiated on CP–4 when a pulse from the Start-Stop Circuit energizes the Sequencer, either in response to a Start pulse, if the Continuous Run Switch (Fig. 75) is closed, or in response to closure of the Start Switch at any time, or the Special Stop Disable Switch during the appropriate code, as hereinbefore described. The next CP–5 is transmitted by the Sequencer (Fig. 83) to the Start-Stop Circuit for enabling the latter to automatically recycle the computer by transmitting the next Start pulse to the Sequencer if the Continuous Run Switch (Fig. 75) is closed. CP–5 also conditions the Sequencer (Fig. 83) to initiate SP–4 in response to the next delayed SC Pulse (following SP–2 and SP–3). The next CP–6 is transmitted by the Sequencer to the Main Adder for presetting the latter to the value 1 as a "*y*" operand in preparation for adding that value to the contents of the "S" Register.

During SP–1, the Sequencer arms the following gates through control leads which are not shown in Fig. 83:

The "C" Register by-pass gate 390 in the Main Adder (Fig. 51);
The CP–1 to 4 input shift gate 622 in the "K" Register (Fig. 61);
The CP–1 input gate 641 in the "K" Register;
The CP–2 input gate 642 in the "K" Register;
The CP–3 input gate 643 in the "K" Register;
The OP input shift gate 712 in the "O" Register (Fig. 65);
The word input gate 715 in the "O" Register;
The OP input shift gate 733 in the "S" Register (Fig. 66);
The OP output shift gate 736 in the "S" Register; and
The word input gate 741 in the "S" Register.

The first OP train following the initiation of SP–1 shifts the 1's digits of the contents of the "S" Register (Fig. 83) through the 1's Transfer Bus and the Sign Clipper into the "*x*" input of the Main Adder. The 0's digits of the contents of the "S" Register are shifted through the 0's Transfer Bus and directly into the "*x*" input of the Main Adder. The collective 0's and 1's contents of the "S" Register are additively combined by the Main Adder with the preset "*y*" operand of 1, and the output of the Main Adder, constituting the address of the next command (the previous command increased by unity), is shifted through the Arithmetic Bus and the first section of the "O" Register back into the "S" Register and into the second section of the "O" Register. During the above shifting operation, the contents of the first section of the "O" Register are shifted through the "S" Register and the previously described paths back into the first section of the "O" Register, but generally are not altered in value, since the "y" operand of 1 in the Main Adder is added to the least significant digit of the "x" operand, i.e., to the least significant digit of the contents of the "S" Register.

During CP–1 to 4 following the OP train in SP–1, the binary value 0111(B) is entered into the "K" Register for subsequently controlling the duration of a cycling operation during SP–2. One word interval following the initiation of SP–1, that sequencing phase is terminated when CP–4 is applied to the Sequencer. The CP–4 which terminates SP–1 also initiates SP–2 and is transmitted by the Sequencer to the CBP Distributor, the Band Counter and Code Counter "A" for resetting the latter units to their initial states of operation. The Band Counter transmits the reset pulse to the Band Group Counter, and Code Counter "A" transmits the reset pulse to Code Counters "B" and "C," and the Band Group Counter and Code Counters "B" and "C" are thereby reset to their initial states of operation.

*Sequencing phase 2.*—Referring to Fig. 84, SP–2 is initiated by the same CP–4 which is applied to the Sequencer for terminating SP–1 (see also Fig. 83). SP–2 may also be initiated on CP–4 by a pulse applied to the Sequencer from Code Counter "A" during certain codes, as hereinafter described. The next CP–6 is transmitted by the Sequencer (Fig. 84) to the Pattern Generator for causing the latter unit to generate the previously described sequencing patterns. During SP–2 the Sequencer arms the following gates through control leads which are not shown in Fig. 84:

The OP input shift gate 627 in the "K" Register (Fig. 61);
The OP output shift gate 633 in the "K" Register;
The OP input shift gate 712 in the "O" Register (Fig. 65);
The OP output shift gate 716 in the "O" Register; and
The output gate 776 in the "O" Subtractor (Fig. 68).

The first OP train during SP–2 (Fig. 84) is applied to the "K" Register for shifting the value 0111(B), standing in that register, through the "K" Subtractor and back into the "K" Register. The fourth OP from the Pattern Generator is applied to the "K" Register for blocking the fifth and subsequent OP's in the shift train, and only the first four OP's perform the shifting operation. Therefore, during the first word interval of SP–2, the contents of the "K" Register are circulated just once through the "K" Subtractor and back into the "K" Register. During the first word interval, the Pattern Generator transmits through the Address Control Circuit and into the "y" input of the "O" Subtractor, the address pattern comprising three 0's followed by the repeated pattern 100. The entire first OP train is applied to the "O" Register for shifting the contents of that register through the "O" Subtractor and back into the "O" Register. It is recalled that the "O" Register, at the end of SP–1, contains a word comprising the value of the preceding code and the address of the next command. The address pattern is subtracted from this word to decrease by unity the value of each octal group of the band number and of the code number. The output of the "O" Register is also applied to an input of the Address Control Circuit which transmits only the sector number, comprising two octal groups, to the Main Adder as a "y" input. This input to the Main Adder is not used during the first eight word intervals of SP–2, but is used after the initiation of SP–3 which overlaps with SP–2, after the first eight word intervals, as hereinafter described.

Also during the first word interval with SP–2, the Address Control Circuit transmits a counting pulse to the CBP Distributor, in response to each digit 1 in the address pattern, for successively relating the CBP Distributor output to the Band Counter, the Band Group Counter, and the three Code Counters. The Address Control Circuit also transmits a test pulse to the "O" Subtractor in response to each digit 1 in the address pattern. If the corresponding octal group of the band number or code number has a value greater than 0, the "O" Subtractor transmits a pulse to the CBP Distributor which, in turn, commutates it as a counting pulse to the related Band Counter, Band Group Counter, or Code Counter. If the corresponding octal group of the band number or code number has the value 0, the "O" Subtractor transmits a pulse to the CBP Distributor for blocking transmission of further counting pulses by the CBP Distributor to the related Band Counter, Band Group Counter or Code Counter.

On CP–3 following the first OP train during SP–2, the Sequencer transmits a pulse to the KS Sensing Circuit to determine whether the value standing in the "K" Register was equal to or greater than 0 during the last pass of that value through the "K" Subtractor. If that value was greater than 0 (which it must be after the first word interval of SP–2), the Sequencer causes a second word interval of operation, like the first word interval described above, and this process continues for a total of eight word intervals until the value 0000(B) is detected in the KS Sensing Circuit. During each of the eight word intervals, the value of each octal group of the band number and code number in the "O" Register is decreased by unity, and therefore returns to its original value. Until the value of an octal group reaches 0, its corresponding Band Counter, Band Group Counter or Code Counter receives a counting pulse during each word interval. When the value 0000(B) is detected in the KS Sensing Circuit by a pulse from the Sequencer after the eighth word interval of SP–2, the KS Sensing Circuit transmits the pulse back to the Sequencer for initiating SP–3. Therefore, at the end of eight word intervals of SP–2, the Band Counter, the Band Group Counter and each Code Counter is set to the value of the corresponding octal group of the word standing in the "O" Register. The values set into the Band Counter and the Band Group Counter are employed during the first occurrence of SP–3 for locating the next command in Memory, but the values set into the Code Counters are not used at all during the first occurrence of SP–3. It will be shown that values similarly set into the Code Counters during the second occurrence of SP–2, following the first occurrence of SP–3 and the only occurrence of SP–4 are employed for controlling the selected code. No misoperation results from setting up the Code Counters during the first occurrence of SP–2, and therefore no circuitry is provided for preventing them from being set up at that time.

*Sequencing phase 3.*—Referring to Fig. 85, SP–3 is initiated by a pulse applied to the Sequencer from the KS Sensing Circuit on CP–3 when the value 0000(B) is detected in the KS Sensing Circuit. SP–2 is not terminated at this time, but the further sensing of the KS Sensing Circuit on each CP–3 is terminated. In addition to the gates that are armed during SP–2 (Fig. 84), the Sequencer (Fig. 85) also arms, during SP–3, the output gate 307 of the Read Control Circuit (Fig. 48).

Referring again to Fig. 85, the first CP–6 following the initiation of SP–3 is transmitted by the Sequencer to the Sign Control Circuit for causing the latter to condition the Main Adder for a subtractive operation in preparation for sector searching. CP–6 is also transmitted by the Sequencer to the Address Control Circuit for disabling further entry of the address pattern into the "y" input of the "O" Substractor.

The first OP train following the initiation of SP–3 shifts the contents of the "O" Register through the "O" Subtractor and back into the "O" Register, but no subtraction occurs in the "O" Subtractor. During this circulation, the output from the "O" Register is also entered into the Address Control Circuit which transmits the sector number, i.e., the two least significant octal groups, to the "y" input of the Main Adder.

During the same OP train, the Read Control Circuit arms the Sector Read Amplifier and applies the OP train to the Interpreter for reading out the latter. Therefore, the sector number which is currently in reading relation with the Sector Head is transmitted through the Sector Head, the Sector Read Amplifier, the Interpreter and the Transfer Busses into the "x" input of the Main Adder, the 0's digits being transmitted directly to the Main Adder from the 0's Transfer Bus, and the 1's digits being transmitted to the Main Adder from the 1's Transfer Bus through the Sign Clipper. The "y" input of the Main Adder, i.e., the selected sector number is subtracted from the "y" input, i.e., the current sector number, and if there are any digits 1 in the result, the Main Adder conditions the MA Unit Input Circuit. The ninth OP is transmitted by the Address Control Circuit to the MA Unit Input Circuit to test for the occurrence of any 1's in the subtraction result; if any 1's have occurred, the MA Unit Input Circuit remains inactive, and the same subtraction is repeated in the next word interval. When a subtraction result of all 0's is detected by the ninth OP in the MA Unit Input Circuit, this circuit transmits the ninth OP to the SC Delay Circuit which thereupon arms the Band Counter and the Band Group Counter and, on the next CP-4, receives a pulse from the Address Control Circuit and transmits this pulse as an SC pulse to the Sequencer for terminating SP-2 and SP-3 (see also Fig. 84). SP-2 and SP-3 may also be terminated by CP-5 applied to the Sequencer from the Start-Stop Circuit during initiation of the Logical Jump Code, as hereinafter described.

*Sequencing phase 4.*—Referring to Fig. 86, SP-4 is initiated when the SC Delay Circuit transmits a delayed SC pulse through the Sequencer on CP-4, one word interval following the termination of SP-2 and SP-3 (see also Fig. 85). SP-4 may also be initiated on CP-5 by the pulse transmitted from the Start-Stop Circuit to the Sequencer for terminating SP-2 and SP-3. If SP-4 is initiated by the delayed SC pulse, the Sequencer transmits that pulse to the Read Control Circuit for arming output gate 307 of the latter unit. The delayed SC pulse also prepares the Sequencer for transmitting the next undelayed SC pulse to the Timing Generator and to Code Counter "A" for initiating TP-1 following the second occurrence of SP-3, as hereinafter described, and disables the Sequencer from responding to a next delayed SC pulse. During SP-4, the selected Read-Write Amplifier remains armed by the Band Counter and the Band Group Counter, and the Sequencer arms the following gates, the control leads not being shown in Fig. 86:

The "C" Register by-pass gate 390 in the Main Adder (Fig. 51);
The CP-1 to 4 input shift gate 622 in the "K" Register (Fig. 61);
The CP-1 input gate 641 in the "K" Register;
The CP-2 input gate 642 in the "K" Register;
The CP-3 input gate 643 in the "K" Register;
The OP input shift gate 712 in the "O" Register (Fig. 65); and
The word input gate 715 in the "O" Register.

During the first OP train following the initiation of SP-4, a command in the selected address of Memory (Fig. 86) is read out through the related Read-Write Head, and the related Read-Write Amplifier, and through the Interpreter to the Transfer Busses. The 0 digits of the command are transmitted from the 0's Transfer Bus directly to the "x" input of the Main Adder, and the 1's digits of the command are transmitted from the 1's Transfer Bus through the Sign Clipper into the "x" input of the Main Adder. No "y" input is applied to the Main Adder; therefore, the command word appears at the Main Adder output unaltered, and is shifted, as received from Memory, through the Arithmetic Bus into the "O" Register.

On CP-1 to 4 following the OP train, CP-1, CP-2 and CP-3 are shifted into the "K" Register input for setting up the value 0111(B) in preparation for counting the first eight word intervals of the second occurrence of SP-2, hereinafter described. SP-3 is also applied to the SC Delay Circuit for causing the latter to de-energize the Band Counter and the Band Group Counter. CP-4 is applied to the Sequencer for terminating SP-4 and for re-initiating SP-2. CP-4 is also transmitted by the Sequencer to the CBP Distributor, the Band Counter and Code Counter "A" for resetting the latter. The Band Counter transmits the reset pulse to the Band Group Counter which is thereby reset, and Code Counter "A" transmits the reset pulse to Code Counters "B" and "C" which are thereby reset.

*Sequencing phase 2: Second occurrence.*—Referring again to Fig. 84, SP-2 is re-initiated by the CP-4 which terminates SP-4, and carries out the previously described operations for setting up the Band Counter, the Band Group Counter and the Code Counters according to the values of the five octal groups representing the band and code numbers in the "O" Register. At the end of the first eight word intervals of the second occurrence of SP-2, the value 0000(B) is sensed in the KS Sensing Circuit on CP-3, as hereinbefore described, and the KS Sensing Circuit transmits CP-3 to the Sequencer for initiating SP-3.

*Sequencing phase 3: Second occurrence.*—During the second occurrence of SP-3, which is concurrent with the latter portion of the second occurrence of SP-2 (following the eighth word interval thereof), the sector number of the address representation in the "O" Register (Fig. 85) is compared with successive sector numbers from the Sector Track of Memory, as hereinbefore described, and when a match occurs, the SC Delay Circuit is conditioned for transmitting a second SC pulse to the Sequencer on the next CP-4. The second SC pulse terminates SP-2 and SP-3, as hereinbefore described, and is transmitted by the Sequencer to the Timing Generator, for initiating TP-1 of the selected code, and to Code Counter "A" for sensing the latter for a code value (a linear count of 2; see also Fig. 77) representing a decimal operation. If a decimal operation value stands in Code Counter "A," the SC pulse is further transmited by Code Counter "A" to the Pattern Generator for causing the latter to generate decimal patterns in preparation for carrying out the selected code.

CODES

*In General.*—The codes, or computer operations, will be described with general reference to the over-all block diagram of Figs. 33 and 34, and with specific reference to Figs. 87 to 115, inclusive, each of which is based on Figs. 33 and 34 but shows the block representation of only those circuits employed during the related timing phase or phases of a particular code. The descriptions of the various codes will be more readily understood by also referring to the previously described drawings (in Figs. 35 to 82, inclusive) of the individual circuit units employed.

It is recalled that TP-1 is automatically initiated during each code, and is employed as the first timing phase of each code; TP-2 is automatically initiated during each code and is employed as the second timing phase of each code; and TP-3, TP-4 and TP-5 are initiated during only selected codes. Therefore, TP-1 will be described first without reference to any particular code, and the remaining timing phases will be described only in relation to those codes during which they are employed. Certain special operations must be performed during TP-1 in some of the codes, and that timing phase will be described with particularity for those codes.

It is recalled that each code value comprises eight binary digits which, for purposes of setting up the Code Counters (Figs. 77 to 79), are treated as three octal groups. For purposes of entering the code values into the "O" Register (Fig. 65), each such value is treated as comprising two hexadecimal groups of four binary digits each. This permits each code value to be expressed as two hexadecimal digits when it is typed in, and permits the setting up of one or more secondary codes, based on a primary code, by changing only the less significant of the two hexadecimal digits of the code value.

*Timing phase 1 all codes.*—Referring to Fig. 87, TP–1 is initiated, during each code, by an SC pulse from the Sequencer on CP–4. Regardless of which code has been selected, certain operations occur during TP–1, as follows.

The first CP–2 following the initiation of TP–1 is transmitted by the Timing Generator to the Read Control Circuit for arming the latter in preparation for reading a word out of Memory during TP–2 if the selected code so requires. CP–2 is also transmitted by the Timing Generator to Code Counter "C" to test the latter unit for the presence of any of three secondary codes. If the value 2 has been entered into Code Counter "C" in the setting up of the selected code during the preceding addressing operation, as hereinbefore described, Code Counter "C" transmits CP–2 to the Sign Control Circuit for reversing the sign of the operand stored in the "A" Register. If the value 3 has been set up in Code Counter "C," that unit transmits CP–2 to the Sign Control Circuit for setting the sign of the "A" Register word to "plus"; and if the value 5 has been set up in Code Counter "C," that unit transmits CP–2 to the Sign Control Circuit for setting the sign of the "A" Register word to "minus."

The next CP–4 is transmitted by the Timing Generator to Code Counter "C" to test for the presence of a fourth secondary code. If the value 4 has been set up in Code Counter "C," that unit transmits CP–4 to the Sign Control Circuit to set the latter to a sign count of 1. The CP–4 which tests for the presence of the fourth secondary code also terminates TP–1 in the Timing Generator and initiates TP–2; therefore, TP–1 has a duration of one word interval.

It is seen from the foregoing that a secondary code is selected by setting up one of the values 2, 3, 4, or 5 in Code Counter "C," and therefore occurs when the least significant octal group of a code value is 010(OGB), 011(OGB), 100(OGB) or 101(OGB). If a code value is treated as two hexadecimal groups instead of three octal groups, there is no secondary code when the last three binary digits of the less significant hexadecimal group are 0's. In the following description of the codes, other than the Jump Codes it will be assumed that no secondary code is selected and that the less significant hexadecimal group of each code value ends with three 0's.

*Read Code.—In general.*—The Read Code is provided for transferring a word from Memory into the "A" Register. Other than the standard TP–1 hereinbefore described, the Read Code employs only TP–2. To initiate the Read Code, the code value 0001/0000(HGB) is entered into the "O" Register (Fig. 65); therefore, the respective values 0 and 2 are set up in Code Counters "A" and "B" (Figs. 77 and 78). This energizes output 980(2) of Code Counters "A" and "B," thereby arming gate 1042(2) of the Code Matrix (Fig. 80). The previously described operations occur during TP–1, and TP–2 is then initiated on CP–4.

*TP–2.*—When TP–2 is initiated, output terminal 1052(2) of the Code Matrix is energized and, in turn, energizes the corresponding input terminal of the Code Distributor (Fig. 81) for arming the following gates:

The CP–1 non-overflow test gate 441 in the MA Sensing Circuit (Fig. 54);

The CP–5 sign readout gate 464 in the Sign Control Circuit (Fig. 55);

The sign count input gate 472 in the Sign Control Circuit;

The CP–1 to 4 shift gate 523 in the "A" Register (Fig. 57);

The OP shift gate 527 in the "A" Register;

The word input gate 534 in the "A" Register;

The controlled stop gate 894 in the Start-Stop Circuit (Fig. 75); and

The Start pulse gate 948 in the Timing Generator (Fig. 76).

Referring generally to Fig. 88, and referring for circuit details to Figs. 35 to 76, the first CP–5 after the initiation of TP–2 (on CP–4) tests the first section of the Sign Control Circuit for the sign of the word standing in the "A" Register. If that sign is minus, the test pulse is transmitted by the Sign Control Circuit through the 1's Transfer Bus and the Sign Clipper into the second section of the Sign Control Circuit for setting the latter to a minus sign count of 1. If the sign of the word in the "A" Register is plus CP–5 is not transmitted to the second section of the Sign Control Circuit, and the sign count remains at 0.

It is recalled that there is a delay of two digit intervals between the reading of a digit on an Information Band of Memory and the reading out of that digit from the Interpreter onto the related Transfer Bus. Therefore, the sign digit of the word in the selected address of Memory is read by the related Read-Write Amplifier in coincidence with the CP–4 which initiates TP–2, and this sign digit is then read out of the Interpreter by CP–6, which is applied to the Interpreter from the Read Control Circuit. If the sign digit is a 1 (representing a minus sign), it is transmitted from the 1's Transfer Bus through the Sign Clipper and into the second section of the Sign Control Circuit, and increases the sign count by unity. If the sign digit is a 0 (representing a plus sign), it is transmitted from the 0's Transfer Bus directly into the "*x*" input of the Main Adder. However, no sum digit is shifted out of the Main Adder on CP–6; therefore, a sign digit of 0 has no effect on the output of that unit.

The following OP train is applied by the Read Control Circuit to the Interpreter for reading out the forty-digit word from the selected address of Memory onto the Transfer Busses. The 1's digits of the word are transmitted from the 1's Transfer Bus through the Sign Clipper into the "*x*" input of the Main Adder, and the 0's digits of the word are transmitted directly from the 0's Transfer Bus into the "*x*" input of the Main Adder. Although the Sign Control Circuit conditions the Main Adder for an additive or subtractive operation, according to the sign count, there is no "*y*" input to the Main Adder; therefore, nothing is added to or subtracted from the combined "*x*" input which is transmitted by the Main Adder through the "C" Register, the Corrector Adder and the Arithmetic Bus into the "A" Register. The OP train is applied to the "A" Register for shifting the word, and is transmitted by the "A" Register to the "C" Register for the same purpose. Since the "C" Register constitutes an extra four stages in the shifting circuit, forty-four shift pulses are necessary in order to shift the forty-digit word into the "A" Register. For this purpose, CP–1 to 4 are also applied to the "A" Register shift input, and cause the last four digits of the word to be shifted through the "C" Register and the Corrector Adder into the "A" Register. Although the Sign Control Circuit conditions the Corrector Adder for an additive or subtractive operation, according to the sign count, there is no "*y*" input to the Corrector Adder, which therefore transmits its input, unaltered to the Arithmetic Bus.

Since there is no "*y*" input to the Main Adder, there is no overflow of the "A" Register, and the 0 state of the Main Adder conditions the MA Sensing Circuit to represent a non-overflow. The CP–1 following the OP train tests the MA Sensing Circuit for overflow or non-overflow, and the latter unit transmits a non-overflow pulse to the Sign Control Circuit. If the second section of the Sign Control Circuit stands in a "subtract" state, the non-overflow pulse is transmitted to the first section of that unit for reversing the representation of the sign of the operand standing in the "A" Register. If the second section of the Sign Control Circuit stands in "subtract" state, it is necessary to reverse the sign of the "A" Register word, regardless of whether it is plus or minus. If a sign of that word is plus, this is because the sign of the word previously standing in the "A" Register was plus, and the "subtract" state of the second section of the Sign Control Circuit indicates a sign count of 1, i.e., the sign of the word from Memory was minus: therefore, the sign indication in the first section should be reversed to "minus." If the sign indication in the first section of the Sign Control Circuit is "minus," this indicates that the sign of the word previously standing in the "A" Register was minus, and if the second section of the Sign Control Circuit stands at "subtract," it indicates a sign count of 1 which is due to the previous "A" Register word. Therefore, the word from Memory was plus and the first section of the Sign Control Circuit should be reversed to a "plus" indication.

The CP–4 following the previously described CP–1 test pulse, terminates TP–2 in the Timing Generator, and the Timing Generator transmits a Start pulse to the Start Pulse Bus for initiating a next addressing operation in order to set up a next code.

*Write Code.—In general.*—The Write Code is employed for writing the contents of the "A" Register in a selected address of Memory. Its code value is 0001/1000(HGB); therefore, Code Counter "A" (Fig. 77) is set to a value of 0, and Code Counter "B" (Fig. 78) is set to a value of 3, and output terminal 980(3) of Code Counters "A" and "B" is energized. This arms two gates in the Code Matrix (Fig. 80), viz., Tp–1 gate 1041(1) and TP–2 gate 1042(3). During TP–1, the Code Matrix output terminal 1051(1) is energized, and energizes a corresponding input terminal of the Code Distributor (not shown in Fig. 81), and during TP–2, the Code Matrix output terminal 1052(3) (Fig. 80) is energized and energizes a corresponding input terminal of the Code Distributor (not shown in Fig. 81). During TP–1, the Read Control Circuit (Fig. 48) is disabled and the Write Control Circuit (Fig. 49) is enabled. The Sign Clipper (Fig. 50) is conditioned for transmitting all digit 1 pulses subsequent to CP–4 to the Main Adder (Fig. 51), instead of transmitting, as usual, any digit 1 pulse on CP–6 through the Sign Control Circuit (Fig. 55). If a minus sign is associated with the contents of the "A" Register (Fig. 57), its representation is read out of the first section of the Sign Control Circuit (Fig. 55) onto the 1's Transfer Bus to be written in Memory (Fig. 35). During TP–2, the contents of the "A" Register (Fig. 57) are shifted to the Transfer Busses to be written in Memory (Fig. 35), and are recirculated back into the "A" Register (Fig. 57).

*TP–1.*—For supplementing the previously described operations which occur during TP–1 of every code, the Code Distributor arms the following gates during TP–1 of the Write Code:

The CP–3 writing gate 335 in the Write Control Circuit (Fig. 49);

The CP–4 sign-count blocking gate 352 in the Sign Clipper (Fig. 50);

The CP–4 sign readout gate 463 in the Sign Control Circuit (Fig. 55).

Referring to Fig. 89, it is recalled that TP–1 is initiated when an SC pulse is transmitted by the Sequencer to the Timing Generator. The next CP–2 is transmitted by the Timing Generator to the Read Control Circuit for arming the output of that unit in preparation for the reading operation which normally occurs during TP–2 of a code. During the Write Code, however, the following CP–3 is applied to the Write Control Circuit for enabling the latter, and is transmitted by the Write Control Circuit to the Read Control Circuit for disabling the output of the Read Control Circuit, because no reading operation occurs during the Write Code.

It is also recalled that a word is written in Memory two digit intervals in advance of its normal transfer time, i.e., the sign digit is written on CP–4 and the first word digit is written on CP–5. Thus, the first CP–4 following the initiation of TP–1, i.e., the CP–4 which terminates TP–1 and initiates TP–2, is applied to the first section of the Sign Control Circuit, and if a minus sign digit is stored therein, it is transmitted through the 1's Transfer Bus, the Write Control Circuit and the selected Read-Write Amplifier and Read-Write Head, and is written in Memory at the selected address. CP–4 is also applied to the Sign Clipper for disabling the usual transmission of any digit 1 pulse on CP–6 (normally representing a minus sign) from the 1's Transfer Bus to the Sign Control Circuit.

*TP–2.*—When TP–2 is initiated on CP–4, the Code Distributor arms the following gates:

The CP–1, 2, 5, and 6 shift gate 524 in the "A" Register (Fig. 57);

The OP shift gate 527 in the "A" Register;

The word input gate 534 in the "A" Register;

The word output gates 542(0) and 542(1) in the "A" Register;

The Start pulse gate 948 in the Timing Generator (Fig. 76).

Referring again to Fig. 89, the first CP–5 and CP–6 following the initiation of TP–2 are applied to the shifting input of the "A" Register and shift the contents of that register two binary places toward the output end of the register. This shifts the two least significant binary digits in that register through the Transfer Busses and the previously described path for writing them in Memory, and further shifts these digits through the Sign Clipper and the Main Adder into the "C" Register. It is recalled that each shift pulse which is applied to the "A" Register is transmitted by that register to the shift input of the "C" Register; therefore, the output of the Main Adder is shifted into the "C" Register. The following OP train shifts the remaining thirty-eight digits of the "A" Register word into the Transfer Busses for writing them in Memory, and shifts them through the Sign Clipper, the Main Adder, the "C" Register, and the Corrector Adder and the Arithmetic Bus back into the "A" Register. Although the Sign Control Circuit conditions the Main Adder and the Corrector Adder for additive or subtractive operations, there is no "y" input to either adder, and the word from the "A" Register is not altered when it passes through these adders. Since the "C" Register constitutes four stages of the recirculation path back into the "A" Register, forty-four pulses are required to return the "A" Register word to its original position in that register. Thus, following the OP train, CP–1 and CP–2 are applied to the shift input of the "A" Register, and are applied by the "A" Register to the shift input of the "C" Register, and along with CP–5, CP–6 and the OP train, constitute forty-four shift pulses.

The next CP–4, which occurs 1 word interval after the initiation of TP–2, is applied to the Timing Generator for terminating TP–2, and for causing the Timing Generator to transmit a pulse to the Start Pulse Bus for initiating a next addressing operation in preparation of setting up the next code.

*Add 1 Code.—In general.*—The Add 1 Code is provided for adding +1 or −1 to a word from a selected address of Memory, and for writing the altered word in the same address. This code employs the standard TP–1, hereinbefore described, and employs TP–2, during which the word is read out of Memory and into the "x" input of the Main Adder where it is additively or subtractively combined with a "y" operand of 1. The result is entered into the "A" Register. When TP–2 is terminated, SP–4 of an addressing operation is initiated for setting up the Write Code, during which the contents of the "A" Register are written back into the same address of Memory. To initiate the Add 1 Code, the code value 0101/1000(HGB), for decimal addition, or the code value 1001/1000(HGB), for hexadecimal addition, is entered into the "O" Register (Fig. 65). Therefore, either the value 1 (for decimal addition) or 2 (for hexadecimal addition) is set up in Code Counter "A" (Fig. 77), and the value 3 is set up in Code Counter "B" (Fig. 78). It will be seen that it is possible in many of the codes hereinafter described to set up Code Counter "A" for either decimal or hexadecimal operation, and for simplicity of explanation, each code will be described in terms of hexadecimal operation.

Since the respective values 2 and 3 are set up in Code Counters "A" and "B" for controlling the Add 1 Code in hexadecimal operation, the output terminal 981(3) of Code Counters "A" and "B" is energized during this code for arming gate 1042(11) of the Code Matrix (Fig. 80). Therefore, during TP–2, the Code Matrix output terminal 1052(11) is energized, and energizes a corresponding input terminal of the Code Distributor (not shown in Fig. 81).

*TP–2.*—During TP–2 of the Add 1 Code, the Code Distributor arms the following gates:

The CP–1 overflow sensing gate 441 in the MA Sensing Circuit (Fig. 54);
The CP–5 sign readout gate 464 in the Sign Control Circuit (Fig. 55);
The sign count gate 464 in the Sign Control Circuit;
The CP–6 unit set gate 504 in MA Unit Input Circuit (Fig. 56);
The CP–1 to 4 shift gate 523 in the "A" Register (Fig 57);
The OP shift gate 527 in the "A" Register;
The word input gate 534 in the "A" Register;
The CP–1 to 4 shift gate 622 in the "K" Register (Fig. 61);
The CP–1 input gate 641 in the "K" Register;
The CP–2 input gate 642 in the "K" Register;
The CP–3 input gate 643 in the "K" Register; and
The SP–2 gate 972 in Code Counter "A" (Fig. 76).

Referring to Fig. 90, the first CP–5 following the initiation of TP–2 tests the first section of the Sign Control Circuit for the presence of a minus sign, and if a minus sign is stored therein, a pulse is transmitted by the Sign Control Circuit through the 1's Transfer Bus and the Sign Clipper into the second section of the Sign Control Circuit where it is counted. CP–6 is applied to the MA Unit Input Circuit for preparing the latter to enter a "y" operand of 1 into the Main Adder in coincidence with the first OP of the following OP train. Also on CP–6, the sign digit of the word from the selected address of Memory is applied to the 0's or 1's Transfer Bus. If it is a minus sign, represented by a digit 1 pulse, it is transmitted through the Sign Clipper into the second section of the Sign Control Circuit and is counted; if it is a plus sign, represented by a digit 0, it is transmitted directly into the "x" input of the Main Adder. During the following OP train and CP–1 to 4, the word from Memory is entered into the "x" input of the Main Adder, as hereinbefore described, and is combined with the "y" operand of 1 from the MA Unit Input Circuit. The sum word is shifted through the "C" Register, and the Corrector Adder and the Arithmetic Bus into the "A" Register. The Sign Control Circuit controls the additive or subtractive entry of the "y" operand of 1 into the Main Adder in accordance with the sign of the word previously standing in the "A" Register (which sign can be controlled through the use of a secondary code, as hereinbefore described) and the sign of the word from Memory.

The CP–1 following the OP train is applied to the MA Sensing Circuit to test for overflow or non-overflow of the "A" Register, and an overflow or non-overflow pulse is transmitted by the MA Sensing Circuit to the Sign Control Circuit for setting the first section thereof, as hereinbefore described. CP–1 to 4 are also applied to the shift input of "K" Register, and CP–1 to 3 are applied to the word input of that register for shifting the value 0111(B) into the "K" Register in preparation for counting the first eight word intervals of SP–2 during the next addressing operation.

CP–4 also resets Code Counter "A," and is transmitted by the latter to the Code Counter "C" for resetting that unit. This leaves the respective values 0, 3 and 0 set into Code Counters "A," "B," and "C," which values, it is recalled, constitute the Write Code value. CP–4 is also transmitted by Code Counter "A" to the Pattern Generator for terminating the generation of decimal patterns in preparation for a writing operation, and to the Sequencer for initiating SP–2. The same CP–4 is applied to the Timing Generator for terminating TP–2.

Although SP–2 is initiated at the end of TP–2, and the "K" Register and "K" Subtractor (Fig. 62) count the first eight word intervals of that sequencing phase, as hereinbefore described, the CBP Distributor (Fig. 69) was not reset, and the Band Counter (Fig. 70), the Band Group Counter (Fig. 71) and Code Counters A, B and C (Figs. 77 to 79) are therefore not set up according to the word standing in the "O" Register (Fig. 65) at the beginning of SP–2 (this word includes the address of the word from Memory and the Add 1 Code value). Instead, the Sequencer (Fig. 74) is idle during the first eight word intervals of SP–2 and then initiates SP–3, during which the sector number standing in the "O" Register (Fig. 65) is searched. Since the word from Memory (Fig. 35), after being increased or decreased by unity, is returned to the same address from which it was read, the Band Counter (Fig. 70) and the Band Group Counter (Fig. 71) are already set to the proper values, for this writing operation, and Code Counters "A," "B," and "C" are set to the values necessary for carrying out the Write Code. Therefore, at the end of SP–3, TP–1 of the Write Code is initiated as hereinbefore described.

*Jump Code.—In general.*—The Jump Code is provided for preparing the computer to receive its next command from a Memory address other than the next consecutive address. This code employs TP–1 and TP–2. During TP–1, in addition to the operations performed during the standard TP–1, the Read Control Circuit (Fig. 48) is disabled, and the Jump command standing in the "O" Register (Fig. 65) is circulated through the "O" Subtractor (Fig. 68) and back into the "O" Register (Fig. 65), and when the address part of the command is being shifted from the first section of the "O" Register into the second section of that register, it is also shifted into the "S" Register (Fig. 66). The Jump command, like other commands, includes a code value, which in this case corresponds to the Jump Code. But unlike other commands, the Jump command includes the address of a next command rather than the address of an operand or an address where a word is to be written. It is the address of the next command which is shifted into the "S" Register during TP–1 of the Jump Code, and this address may be any predetermined address, and obviously need not be the next consecutive address. During TP–2 of the Jump Code, a Start pulse is generated for initiating a next addressing operation.

The code value for the Jump Code 1111/1100(HGB); therefore, in setting up the Jump Code, Code Counters "A," "B" and "C" (Figs. 77 to 79) are set to the respective values 3, 7 and 4. It is noted that Code Counter "C" is set to a value other than 0, but during the Jump Code this does not indicate the selection of a secondary code. The presence of the respective values 3, 7 and 4 in Code Counters "A," "B" and "C" energizes the common output terminal 983(7–1) from these counters, which energizes a corresponding input terminal of the Code Matrix (Fig. 80). During TP–1, therefore, gate 1041(4) of the Code Matrix is armed, and output terminal 1051(4) is energized, and during TP–2, gate 1042(18) is armed, and output terminal 1052(18) is energized. Output terminals 1051(4) and 1052(18) of the Code Matrix energize corresponding input terminals of the Code Distributor (not shown in Fig. 81) during their related timing phases TP–1 and TP–2.

*TP–1.*—During TP–1, the previously described standard operations occur; also, the Code Distributor arms the following gates:

The CP–3 read-disabling gate 306 in the Read Control Circuit (Fig. 48);
The OP input shift gate 712 in the "O" Register (Fig. 65);
The OP output shift gate 716 in the "O" Register;
The OP input shift gate 733 in the "S" Register (Fig. 66);
The word input gate 741 in the "S" Register;
The "O" Subtractor output gate 776 in the "O" Subtractor (Fig. 68).

Referring to Fig. 91, the first OP train following the initiation of TP–1 is applied to the shift inputs of the "O" and "S" Registers, and the contents of the "O" Register are shifted into the "*x*" input of the "O" Subtractor, through the "O" Subtractor and the first section of the "O" Register, and into both the "S" Register and the second section of the "O" Register. There is no "*y*" input to the "O" Subtractor; therefore, the circulated word is not altered.

It is recalled that during the standard TP–1, CP–2 following the OP train is applied to the Timing Generator and is transmitted by that unit to the Read Control Circuit for enabling the latter. During TP–1 of the Jump Code, the following CP–3 is applied to the Read Control Circuit for disabling it, because no reading operation occurs during the Jump Code. The next CP–4 which occurs one word interval after the initiation of TP–4 which occurs one word interval after the initiation of TP–2, is applied to the Timing Generator for terminating TP–1 and for initiating TP–2.

*TP–2.*—During TP–2, the Code Distributor arms only the Start pulse gate 948 (Fig. 76) in the Timing Generator. The CP–4 which occurs one word interval after the initiation of TP–2 is applied to the Timing Generator (Fig. 91) for terminating TP–2 and for transmitting a pulse to the Start Pulse Bus to initiate a next addressing operation.

*Logical Jump Code.—In general.*—The Logical Jump Code is provided for writing in Memory a command comprising the address of the present command and the code value of the Jump Code, described above. This command is written at an address which constitutes a part of the Logical Jump command. The Logical Jump Code employs TP–1 and TP–2. In addition to the operations which always occur during the standard TP–1, the Read Control Circuit (Fig. 48) is disabled during TP–1 of the Logical Jump Code, and the Write Control Circuit (Fig. 49) is enabled. During TP–2, the contents of the "S" Register (Fig. 66) (the address of the present command) and the contents of the first section of the "O" Register (Fig. 65) shifted two binary places (which, as will be seen, constitutes the Jump Code value) are written at the address whose value stands in the second section of the "O" Register, i.e., the address whose value forms a part of the Logical Jump command. The Logical Jump Code value is 1111/1111(HGB); therefore, Code Counters "A," "B" and "C" (Figs. 77 to 79) are set to the respective values 3, 7 and 7, and their common output terminal 983(7–2) is energized. This energizes a corresponding input terminal of the Code Matrix (Fig. 80) and arms gates 1041(5) and 1042(19). During TP–1, output terminal 1051(5) is energized, and during TP–2, output terminal 1052(19) is energized. Output terminals 1051(5) and 1052(19) energize corresponding input terminals of the Code Distributor (not shown in Fig. 81).

*TP–1.*—In addition to the operations which normally occur during the previously described standard TP–1, the Code Distributor arms the CP–3 writing gate 335 in the Write Control Circuit (Fig. 49) during TP–1 of the Logical Jump Code. Referring to Fig. 92, although the first CP–2 after the initiation of TP–1 is transmitted by the Timing Generator to the Read Control Circuit for enabling the latter, as hereinbefore described in connection with the standard TP–1, the next CP–3 enables the Write Control Circuit and is transmitted by that circuit to the Read Control Circuit, which is thereby disabled. CP–4 is applied to the Timing Generator for terminating TP–1 and for initiating TP–2.

*TP–2.*—During TP–2 of the Logical Jump Code, the Code Distributor arms the following gates:

The OP input shift gate 712 in the "O" Register (Fig. 65);
The OP output shift gate 716 in the "O" Register;
The CP–5, CP–6 and OP input shift gate 732 in the "S" Register (Fig. 66);
The CP–5, CP–6 and OP output shift gate 736 in the "S" Register;
The word input gate 741 in the "S" Register;
The "O" Subtractor output gate 776 in the "O" Subtractor (Fig. 68); and
The Start pulse gate 948 in the Timing Generator (Fig. 76).

The first CP–5, CP–6 and OP train following the initiation of TP–2 shift the contents of the "S" Register onto the Transfer Busses for writing them in Memory in the manner hereinbefore described. The OP train also shifts the contents of the first section of the "O" Register through the "S" Register onto the Transfer Busses for writing them in Memory. However, the "O" Register is not shifted with CP–5 and CP–6, and the "S" Register is shifted with these pulses; therefore, the two most significant binary digits of the contents of the first section of the "O" Register are not written in Memory, and the two least significant digits of the contents of the first section of that register become 0's. Since the first section of the "O" Register contained all 1's, representing the Logical Jump Code value 1111/1111(HGB), the code value written in Memory is 1111/1100(HGB), i.e., the Jump Code value. The OP train also circulates the entire contents of the "O" Register through the "*x*" input of the "O" Subtractor, and from the output of the "O" Subtractor back into the "O" Register. The twelve least significant binary digits of the circulated word are also entered into the "S" Register from the first section of the "O" Register, as well as being entered into the second section of the "O" Register. There is no "*y*" input to the "O" Subtractor; therefore, the circulated word remains unaltered.

The CP–4 which occurs one word interval after the initiation of TP–2 is applied to the Timing Generator for terminating TP–2 and for transmitting a Start pulse to the Start Pulse Bus for initiating a next addressing operation.

*Add Code.—In general.*—The Add Code is provided for adding or subtracting the contents of the "A" Register to or from a word from a selected address in Memory. Other than the standard TP–1, the Add Code employs TP–2 and TP–3. During TP–2, the word standing in the "A" Register is added to or subtracted from a word which is read out of a selected address in Memory, and the result is entered into the "A" Register. During TP–3, the result word is complemented, if necessary. The Add Code value is 0100/0000(HGB) for decimal addition, or 1000/0000(HGB) for hexadecimal addition. The code will be described in terms of hexadecimal addition. Subtraction may be controlled through the use of secondary codes and/or signs of the two operands, as hereinbefore described. Using the hexadecimal Add Code value of 1000/0000(HGB), Code Counters "A," "B" and "C" (Figs. 77 to 79) are set to the respective values 2, 0 and 0, and the common output terminal 981(0) from Code Counters "A" and "B" is energized. This energizes a corresponding input terminal of the Code Matrix (Fig. 80) and arms gates 1042(8) and 1043(1); therefore, during TP–2, output terminal 1052(8) is energized, and during TP–3, output terminal 1053(1) is energized. Output terminals 1052(8) and 1053(1) of the Code Matrix energize corresponding input terminals of the Code Distributor (not shown in Fig. 81) during the related timing phases TP–2 and TP–3.

During the standard TP–1 of the Add Code, the computer is prepared as hereinbefore described, for the reading operation which will occur during TP–2.

*TP–2.*—During TP–2 of the Add Code, the Code Distributor arms the following gates:

The TP–1 overflow sensing gate 441 in the MA Sensing Circuit (Fig. 54);
The CP–5 sign readout gate 464 in the Sign Control Circuit (Fig. 55);
The sign count input gate 472 in the Sign Control Circuit;
The overflow stop gate 477 in the Sign Control Circuit;
The CP–1 to 4 input shift gate 523 in the "A" Register (Fig. 57);
The OP input shift gate 527 in the "A" Register;
The word input gate 534 in the "A" Register;
The Main Adder output gate 543 in the "A" Register; and
The TP–3 start gate 947 in the Timing Generator (Fig. 76).

Referring to Fig. 93, the first CP–5 following the initiation of TP–2 senses the first section of the Sign Control Circuit for the presence of a minus sign of the word standing in the "A" Register. If a minus sign is stored in the Sign Control Circuit, it is transmitted through the 1's Transfer Bus and the Sign Clipper into the second section of the Sign Control Circuit where it is counted. On CP–6, the sign, if minus, of the word from the selected address of Memory is transmitted from the Interpreter through the 1's Transfer Bus and the Sign Clipper into the second section of the Sign Control Circuit where it is counted. During the following OP train, the word from Memory is entered into the "$x$" input of the Main Adder, the word standing in the "A" Register is entered into the "$y$" input of the Main Adder, and the result word is shifted through the "C" Register, the Corrector Adder and the Arithmetic Bus into the "A" Register. The Sign Control Circuit conditions the Main Adder for an additive or subtractive operation in accordance with the sign count stored in the second section of the Sign Control Circuit. The Sign Control Circuit also conditions the Corrector Adder for additive or subtractive operation, but there is no "$y$" input to the Corrector Adder during hexadecimal operation. The shift pulses that are applied to the "A" Register are transmitted by that register to the "C" Register, as hereinbefore described, for causing the "C" Register to shift.

Although the result word is not fully shifted into the "A" Register until CP–4 following the OP train (due to the four "C" Register stages in the shifting path), the last result digit is read out of the Main Adder and into "C" Register in coincidence with the last pulse of the OP train. CP–1 following OP train tests the MA Sensing Ciruit for overflow of the "A" Register, and the MA Sensing Circuit transmits either an overflow or a non-overflow pulse to the Sign Control Circuit, and sets the first section thereof to represent the sign of the result. If there is no overflow of the "A" Register, the result word entered into the "A" Register is the true result, and this is the true result, and this is the effective end of the Add Code; although TP–3 is automatically initiated, as hereinafter described, it performs no significant function in this case.

If an overflow of the "A" Register occurs under circumstances which require the result to be complemented (as previously set forth in connection with Table XIX), an overflow pulse that is transmitted from the MA Sensing Circuit to the Sign Control Circuit also conditions the latter for controlling a complementing operation during TP–3.

If an overflow of the "A" Register occurs under circumstances which indicate that the capacity of that register has been exceeded (as set forth in Table XIX), an overflow pulse which is transmitted from the MA Sensing Circuit to the Sign Control Circuit, is further transmitted to the Start-Stop Circuit to energize the Overflow Light and to condition the Start-Stop Circuit for generating the Logical Jump Code.

The CP–4 which occurs one word interval after the initiation of TP–2 is applied to the Timing Generator for terminating TP–2 and for initiating TP–3.

*TP–3.*—During TP–3 of the Add Code, the Code Distributor arms the following gates:

The 0's input gate 398 in the Main Adder (Fig. 51);
The CP–1 to 4 input shift gate 523 in the "A" Register (Fig. 57);
The OP input shift gate 527 in the "A" Register;
The word input gate 534 in the "A" Register;
The Main Adder output gate 543 in the "A" Register; and
The Start pulse gate 948 in the Timing Generator (Fig. 76).

Referring to Fig. 94, if the result of the addition during TP–2 does not require complementing and does not exceed the capacity of the "A" Register, the Sign Control Circuit conditions the Main Adder and the Corrector Adder for an addition operation, and TP–3 occurs as follows. The first OP train after the initiation of TP–3 is applied to the "$x$" input of the Main Adder as a word comprising all 0's. The same OP train shifts the "A" Register result word into the "$y$" input of the Main Adder where it is added to the "$x$" input of all 0's. The unaltered result word is shifted through the "C" Register, the Corrector Adder and the Arithmetic Bus back into the "A" Register by the OP train and CP–1 to 4. CP–4 is also applied to the Timing Generator for causing that unit to transmit a pulse to the Start Pulse Bus for initiating a next addressing operation.

If the result word produced during TP–2 requires complementing, the Sign Control Circuit conditions the Main Adder and the Corrector Adder for subtractive operations, and the same shifting operation as described occurs, except that the "$y$" operand of the Main Adder (the previous result word) is subtracted from the "$x$" operand of all 0's, and is thereby complemented. The complemented result word is shifted back into the "A" Register.

It is recalled that if the result word produced during TP–2 exceeded the capacity of the "A" Register, the Start-Stop Circuit was set for causing the generation of the Logical Jump Code. In this case, the first CP–5 after the initiation of TP–2 is applied to the Start-Stop Circuit and is transmitted thereby (1) to the Timing Generator for terminating TP–3; (2) to the Sequencer for initiating SP–4; (3) to Code Counter "A" for resetting the latter and for further transmission to Code Counters "B" and "C," which are also reset thereby; (4) to the MA Unit Input Circuit for conditioning that circuit to enter a "$y$" operand of 1 into the Main Adder; (5) to the Sign Control Circuit for setting the latter to its "subtract" state; (6) to the Main Adder for closing the "C" Register output gate 369 (Fig. 51) and for opening the "C" Register by-pass gate 392. Although TP–3 is terminated by the pulse applied to the Timing Generator (Fig. 94) from the Start-Stop Circuit, thereby closing the 0's input gate 398 (Fig. 51) of the Main Adder, the Start-Stop Circuit itself arms gate 398 during generation of the Logical Jump Code.

Referring to Fig. 86, it is recalled that normally, during SP–4, a command word is read out of Memory and into the "O" Register, since the Read Control Circuit is enabled by the same pulse which initiates SP–4. In the present case, the Read Control Circuit is not enabled when SP–4 is initiated, and no word is read out of Memory. However, the first OP train after the initiation of SP–4 is entered into the Main Adder (Fig. 94) as an "*x*" operand of all 0's and the first OP of that train is transmitted by the MA Unit Input Circuit to the "*y*" input of the Main Adder. Since the Sign Control Circuit is set to its "subtract" state, it conditions the Main Adder for a subtractive operation, and the "*y*" operand of 1 is subtracted from the "*x*" operand of all 0's, thereby producing a result word of all 1's. This result word constitutes the Logical Jump command, as hereinbefore described, and is transmitted by the Main Adder through the Arithmetic Bus into the "O" Register (Fig. 86) in the normal course of operation during SP–4, as previously described in connection with Fig. 86.

*Compare Code.—In general.*—The Compare Code is provided for comparing the values of two words, and for causing the computer to either perform or omit the next consecutive command in its stored program, depending on the results of the comparison. This code employs a standard TP–1, and employs TP–2 and TP–3. TP–2 is identical with TP–2 of the Add Code, hereinbefore described; during this timing phase, a word from Memory is combined with the word standing in the "A" Register. In order to compare the values of two words, the absolute value of one word is subtracted from that of the other word. The secondary codes and the signs of the words are employed in determining which word is to be subtracted from the other. During TP–3, the result word is complemented, if necessary, or the Logical Jump Code is generated, if necessary, just as in TP–3 of the Add Code. Also, during TP–3, the zero, plus or minus nature of the result word is determined; if the result word is zero or plus, the MA Unit Input Circuit (Fig. 56) is conditioned for causing the Main Adder (Fig. 51) to add an extra value of 1 to the contents of the "S" Register (Fig. 66) during the next addressing operation, and thereby omit the next consecutive command.

The code value for the Compare Code is 0100/1000(HGB) for decimal operation or 1000/1000(HGB) for hexadecimal operation. The Compare Code will be described in terms of hexadecimal operation; therefore, Code Counters "A" and "B" (Figs. 77 and 78) are set to the respective values 2 and 1, and their common output terminal 981(1) is energized. This energizes a corresponding input terminal in the Code Matrix (Fig. 80) for arming gates 1042(9) and 1043(2). Therefore, during TP–2 of the Compare Code, output terminal 1052(9) of the Code Matrix is energized, and during TP–3, output terminal 1053(2) is energized. Output terminals 1052(9) and 1053(2) of the Code Matrix energize corresponding input terminals of the Code Distributor (not shown in Fig. 81).

TP–1 of the Compare Code is the standard TP–1 (Fig. 87) during which the computer is prepared for reading a word out of the selected address of Memory. TP–2 is identical with TP–2 of the Add Code (Fig. 93), and by the proper choice of secondary codes, causes the subtraction of the absolute value of one operand from that of the other, with the result being entered into the "A" Register.

*TP–3.*—During TP–3 of the Compare Code, the Code Distributor arms the same gates that are armed during TP–3 of the Add Code (Fig. 94), and also arms the comparison test gate 515 in the MA Unit Input Circuit (Fig. 56).

Referring to Fig. 95, the computer operation for complementing the result, or for generating the Logical Jump Code, is the same as TP–3 of the Add Code. Assuming that the Logical Jump Code is not generated (generation of this code would terminate TP–3, as during the Add Code), the first CP–5 after the initiation of TP–3 is applied to the MA Unit Input Circuit and, if the result of the subtraction operation during TP–2 was all 0's, directly sets the MA Unit Input Circuit for delayed entry of an operand of 1 into the Main Adder. If the result of the subtraction operation was not all 0's, but had a plus sign, CP–5, which is transmitted by the MA Unit Input Circuit to the Sign Control Circuit, is transmitted back to the MA Unit Input Circuit for setting the latter for delayed entry of an operand of 1 into the Main Adder. The following OP train shifts the contents of the "A" Register through the Main Adder and back into the "A" Register for complementing, if necessary, as hereinbefore described. CP–1 following the OP train is applied to the MA Unit Input Circuit, and if that circuit was previously set for delayed entry of an operand of 1 into the Main Adder, it is conditioned by CP–1 for entering the first OP of the next OP train into the Main Adder as the operand of 1. CP–4 is applied to the Timing Generator and causes the latter to transmit a pulse to the Start Pulse Bus for initiating a next addressing operation. During this addressing operation, the operand of 1 is entered into the "y" input of the Main Adder from MA Unit Input Circuit if the latter has been so conditioned.

*Overflow Add Code.—In general.*—The Overflow Add Code is provided for adding a word from the selected address of Memory (Fig. 35) to a word standing in the "A" Register (Fig. 57), and for entering the result into the "A" Register. The Overflow Add Code differs from the Add Code, hereinbefore described, in that it does not cause the Logical Jump Code to be generated if the capacity of the "A" Register is exceeded, but simply permits the computer program to proceed to the next consecutive command which ordinarily causes the result word to be right-shifted, or "scaled" to include the overflow digit or digits. If the capacity of the "A" Register is not exceeded during the Overflow Add Code, the computer is conditioned for omitting the next consecutive command. The Overflow Add Code, like the Add Code, employs the standard TP–1, and also employs TP–2 and TP–3 for an addition operation and for any necessary complementing operation, respectively. During TP–2, if the capacity of the "A" Register is not exceeded, the MA Unit Input Circuit (Fig. 56) is conditioned for entering an extra value of 1 into the Main Adder (Fig. 51) during the next addressing operation following TP–3.

The code value for the Overflow Add Code is 0101/0000(HGB) for decimal operation, or 1001/0000(HGB) for hexadecimal operation. The Overflow Add Code will be described in terms of hexadecimal operation; therefore, Code Counters "A" and "B" (Figs. 77 and 78) are each set to the value 2, and their common output terminal 981(2) is energized. This arms gates 1042(10) and 1043(3) in the Code Matrix (Fig. 80); therefore, during TP–2, output terminal 1052(10) of the Code Matrix is armed, and during TP–3, output terminal 1053(3) is armed. Output terminals 1052(10) and 1053(3) of the Code Matrix energize corresponding input terminals of the Code Distributor (not shown in Fig. 81).

*TP–2.*—During TP–2 of the Overflow Add Code (Fig. 96), the Code Distributor arms the same set of gates which it arms during TP–2 of the Add Code (see also Fig. 93), except that it does not arm the overflow stop gate 477 in the Sign Control Circuit (Fig. 55) but, instead, arms the scaling gate 497 in the same circuit. Therefore, if the capacity of the "A" Register (Fig. 96) is not exceeded, the overflow or non-overflow pulse which is applied to the Sign Control Circuit from the MA Sensing Circuit on CP–1 near the end of TP–2, is transmitted by the Sign Control Circuit to the MA Unit Input Circuit to condition the latter for the delayed entry of a "*y*" operand of 1 into the Main Adder. The following CP–4 terminates TP–2 and initiates TP–3, as hereinbefore described in relation to the Add Code.

*TP–3.*—TP–3 of the Overflow Add Code is identical to TP–3 of the Add Code, but it cannot be terminated to generate the Logical Jump Code, because the Start-Stop Circuit can never be energized during TP–2 of the Overflow Add Code. Fig. 94 (TP–3 of the Add Code) therefore shows the circuit for carrying out TP–3 of the Overflow Add Code, as well as the circuit for generating the Logical Jump Code.

*Left Shift Code.*—*In general.*—During certain operations in the computer, it is desirable to treat the contents of the "A" and "R" Registers (Figs. 57 and 58, respectively) as one word of eighty binary places, or twenty decimal or hexadecimal places, in which case the contents of the "A" Register constitute the more significant half of the word and the contents of the "R" Register constitute the less significant half of the word. The Left Shift Code is provided for shifting the combined word through a selected number of places to the left. This is done, first, by connecting the output of the "A" Register to the input of the "R" Register, and connecting the output of the "R" Register through the "C" Register (Fig. 52) to the input of the "A" Register (Fig. 57). The completed loop then has eighty-four stages, including the "A," "R" and "C" Registers. Next, the combined word is right-shifted, employing eighty shift pulses, and is thereby returned to a shifted position which is four binary places to the left of its original position. This constitutes a left-shift of one decimal or hexadecimal place. The process is repeated until the selected number of left shift places is achieved.

The Left Shift Code employs the standard TP–1, during which the computer is prepared for reading a word out of the selected address of Memory (Fig. 35). It also employs TP–2, TP–4 and TP–5. During TP–2, a word is read out of Memory, and its four least significant binary digits are entered into the "K" Register (Fig. 61) and constitute a value representing the number of decimal or hexadecimal places through which the contents of the "A" and "R" Registers (Figs. 57 and 58, respectively) are to be left-shifted. When TP–2 is terminated, TP–5 is initiated, and has a duration of one word interval. During TP–5, the value standing in the "K" Register (Fig. 61) is sensed and is reduced by unity. If the sensed value is all 0's, this indicates the end of the Left Shift Code, and the computer either initiates a next addressing operation, or initiates the Round Off Code, hereinafter described. If the sensed value is not all 0's, TP–4 is initiated when TP–5 is terminated at the end of one word interval. During TP–4, the output of the "A" Register (Fig. 57) is connected to the input of the "R" Register (Fig. 58), and the output of the "R" Register is connected through the "C" Register (Fig. 52) to the input of the "A" Register (Fig. 57). Then, the contents of the "A," "R" and "C" Registers are right-shifted twenty decimal or hexadecimal places, thereby returning the contents of the "A" and "R" Registers to a position which is left-shifted one decimal or hexadecimal place from the original position. It will be seen that a shift of twenty decimal or hexadecimal places requires eighty shift pulses, and therefore requires two word intervals. At the beginning of the second of the two word intervals, TP–5 is re-initiated, and the value now standing in the "K" Register (Fig. 61) is again sensed and again reduced by unity. In this manner, TP–5 re-occurs each alternate word interval until the value in the "K" Register becomes all 0's, at which time, both TP–4 and TP–5 are terminated, and the computer either initiates a next addressing operation, or initiates the Round Off Code, as previously mentioned.

The code value for the Left Shift Code is 0111/1000 (HGB) for decimal operation or 1011/1000(HGB) for hexadecimal operation. The code will be described in terms of hexadecimal operation; therefore, Code Counters "A" and "B" (Figs. 77 and 78) are set to the respective values 2 and 7, and their common output terminal 981(7) is energized. This energizes a corresponding input terminal of the Code Matrix (Fig. 80) and arms gates 1042(15), 1044(4) and 1045(9). Therefore, output terminals 1052(15), 1054(4) and 1055(9) of the Code Matrix are energized during TP–2, TP–4 and TP–5, respectively, and they energize corresponding input terminals in the Code Distributor (not shown in Fig. 81). If it is desired to automatically initiate the Round Off Code following the Left Shift Code, instead of initiating the usual addressing operation, Code Counter "C" (Fig. 79) is set to the value 6.

*TP–2.*—During TP–2 of the Left Shift Code, the Code Distributor arms the following gates:

The "C" Register by-pass gate 390 in the Main Adder (Fig. 51);
The OP input shift gate 628 in the "K" Register (Fig. 61);
The value input gate 636 in the "K" Register; and
The TP–5 start gate 966 in the Timing Generator (Fig. 76).

Referring to Fig. 97, the first four OP's following the initiation of TP–2 shift the four least significant digits of the word from the selected address of Memory through the Transfer Busses, the Sign Clipper, the Main Adder and the Arithmetic Bus into the "K" Register. Although the entire word is read out of Memory, the input to the "K" Register is terminated after the first four OP's, in the manner hereinbefore described in relation to Fig. 61. CP–4 following the OP train is applied to the Timing Generating for terminating TP–2 and for initiating TP–5.

*TP–5.*—During TP–5 of the Left Shift Code, the Code Distributor arms the following gates:

The reset gate 405 in the "C" Register (Fig. 52);
The OP input shift gate 627 in the "K" Register (Fig. 61);
The OP output shift gate 633 in the "K" Register;
The 1's test gate 664 in the KS Sensing Circuit (Fig. 63); and
The O's test gate 674 in the KS Sensing Circuit.

Referring to Fig. 99, the first four OP's following the initiation of TP–5 shift the "K" Register valve through the "K" Subtractor and back into the "K" Register, and this value is reduced by unity in the "K" Subtractor. The "K" Subtractor conditions the KS Sensing Circuit in one manner if the original "K" Register value contained all 0's, and in another manner if that value contained at least one digit 1. CP–4 following the OP train is applied to the KS Sensing Circuit to test its condition. If the "K" Register value was all 0's, CP–4 is transmitted by the KS Sensing Circuit to the "C" Register for resetting, the latter to 0 (so that any value remaining therein, as described hereinafter, will not interfere with the next code) and to Code Counter "C." If the value 6 has been set into Code Counter "C," the latter unit, upon receipt of CP–4, transmits a reset pulse to Code Counter "A" which re-transmits the reset pulse to Code Counters "B" and "C," thereby removing the Left Shift Code value from the Code Counters. Code Counter "C" also directly energizes the Code Matrix for initiating the Round Off Code, and transmits a pulse to the Timing Generator for initiating TP–2 of that code. CP–4 is also applied directly to the Timing Generator for terminating TP–5. If the value 6 was not set into Code Counter "C," the latter unit, upon receipt of CP–4 from the KS Sensing Circuit, transmits a pulse to the Start Pulse Bus for initiating a next addressing operation in the manner hereinbefore described.

If the KS Sensing Circuit has been conditioned to represent the presence of at least one digit 1 in the "K" Register value, then when CP–4 is applied to the KS Sensing Circuit, the latter unit transmits this pulse to the Timing Generator for initiating TP–4. Again, CP–4 is applied directly to the Timing Generator for terminating TP–5.

*TP–4.*—If TP–4 of the Left Shift Code is initiated, due to the presence of a value other than 0 in the "K" Register, as described above, the Code Distributor arms the following gates:

The OP shift gate 527 in the "A" Register (Fig. 57);
The word input gate 534 in the "A" Register;
The "R" Register output gate 545 in the "A" Register;
The OP shift gate 553 in the "R" Register (Fig. 58); and
The transfer output gates 565(0) and 565(1) in the "R" Register.

Referring to Fig. 98, the first OP train following the initiation of TP–4 shifts the contents of the "A" Register into the "R" Register, and shifts the contents of the "R" Register through the Transfer Busses, the Sign Clipper, the Main Adder, the "C" Register, the Corrector Adder and the Arithmetic Bus into the "A" Register. However, since the OP train includes only forty shift pulses, and since the shift path includes forty-four stages, comprising the "R" and "C" Registers, the four most significant digits of the "R" Register word do not enter the "A" Register, but remain in the "C" Register. At the end of the first word interval of TP–4, CP–4 is applied to the Timing Generator for re-initiating TP–5, and TP–4 remains in operation. During the second word interval of TP–4, the OP train again shifts the contents of the "A" Register into the "R" Register, and shifts all but the four most significant digits of the contents of the "R" Register into the "A" Register, the four most significant digits again remaining in the "C" Register. Therefore, after two word intervals of TP–4, eighty shift pulses have been applied to a closed shift path which comprises the "A," "R" and "C" Registers, including eighty-four shifting stages, and the original contents of these registers are returned to a position that is left-shifted four binary places from the original position. Meanwhile, during the second word interval of TP–4, TP–5 (Fig. 99) is repeated for again subtracting unity from the value standing in the "K" Register, and if that value is all 0's before such subtraction, TP–4 and TP–5 are both terminated, as hereinbefore described. TP–5 is, again, one word interval in duration, and if the "K" Register value was not all 0's, TP–4 is not terminated, but continues for another two word intervals, during which the previously shifting operation again occurs and TP–5 is again initiated for reducing by unity the value standing in the "K" Register. Thus, two word intervals of TP–4 occur (and four binary places of the left shift) for each unit of the value standing in the "K" Register, and when that value is reduced to 0, TP–4 and TP–5 are both terminated, and the computer initiates either the Round Off Code, as hereinbefore mentioned, or a next addressing operation in the usual manner.

*Right Shift Code.—In general.*—The Right Shift Code is similar to the Left Shift Code, described above, and is provided for shifting the combined "A" and "R" Register word (Figs. 57 and 58) a selected number of decimal or hexadecimal places to the right. The Right Shift Code employs the standard TP–1 as well as TP–2, TP–4 and TP–5. These timing phases are substantially the same as those of the Left Shift Code, except that in the Right Shift Code, eighty-eight shift pulses are employed during each pair of word intervals of TP–4, instead of eighty shift pulses, and the shifted word is therefore returned to its original position, and then further shifted four more binary places, or one decimal or hexadecimal place to the right during each two word intervals.

The code value for the Right Shift Code is 0101/1000 (HGB) for decimal operation, or 1001/1000(HGB) for hexadecimal operation. The Right Shift Code will be described in terms of hexadecimal operation; therefore, Code Counters "A" and "B" (Figs. 77 and 78) are set to the respective values 2 and 6 and their common output terminal 981(6) is energized and arms the Code Matrix gates 1042(14), 1044(3) and 1045(8) (Fig. 80). Consequently, during TP–2, TP–4 and TP–5, the respective output terminals 1052(14), 1054(3), and 1055(8) of the Code Matrix are energized, and energize corresponding input terminals in the Code Distributor (not shown in Fig. 81).

TP–1 and TP–2 are identical to those of the Left Shift Code, previously described.

*TP–4.*—TP–4 of the Right Shift Code is the same as TP–4 of the Left Shift Code, except that the Code Distributor also arms the following gates:

The Main Adder output gate 348 in the Sign Clipper (Fig. 50);
The CP–1 to 4 shift gate 523 in the "A" register (Fig. 57);
The CP–1 to 4 shift gate 552 in the "R" Register (Fig. 58); and
The fourth OP output control gate 572 in the "R" Register.

Referring to Fig. 100, the Right Shift Code operation during TP–4 is the same as that of the Left Shift Code (see also Fig. 98) except that the "A" Register and the input of the "R" Register are shifted by CP–1 to 4 as well as by the OP trains. Also, the output of the "R" Register is shifted by CP–1 to 4 and by the last thirty-six pulses of each OP train, the output shift during the OP train being enabled by the application of the fourth OP to the "R" Register. Also, the output of the Sign Clipper is connected at all times to the input of the Main Adder since the shifting operation occurs during CP–4, and an error would be introduced by permitting the Sign Clipper to normally transmit a pulse on CP–4 to the Sign Control Circuit. Since the output of the "R" Register is not shifted on the first four OP's, output digits during those digit intervals become 0's, and after two word intervals of shifting, the "C" Register and the four most significant binary places of the "A" Register contain 0's, the original word being shifted four binary places to the right.

*TP–5.*—TP–5 of the Right Shift Code (Fig. 101) is the same as TP–5 of the Left Shift Code (Fig. 99), except that the Code Distributor does not arm the reset gate 405 in the "C" Register (Fig. 52). Since all 0's are shifted into the "C" Register, the latter is automatically reset by the shifting operation.

*Delete Code.—In general.*—The Delete Code is provided for deleting digits from selected ordinal positions of a word from Memory (Fig. 35), and for entering the result word into the "A" Register (Fig. 57). The Delete Code employs the standard TP–1, and employs TP–2 which is similar to TP–2 of the Read Code (Fig. 88), except that during the Delete Code, the Read Control Circuit (Fig. 48) transmits readout pulses to the Interpreter (Fig. 46) in the form of a delete word from the "D" Register (Fig. 60), whereas during the Read Code, the Interpreter (Fig. 46) is read out by means of a normal OP train applied from the Read Control Circuit (Fig. 48).

The code value for the Delete Code is 1110/1000 (HGB); therefore, Code Counters "A" and "B" (Figs. 77 and 78) are set to the respective values 3 and 5, and their common output terminal 983(5) is energized. This energizes a corresponding input terminal in the Code Matrix (Fig. 80) and arms gate 1042(16); therefore, during TP–2 output terminal 1052(16) of the Code Matrix is energized, and energizes a corresponding input terminal of the Code Distributor (not shown in Fig. 81).

*TP–2.*—After completion of the standard TP–1, the Code Distributor, during TP–2, arms the same gates which it arms during TP–2 of the Read Code (Fig. 88), and arms the following additional gates:

The delete-word input set gate 304 in the Read Control Circuit (Fig. 48);

The OP shift gate 602 in the "D" Register (Fig. 60); and The delete-word output gate 611 in the "D" Register.

Referring to Figs. 83 and 102, TP–2 of the Delete Code is identical to the same timing phase of the Read Code with the following exceptions. Whereas, during the Read Code, the word from Memory is read out of the Interpreter under control of an OP train transmitted from the Read Control Circuit, during the Delete Code, the word from Memory is read out of the Interpreter under control of the word standing in the "D" Register, the latter word being transmitted to the Interpreter through the Read Control Circuit. The first CP–5 after the initiation of TP–2 is applied to the Read Control Circuit and opens the input to the Read Control Circuit from the "D" Register delete-word output. CP–6 is applied through the Read Control Circuit to the control input of the Interpreter for reading the sign of the Memory word onto the appropriate Transfer Bus. The following OP train is applied to the "D" Register and shifts its entire contents through the Read Control Circuit to the control input of the Interpreter, and each digit 1 of the "D" Register word reads the corresponding digit 0 or 1 of the Memory word onto its appropriate Transfer Bus. Each digit 0 of the "D" Register word prevents any digit from being read out of the Interpreter during the corresponding digit interval. The output of the "D" Register is also circulated back into the input of the same register. The Memory word, after deletions, is shifted through the Transfer Busses and into the Arithmetic Section for entry into the "A" Register, in the manner hereinbefore described in relation to the Read Code.

*Match Code.—In general.*—The Match Code is provided for detecting the identity or lack of identity between a word standing in the "R" Register (Fig. 58) and a word from Memory (Fig. 35). The word from Memory is read out under control of a delete word standing in the "D" Register (Fig. 60); this permits the matching of only the undeleted digits of the Memory word with the corresponding digits of the "R" Register word. The Match Code employs the standard TP–1, and employs TP–2 during which the word standing in the "R" Register is subtracted from the word which is read out of Memory and which is deleted under control of the word standing in the "D" Register. If a match does not occur, the MA Unit Input Circuit (Fig. 56) is enabled for subsequent entry of an extra value of 1 into the Main Adder (Fig. 51) during the next addressing operation, to thereby omit the next consecutive command.

The code value for the Match Code is 1111/0000 (HGB); therefore, Code Counters "A" and "B" (Figs. 77 and 78) are set to the respective values 3 and 6, and their common output terminal 983(6) is energized. This energizes a corresponding input terminal in the Code Matrix (Fig. 80) and arms gate 1042(17). Therefore, during TP–2, output terminal 1052(17) of the Code Matrix is energized, and energizes a corresponding input terminal of the Code Distributor (not shown in Fig. 81).

*TP–2.*—After the standard TP–1, which prepares the computer for a reading operation, TP–2 is initiated and the Code Distributor arms the following gates:

The delete-word input set gate 304 in the Read Control Circuit (Fig. 48);
The subtraction-set gate 493 in the Sign Control Circuit (Fig. 55);
The match-sensing gate 507 in the MA Unit Input Circuit (Fig. 56);
The OP shift gate 553 in the "R" Register (Fig. 58);
The "R" Adder output gates 563(0) and 563(1) in the "R" Register;
The Main Adder output gate 573 in the "R" Register;
The adder-disabling gate 587 in the "R" Adder (Fig. 59);
The OP shift gate 602 in the "D" Register (Fig. 60);
The delete-word output gate 611 in the "D" Register; and
The Start pulse gate 948 in the Timing Generator (Fig. 76).

Referring to Fig. 103, the first CP–5 following the initiation of TP–2 is applied to the Sign Control Circuit for setting the latter to its "Subtract" state, in which state it enables the Main Adder to perform a subtractive operation during the next word interval. CP–6 is applied to the Read Control Circuit and is transmitted by that unit to the Interpreter for reading the sign of the Memory word onto the appropriate Transfer Bus. CP–6 is also applied to the "R" Adder for disabling that unit and rendering it a passive conduit in the recirculation path for the "R" Register. The following OP train is applied to the "D" Register and shifts its contents through the Read Control Circuit to the Interpreter for reading out the Memory word onto the Transfer Busses, with a deletion occurring in each digital position which is represented by a 0 in the "D" Register word. The Memory word, minus any deleted digits, is entered from the Transfer Busses into the "*x*" input of the Main Adder, the 1's digits being transmitted through the Sign Clipper. The delete word in the "D" Register is also re-entered into the same register.

The OP train is also applied to the "R" Register, and shifts its contents into the "*y*" input of the Main Adder where they are subtracted from the "*x*" input. The "R" Register word is also recirculated, unaltered, through the "R" Adder and back into the "R" Register. If the result of the subtraction in the Main Adder is all 0's, thereby indicating an exact match between the undeleted digits of the Memory word and the corresponding digits of the "R" Register word, the Match Code function is completed, and no change is made in the next normal addressing operation; therefore, the next consecutive command is not omitted. On the other hand, if an exact match does not occur, then the result of the subtractive operation contains at least one digit 1, and the first such digit is transmitted by the Main Adder to the MA Unit Input Circuit for conditioning the latter to respond to the next CP–4. This CP–4, which occurs one word interval after the initiation of TP–2, is applied to the Timing Generator for generating a Start pulse and for terminating TP–2. CP–4 is also applied to the MA Unit Input Circuit which, if previously conditioned by the receipt of a digit 1 from the Main Adder, is further conditioned to respond to the first OP during the following word interval. The first OP of the next word interval occurs during the next addressing operation and is transmitted by the MA Unit Input Circuit to the Main Adder as an extra "*y*" operand of 1, to thereby cause the next consecutive command to be omitted in the manner hereinbefore described.

*Multiply Code.—In general.*—The Multiply Code is provided for multiplying the contents of the "A" Register (Fig. 57) by a word from a selected address of Memory (Fig. 35). This code employs all five timing phases. During TP–1, the standard preparations are made for a reading operation which will occur during TP–2. Also during TP–1, the "A" Register word (Fig. 56), whose sign count stands in the first section of the Sign Control Circuit (Fig. 55), is transferred to the "D" Register (Fig. 60) where it constitutes the multiplicand word. The "K" Register (Fig. 61) is set to the value 1001(B) for controlling the number of multiplication cycles. During TP–2, the word from the selected address of Memory (Fig. 35) is transferred into the "R" Register (Fig. 58), and constitutes the multiplier word. The sign of the multiplier word, if minus, is counted in the first section of the Sign Control Circuit (Fig. 55), and is thus combined with the sign count of the multiplicand word to indicate the sign of the product, as hereinbefore described. During TP–3, which has a variable number of word intervals, the multiplicand word in the "D" Register (Fig. 60) is additively entered into the "A" Register (Fig. 57) a number of times corresponding to the value of the least significant decimal or hexadecimal group of the multiplier word standing in the "R" Register (Fig. 58), and the "A" Register word thereby formed constitutes a first partial product. During TP-4, which is two word intervals in duration, the multiplier word is right-shifted four binary places in the "R" Register (Fig. 58) to bring the second multiplier group into operative position, and the partial product word is right-shifted four binary places in the "A" Register (Fig. 57), with the least significant group of four binary digits being entered into the "R" Register (Fig. 58). During TP-5, which is concurrent with the second word interval of TP-4, unity is subtracted from the value 1001(B) standing in the "K" Register (Fig. 61) to represent the termination of the first of ten multiplication cycles. A "K" Register value other than 0000(B), before subtraction, is detected by the KS Sensing Circuit (Fig. 63), which thereupon energizes the Timing Generator (Fig. 76) for re-initiating TP-3 and for terminating TP-4, TP-5 being automatically terminated at the same time. The computer then repeats TP-3, TP-4 and TP-5 for a second multiplication cycle.

At the end of ten multiplication cycles, the "K" Register value 0000(B) (Fig. 61) is detected by the KS Sensing Circuit (Fig. 63), which thereupon senses Code Counter "C" (Fig. 79). If Code Counter "C" has not been set to the Round Off Code value of 6, it generates a Start pulse for causing the computer to carry out its next program step. If Code Counter "C" has been set to the value 6, it causes the initiation of the Round Off Code as hereinafter described.

The code value for the Multiply Code is 0110/000 (HGB) for decimal operation, or 1010/0000(HGB) for hexadecimal operation. The Multiply Code will be described in terms of decimal operation; therefore, Code Counters "A" and "B" (Figs. 77 and 78) are set to the respective values 1 and 4, and their common output terminal 981(4) is energized. This energizes a corresponding input terminal of the Code Matrix (Fig. 80) and arms the Code Matrix gates 1041(2), 1042(12), 1043(4), 1044(1) and 1045(6). Therefore, during the five timing phases, the respective Code Matrix output terminals 1051(2), 1052(12), 1053(4), 1054(1) and 1055(6) are energized, and energize corresponding input terminals of the Code Distributor (not shown in Fig. 81).

*TP-1.*—During TP-1 of the Multiply Code, the Code Distributor arms the following gates in addition to those armed during the standard TP-1 (Fig. 87):

The "C" Register by-pass gate 390 in the Main Adder (Fig. 51);
The OP shift gate 527 in the "A" Register (Fig. 57);
The 0's and 1's Transfer Bus output gates 542(0) and 542(1) in the "A" Register;
The OP shift gate 602 in the "D" Register (Fig. 60);
The word input gate 605 in the "D" Register;
The CP-1 to 4 shift gate 622 in the "K" Register (Fig. 61);
The CP-1 input gate 641 in the "K" Register; and
The CP-4 input gate 644 in the "K" Register.

Referring to Fig. 104, the first CP-5 after the initiation of TP-1 is applied to the Main Adder for connecting the output of the latter directly to the Arithmetic Bus, and for by-passing the "C" Register. The following OP train is applied to the "A" and "D" Registers and shifts the contents of the "A" Register (the multiplicand word) through the Transfer Busses, the Sign Clipper, the Main Adder, and the Arithmetic Bus into the "D" Register, the 0's digits from the "A" Register by-passing the Sign Clipper in the usual manner. There is no input to the "A" Register; therefore, the "A" Register contains all 0's after the shifting operation. The sign representation of the multiplicand word stands in the first section of the Sign Control Circuit (Fig. 55) since the multiplicand word originally stood in the "A" Register.

After the OP train, CP-1 to 4 (Fig. 104) are applied to the "K" Register as four shift pulses. CP-1 and CP-4 are entered into the word input of the "K" Register in the shifting operation, and constitute entry of the value 1001(B). The remaining operations during TP-1 are the same as those described in relation to Fig. 87, and TP-2 is automatically initiated on CP-4 at the end of TP-1.

*TP-2.*—During TP-2 of the Multiply Code, the Code Distributor arms the following gates:

The "C" Register by-pass gate 390 in the Main Adder (Fig. 51);
The first section sign count gate 468 in the Sign Control Circuit (Fig. 55);
The OP shift gate 553 in the "R" Register (Fig. 58);
The word input gate 561 in the "R" Register; and
The TP-3 initiating gate 947 in the Timing Generator (Fig. 76).

Referring to Fig. 105, the first CP-5 after the initiation of TP-2 is applied to the Main Adder for connecting its output directly to the Arithmetic Bus, and for by-passing the "C" Register. CP-6 is applied to the Interpreter through the Read Control Circuit for reading the sign of the selected Memory word (the multiplier word) onto the appropriate Transfer Bus. If the sign is minus, it is transmitted through the Sign Clipper into the first section of the Sign Control Circuit and is there counted along with the sign of the multiplicand word. The following OP train is applied to the Interpreter to the Read Control Circuit for reading the body of the multiplier word out of the Interpreter and through the Transfer Busses, the Sign Clipper, the Main Adder, and the Arithmetic Bus into the "R" Register, the 0's digits of the multiplier word again by-passing the Sign Clipper. CP-4 following the OP train is applied to the Timing Generator for terminating TP-2 and for initiating TP-3.

*TP-3.*—During TP-3 of the Multiply Code, the Code Distributor arms the following gates:

The Main Adder output gate 348 in the Sign Clipper (Fig. 50);
The CP-1 to 4 shift gate 523 in the "A" Register (Fig. 57);
The OP shift gate 527 in the "A" Register;
The word input gate 534 in the "A" Register;
The 0's and 1's Transfer Bus output gates 542(0) and 542(1) in the "A" Register;
The multiplier test gate 591 in the "R" Adder (Fig. 59), this being a multiple-control gate that is only partially armed by the Code Distributor;
The OP shift gate 602 in the "D" Register (Fig. 60);
The Main Adder input gate 607 in the "D" Register; and
The recirculation gate 611 in the "D" Register.

Referring to Figs. 1-6, the second section of the Sign Control Circuit stands in its normal "Add" state and therefore conditions the Main Adder and the Corrector Adder for additive operations, and conditions the "R" Adder for a subtractive operation. The first CP-5 after the initiation of TP-3 is applied to the "R" Adder, thereby entering a value of 1 into that unit to be subsequently combined with the "R" Register word. CP-5 also tests the "R" Adder to determine whether or not a multiplier word having a least significant group of all 0's had been circulated through the "R" Adder during the previous word interval. Since there has as yet been no circulation of the multiplier word through the "R" Adder, the test for all 0's is negative and produces no result. The following OP train is applied to the "A" Register for shifting the contents of that register (all 0's at this time) through the 0's Transfer Bus into the "*x*" input of the Main Adder. The same OP train is applied to the "D" Register and shifts the multiplicand word into the "*y*" input of the Main Adder as well as back into the "D" Register. The OP train is also applied to the "R" Register and shifts the multiplier word through the "R" Adder and back into the "R" Register for subtracting unity from the least significant multiplier group. The fifth OP is applied to the "R" Adder to determine whether or not the value of the least significant group of the multiplier word was 0000(DGB) before this subtractive operation. The effect of detecting all 0's will be described hereinafter, and for the present it will be assumed that the least significant multiplier group was not all 0's when it entered the "R" Adder.

The sum word which is produced by the Main Adder is the sum of the "D" Register word (the multiplicand) and the all 0's word in the "A" Register, and represents the first partial product of the multiplication. The sum is transmitted from the Main Adder output into the "C" Register, which receives each shift pulse that is applied to the "A" Register, and which therefore shifts the sum through the Corrector Adder and the Arithmetic Bus back into the "A" Register. CP–1 to 4 are applied as shift pulses to the "A" Register, and from the "A" Register to the "C" Register for increasing the number of shift pulses to forty-four for the closed loop which includes the "A" and "C" Registers. Forty-four shift pulses are necessary for this loop because the "A" and "C" Registers include a total of forty-four stages, and it is desirable to enter the entire partial product word into the "A" Register.

During subsequent word intervals, TP–3 produces successive addition operations in the manner described above, and unity is subtracted from the least significant group of the multiplier word during each such word interval until the value of that group is reduced to 0000(DGB). When the least significant multiplier group has been reduced to the value 0000(DGB), its next entry into the "R" Adder is detected by the fifth OP which is applied to the "R" Adder after another subtraction, i.e., after the value of that group is further reduced to 1111(DGB). The fifth OP, in detecting the value 0000(DGB), enables the "R" Adder to respond to the next CP–5. When CP–5 is applied to the "R" Adder, it is retransmitted to the Sign Control Circuit and sets the second section of the Sign Control Circuit to its "Subtract" state in preparation for a corrective word interval. During the corrective word interval, the multiplicand word is subtracted from the partial product word in the Main Adder under control of the Sign Control Circuit, and the "R" Adder adds the value 1 to the least significant group of the multiplier word to restore the value of that group to 0000(DGB). CP–5 also is transmitted from the "R" Adder to the Timing Generator for enabling the latter to respond to the next CP–4 (one-word interval later) for then terminating TP–3 and initiating TP–4. This extra word interval of TP–3 is provided for the corrective subtraction operation described above. It is therefore seen that after the corrective word interval of TP–3 the multiplicand has been entered into the partial product word a number of times equal to the value of the least significant group of the multiplier word, which group then has the value 0000(DGB).

*TP–4.*—During TP–4 of the Multiply Code, the Code Distributor arms the following gates:

The Main Adder output gate 348 in the Sign Clipper (Fig. 50);
The CP–1 to 4 shift gate 523 in the "A" Register (Fig. 57);
The OP shift gate 527 in the "A" Register;
The word input gate 534 in the "A" Register;
The "R" Register output gate 545 in the "A" Register;
The CP–1 to 4 shift gate 552 in the "R" Register (Fig. 58);
The OP shift gate 553 in the "R" Register; and
The 0's and 1's Transfer Bus output gates 565(0) and 565(1) in the "R" Register.

Referring to Fig. 107, the first OP train and the following CP–1 to 4 after the initiation of TP–4 are applied to the "A" and "B" Registers, and are applied by the "A" Register to the "C" Register, thereby shifting the output of the "A" Register into the "R" Register, and the output of the "R" Register through the Transfer Busses, the Sign Clipper (1's digits only), the Main Adder, the "C" Register, the Corrector Adder and the Arithmetic Bus into the "A" Register. CP–4 is applied to the Timing Generator for initiating TP–5, but TP–4 continues for a second-word interval during which the OP train and CP–1 to 4 again shift the "A" and "R" Registers as shown in Fig. 107. The second CP–4 after the initiation of TP–4 is applied to the Timing Generator, in the manner hereinafter described, for terminating TP–4 at the same time that TP–5 is terminated. Therefore, during the two-word intervals of TP–4, eighty-eight shift pulses are applied to the "A," "R" and "C" Registers. Since the shifting loop, which comprises the "A," "R" and "C" Registers, include eighty-four stages, the eighty-eight shift pulses effectively perform a shift of four binary places toward the less significant ends of the "A" and "R" Registers. The least significant multiplier group which is now reduced to all 0's, is thereby placed in the "C" Register; the second least significant group of four binary multiplier digits is placed in the output end of the "R" Register in preparation for controlling the next multiplication cycle; the least significant partial product group from the "A" Register is placed in the input end of the "R" Register; and the four digits from the "C" Register are placed in the input end of the "A" Register.

*TP–5.*—During TP–5 of the Multiply Code, the Code Distributor arms the following gates:

The OP shift gate 627 in the "K" Register (Fig. 61);
The OP output shift gate 633 in the "K" Register;
The multiplication recycling gate 662 in the KS Sensing Circuit (Fig. 63); and
The multiplication termination gate 674 in the KS Sensing Circuit.

Referring to Fig. 108, the first OP train after the initiation of TP–5 is applied to the "K" Register for shifting the contents of the latter through the "K" Subtractor and back into the "K" Register. The fourth OP is applied to the "K" Register for limiting the shift train to the first four OP's. Therefore, the four-digit value in the "K" Register is shifted once, during the word interval, through the "K" Subtractor where unity is subtracted from that value. Since the value 1001(B) was originally entered into the "K" Register, this value is reduced to 1000(B) during the first TP–5. CP–4 following the OP train is applied to the Timing Generator for terminating TP–5, and is applied to the KS Sensing Circuit to determine whether or not the "K" Register value previously circulated through the "K" Subtractor was all 0's before the subtraction of unity from that value. If any digit 1 was contained in that value, before subtraction, the KS Sensing Circuit transmits CP–4 to the Timing Generator for terminating TP–4 and for re-initiating TP–3 for a next multiplication cycle. In this case, TP–3 (Fig. 106) is repeated for multiplying the multiplicand by the second multiplier group, and TP–4 (Fig. 107) is then re-initiated for again shifting the multiplier and the partial product. Also, TP–5 (Fig. 108) is re-initiated for again testing the "K" Register value for all 0's.

Since the original "K" Register value was 1001(B), and since its value is tested in the KS Sensing Circuit prior to subtraction during TP–5, it will be seen that after ten multiplication cycles the "K" Register value 0000(B) is detected in the KS Sensing Circuit. In this case, the Multiply Code is terminated and the CP–4 which tests the KS Sensing Circuit is transmitted by that unit to the "C" Register which is thereby cleared. CP–4 is also transmitted by the KS Sensing Circuit to Code Counter "C." If the Round Off Code value of 6 has not been set into Code Counter "C," the latter unit generates a Start pulse for initiating a next addressing operation in the normal manner. On the other hand, if the Round Off Code value of 6 has been set into Code Counter "C,"

that unit retransmits CP–4 to Code Counter "A" for clearing the latter and for causing Code Counter "A" to clear Code Counters "B" and "C." Code Counter "C" also transmits CP–4 to the Timing Generator for terminating TP–4 of the Multiply Code and for initiating TP–2. Code Counter "C" further energizes the Code Matrix for initiating the Round Off Code, which starts on TP–2, as hereinafter described.

In conclusion, it will be seen that after ten multiplication cycles, the ten least significant product groups stand in the "R" Register, the ten most significant product groups stand in the "A" Register, and the multiplicand word stands in the "D" Register. The multiplier word, having been reduced to all 0's group by group, is no longer stored in the Arithmetic Section, although it is still stored in the Memory address from where it was originally entered into the "R" Register.

*Divide Code.—In general.*—The Divide Code is provided for dividing a dividend word from a selected address of Memory (Fig. 35) by a divisor word from the "A" Register (Fig. 57). This code, like the Multiply Code, employs all five timing phases. During TP–1, the standard operations occur to prepare for reading a word out of Memory (Fig. 35) during TP–2. Also, the divisor word in the "A" Register (Fig. 57), whose sign count stands in the first section of the Sign Control Circuit (Fig. 55), is transferred into the "D" Register (Fig. 60), and the "R" Register (Fig. 58) is cleared to establish an initial quotient word of all 0's. The value 1001(B) is set into the "K" Register (Fig. 61) for controlling the number of division cycles which occur subsequently.

During TP–2, the dividend word is read out of the selected address of Memory (Fig. 35) and into the "A" Register (Fig. 57). Its sign, if minus, is counted in the first section of the Sign Control Circuit (Fig. 55), along with the sign of the divisor word.

During TP–3, the divisor is subtracted a first time from the dividend and the sign of the remainder is sensed. It is recalled that the present computer operates on values between −1 and +1. In order for the quotient to lie between these values, the divisor must be larger than the dividend. Therefore, when the divisor is subtracted from the dividend a first time during TP–3, if the result is positive, the division operation is improper in that it will produce a quotient greater than 1. In such case, the Start-Stop Circuit (Fig. 75) is energized for generating the Logical Jump Code value (Fig. 92), and the Divide Code is terminated. If the result of the first subtraction is negative, the division is proper, and the Divide Code continues.

It is recalled that the "R" Register was cleared during TP–1 to establish an initial quotient word of all 0's. When the divisor word is subtracted once from the dividend word, a value of +1 is added to the "R" Register quotient word (Fig. 58) by circulating the contents of that register through the "R" Adder (Fig. 59). The negative result of the first subtraction, indicating a proper division operation, also indicates that the quotient and negative remainder must be corrected. Therefore, the digit 1 is correctively subtracted from the quotient, and the divisor is correctively added to the remainder, thereby restoring the quotient and dividend to their original values.

During TP–4, the dividend is left-shifted four binary places relative to the divisor, two word intervals being required for the shifting operation. The second word interval of TP–4 is concurrent with TP–5, during which the value in the "K" Register (Fig. 61) is tested for all 0's. If this value is not all 0's, TP–3 is re-initiated for a next division cycle. If the "K" Register value is all 0's, the Divide Code is terminated, following a final division cycle which is hereinafter described. During TP–5, after testing the "K" Register value for all 0's, unity is subtracted from this value. Therefore, after ten division cycles, the "K" Register value of all 0's is detected for terminating the Divide Code, and that code is then terminated after one further division cycle.

The code value for the Divide Code is 0110/1000 (HGB) for decimal operation, or 1010/1000(HGB) for hexadecimal operation. The Divide Code will be described in terms of decimal operation; therefore, Code Counters "A" and "B" (Figs. 77 and 78) are set to the respective values 1 and 5, and their common output terminal 981(5) is energized. This energizes a corresponding input terminal of the Code Matrix (Fig. 80) and arms Code Matrix gates 1041(3), 1042(13), 1043(5), 1044(2) and 1045(7). Therefore, during Timing Phases 1 to 5, the respective Code Matrix output terminals 1051(3), 1052(13), 1053(5), 1054(2) and 1055(7) are energized, and energize corresponding input terminals of the Code Distributor (not shown in Fig. 81).

*TP–1.*—During TP–1 of the Divide Code, the Code Distributor arms the same gates that are armed during TP–1 of the Multiply Code (Fig. 104) and also arms the OP shift gate 553 in the "R" Register (Fig. 58).

Referring to Fig. 109, the operations which occur during TP–1 of the Divide Code include those which occur during TP–1 of the Multiply Code (Fig. 104), viz: (1) the contents of the "A" Register (the divisor word in this case) are transferred to the "D" Register; (2) the value 1001(B) is entered into the "K" Register; and (3) the standard TP–1 operations (Fig. 87) are performed to prepare for reading a word out of Memory during TP–2. In addition, however, the first OP train following the initiation of TP–1 is applied to the "R" Register (Fig. 109) for shifting any stored value out of that register. No "R" Register output gates are armed; therefore, any value stored in that register is destroyed by the shifting operation. At the end of TP–1, TP–2 is initiated in the usual manner.

*TP–2.*—During TP–2 of the Divide Code, the Code Distributor arms the following gates:

The "C" Register by-pass gate 390 in the Main Adder (Fig. 51);
The division-test enabling gate 455 in the MA Sensing Circuit (Fig. 54);
The sign count gate 468 in the Sign Control Circuit (Fig. 55);
The subtraction set gate 483 in the Sign Control Circuit;
The OP shift gate 527 in the "A" Register (Fig. 57);
The word input gate 534 in the "A" Register; and
The TP–3 initiating gate 947 in the Timing Generator (Fig. 76).

Referring to Fig. 110, the first CP–5 following the initiation of TP–2 is applied to the Main Adder for connecting its output directly to the Arithmetic Bus, and by-passing the "C" Register (Fig. 52). CP–6 is applied through the Read Control Circuit (Fig. 110) to the Interpreter for reading the sign of the selected Memory word (the dividend) out of the Interpreter and onto the appropriate Transfer Bus. If the sign is minus, it is transmitted from the 1's Transfer Bus through the Sign Clipper and into the first section of the Sign Control Circuit where it is counted, along with the sign of the divisor, to determine the sign of the quotient. If the dividend sign is plus, it is transmitted from the 0's Transfer Bus directly into the "*x*" input of the Main Adder but has no effect on the arithmetic operation of that unit. The following OP train is applied through the Read Control Circuit to the Interpreter, and is applied to the "A" Register for reading the dividend word out of the Interpreter and through the Transfer Busses, the Sign Clipper (1's digits only), the Main Adder, and the Arithmetic Bus into the "A" Register. CP–4 after the OP train is applied to the Timing Generator for terminating TP–2 and for initiating TP–3. The same CP–4 is applied to the MA Sensing Circuit for enabling the latter to sense for an improper division operation during TP–3, and is applied to the Sign Control Circuit for setting the second section of that unit to its "Subtract" state in preparation for subtractive operations during TP–3.

*TP–3.*—During TP–3 of the Divide Code, the Code Distributor arms the following gates:

The Main Adder output gate 348 in the Sign Clipper (Fig. 50);

The division-overflow test gate 446 in the MA Sensing Circuit (Fig. 54);

The subtraction set gate 483 in the Sign Control Circuit (Fig. 55);

The CP–1 to 4 shift gate 523 in the "A" Register (Fig. 57);

The OP shift gate 527 in the "A" Register;

The word input gate 534 in the "A" Register;

The 0's and 1's Transfer Bus output gates 542(0) and 542(1) in the "A" Register;

The OP shift gate 553 in the "R" Register (Fig. 58);

The 0's and 1's "R" Adder output gates 563(0) and 563(1) in the "R" Register;

The OP shift gate 602 in the "D" Register (Fig. 60);

The Main Adder output gate 607 in the "D" Register; and

The recirculation gate 611 in the "D" Register.

Referring to Fig. 111, the first CP–5 following the initiation of TP–3 is applied to the MA Sensing Circuit to test for the presence of an overflow due to any previous subtraction in the Main Adder. Since there have been no subtractions in the Main Adder at this time, the test is negative, and causes no further operations. CP–5 is also applied to the "R" Adder, thereby entering the value 1 into that unit for subsequently being added to the "R" Register quotient word. The following OP train is applied to the "A," "R" and "D" Registers, and by the "A" Register to the "C" Register. This OP train shifts the divisor word from the "D" Register into the "y" input of the Main Adder, and also re-enters the divisor word into the "D" Register. The OP train also shifts the dividend word from the "A" Register through the Transfer Busses, the Sign Clipper (1's digits only) and into the "x" input of the Main Adder. Since the Sign Control Circuit was set to its "Subtract" state during TP–2, the divisor word is subtracted from the dividend word in the Main Adder, and the remainder word is shifted through the "C" Register, the Corrector Adder and Arithmetic Bus back into the "A" Register. Since the above shifting loop includes both the "A" and "C" Registers, i.e., forty-four stages, CP–1 to 4 are applied to the "A" Register, and by the "A" Register to the "C" Register, as four additional shift pulses, and the remainder word is completely entered into the "A" Register.

It is recalled that when the second section of the Sign Control Circuit causes a subtractive operation in the Main Adder and Corrector Adder, it causes an additive operation in the "R" Adder. The OP train is also applied to the "R" Register for shifting the quotient word through the "R" Adder, where the value 1 is added to the quotient word, and back into the "R" Register.

Following the OP train, CP–2 is applied to MA Sensing Circuit. If the subtractive operation resulted in an overflow, thereby indicating that the dividend is properly larger than the divisor, the previously enabled MA Sensing Circuit is disabled. If there was no overflow, the MA Sensing Circuit remains enabled. CP–3 is then applied to the MA Sensing Circuit which, if enabled, energizes the Start-Stop Circuit for terminating the code in progress (the Divide Code in this case) and for generating the Logical Jump Code value in the manner hereinbefore described. If the MA Sensing Circuit has been disabled when CP–3 is applied thereto, no further operations are caused by that pulse.

If the division operation is proper, TP–3 continues for one more word interval. CP–5 again enters the value 1 into the "R" Adder and again tests the MA Sensing Circuit for an overflow. Since an overflow is detected this time (because the dividend is larger than the divisor), the MA Sensing Circuit sets the second section of the Sign Control Circuit to its "Add" state, thereby conditioning the Main Adder and the Corrector Adder for corrective addition operations, and conditioning the "R" Adder for a corrective subtraction operation. The MA Sensing Circuit also enables the Timing Generator to respond to the next CP–4 (one word interval later) for terminating TP–3 and initiating TP–4. During the extra word interval of TP–3, the "D" Register divisor word is correctively added to the "A" Register dividend word, and the result is entered into the "A" Register. Also, the value 1 is correctively subtracted from the "R" Register quotient word, and the corrected quotient of all 0's is returned to the "R" Register. CP–4 following the OP train is applied to the Timing Generator for terminating TP–3 and for initiating TP–4.

*TP–4.*—During TP–4 of the Divide Code, the Code Distributor arms the following gates:

The OP shift gate 527 in the "A" Register (Fig. 57);

The word input gate 534 in the "A" Register;

The "R" Register output gate 545 in the "A" Register;

The OP shift gate 553 in the "R" Register (Fig. 58); and

The 0's and 1's Transfer Bus output gates 565(0) and 565(1) in the "R" Register.

Referring to Fig. 112, the first OP train following the initiation of TP–4 is applied to the "A" and "R" Registers, and by the "A" Register to the "C" Register, for shifting the output of the "A" Register into the "R" Register, the output of the "R" Register into the "C" Register, and the output of the "C" Register into the "A" Register. The next CP–4 is applied to the Timing Generator for initiating TP–5, hereinafter described, but TP–4 remains in operation. The following OP train again shifts the "A," "R" and "C" Registers in the manner described above, and TP–4 is terminated by the next CP–4, two word intervals after it was initiated. During the two word intervals of TP–4, eighty shift pulses are applied to the loop comprising the "A," "R" and "C" Registers, which include eighty-four stages; therefore, a left shift of four binary places (one decimal group) is effected in the "A" and "R" Registers, and the remainder word in the "A" Register is shifted relative to the divisor word in the "D" Register (Fig. 60) in preparation for a subsequent division cycle. Also, the quotient word in the "R" Register is left-shifted one decimal group in preparation for the forming of a new quotient group in the four least significant stages of the "R" Register.

*TP–5.*—During TP–5 of the Divide Code, the Code Distributor arms the following gates:

The OP input shift gate 627 in the "K" Register (Fig. 61);

The OP output shift gate 633 in the "K" Register;

The division recycling gate 662 in the KS Sensing Circuit (Fig. 63); and

The division terminating gate 668 in the KS Sensing Circuit.

Referring to Fig. 113, the first CP–5 following the initiation of TP–5 is applied to the "K" Subtractor for entering into that unit the value 1 which is to be subtracted from the "K" Register value. The following OP train is applied to the "K" Register as shift pulses. The fourth OP is separately applied to the "K" Register for limiting the shift pulse train to the first four OP's. The shift train of four pulses shifts the "K" Register value through the "K" Subtractor, where unity is subtracted from that value, and back into the "K" Register. The following CP–4 is applied to the KS Sensing Circuit to determine whether or not the "K" Register value, before subtraction, was all 0's. If that value was not all 0's before subtraction, the KS Sensing Circuit retransmits CP–4 to the Timing Generator for re-initiating TP–3 and for terminating TP–4. TP–5 is also terminated at the same time by CP–4 applied to the Timing Generator, and a next division cycle, including TP–3, TP–4 and TP–5, occurs. During TP–3 (Fig. 111) of the second and subsequent division cycles, the divisor is subtracted from the remainder until the latter overflows, and a restore word interval is employed for correcting the overflow. Then, a new shift occurs during TP–4 (Fig. 112) and the "K" Register value is tested during TP–5 (Fig. 113).

When a "K" Register value register of all 0's is sensed during TP–5, the KS Sensing Circuit energizes the Timing Generator for re-initiating TP–3 and for terminating TP–4, as usual. Also, TP–5 is terminated by CP–4, as usual. However, the Timing Generator, in this case, is enabled to respond to the CP–4 which will occur following the first word interval of the next TP–4. Therefore, an eleventh and final division cycle is initiated, and in this cycle, the usual division operation occurs during TP–3, and is followed by a shift of only one word interval during TP–4, after which the Timing Generator automatically terminates TP–4 and generates a Start pulse wtihout initiating TP–5, and the Divide Code is ended. The purposes of the eleventh division cycle are as follows.

It is recalled that during the first division cycle, the quotient is always 0, because there had to be a corrected overflow from the first subtractive operation during TP–3 (Fig. 111) in order for the division operation to be a proper one. Therefore, if ten division cycles are used, a nine-order decimal quotient would result, and eleven division cycles are necessary to produce a ten-order decimal quotient. Also, it is desirable for the final quotient to be stored in the "A" Register; therefore, the single word interval of TP–4 (Fig. 112) is provided during the final division cycle for shifting the "A" and "R" Registers. Referring to Fig. 113, when the Timing Generator is enabled by the KS Sensing Circuit during TP–5, for the delayed generation of a Start pulse as described above, it is also enabled for energizing the Main Adder at the end of the final TP–3 and the beginning of the final TP–4. When the final TP–3 is terminated (Fig. 111), the Timing Generator transmits a pulse to the Main Adder for connecting its output directly to the Arithmetic Bus and by-passing the "C" Register. Therefore, during the final TP–4 (Fig. 112) the shifting loop includes only the "A" and "R" Registers, i.e., only eighty stages, and since the final TP–4 is only one word interval in duration, its forty shift pulses transfer the quotient word from the "R" Register to the "A" Register, and the remainder word from the "A" Register to the "R" Register. At the end of one word interval of TP–4, CP–4 is applied to the Timing Generator for terminating TP–4 and for generating a Start pulse, thereby terminating the Divide Code.

*Round Off Code.—In general.*—The Round Off Code is employed for rounding off an eighty binary digit word, the more significant half of which stands in the "A" Register (Fig. 57), and the less significant half of which stands in the "R" Register (Fig. 58). This code is generally employed as an adjunct to the Multiply, Left Shift or Right Shift Code, and is initiated at the end of that code in place of the generation of a Start pulse which would initiate a next addressing operation in the normal manner. The Round Off Code does not employ TP–1 at all, but starts on TP–2, and employs TP–3 as its final timing phase. During TP–2, the half word in the "R" Register is added to itself in the Main Adder (Fig. 51). The sum word is destroyed, but any carry which occurs in the most significant decimal group (representing a decimal value of 5 or more in the most significant decimal group of the "R" Register half word) is sensed by the MA Sensing Circuit (Fig. 54) which thereupon conditions the MA Unit Input Circuit (Fig. 56) for subsequently entering a "*y*" operand of 1 into the Main Adder (Fig. 51) during TP–3. The "A" Register half word (Fig. 57) is transferred, at the same time, to the "R" Register (Fig. 58).

During TP–3, the half word that is now stored in the "R" Register (the more significant half of the original word) is entered into the "*x*" input of the Main Adder (Fig. 51) and is there added to the "*y*" operand of 1 from the MA Unit Input Circuit (Fig. 56), if any such "*y*" operand was stored during TP–2. The result word constitutes the more significant half of the original word which is increased by unity if and only if the highest order decimal group of the less significant half of the original word had a value of 5 or more.

The code value for the Round Off Code is

0000/0110(HGB)

therefore, Code Counter "C" (Fig. 79) is set to the value 6. It is recalled from the description of the Multiply Code, for example, that in order to determine whether or not the Round Off Code is programmed to follow another code, the KS Sensing Circuit (Fig. 63) applies a pulse to input terminal 675 of Code Counter "C" (Fig. 79). If the value 6 has not been set into Code Counter "C," gate 1022 is armed and a Start pulse is generated for initiating the next addressing operation in the normal manner. On the other hand, if the value 6 has been set into Code Counter "C," gate 1026 is armed, and the pulse from terminal 675 is transmitted through gate 1026 and output terminal 1027 to Code Counter "A" (Fig. 77) which thereupon clears all three Code Counters (Figs. 77 to 79). The output pulse from terminal 1027 (Fig. 79) is also transmitted to the Timing Generator (Fig. 76) for initiating TP–4 of the previous code. Finally, the output pulse from gate 1026 (Fig. 79) sets flip-flop 1023 to 1, thereby energizing output terminal 1031 which is connected to a corresponding input terminal of the Code Matrix (Fig. 80). This arms the Code Matrix gates 1042(21) and 1043(6); therefore, during TP–2 and TP–3, the respective Code Matrix output terminals 1052(21) and 1053(6) are energized, and energize corresponding input terminals of the Code Distributor (not shown in Fig. 81).

*TP–2.*—During TP–2 of the Round Off Code, the Code Distributor arms the following gates:

The CP–1 overflow test gate 441 in the MA Sensing Circuit (Fig. 54);

The unit input gate 481 in the Sign Control Circuit (Fig. 55);

The OP shift gate 527 in the "A" Register (Fig. 57);

The "R" Register output gate 545 in the "A" Register;

The OP shift gate 553 in the "R" Register (Fig. 58);

The 0's and 1's Transfer Bus output gates 565(0) and 565(1) in the "R" Register;

The Main Adder output gate 573 in the "R" Register; and

The TP–3 initiating gate 947 in the Timing Generator (Fig. 76).

Referring to Fig. 114, the first OP train following the initiation of TP–2 is applied to the "R" Register for shifting its contents as follows: (1) directly into the "*y*" input of the Main Adder; and (2) through the Transfer Busses and the Sign Clipper (1's digits only) into the "*x*" input of the Main Adder. The "*x*" and "*y*" inputs to the Main Adder are additively combined under control of the Sign Control Circuit which is in its normal "Add" state. The OP train is also applied to the "A" Register for shifting its contents into the "R" Register, and is applied by the "A" Register to the "C" Register. The sum word from the Main Adder is shifted through the "C" Register and the Corrector Adder onto the Arithmetic Bus in order to properly perform decimal carry, as hereinbefore described. However, the Arithmetic Bus is not connected to the input of any of the arithmetic registers; therefore, the sum word is destroyed. If the highest order decimal group of the "R" Register half word has a value of 5 or more, a carry digit remains stored in the Main Adder after the addition operation, and constitutes an overflow. The next CP–1 is applied to the MA Sensing Circuit and, if an overflow digit remains in the Main Adder, it is sensed in the MA Sensing Circuit which thereupon transmits a sensing pulse to the Sign Control Circuit. If the Sign Control Circuit stands in its "Add" state, which is the case during the Round Off Code, it further transmits the pulse to MA Unit Input Circuit for enabling the latter to enter a "*y*" operand of 1 into the Main Adder during TP–3.

*TP–3.*—During TP–3 of the Round Off Code, the Code Distributor arms the following gates:

The CP–1 to 4 gate 523 in the "A" Register (Fig. 57);
The OP shift gate 527 in the "A" Register;
The word input gate 534 in the "A" Register;
The CP–1 to 4 shift gate 552 in the "R" Register (Fig. 58);
The OP shift gate 553 in the "R" Register;
The 0's and 1's Transfer Bus output gates 565(0) and 565(1) in the "R" Register; and
The Start pulse gate 948 in the Timing Generator (Fig. 76).

Referring to Fig. 115, the first OP train and CP–1 to 4 are applied to the "A" and "R" Register, and by the "A" Register to the "C" Register, for shifting the "R" Register word through the Transfer Busses and the Sign Clipper (1's digits only) into the "*x*" input of the Main Adder. The OP train is also applied to the MA Unit Input Circuit, and the first OP causes any stored value of 1 to be entered into the "*y*" input of the Main Adder for subsequent additive combination with the "*x*" input from the "R" Register under control of the Sign Control Circuit, which is in its normal "Add" state. The sum word from the Main Adder is shifted through the "C" Register, the Corrector Adder and the Arithmetic Bus into the "A" Register, the total of forty-four shift pulses being effective to completely shift the sum word through the "C" Register and into the "A" Register. In this manner, the rounded off half word is stored in the "A" Register to be used, if necessary, as a subsequent operaned. CP–4 is applied to the Timing Generator for generating a Start pulse to initiate a next addressing operation in the normal manner.

We claim:

1. In a computer having (*a*) a memory section comprising a plurality of data storage positions each having a corresponding address, (*b*) means for storing in selected addresses of said memory section items of data representing command steps in a program of operation for said computer each command including a memory address and the designation of a computer function, (*c*) an address section, (*d*) a control section, (*e*) means for entering into the address section successive representations of the memory addresses where successive commands are stored, (*f*) means for transmitting from the memory section to the address section command signals representative of the command whose address representation stands in the address section, (*g*) means controlled by the address section and the control section for causing the computer to perform the function designated by each successive command transmitted to the address section; the combination of: (1) an arithmetic section including a register, (2) means for entering a pair of values into the arithmetic section, (3) means comprising a part of said arithmetic section and controlled by signals representative of an arithmetic command in said address section for arithmetically combining said pair of values and for entering their combination into said register, (4) sensing means for sensing said combination of values to determine the relationship of its magnitude to the capacity of said register, (5) means operable under control of said sensing means when the capacity of said register is exceeded by said combination of values for generating and for transmitting to the address section signals representative of a logical jump command, (6) means comprising the address section and the control section for altering the logical jump command to form a jump command including as the address part of said jump command the address of the arithmetic command performance of which by the computer caused the exceeding of capacity of said register, and (7) means for storing said jump command in a predetermined location in said memory section.

2. In a computer having (*a*) a memory section comprising a plurality of data storage positions each having a corresponding address, (*b*) means for storing in selected address of said memory section items of data representing command steps in a program of operation for said computer each command including a memory address and the designation of a computer function, (*c*) an address section, (*d*) a control section, (*e*) means for entering into the address section successive representations of the memory addresses where successive commands are stored, (*f*) means for transmitting from the memory section to the address section command signals representative of the command whose address representation stands in the address section, (*g*) means controlled by the address section and the control section for causing the computer to perform the function designated by each successive command transmitted to the address section; the combination of: (1) a selectively settable control device, (2) sensing means for sensing the state of said device during the performance of a predetermined command function, (3) means responsive to the set state of said device for generating and for transmitting a logical jump command to the address section, (4) means comprising the address section and the control section for altering said logical jump command to form a jump command including as the address part of said jump command the address of the command being performed by the computer when the set state of said device was sensed, and (5) means for storing said jump command in a predetermined location in said memory section.

3. In a computer having (*a*) a memory section comprising a plurality of data storage positions each having a corresponding address, (*b*) means for storing in selected addresses of said memory section items of data representing command steps in a program of operation for said computer each command including a memory address and the designation of a computer function, (*c*) an address section, (*d*) a control section, (*e*) means for entering into the address section successive representations of the memory addresses where successive command are stored, (*f*) means for transmitting from the memory section to the address section command signals representative of the command whose address representation stands in the address section, (*g*) means controlled by the address section and the control section for causing the computer to perform the function designated by each successive command transmitted to the address section; the combination of: (1) detection means for detecting a misfunction in said computer during the performance of a programmed command function, (2) means controlled by said detection means for generating and for transmitting signals representative of a logical jump command to the address section upon detection of a misfunction, (3) means comprising the address section and the control section for altering said logical jump command to form a jump command including as the address part of said jump command the address of the command being performed by the computer when the misfunction occurred, and (4) means for storing said jump command in a predetermined location in said memory section.

4. In a computer wherein ordinal values are represented by groups of four serially-occurring binary digits each contributing a preassigned partial decimal value to said ordinal value, means for converting a group of four binary digits representing an ordinal value greater than nine to a corresponding group of four binary digits representing an ordinal value less than ten, said means including: a register adapted to simultaneously store the first three of said binary digits; gating means; connections from said gating means to said register for arming said gating means upon the occurrence of a predetermined decimal value representing condition of said register; a settable condition indicating storage device; means for interrogating said gating means and for setting said device in response to the interrogation when said gating means is armed; sensing means for subsequently sensing the value of the fourth of said binary digits during the entry of said fourth binary digit into said register and conditioned by the set state of said device for developing a correction control signal upon the sensing of a fourth binary digit representing a non-zero partial decimal value; and means responsive to said correction control signal for adding a fixed correction pattern of binary digits to said four binary digits.

5. In a computer wherein ordinal values are represented by groups of four serially-occurring binary digits each contributing a preassigned partial decimal value to said ordinal value, means for converting a group of four binary digits representing an ordinal value greater than nine to a corresponding group of four binary digits representing an ordinal value less than ten, said means including: a register adapted to simultaneously store the first three of said binary digits; gating means; connections from said gating means to said register for arming said gating means upon the occurrence of a predetermined decimal value representing condition of said register; a settable condition indicating storage device; means for interrogating said gating means and for setting said device in response to the interrogation when said gating means is armed; sensing means for subsequently sensing the value of the fourth of said binary digits during the entry of said fourth binary digit into said register and conditioned by the set state of said device for (1) generating a correction control signal and (2) generating a signal representing a decimal carry to the next higher decimal order, upon the sensing of a fourth binary digit representing a non-zero partial decimal value; and means responsive to correction control signal for adding a fixed correction pattern of binary digits to said four binary digits.

6. In a computer wherein ordinal values are represented by groups of serially-occurring binary digits each contributing a preassigned partial decimal value to said ordinal value, means for converting a group of binary digits representing an ordinal value greater than nine to a corresponding group of binary digits representing an ordinal value less than ten, said means including: a register for simultaneously storing said digits; means for entering all of the binary digits of a group except the last binary digit into said register; gating means; connections from said gating means to said register for arming said gating means upon the occurrence of a predetermined decimal value representing condition of said register; a settable condition indicating storage device; means for interrogating said gating means and for setting said device in response to the interrogation when said gating means is armed; sensing means for subsequently sensing the value of the last of said binary digits during the entry of said last binary digit into said register and conditioned by the set state of said device for developing a correction control signal upon the sensing of a last binary digit representing a non-zero partial decimal value; and means responsive to said correction control signal for adding a fixed correction pattern of binary digits to said group of binary digits.

7. In a computer wherein ordinal values are represented by groups of four serially-occurring binary digits each contributing a preassigned partial decimal value to said ordinal value, means for converting a group of four binary digits representing an ordinal value less than zero to a corresponding group of four binary digits representing an ordinal value greater than zero, said means including: a register adapted to simultaneously store the first three of said binary digits; gating means; connections from said gating means to said register for arming said gating means upon the occurrence of a predetermined decimal value representing condition of said register; a settable condition indicating storage device; means for interrogating said gating means and for setting said device in response to the interrogation when said gating means is armed; sensing means for subsequently sensing the value of the fourth of said binary digits during the entry of said fourth binary digit into said register and conditioned by the set state of said device for developing a correction control signal upon the sensing of a fourth binary digit representing a non-zero partial decimal value; and means responsive to said correction control signal for subtracting a fixed correction pattern of binary digits from said four binary digits.

8. In a computer wherein ordinal values are represented by groups of four serially-occurring binary digits each contributing a preassigned partial decimal value to said ordinal value, means for converting a group of four binary digits representing an ordinal value less than zero to a corresponding group of four binary digits representing an ordinal value greater than zero, said means including: a register adapted to simultaneously store the first three of said binary digits; gating means; connections from said gating means to said register for arming said gating means upon the occurrence of a predetermined decimal value representing condition of said register; a settable condition indicating storage device; means for interrogating said gating means and for setting said device in response to the interrogation when said gating means is armed; sensing means for subsequently sensing the value of the fourth of said binary digits during the entry of said fourth binary digit into said register and conditioned by the set state of said device for (1) generating a correction control signal and (2) generating a signal representing a decimal borrow from the next higher decimal order, upon the sensing of a fourth binary digit representing a non-zero partial decimal value; and means responsive to correction control signal for subtracting a fixed correction pattern of binary digits from said four binary digits.

9. In a computer wherein ordinal values are represented by groups of serially-occurring binary digits each contributing a preassigned partial decimal value to said ordinal value, means for converting a group of binary digits representing an ordinal value less than zero to a corresponding group of binary digits representing an ordinal value greater than zero, said means including: a register for simultaneously storing said digits; means for entering all of the binary digits of a group except the last binary digit into said register; gating means; connections from said gating means to said register for arming said gating means upon the occurrence of a predetermined decimal value representing condition of said register; a settable condition indicating storage device; means for interrogating said gating means and for setting said device in response to the interrogation when said gating means is armed; sensing means for subsequently sensing the value of the last of said binary digits during the entry of said last binary digit into said register and conditioned by the set state of said device for developing a correction control signal upon the sensing of a last binary digit representing a non-zero partial decimal value; and means responsive to said correction control signal for subtracting a fixed correction pattern of binary digits from said group of binary digits.

References Cited in the file of this patent

UNITED STATES PATENTS

| | | |
|---|---|---|
| 2,624,508 | Dickenson | Jan. 6, 1953 |
| 2,634,052 | Bloch | Apr. 7, 1953 |
| 2,636,672 | Hamilton | Apr. 28, 1953 |
| 2,679,638 | Bensky | May 25, 1954 |
| 2,702,380 | Brustman | Feb. 15, 1955 |
| 2,721,990 | McNaney | Oct. 25, 1955 |
| 2,795,378 | Beranger | June 11, 1957 |
| 2,810,516 | Tootill et al. | Oct. 22, 1957 |

FOREIGN PATENTS

| | | |
|---|---|---|
| 526,099 | Belgium | July 29, 1954 |